United States Patent
Poulsen

(10) Patent No.: US 9,672,177 B2
(45) Date of Patent: *Jun. 6, 2017

(54) SYNCHRONIZATION OF ELECTRONIC DEVICE WITH ANOTHER ELECTRONIC DEVICE ON BUS USING SYNCHRONIZATION FIELD

(71) Applicant: BlackBerry Limited, Waterloo (CA)

(72) Inventor: Jens Kristian Poulsen, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/011,158

(22) Filed: Jan. 29, 2016

(65) Prior Publication Data

US 2016/0147686 A1 May 26, 2016

Related U.S. Application Data

(63) Continuation of application No. 13/803,393, filed on Mar. 14, 2013, now Pat. No. 9,252,900, which is a
(Continued)

(51) Int. Cl.
  *G06F 13/362* (2006.01)
  *H04J 3/06* (2006.01)
  (Continued)

(52) U.S. Cl.
  CPC ............ *G06F 13/3625* (2013.01); *G06F 1/12* (2013.01); *H04J 3/06* (2013.01); *H04L 7/041* (2013.01);
  (Continued)

(58) Field of Classification Search
  None
  See application file for complete search history.

(56) References Cited

U.S. PATENT DOCUMENTS 3,710,262 A   1/1973   Sorensen
3,810,111 A   5/1974   Patel
(Continued)

FOREIGN PATENT DOCUMENTS

CA    2759946      6/2012
CN    102591834    7/2012
(Continued)

OTHER PUBLICATIONS

First Office Action for 10-2014-7037058—May 18, 2016.
(Continued)

*Primary Examiner* — Kodzovi Acolatse
(74) *Attorney, Agent, or Firm* — Integral Intellectual Property Inc.; Miriam Paton; Amy Scouten

(57) ABSTRACT

Various embodiments are described herein related to techniques for synchronizing a slave device to a master device that communicates using a unified bus communication protocol or some aspect thereof. In one example, the method may comprise assuming a first mode of operation for the unified bus communication protocol; searching for a synchronization pattern at one or more locations in transmitted data according to the first mode of operation; obtaining synchronization when the located synchronization pattern is verified according to at least one synchronization rule for the mode of operation; and if synchronization is not obtained based on the assumed first mode of operation, a second mode of operation for the unified bus communication protocol is assumed and the searching and obtaining acts are carried out on the transmitted data according to the second mode of operation.

20 Claims, 68 Drawing Sheets

| | S command word | | | | | | | | | | | | | | | |
|---|---|---|---|---|---|---|---|---|---|---|---|---|---|---|---|---|
| Bit | S15 | S14 | S13 | S12 | S11 | S10 | S9 | S8 | S7 | S6 | S5 | S4 | S3 | S2 | S1 | S0 |
| Field | PAR (w) | ACK (r) | CONSTANT SYNC SYMBOL (w) | | | | | | | | | DYNAMIC SYNC SYMBOL (w) | | | | IRQS (w) |

Related U.S. Application Data continuation-in-part of application No. 13/784,547, filed on Mar. 4, 2013.

(60) Provisional application No. 61/714,156, filed on Oct. 15, 2012, provisional application No. 61/654,386, filed on Jun. 1, 2012, provisional application No. 61/654,287, filed on Jun. 1, 2012.

(51) Int. Cl.
| | |
|---|---|
| *H04L 7/04* | (2006.01) |
| *H04L 7/10* | (2006.01) |
| *G06F 1/12* | (2006.01) |
| *H04L 1/16* | (2006.01) |
| *H04L 1/00* | (2006.01) |

(52) U.S. Cl.
CPC .............. *H04L 7/042* (2013.01); *H04L 7/048* (2013.01); *H04L 7/10* (2013.01); *H04L 1/1607* (2013.01); *H04L 2001/0094* (2013.01)

(56) References Cited

U.S. PATENT DOCUMENTS

| | | |
|---|---|---|
| 3,883,729 A | 5/1975 | de Cremiers |
| 3,995,264 A | 11/1976 | Ouchi |
| 4,298,987 A | 11/1981 | Stattel et al. |
| 4,310,922 A | 1/1982 | Lichtenberger et al. |
| 4,321,483 A | 3/1982 | Dugan |
| 4,402,073 A | 8/1983 | Hammond |
| 4,530,088 A | 7/1985 | Hamstra et al. |
| 4,592,077 A | 5/1986 | Norton |
| 4,768,188 A | 8/1988 | Barnhart et al. |
| 4,817,117 A | 3/1989 | Tasto et al. |
| 4,907,222 A | 3/1990 | Slavik |
| 4,931,923 A | 6/1990 | Fitch et al. |
| 5,012,240 A | 4/1991 | Takahashi et al. |
| 5,060,227 A | 10/1991 | Finley et al. |
| 5,210,846 A | 5/1993 | Lee |
| 5,237,322 A | 8/1993 | Heberle |
| 5,251,239 A | 10/1993 | Turban et al. |
| 5,297,181 A | 3/1994 | Barr et al. |
| 5,398,326 A | 3/1995 | Lee |
| 5,459,722 A | 10/1995 | Sherif |
| 5,495,240 A | 2/1996 | Heberle |
| 5,532,556 A | 7/1996 | Anderson et al. |
| 5,574,865 A | 11/1996 | Hashemi |
| 5,577,044 A | 11/1996 | Oxford |
| 5,856,975 A | 1/1999 | Rostoker et al. |
| 5,862,354 A | 1/1999 | Curiger |
| 5,864,872 A | 1/1999 | Lee et al. |
| 5,903,607 A | 5/1999 | Talliet |
| 6,009,389 A | 12/1999 | Dokic et al. |
| 6,026,088 A | 2/2000 | Rostoker et al. |
| 6,104,724 A | 8/2000 | Upp |
| 6,108,751 A | 8/2000 | Lee et al. |
| 6,111,888 A | 8/2000 | Green et al. |
| 6,145,007 A | 11/2000 | Dokic et al. |
| 6,157,614 A | 12/2000 | Pasternak et al. |
| 6,182,180 B1 | 1/2001 | Liu et al. |
| 6,205,504 B1 | 3/2001 | Faust et al. |
| 6,370,158 B1 | 4/2002 | O'Scolai et al. |
| 6,438,434 B1 | 8/2002 | Kamiya |
| 6,507,299 B1 | 1/2003 | Nujiten |
| 6,532,506 B1 | 3/2003 | Dunstan et al. |
| 6,535,505 B1 | 3/2003 | Hwang et al. |
| 6,539,443 B1 | 3/2003 | Dunstan et al. |
| 6,567,780 B2 | 5/2003 | Rhoads |
| 6,694,382 B1 | 2/2004 | Kovalan et al. |
| 6,697,897 B1 | 2/2004 | Friel et al. |
| 6,737,957 B1 | 5/2004 | Petrovic et al. |
| 6,904,110 B2 | 6/2005 | Trans et al. |
| 6,920,156 B1 | 7/2005 | Manchester et al. |
| 6,931,370 B1 | 8/2005 | McDowell |
| 6,944,298 B1 | 9/2005 | Rhoads |
| 6,947,893 B1 | 9/2005 | Iwaki et al. |
| 7,050,402 B2 | 5/2006 | Schmidl et al. |
| 7,054,280 B2 | 5/2006 | Novak et al. |
| 7,099,970 B1 | 8/2006 | Foegelle |
| 7,181,557 B1 | 2/2007 | Falik et al. |
| 7,200,782 B2 | 4/2007 | Vining |
| 7,245,630 B1 | 7/2007 | Chen et al. |
| 7,324,159 B2 | 1/2008 | Eveleens et al. |
| 7,365,669 B1 | 4/2008 | Melanson |
| 7,519,005 B2 | 4/2009 | Hejdeman et al. |
| 7,590,070 B1 | 9/2009 | Asawa et al. |
| 7,606,955 B1 | 10/2009 | Falik et al. |
| 7,668,202 B2 | 2/2010 | Gillet |
| 7,983,308 B1 | 7/2011 | Johnston et al. |
| 8,103,869 B2 | 1/2012 | Balandin et al. |
| 8,161,224 B2 | 4/2012 | Laurencin et al. |
| 2002/0077139 A1* | 6/2002 | Bouet ................. H04L 1/08 455/522 |
| 2002/0156948 A1 | 10/2002 | Smith |
| 2002/0173889 A1 | 11/2002 | Odinak et al. |
| 2004/0059852 A1 | 3/2004 | Sun |
| 2004/0068535 A1 | 4/2004 | Subbiah et al. |
| 2004/0116151 A1 | 6/2004 | Bosch et al. |
| 2004/0233917 A1 | 11/2004 | Rocas et al. |
| 2005/0049020 A1 | 3/2005 | Higgins et al. |
| 2005/0259609 A1 | 11/2005 | Hansquine et al. |
| 2006/0039450 A1* | 2/2006 | Fulton ................. H04B 1/7156 375/133 |
| 2006/0187969 A1 | 8/2006 | Kadowaki |
| 2007/0032241 A1* | 2/2007 | Busch ................. H04B 7/022 455/450 |
| 2007/0067528 A1 | 3/2007 | Schaffer |
| 2007/0121006 A1 | 5/2007 | Kim |
| 2007/0162665 A1 | 7/2007 | Lee |
| 2007/0232266 A1 | 10/2007 | Pinder et al. |
| 2007/0255819 A1 | 11/2007 | Hua et al. |
| 2007/0274424 A1 | 11/2007 | Lloyd |
| 2008/0163663 A1 | 7/2008 | Hankey et al. |
| 2008/0181186 A1 | 7/2008 | Rofougaran |
| 2008/0279320 A1 | 11/2008 | Rocas et al. |
| 2009/0024235 A1 | 1/2009 | Kim |
| 2009/0116475 A1 | 5/2009 | Krzyzanowski et al. |
| 2009/0119439 A1 | 5/2009 | Zou et al. |
| 2009/0122812 A1* | 5/2009 | Steiner ................. H04L 7/10 370/503 |
| 2009/0302806 A1 | 12/2009 | Lindlar et al. |
| 2009/0323975 A1 | 12/2009 | Groesch |
| 2010/0017654 A1 | 1/2010 | Wishneusky |
| 2010/0022183 A1 | 1/2010 | Ryle et al. |
| 2010/0260362 A1 | 10/2010 | Sander et al. |
| 2010/0315964 A1 | 12/2010 | Kim et al. |
| 2011/0231509 A1 | 9/2011 | Schriefer et al. |
| 2011/0231588 A1 | 9/2011 | Meredith |
| 2012/0014530 A1 | 1/2012 | Yamkovoy |
| 2012/0070004 A1 | 3/2012 | Labosco et al. |
| 2012/0144078 A1 | 6/2012 | Poulsen |
| 2012/0203560 A1 | 8/2012 | Poulsen |
| 2012/0269205 A1 | 10/2012 | Haque et al. |
| 2013/0108068 A1 | 5/2013 | Poulsen et al. |
| 2013/0174208 A1 | 7/2013 | Lee et al. |
| 2013/0322461 A1 | 12/2013 | Poulsen |
| 2014/0247834 A1 | 9/2014 | Poulsen |

FOREIGN PATENT DOCUMENTS

| | | |
|---|---|---|
| EP | 0405968 | 9/1995 |
| EP | 0693729 | 2/2000 |
| EP | 2466481 | 6/2012 |
| EP | 2775654 | 9/2014 |
| JP | 58101541 | 6/1983 |
| JP | 58095447 | 12/1984 |
| JP | 63292841 | 11/1988 |
| JP | 08242223 | 9/1996 |
| JP | 2001345875 | 12/2001 |
| JP | 2009534872 | 9/2009 |
| WO | 0044125 | 7/2000 |
| WO | 2004086614 | 10/2004 |
| WO | 2007068500 | 6/2007 |

(56) References Cited

FOREIGN PATENT DOCUMENTS

| WO | 2009045904 | 4/2009 |
|---|---|---|
| WO | 2010010278 | 1/2010 |
| WO | 2012012309 | 1/2012 |
| WO | 2013177664 | 12/2013 |
| WO | 2013177665 | 12/2013 |

OTHER PUBLICATIONS

First Office Action for JP2015-514292, mailed Jan. 22, 2016.
First Office Action for JP2015-514293, mailed Jan. 22, 2016.
First Office Action for KR10-2014-7037055.
Notice of Acceptance for AU2013270396, mailed Jan. 15, 2016.
Second Office Action for KR10-2014-7037058, mailed Aug. 17, 2016.
Third Office Action for KR10-2014-7037058, mailed Nov. 4, 2016.
Final Office Action for JP2015-514293, mailed Sep. 16, 2016.
First Office Action for CN201380040621.6, mailed Oct. 11, 2016.
First Office Action for CN201380040806.7, mailed Nov. 2, 2016.
Aihara, et al., Multiple-Bit-Rate Synchronous Terminals Towards ISDN, IEEE Communications Magazine, vol. 21, No. 5, Aug. 1, 1983, pp. 45-50.
Atkinson, First Office Action for CA2,874,891, mailed Nov. 9, 2015.
Atkinson, First Office Action for CA2,874,899, mailed Oct. 20, 2015.
Atkinson, Second Office Action for CA2,874,899, mailed Oct. 11, 2016.
Boyce, An Introduction to the Mobile Industry Processor Interface (MIPI) Alliance Standard.
Farrington, First Office Action for Australian Patent Application No. 2013270397, mailed Jun. 29, 2015.
Gnanasingham, Patent Examination Report No. 2 for AU 2013270396, Aug. 13, 2015.
Jang, et al., Study on Asynchronous Data Transmission of MediaLB Bus Communication, Convergence and Hybrid Information Technology, Springer Berlin Heidelber, pp. 54-63, Sep. 22, 2011.
Pieper, Extended European Search Report for EP13796542.2, mailed Jan. 14, 2016.
Pieper, Extended European Search Report for EP13797692.4, mailed Feb. 4, 2016.
Advisory Action for U.S. Appl. No. 12/958,942, mailed Aug. 5, 2013.
Request for Continued Examination for U.S. Appl. No. 12/958,942, mailed Aug. 23, 2013.
Office Action for U.S. Appl. No. 12/958,942, mailed Nov. 4, 2013.
hi-mobile.net, i.Tech Clip D-Radio Bluetooth Stereo Headset with Display Product Information, downloaded from http://www.hi-mobile.net/i-tech-bluetooths-clip-d-radio on Apr. 2010.
Nokia Stuff, Nokia BH-216 Bluetooth Headset with Display Product Information, downloaded from http://www.nokiastuff.net/nokia-bh-216-bluetooth-headset-with-display.
The Society of Motion Picture and Television Engineers. Proposed SMPTE Standard for Television—Format for Non-PCM Audio and Data in an AES3 Serial Digital Audio Interface, SMPTE Journal, Apr. 2000.
International Telecommunication Union, Procedures for the simultaneous transmission of data and digitally encoded voice signals over the GSTN, or over a 2-wire leased point to point telephone type circuits, Aug. 1, 1996.
Walt Kester, MT-022 Tutorial: DC Architectures III: Sigma-Delta ADC Basics, 2009.
NXP Semiconductors, TFA9881: PDM input mono class D audio amplifier, marked as confidential as of May 18, 2009.
Atmel Corporation. AVR318: Dallas 1-wire master. Application Note. 2004.
Springbok Digitronics. 1-wire FAQ. Design Guide v1.0. Aug. 19, 2004.
Awtrey, Dan. Dallas Semiconductor. Sensors: The Journal of Applied Sensing Technology: Transmitting Data and Power over a One-Wire Bus. Feb. 1997.
Office Action for U.S. Appl. No. 13/020,850, mailed Dec. 17, 2013.
Notice of Allowance for U.S. Appl. No. 12/958,942, mailed Feb. 26, 2014.
Office Action for U.S. Appl. No. 13/282,577, mailed Feb. 20, 2014.
Notice of Non-Compliant Amendment for U.S. Appl. No. 13/020,850, mailed Mar. 21, 2014.
Future Technology Devices International Ltd. FT201X (USB I2C Slave IC) Datasheet Version 1.3, 2013.
SMSC USB3503, USB 2.0 HSIC High-Speed Hub Controller Optimized for Portable Applications Datasheet Revision 1.1 (Feb. 7, 2013).
Texas Instruments USB Interface Adapter Evaluation Module User's Guide Literature No. SLLU093, Aug. 2006.
Cypress Semiconductor Corporation USB Hi-Speed Hubs webpages printed from www.cypress.com/?id-183&source=header, printed Apr. 2, 2014.
Robot Electronics—Using the I2C Bus, I2C Tutorial webpages printed from www.robot-electonics.co.uk/acatalog/I2C_Tutorial.html printed Nov. 28, 2013.
Linear Technology Corporation Datasheet—LTC4099, I2C Controlled USB Power Manager/Charger with Overvoltage protection, pp. 21-22, 2008.
Wikipedia—I2C, webpages printed from http://en.wikipedia.org/wiki/I2C, printed Nov. 28, 2013.
Philips Semiconductors, The I2C-Bus Specification, Version 2.1, Jan. 2000.
Ito T. et al.: "mBic Code and Its Performance in an Optical Communication System", IEEE Transactions on Communications, IEEE Service Center, Piscataway, NJ, USA vol. COM-32, No. 2, Feb. 1, 1984. pp. 163-168, XP000758558, ISSN:0090-6778.
Fairhurst G.: "Manchester Encoding", Sep. 2001. XP002348542, Retrieved from http://www.erg.abdn.ac.uk/users/gorry/course/phypages/man.html on Oct. 11, 2005.
Maxim Integrated Products, Overview of 1-Wire Technology and Its Use, http://pdfserv.maxim-ic.com/en/an/AN1796.pdf, Jun. 19, 2008.
Downs "Using 1-Wire I/O for Distributed System Monitoring", The AIAA/IEEE/SAE Digital Avionics Systems Conference Proceedings Sep. 15, 1998, pp. 161-168, XP010305393.
Office Action for U.S. Appl. No. 12/958,942, mailed Jan. 24, 2013.
Office Action Response for U.S. Appl. No. 12/958,942, filed Apr. 24, 2013.
Office Action for U.S. Appl. No. 12/958,942, mailed May 30, 2013.
International Search Report and Written Opinion for PCT/CA2013/000232, mailed Jun. 27, 2013.
International Search Report and Written Opinion for PCT/CA2013/000198, mailed Jun. 19, 2013.
Office Action Response for U.S. Appl. No. 12/958,942, filed Jul. 29, 2013.
Office Action Response with Terminal Disclaimer for U.S. Appl. No. 13/020,850, filed Sep. 2, 2014.
Notice of Allowance for U.S. Appl. No. 13/020,850, mailed Sep. 15, 2014.
Final Office Action for U.S. Appl. No. 13/282,577, mailed Sep. 25, 2014.
Petition to Withdraw an Application from Issue after Payment of the Issue Fee under 37 CFR 1.313(c) U.S. Appl. No. 13/020,850, mailed Jan. 21, 2015.
Request for Continued Examination (RCE) for U.S. Appl. No. 13/020,850, filed Jan. 21, 2015.
Patent Withdrawal Notice for U.S. Appl. No. 13/020,850, mailed Jan. 21, 2015.
Notice of Allowance for U.S. Appl. No. 13/020,850, mailed Feb. 3, 2015.
Benjamin W. Wah, Xiao Su and Dong Lin. A Survey of Error-Concealment Schemes for Real-Time Audio and Video Transmissions over the Internet. Department of Electrical and Computer Engineering and the Coordinated Science Laboratory University of Illinois at Urbana-Champaign, Urbana IL 61801, USA. Dec. 2000.

(56) References Cited

OTHER PUBLICATIONS

Wen-Tsai Liao, Jeng-Chun Chen and Ming-Syan Chen. Adaptive Recovery Techniques for Real-Time Audio Streams. Electrical Engineering Department National Taiwan University, Taipei, Taiwan, ROC. Apr. 2001.

Prima LT User's Guide—Feature Overview and Model Description. Online at http://www.musicamusa.com/techdocs/Manual/lt/ltuser1.pdf available as early as Apr. 2001.

* cited by examiner

| Bit | \multicolumn{16}{c}{S command word} |
|---|---|

| Bit | S15 | S14 | S13 | S12 | S11 | S10 | S9 | S8 | S7 | S6 | S5 | S4 | S3 | S2 | S1 | S0 |
|---|---|---|---|---|---|---|---|---|---|---|---|---|---|---|---|---|
| Field | PAR (w) | ACK (r) | CONSTANT SYNC SYMBOL (w) | | | | | | | | | DYNAMIC SYNC SYMBOL (w) | | | | IRQS (w) |

Figure 5

| Bit | 0-15 | 16-31 | 32-47 | 48-63 | 64-79 | 80-95 | 96-111 |
|---|---|---|---|---|---|---|---|
| Content | S | Audio 1 | X | Audio 1 | Y | Audio 1 | S |

Master writes S15
Slave responds S14

Figure 6

| LAST FRAME | Device that should respond | | Master action on ACK value | | Slave action on ACK value | |
|---|---|---|---|---|---|---|
| | PARITY | ACK | ACK=1 | ACK=0 | ACK=1 | ACK=0 |
| PING | Master writes parity bit based on all bits on bus during last frame including last parity bit. | All devices attached to bus respond to parity failure with NACK. | There has been a bus error in this frame. Treat data with caution, signal bus error. | All ok, valid frame. | If device itself is signaling NACK for two frames in a row, set status level "10", otherwise ignore. | All ok, valid frame. |
| FUNCTION (no data) | | | | | | |
| FUNCTION (with data) | | If slave address matches the addressed device, reply with NACK, if parity error. | All ok, valid data. | Signal IO ERROR. Bus controller should try to recover by performing IO operation again. | All ok, valid data. | Depend on operation, see READ & WRITE |
| READ | | | | | | Slave should ignore condition. |
| WRITE | | | | | | Addressed device should not proceed with write. |

Figure 7

| IRQS (S-word) | S0 DELAY (Reg. 0x11, B4) | Frame action | |
|---|---|---|---|
| | | Master controller requests PING | Master controller requests read/write operation |
| 0 | 0 | Perform PING X15:13="000" | Perform read/write sequence X15:X13≠ '000' |
| 0 | 1 | | |
| 1 | 0 | | |
| 1 | 1 | | Perform ping, original read/write/function action is delayed and retried again in next frame, X15:X13='000' |

Figure 8

| X command word ||||||||||||||||
|---|---|---|---|---|---|---|---|---|---|---|---|---|---|---|---|
| TYPE | X15 | X14 | X13 | X12 | X11 | X10 | X9 | X8 | X7 | X6 | X5 | X4 | X3 | X2 | X1 | X0 |
| PING | 0 (w) | 0 (w) | 0 (w) | BANK | DS0 | DS1 | REQ BUS | REL BUS | ST11 (r) || ST10 (r) || ST9 (r) || ST8 (r) ||
| FUNC | 0 (w) | 0 (w) | 1 (w) | | DEV3-0 (w) |||| FUNCTION (w) ||||||||
| OTHER | 0 (w) | 1 (w) | 0 (w) | | FUTURE EXPANSION – VALUES SHOULD BE IGNORED BY SLAVE ||||||||||||
| | 0 (w) | 1 (w) | 1 (w) | | ||||||||||||
| WR8 | 1 (w) | 0 (w) | 0 (w) | | DEV3-0 (w) |||| ADDRESS (7-0) (w) ||||||||
| RD8 | 1 (w) | 0 (w) | 1 (w) | | |||| ||||||||
| WR16 | 1 (w) | 1 (w) | 0 (w) | | |||| ||||||||
| RD16 | 1 (w) | 1 (w) | 1 (w) | | |||| ||||||||

Figure 9a

| X command word | | | | | | | | | | | | | | | | |
|---|---|---|---|---|---|---|---|---|---|---|---|---|---|---|---|---|
| TYPE | X15 | X14 | X13 | X12 | X11 | X10 | X9 | X8 | X7 | X6 | X5 | X4 | X3 | X2 | X1 | X0 |
| PING | 0 (w) | 0 (w) | 0 (w) | DS0 | DS1 | DS2 | DS3 | BANK | ST11 (r) | | ST10 (r) | | ST9 (r) | | ST8 (r) | |
| FUNC | 0 (w) | 0 (w) | 1 (w) | | DEV3-0 (w) | | | | FUNCTION (w) | | | | | | | |
| OTHER | 0 (w) | 1 (w) | 0 (w) | | FUTURE EXPANSION – VALUES SHOULD BE IGNORED BY SLAVE | | | | | | | | | | | |
| | 0 (w) | 1 (w) | 1 (w) | | | | | | | | | | | | | |
| WR8 | 1 (w) | 0 (w) | 0 (w) | | DEV3-0 (w) | | | | ADDRESS (7-0) (w) | | | | | | | |
| RD8 | 1 (w) | 0 (w) | 1 (w) | | | | | | | | | | | | | |
| WR16 | 1 (w) | 1 (w) | 0 (w) | | | | | | | | | | | | | |
| RD16 | 1 (w) | 1 (w) | 1 (w) | | | | | | | | | | | | | |

Figure 9b

| TYPE | Y command word ||||||||||||||||
|---|---|---|---|---|---|---|---|---|---|---|---|---|---|---|---|---|
| | Y15 | Y14 | Y13 | Y12 | Y11 | Y10 | Y9 | Y8 | Y7 | Y6 | Y5 | Y4 | Y3 | Y2 | Y1 | Y0 |
| PING | ST7 (r) || ST6 (r) || ST5 (r) || ST4 (r) || ST3 (r) || ST2 (r) || ST1 (r) || ST0 (r) ||
| FUNC | FUNCTION DATA (r/w) ||||||||||||||||
| OTHER | FUTURE EXPANSION - SHOULD BE IGNORED BY SLAVE ||||||||||||||||
| WR8 | ADDR 7-0 (w) |||||||| WD 7-0 (w) ||||||||
| RD8 | ^^ |||||||| RD 7-0 (r) ||||||||
| WR16 | WD15-0 (w) ||||||||||||||||
| RD16 | RD15-0 (r) ||||||||||||||||

Figure 10

| X3 | X2 | X1 | X0 | Function | Support broadcast |
|---|---|---|---|---|---|
| 0 | 0 | 0 | 0 | Request device ID | Yes |
| 0 | 0 | 0 | 1 | Hard reset | Yes |
| 0 | 0 | 1 | 0 | Soft reset | Yes |
| 0 | 0 | 1 | 1 | Read IRQ source | No |
| 0 | 1 | 0 | 0 | Perform device self test | Yes |
| 0 | 1 | 0 | 1 | Request capability information | No |
| 0 | 1 | 1 | 0 | Request relative calibration data | No |
| 0 | 1 | 1 | 1 | Request absolute calibration data | No |
| 1 | 0 | 0 | 0 | Read and increment address | No |
| 1 | 0 | 0 | 1 | Write and increment address | No |
| 1 | 0 | 1 | 0 | Execute function at address | Yes |
| 1 | 0 | 1 | 1 | Execute function at address indirect | Yes |
| 1 | 1 | 0 | 0 | Set gain | Yes |
| 1 | 1 | 0 | 1 | Set delay | Yes |
| 1 | 1 | 1 | 0 | Set power | Yes |
| 1 | 1 | 1 | 1 | Reserved for future expansion ||

Figure 11a

| DATA | SEL_IN(N) | SEL_OUT(N) | POSITION | FUNCTION |
|---|---|---|---|---|
| BITSTREAMS | 0 | 0 | LEFT | TWO CHANNEL BUS |
| BITSTREAMS | 0 | 1 | RIGHT | TWO CHANNEL BUS |
| BUS | 0 | 0 | 0 | MULTIFORMAT BUS |
| BUS | 0 | 1 | 1 | MULTIFORMAT BUS |
| BUS | 1 | 0 | 2 | MULTIFORMAT BUS |
| BUS | 1 | 1 | 3 | MULTIFORMAT BUS |
| BUS | FLOAT | 0 | 4 | MULTIFORMAT BUS |
| BUS | FLOAT | 1 | 5 | MULTIFORMAT BUS |
| BUS | 0 | FLOAT | 6 | MULTIFORMAT BUS |
| BUS | 1 | FLOAT | 7 | MULTIFORMAT BUS |
| BUS | FLOAT | FLOAT | 8 | MULTIFORMAT BUS |

Figure 11b

| DATA | SEL_IN(N) | SEL_OUT(N) | POSITION | FUNCTION |
|---|---|---|---|---|
| BITSTREAMS | 0 | 0 | LEFT | TWO CHANNEL BUS |
| BITSTREAMS | 0 | 1 | RIGHT | TWO CHANNEL BUS |
| BUS | 0 | 0 | 0 | MULTIFORMAT BUS |
| BUS | 0 | 1 | 1 | MULTIFORMAT BUS |
| BUS | 1 | 0 | 2 | MULTIFORMAT BUS |
| BUS | 1 | 1 | 3 | MULTIFORMAT BUS |
| BUS | 0 | SEL_IN(1) | 0 (first element) | MULTIFORMAT BUS/RING |
| BUS | SEL_OUT(N-1) | SEL_IN (N+1) | N (intermediate el.) | MULTIFORMAT BUS/RING |
| BUS | SEL_OUT(N-1) | 0 | N (last element) | MULTIFORMAT BUS/RING |
| X | Z | 1 | | TEST |

Figure 11c

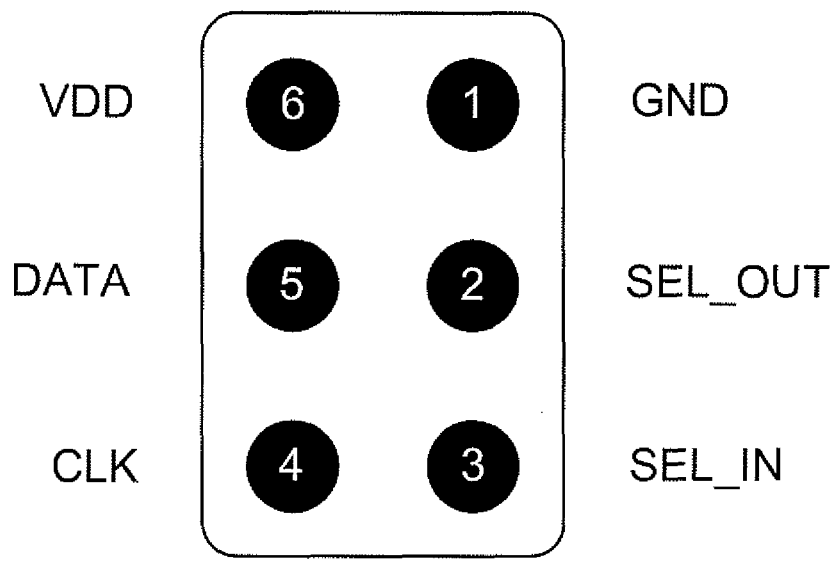
Figure 11d
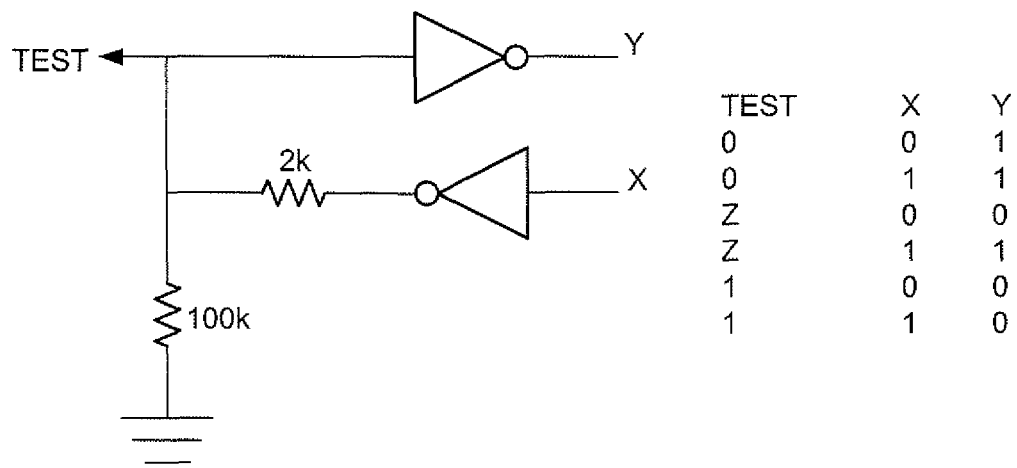
Figure 11e
| Register | B7 | B6 | B5 | B4 | B3 | B2 | B1 | B0 |
|---|---|---|---|---|---|---|---|---|
| 0x0000 | TYPE | CHANNEL INFO | | | DATA FORMAT | | | |
Figure 12

| B3 | B2 | B1 | B0 | Data format |
|---|---|---|---|---|
| 0 | 0 | 0 | 0 | This value is reserved to indicate end of port information |
| 0 | All other combinations | | | Future expansion |
| 1 | 0 | 0 | 0 | Binary, two's complement |
| 1 | 0 | 0 | 1 | Bitstream |
| 1 | 0 | 1 | 0 | String |
| 1 | 0 | 1 | 1 | File |
| 1 | 1 | 0 | 0 | Floating point, IEEE 754-2008 single precision binary |
| 1 | 1 | 0 | 1 | Floating point, IEEE 754-2008 double precision binary |
| 1 | 1 | 1 | 0 | Floating point, IEEE 754-2008 decimal32 format |
| 1 | 1 | 1 | 1 | Floating point, IEEE 754-2008 decimal64 format |

Figure 13

| Register | B7 | B6 | B5 | B4 | B3 | B2 | B1 | B0 |
|---|---|---|---|---|---|---|---|---|
| 0x0000 | Error information (3:0) | | | | Error code | | | |
| 0x0001 | Error information (11:0) | | | | | | | |

Figure 14

| B3 | B2 | B1 | B0 | IRQ source | Error information |
|---|---|---|---|---|---|
| 0 | 0 | 0 | 0 | No error | All zeros |
| 0 | 0 | 0 | 1 | Slave IRQ low level | None (read slave status registers) |
| 0 | 0 | 1 | 0 | Slave IRQ high level | None (read slave status registers) |
| 0 | 0 | 1 | 1 | Multi master request | None (all zeros) |
| 0 | 1 | 0 | 0 | Device self test | Device dependent (zero=no error) |
| 0 | 1 | 0 | 1 | Parity error | Number of frames since detection |
| 0 | 1 | 1 | 0 | Bus collision | Corrupted bit inside frame |
| 0 | 1 | 1 | 1 | Slave sync loss | Slave number before loss of sync |
| 1 | 0 | 0 | 0 | Function | Unsupported function (reg. 0x0001) |
| 1 | 0 | 0 | 1 | Overheating | Temperature in Celcius (optional) |
| Any other combination | | | | Future expansion (ignore source and information) | |

Figure 15

| Register | Purpose | B7 | B6 | B5 | B4 | B3 | B2 | B1 | B0 |
|---|---|---|---|---|---|---|---|---|---|
| 0x0000 | Data port | DATA (7:0) | | | | | | | |
| 0x0001 | | DATA (15:8) | | | | | | | |
| 0x0002 | Setup Port | CHANNEL SELECTION | | | | | | | |
| 0x0003 | | ACTIVATE | PREPARE | IRQ23 MASK | IRQF MASK | PORT | | | |
| 0x004 | | START | | | | | | | |
| 0x0005 | | SYNCHRONIZE | | SUBGROUP | | | REPEAT | | |
| 0x006 | | SKIP(1:0) | | LENGTH | | | | | |
| 0x007 | | PCLKD | | | | SKIP(5:2) | | | |

Figure 16a

| Register | Purpose | B7 | B6 | B5 | B4 | B3 | B2 | B1 | B0 |
|---|---|---|---|---|---|---|---|---|---|
| 0x0000 | Data port | DATA (7:0) | | | | | | | |
| 0x0001 | | DATA (15:8) | | | | | | | |
| 0x0002 | Setup port | ACTIVATE | | POWER LEVEL | | | PORT | | |
| 0x0003 | | CHANNEL SELECTION | | | | | | | |
| 0x004 | | START | | | | | | | |
| 0x005 | | BANK MODE | BANK SELECT | LENGTH | | | | | |
| 0x006 | | IRQ23 MASK | IRQF MASK | SKIP | | | | | |
| 0x0007 | | SYNCHRONIZE | | SUBGROUP | | | REPEAT | | |
| 0x008 | | COMMAND SEPARATION | | | | | | | |

Figure 16b

| B2 | B1 | B0 | Power [%] | Functionality |
|---|---|---|---|---|
| 0 | 0 | 0 | <0.1 | Shut down at next frame boundary, mode change to 001 by clock transition |
| 0 | 0 | 1 | 1 | Shut down at next frame boundary, mode change by SoundWire command |
| 0 | 1 | 0 | 5 | SLEEP mode, limited functionality |
| 0 | 1 | 1 | 50 | Lowest power with full functionality |
| 1 | 0 | 0 | 75 | Low power mode |
| 1 | 0 | 1 | 100 | Normal mode |
| 1 | 1 | 0 | 150 | High performance mode |
| 1 | 1 | 1 | 200 | Highest performance mode |

Figure 17

| Bit | B7 | B6 | B5 | B4 | B3 | B2 | B1 | B0 |
|---|---|---|---|---|---|---|---|---|
| Channel | 7 | 6 | 5 | 4 | 3 | 2 | 1 | 0 |

| BANK MODE | BANK SELECT | Bank selected during read/write | Read/write address |
|---|---|---|---|
| 0 | 0 | Determined by MSB of I/O operation | MSB given by BANK select. MSB from master given during IO operation is ignored. |
| 0 | 1 | | |
| 1 | 0 | 0 | Given by master during IO operation (either 8 or 16 bits address) |
| 1 | 1 | 1 | |

Figure 20

| Bit | 0-15 | 16-31 | 32-47 | 48-63 | 64-79 | 80-95 |
|---|---|---|---|---|---|---|
| Content | S, X or Y | Audio 0 | Audio 1 | Empty | Audio 0 | Audio 1 |

START=00000000

REPEAT=010=2X1=2

SUBGROUP=111 (IGNORE)

SKIP=000100

CHANNEL SELECTION= 00000011

Figure 21

| Configuration | B7 | B6 | Source of synchronization | | | Function |
|---|---|---|---|---|---|---|
| | | | DS0 | DS1 | PORT PREAMBLE | |
| 1 | 0 | 0 | | | | Isochronous |
| 2 | 0 | 1 | | | TX/RX | Asynchronous |
| 3 | 1 | 0 | Reset phase adder | | | Fractional synchronization |
| 4 | 1 | 1 | | Reset phase adder | | |

Figure 22a

| B3 | B2 | B1 | B0 | Port clock divide factor |
|---|---|---|---|---|
| 0 | 0 | 0 | 0 | Clock disabled (low) |
| 0 | 0 | 0 | 1 | 1 |
| 0 | 0 | 1 | 0 | 2 |
| 0 | 0 | 1 | 1 | 2.5 |
| 0 | 1 | 0 | 0 | 3 |
| 0 | 1 | 0 | 1 | 4 |
| 0 | 1 | 1 | 0 | 5 |
| 0 | 1 | 1 | 1 | 6 |
| 1 | 0 | 0 | 0 | 6.5 |
| 1 | 0 | 0 | 1 | 8 |
| 1 | 0 | 1 | 0 | 10 |
| 1 | 0 | 1 | 1 | 12 |
| 1 | 1 | 0 | 0 | 12.5 |
| 1 | 1 | 0 | 1 | 13 |
| 1 | 1 | 1 | 0 | 16 |
| 1 | 1 | 1 | 1 | 24 |

Figure 22b

| Configuration | B7 | B6 | Source of synchronization ||||| Function |
|---|---|---|---|---|---|---|---|---|
| | | | DS0 | DS1 | DS2 | DS3 | PORT | |
| 1 | 0 | 0 | None ||||| Isochronous |
| 2 | 0 | 1 | | | | | TX/RX | Asynchronous |
| 3 | 1 | 0 | TX samples offered | | RX samples accepted | | | |
| 4 | 1 | 1 | Multi frame start | | | | | Fractional synchronization |

Figure 22c

| B3 | Group |
|---|---|
| 0 | X1 |
| 1 | X3 |

| B5 | B4 | Group |
|---|---|---|
| 0 | 0 | X1 |
| 0 | 1 | X2 |
| 1 | 0 | X4 |
| 1 | 1 | X8 |

| Bit | 0-15 | 16-31 | 32-47 | 48-63 | 64-79 | 80-95 | 96-111 | 112-127 |
|---|---|---|---|---|---|---|---|---|
| Content | S, X or Y | Empty | Empty | Audio 0 | Audio 1 | Empty | Audio 3 | Audio 4 |

CHANNEL SELECTION = 00001111

| B3 | Channel activate |
|---|---|
| 0 | X1 |
| 1 | X3 |

| B2 | B1 | Channel activate |
|---|---|---|
| 0 | 0 | X1 |
| 0 | 1 | X2 |
| 1 | 0 | X4 |
| 1 | 1 | X8 |

| COMMAND SEPARATION | | | | | | | | FRAME TYPE |
|---|---|---|---|---|---|---|---|---|
| B7 | B6 | B5 | B4 | B3 | B2 | B1 | B0 | |
| 0 | Distance between subframes in nibbles | | | | | | | Word |
| 1 | Subframe distance, see Figure 25b | | | Number of bitstreams | | | | Bitstream |

| B6 | B5 | B4 | Subframe separation (bits) | Subframe length (bits) |
|---|---|---|---|---|
| 0 | 0 | 0 | 0 | 16 |
| 0 | 0 | 1 | 34 | 50 |
| 0 | 1 | 0 | 48 | 64 |
| 0 | 1 | 1 | 80 | 96 |
| 1 | 0 | 0 | 84 | 100 |
| 1 | 0 | 1 | 112 | 128 |
| 1 | 1 | 0 | 114 | 130 |
| 1 | 1 | 1 | 176 | 192 |

Figure 25b

| COMMAND SEPARATION | Interpretation of field | FRAME TYPE |
|---|---|---|
| 0-239 | Distance between subframes in nibbles | Word mode |
| 240-255 | Distance between bitstreams, in bits (only 4 lower bits is used) | Bitstream mode |

| B5 | B4 | B3 | B2 | B1 | B0 |
|----|----|----|----|----|----|
| VREPEAT | | | HREPEAT | | |

| LSB | Multiplier |
|-----|------------|
| 0 | 1 |
| 1 | 3 |

| MSB | LSB+1 | Multiplier |
|-----|-------|------------|
| 0 | 0 | 1 |
| 0 | 1 | 2 |
| 1 | 0 | 4 |
| 1 | 1 | 8 |

| S15 | L | VL | IL | Z | R | VR | IR |
|-----|---|----|----|---|---|----|----|
| S14 | L | VL | IL | Z | R | VR | IR |
| S13 | L | VL | IL | Z | R | VR | IR |
| S12 | L | VL | IL | Z | R | VR | IR |
| S11 | L | VL | IL | Z | R | VR | IR |
| S10 | L | VL | IL | Z | R | VR | IR |
| S9  | L | VL | IL | Z | R | VR | IR |
| S8  | L | VL | IL | Z | R | VR | IR |

Figure 28b

| S15 | L | VL | R |
|-----|---|----|---|
| S14 | L | IL | R |
| S13 | L | VR | R |
| S12 | L | IR | R |
| S11 | L | VL | R |
| S10 | L | IL | R |
| S9  | L | VR | R |
| S8  | L | IR | R |

Figure 28c

| S15 | L | R | VL | L | R |
| S14 | L | R | IL | L | R |
| S13 | L | R | VR | L | R |
| S12 | L | R | IR | L | R |
| S11 | L | R | VL | L | R |
| S10 | L | R | IL | L | R |
| S9  | L | R | VR | L | R |
| S8  | L | R | IR | L | R |

Figure 28d

| Register | Purpose | B7 | B6 | B5 | B4 | B3 | B2 | B1 | B0 |
|---|---|---|---|---|---|---|---|---|---|
| 0x0008 | Setup port | COMMAND SEPARATION ||||||||
| 0x0009 | | MULTI FRAME | FIRST STAGE || OPTIONAL STAGE || 2nd STAGE | THIRD STAGE ||
| 0x000A | | FRACTIONAL (LOW) check 6/9 bits ||||||||
| 0x000B | | FRACTIONAL (HIGH) ||||||||
| 0x000C | Address port | ADDRESS (7:0) ||||||||
| 0x000D | | ADDRESS (15:8) ||||||||
| 0x000E | Command port | FUNCTION ||||||||
| 0x000F | | FRAME CONTROL ||| CURRENT BANK | DEVICE ADDRESS ||||
| 0x0010 | | MCLKD |||| CLOCK SOURCE | ENABLE MULTI MAST | MASTER IRQ MASK | REQUEST MULTI MASTER |
| 0x0011 | | BUS ERROR MASK | IO ERROR MASK | ATTENTION MASK | SD DELAY ENABLE | ATTACHMENT MASK | IOC MASK | COMMAND MASK | FRAME DONE MASK |
| 0x0012 | | BUS ERROR | IO ERROR | STATUS1 | STATUS0 | ATTACHMENT | IOC | COMMAND ERROR | FRAME DONE |
| 0x0013 | | SLAVE STATUS ||||||||
| 0x0014 | | SLAVE STATUS ||||||||
| 0x0015 | | SLAVE STATUS ||||||||

Figure 29a

| Register | Purpose | B7 | B6 | B5 | B4 | B3 | B2 | B1 | B0 |
|---|---|---|---|---|---|---|---|---|---|
| 0x009 | Address port | SYS FREQ/FRAME RATE | | | | | | | |
| 0x00A | | OVERSAMPLE (X) | | | | | | | |
| 0x00B | | OVERSAMPLE (Y) | | | | | | | |
| 0x00C | | ADDRESS (7:0) | | | | | | | |
| 0x00D | | ADDRESS (15:8) | | | | | | | |
| 0x00E | Command port | FUNCTION | | | | | | | |
| 0x00F | | FRAME CONTROL | | | MULTI MASTER | DEVICE ADDRESS | | | |
| 0x0010 | Status port | ENABLE MULTI | CURR BANK | POWER | CLOCK SOURCE | CLOCK DIV | | | |
| 0x0011 | | BUS ERROR MASK | IO ERROR MASK | ATTENTION MASK | SD DELAY ENABLE | ATTACHMENT MASK | IOC MASK | COMMAND MASK | FRAME DONE MASK |
| 0x0012 | | BUS ERROR | IO ERROR | STATUS1 | STATUS0 | ATTACHMENT | IOC | COMMAND ERROR | FRAME DONE |
| 0x0013 | | SLAVE STATUS | | | | | | | |
| 0x0014 | | SLAVE STATUS | | | | | | | |
| 0x0015 | | SLAVE STATUS | | | | | | | |

Figure 29b

| B7 | B6 | Ratio |
|---|---|---|
| 0 | 0 | 13 |
| 0 | 1 | 16 |
| 1 | 0 | 24 |
| 1 | 1 | 25 |

Figure 29c

| B7 | B6 | Ratio |
|---|---|---|
| 0 | 0 | 1 |
| 0 | 1 | 5 |
| 1 | 0 | 13 |
| 1 | 1 | Future exp. |

| B5 | Ratio |
|---|---|
| 0 | 1 |
| 1 | 1/3 |

| B4 | B3 | Ratio |
|---|---|---|
| 0 | 0 | 2 |
| 0 | 1 | 4 |
| 1 | 0 | 8 |
| 1 | 1 | 16 |

Multiformat decimator

| B7 | B6 | B5 | Frame operation |
|---|---|---|---|
| 0 | 0 | 0 | PING |
| 0 | 0 | 1 | FUNCTION |
| 0 | 1 | 0 | FUTURE EXPANSION |
| 0 | 1 | 1 | |
| 1 | 0 | 0 | WRITE 8 bits |
| 1 | 0 | 1 | READ 8 bits |
| 1 | 1 | 0 | WRITE 16 bits |
| 1 | 1 | 1 | READ 16 bits |

| Value | Master write to WRITE CONTROL | Master read from B7 |
|---|---|---|
| 00 | No operation | No write operation is under way |
| 10 | Start write operation | Write operation is active and not completed |

Figure 30

| B7 | B6 | Result of master write | Result of master read |
|---|---|---|---|
| 0 | 0 | No operation started | All operations completed |
| 0 | 1 | Start read operation | Read still active |
| 1 | 0 | Start write operation | Write still active |
| 1 | 1 | Start function | Function still active |

Figure 31

| B7 | B6 | B5 | B4 | B3 | B2 | B1 | B0 |
|---|---|---|---|---|---|---|---|
| MCLKD | | | | CLOCK SOURCE | ENABLE MULTI MASTER | MASTER IRQ MASK | REQUEST MULTI MASTER |

Figure 32a

| B7 | B6 | B5 | B4 | B3 | B2 | B1 | B0 |
|---|---|---|---|---|---|---|---|
| ENABLE MULTI | CURR BANK | POWER | CLOCK SOURCE | DIV 3 | DIV 2 | DIV 1 | DIV 0 |

Figure 32b

| B3 | B2 | B1 | B0 | Port clock divide factor |
|---|---|---|---|---|
| 0 | 0 | 0 | 0 | Clock disabled (low) |
| 0 | 0 | 0 | 1 | 1 |
| 0 | 0 | 1 | 0 | 2 |
| 0 | 0 | 1 | 1 | 2.5 |
| 0 | 1 | 0 | 0 | 3 |
| 0 | 1 | 0 | 1 | 4 |
| 0 | 1 | 1 | 0 | 5 |
| 0 | 1 | 1 | 1 | 6 |
| 1 | 0 | 0 | 0 | 6.5 |
| 1 | 0 | 0 | 1 | 8 |
| 1 | 0 | 1 | 0 | 10 |
| 1 | 0 | 1 | 1 | 12 |
| 1 | 1 | 0 | 0 | 12.5 |
| 1 | 1 | 0 | 1 | 13 |
| 1 | 1 | 1 | 0 | 16 |
| 1 | 1 | 1 | 1 | 24 |

Figure 33a

| Division ratio | | | | EXTCLK/Single wire bus clock | EXTCLK/Two wire bus clock |
|---|---|---|---|---|---|
| B3 | B2 | B1 | B0 | | |
| 0 | 0 | 0 | 0 | Clock output disabled | |
| 0 | 0 | 0 | 1 | 2 | 1 |
| 0 | 0 | 1 | 0 | 4 | 2 |
| 0 | 0 | 1 | 1 | 6 | 3 |
| 0100-1110 | | | | 8-28 | 4-14 |
| 1 | 1 | 1 | 1 | 30 | 15 |

Figure 33b

| B7 | B6 | B5 | B4 | B3 | B2 | B1 | B0 |
|---|---|---|---|---|---|---|---|
| BUS ERROR MASK (read/write) | IO ERROR MASK (read/write) | ATTENTION MASK (read/write) | SO DELAY ENABLE (read/write) | ATTACHMENT MASK (read/write) | IOC MASK (read/write) | COMMAND MASK (read/write) | FRAME DONE MASK (read/write) |

Figure 34a

| B7 | B6 | B5 | B4 | B3 | B2 | B1 | B0 |
|---|---|---|---|---|---|---|---|
| BUS ERROR MASK (read/write) | IO ERROR MASK (read/write) | ATTENTION MASK (read/write) | SO DELAY ENABLE (read/write) | ATTACHMENT MASK (read/write) | WRC MASK (read/write) | RDC MASK (read/write) | FRAME DONE MASK (read/write) |

Figure 34b

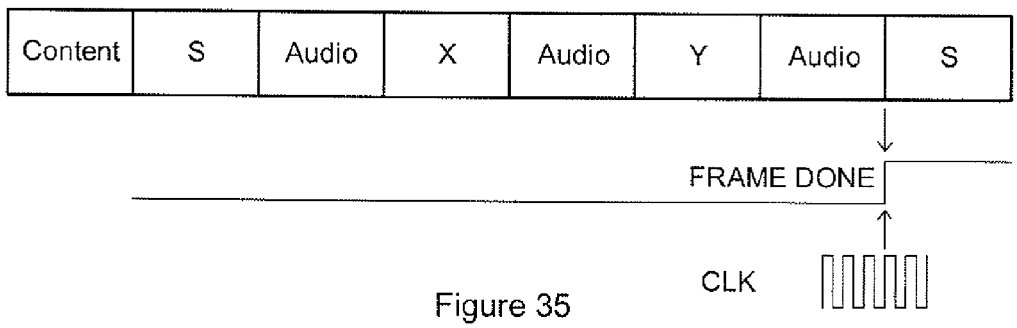

Figure 35

| B7 | B6 | B5 | B4 | B3 | B2 | B1 | B0 |
|---|---|---|---|---|---|---|---|
| BUS ERROR (read) | IO ERROR (read) | STATUS1 (read) | STATUS0 (read) | ATTACHMENT (read) | IOC (read) | COMMAND ERROR (read) | FRAME DONE (read) |

Figure 36a

| B7 | B6 | B5 | B4 | B3 | B2 | B1 | B0 |
|---|---|---|---|---|---|---|---|
| BUS ERROR (read) | IO ERROR (read) | STATUS1 (read) | STATUS0 (read) | ATTACHMENT (read) | WRC (read) | RDC (read) | FRAME DONE (read) |

Figure 36b

| Reg | B7 | B6 | B5 | B4 | B3 | B2 | B1 | B0 |
|---|---|---|---|---|---|---|---|---|
| 0x0013 | ST3H | ST3L | ST2H | ST2L | ST1H | ST1L | ST0H | ST0L |
| 0x0014 | ST7H | ST7L | ST6H | ST6L | ST5H | ST5L | ST4H | ST4L |
| 0x0015 | ST11H | ST11L | ST10H | ST10L | ST9H | ST9L | ST8H | ST8L |

Figure 37

| Field type | Encoding type | Position | Manufacturer name (see special table) | | Part number |
|---|---|---|---|---|---|
| Bit number | B31 | B30-27 | B26-B22 | B21-B17 | B16-B0 |
| Length in bits | 1 | 4 | 5 | 5 | 17 |
| Encoded information | 0 = Compact | 0 = None<br>1-15 = Position | First acronym letter | Second acronym letter | Part number encoded in binary |
| | 1 = General | | See Figure 38b | | |

Figure 38a

| Field type | Encoding type | Position | Grade | Revision | | Part number |
|---|---|---|---|---|---|---|
| Byte number | First | | | Second | | Following |
| Bit number | B7 | B6-B3 | B2-B0 | B7-B4 | B3-B0 | B7-B0 |
| Length in bits | 1 | 4 | 3 | 4 | 4 | 8 |
| Encoding | 0 = Compact encoding | See Figure 38a | | | | |
| | 1= General encoding | 0 = None<br>1-15 = Position | 000-011 Grade A-D | Bus version | Chip version | ASCII character or NULL terminator |
| | | | 100-111 Future expansion | | | |

Figure 38b

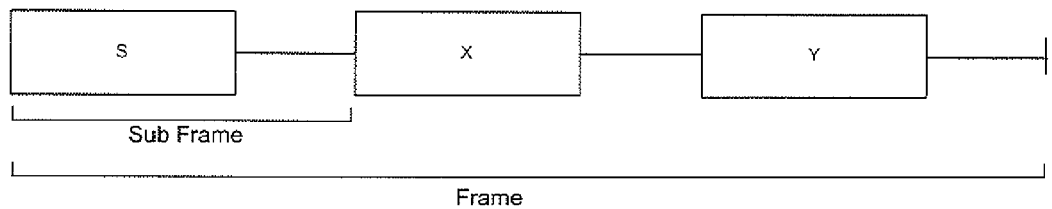

Sub Frame

Frame

Figure 39

S word

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | PAR | ACK | 1 | 0 | 1 | 1 | 0 | 0 | 0 | 0 | 1 | CR3 | CR2 | CR1 | CR0 | IRQ |
| 010 | X15 | X14 | X13 | X12 | X11 | X10 | X9 | X8 | X7 | X6 | X5 | X4 | X3 | X2 | X1 | X0 |
| 020 | Y15 | Y14 | Y13 | Y12 | Y11 | Y10 | Y9 | Y8 | Y7 | Y6 | Y5 | Y4 | Y3 | Y2 | Y1 | Y0 |

X word / Y word

Figure 40

Audio B channel word
Audio A channel word
S word

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | PAR | ACK | 1 | 0 | 1 | 1 | 0 | 0 | 0 | 0 | 1 | CR3 | CR2 | CR1 | CR0 | IRQ |
| 010 | A15 | A14 | A13 | A12 | A11 | A10 | A9 | A8 | A7 | A6 | A5 | A4 | A3 | A2 | A1 | A0 |
| 020 | B15 | B14 | B13 | B12 | B11 | B10 | B9 | B8 | B7 | B6 | B5 | B4 | B3 | B2 | B1 | B0 |
| 030 | C15 | C14 | C13 | C12 | C11 | C10 | C9 | C8 | C7 | C6 | C5 | C4 | C3 | C2 | C1 | C0 |
| 040 | D15 | D14 | D13 | D12 | D11 | D10 | D9 | D8 | D7 | D6 | D5 | D4 | D3 | D2 | D1 | D0 |
| 050 | E15 | E14 | E13 | E12 | E11 | E10 | E9 | E8 | E7 | E6 | E5 | E4 | E3 | E2 | E1 | E0 |
| 060 | Z | Z | Z | Z | Z | Z | Z | Z | Z | Z | Z | Z | Z | Z | Z | Z |
| 070 | Z | Z | Z | Z | Z | Z | Z | Z | Z | Z | Z | Z | Z | Z | Z | Z |
| 080 | X15 | X14 | X13 | X12 | X11 | X10 | X9 | X8 | X7 | X6 | X5 | X4 | X3 | X2 | X1 | X0 |
| 090 | A15 | A14 | A13 | A12 | A11 | A10 | A9 | A8 | A7 | A6 | A5 | A4 | A3 | A2 | A1 | A0 |
| 0A0 | B15 | B14 | B13 | B12 | B11 | B10 | B9 | B8 | B7 | B6 | B5 | B4 | B3 | B2 | B1 | B0 |
| 0B0 | C15 | C14 | C13 | C12 | C11 | C10 | C9 | C8 | C7 | C6 | C5 | C4 | C3 | C2 | C1 | C0 |
| 0C0 | D15 | D14 | D13 | D12 | D11 | D10 | D9 | D8 | D7 | D6 | D5 | D4 | D3 | D2 | D1 | D0 |
| 0D0 | E15 | E14 | E13 | E12 | E11 | E10 | E9 | E8 | E7 | E6 | E5 | E4 | E3 | E2 | E1 | E0 |
| 0E0 | Z | Z | Z | Z | Z | Z | Z | Z | Z | Z | Z | Z | Z | Z | Z | Z |
| 0F0 | Z | Z | Z | Z | Z | Z | Z | Z | Z | Z | Z | Z | Z | Z | Z | Z |
| 100 | Y15 | Y14 | Y13 | Y12 | Y11 | Y10 | Y9 | Y8 | Y7 | Y6 | Y5 | Y4 | Y3 | Y2 | Y1 | Y0 |
| 110 | A15 | A14 | A13 | A12 | A11 | A10 | A9 | A8 | A7 | A6 | A5 | A4 | A3 | A2 | A1 | A0 |
| 120 | B15 | B14 | B13 | B12 | B11 | B10 | B9 | B8 | B7 | B6 | B5 | B4 | B3 | B2 | B1 | B0 |
| 130 | C15 | C14 | C13 | C12 | C11 | C10 | C9 | C8 | C7 | C6 | C5 | C4 | C3 | C2 | C1 | C0 |
| 140 | D15 | D14 | D13 | D12 | D11 | D10 | D9 | D8 | D7 | D6 | D5 | D4 | D3 | D2 | D1 | D0 |
| 150 | E15 | E14 | E13 | E12 | E11 | E10 | E9 | E8 | E7 | E6 | E5 | E4 | E3 | E2 | E1 | E0 |
| 160 | Z | Z | Z | Z | Z | Z | Z | Z | Z | Z | Z | Z | Z | Z | Z | Z |
| 170 | Z | Z | Z | Z | Z | Z | Z | Z | Z | Z | Z | Z | Z | Z | Z | Z |

Figure 41

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | PAR | M0 | M1 | M2 | M3 | M4 | A15 | B15 | ACK | M0 | M1 | M2 | M3 | M4 | A14 | B14 |
| 010 | 1 | M0 | M1 | M2 | M3 | M4 | A13 | B13 | 0 | M0 | M1 | M2 | M3 | M4 | A12 | B12 |
| 020 | 1 | M0 | M1 | M2 | M3 | M4 | A11 | B11 | 1 | M0 | M1 | M2 | M3 | M4 | A10 | B10 |
| 030 | 0 | M0 | M1 | M2 | M3 | M4 | A9 | B9 | 0 | M0 | M1 | M2 | M3 | M4 | A8 | B8 |
| 040 | 0 | M0 | M1 | M2 | M3 | M4 | A7 | B7 | 0 | M0 | M1 | M2 | M3 | M4 | A6 | B6 |
| 050 | 1 | M0 | M1 | M2 | M3 | M4 | A5 | B5 | CR3 | M0 | M1 | M2 | M3 | M4 | A4 | B4 |
| 060 | CR2 | M0 | M1 | M2 | M3 | M4 | A3 | B3 | CR1 | M0 | M1 | M2 | M3 | M4 | A2 | B2 |
| 070 | CR0 | M0 | M1 | M2 | M3 | M4 | A1 | B1 | IRQ | M0 | M1 | M2 | M3 | M4 | A0 | B0 |
| 080 | X15 | M0 | M1 | M2 | M3 | M4 | A15 | B15 | X14 | M0 | M1 | M2 | M3 | M4 | A14 | B14 |
| 090 | X13 | M0 | M1 | M2 | M3 | M4 | A13 | B13 | X12 | M0 | M1 | M2 | M3 | M4 | A12 | B12 |
| 0A0 | X11 | M0 | M1 | M2 | M3 | M4 | A11 | B11 | X10 | M0 | M1 | M2 | M3 | M4 | A10 | B10 |
| 0B0 | X9 | M0 | M1 | M2 | M3 | M4 | A9 | B9 | X8 | M0 | M1 | M2 | M3 | M4 | A8 | B8 |
| 0C0 | X7 | M0 | M1 | M2 | M3 | M4 | A7 | B7 | X6 | M0 | M1 | M2 | M3 | M4 | A6 | B6 |
| 0D0 | X5 | M0 | M1 | M2 | M3 | M4 | A5 | B5 | X4 | M0 | M1 | M2 | M3 | M4 | A4 | B4 |
| 0E0 | X3 | M0 | M1 | M2 | M3 | M4 | A3 | B3 | X2 | M0 | M1 | M2 | M3 | M4 | A2 | B2 |
| 0F0 | X1 | M0 | M1 | M2 | M3 | M4 | A1 | B1 | X0 | M0 | M1 | M2 | M3 | M4 | A0 | B0 |
| 100 | Y15 | M0 | M1 | M2 | M3 | M4 | A15 | B15 | Y14 | M0 | M1 | M2 | M3 | M4 | A14 | B14 |
| 110 | Y13 | M0 | M1 | M2 | M3 | M4 | A13 | B13 | Y12 | M0 | M1 | M2 | M3 | M4 | A12 | B12 |
| 120 | Y11 | M0 | M1 | M2 | M3 | M4 | A11 | B11 | Y10 | M0 | M1 | M2 | M3 | M4 | A10 | B10 |
| 130 | Y9 | M0 | M1 | M2 | M3 | M4 | A9 | B9 | Y8 | M0 | M1 | M2 | M3 | M4 | A8 | B8 |
| 140 | Y7 | M0 | M1 | M2 | M3 | M4 | A7 | B7 | Y6 | M0 | M1 | M2 | M3 | M4 | A6 | B6 |
| 150 | Y5 | M0 | M1 | M2 | M3 | M4 | A5 | B5 | Y4 | M0 | M1 | M2 | M3 | M4 | A4 | B4 |
| 160 | Y3 | M0 | M1 | M2 | M3 | M4 | A3 | B3 | Y2 | M0 | M1 | M2 | M3 | M4 | A2 | B2 |
| 170 | Y1 | M0 | M1 | M2 | M3 | M4 | A1 | B1 | Y0 | M0 | M1 | M2 | M3 | M4 | A0 | B0 |

Figure 43

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | PAR | M0 | M1 | M2 | M3 | M4 | C15 | D15 | ACK | M0 | M1 | M2 | M3 | M4 | C14 | D14 |
| 010 | 1 | M0 | M1 | M2 | M3 | M4 | C13 | D13 | 0 | M0 | M1 | M2 | M3 | M4 | C12 | D12 |
| 020 | 1 | M0 | M1 | M2 | M3 | M4 | C11 | D11 | 1 | M0 | M1 | M2 | M3 | M4 | C10 | D10 |
| 030 | 0 | M0 | M1 | M2 | M3 | M4 | C9 | D9 | 0 | M0 | M1 | M2 | M3 | M4 | C8 | D8 |
| 040 | 0 | M0 | M1 | M2 | M3 | M4 | C7 | D7 | 0 | M0 | M1 | M2 | M3 | M4 | C6 | D6 |
| 050 | 1 | M0 | M1 | M2 | M3 | M4 | C5 | D5 | CR3 | M0 | M1 | M2 | M3 | M4 | C4 | D4 |
| 060 | CR2 | M0 | M1 | M2 | M3 | M4 | C3 | D3 | CR1 | M0 | M1 | M2 | M3 | M4 | C2 | D2 |
| 070 | CR0 | M0 | M1 | M2 | M3 | M4 | C1 | D1 | IRQ | M0 | M1 | M2 | M3 | M4 | C0 | D0 |
| 080 | X15 | M0 | M1 | M2 | M3 | M4 | A15 | B15 | X14 | M0 | M1 | M2 | M3 | M4 | A14 | B14 |
| 090 | X13 | M0 | M1 | M2 | M3 | M4 | A13 | B13 | X12 | M0 | M1 | M2 | M3 | M4 | A12 | B12 |
| 0A0 | DS0=1 | M0 | M1 | M2 | M3 | M4 | A11 | B11 | X10 | M0 | M1 | M2 | M3 | M4 | A10 | B10 |
| 0B0 | X9 | M0 | M1 | M2 | M3 | M4 | A9 | B9 | X8 | M0 | M1 | M2 | M3 | M4 | A8 | B8 |
| 0C0 | X7 | M0 | M1 | M2 | M3 | M4 | A7 | B7 | X6 | M0 | M1 | M2 | M3 | M4 | A6 | B6 |
| 0D0 | X5 | M0 | M1 | M2 | M3 | M4 | A5 | B5 | X4 | M0 | M1 | M2 | M3 | M4 | A4 | B4 |
| 0E0 | X3 | M0 | M1 | M2 | M3 | M4 | A3 | B3 | X2 | M0 | M1 | M2 | M3 | M4 | A2 | B2 |
| 0F0 | X1 | M0 | M1 | M2 | M3 | M4 | A1 | B1 | X0 | M0 | M1 | M2 | M3 | M4 | A0 | B0 |
| 100 | 1 | M0 | M1 | M2 | M3 | M4 | C15 | D15 | 0 | M0 | M1 | M2 | M3 | M4 | C14 | D14 |
| — | — | — | — | — | — | — | — | — | — | — | — | — | — | — | — | — |
| 1C0 | 0 | M0 | M1 | M2 | M3 | M4 | A3 | B3 | 0 | M0 | M1 | M2 | M3 | M4 | A2 | B2 |
| 1D0 | 1 | M0 | M1 | M2 | M3 | M4 | A1 | B1 | CR3 | M0 | M1 | M2 | M3 | M4 | A0 | B0 |
| 1E0 | CR2 | M0 | M1 | M2 | M3 | M4 | C15 | D15 | CR1 | M0 | M1 | M2 | M3 | M4 | C14 | D14 |
| 1F0 | CR0 | M0 | M1 | M2 | M3 | M4 | C13 | D13 | IRQ | M0 | M1 | M2 | M3 | M4 | C12 | D12 |
| 200 | X15 | M0 | M1 | M2 | M3 | M4 | C11 | D11 | X14 | M0 | M1 | M2 | M3 | M4 | C10 | D10 |
| 210 | X13 | M0 | M1 | M2 | M3 | M4 | C9 | D9 | X12 | M0 | M1 | M2 | M3 | M4 | C8 | D8 |
| 220 | DS0=0 | M0 | M1 | M2 | M3 | M4 | C8 | D7 | X10 | M0 | M1 | M2 | M3 | M4 | C6 | D6 |

Figure 44

| EXTCLK=12.288 MHz | | | | | | | | |
|---|---|---|---|---|---|---|---|---|
| Number of audio channels | Output sample frequency [kHz] | Subframe length [bits] | WORD [Bits] | Repeat | Control operations | | EXTCLK divide | Bus clock frequency [kHz] |
| | | | | | Frequency [kHz] | Bandwidth [%] | | |
| 1 | 48 | 64 | 16 | 3 | 5.3 | 25 | 12 | 1024 |
| 1 | 48 | 32 | 16 | 1 | 16 | 50 | 8 | 1536 |
| 2 | 48 | 128 | 28 | 2 | 8 | 12.5 | 4 | 3072 |
| 3 | 48 | 64 | 16 | 1 | 16 | 25 | 4 | 3072 |
| 3 | 48 | 256 | 20 | 4 | 4 | 6.3 | 4 | 3072 |
| 5 | 48 | 256 | 24 | 2 | 8 | 6.3 | 2 | 6144 |
| 6 | 48 | 256 | 20 | 2 | 8 | 6.3 | 2 | 6144 |
| 12 | 48 | 256 | 20 | 1 | 16 | 6.3 | 1 | 12.288 |

Figure 45a

| EXTCLK=19.200 MHz | | | | | | | | |
|---|---|---|---|---|---|---|---|---|
| Number of audio channels | Output sample frequency [kHz] | Subframe length [bits] | WORD [Bits] | Repeat | Control operations | | EXTCLK divide | Bus clock frequency [kHz] |
| | | | | | Frequency [kHz] | Bandwidth [%] | | |
| 4 | 48 | 400 | 24 | 4 | 4 | 4 | 4 | 4800 |
| 6 | 48 | 400 | 16 | 4 | 4 | 4 | 4 | 4800 |
| 8 | 48 | 400 | 24 | 2 | 8 | 4 | 2 | 9600 |
| 12 | 48 | 400 | 16 | 2 | 8 | 4 | 2 | 9600 |

Figure 45b

| EXTCLK=12.288 MHz ||||||||
|---|---|---|---|---|---|---|---|
| Total number of bit streams | Number of audio bit streams | Output sample frequency [kHz] | Oversampling rate | Control operations || EXTCLK divide | Bus clock frequency [kHz] |
| | | | | Frequency [kHz] | Bandwidth [%] | | |
| 2 | 1 | 16 | 48 | 16 | 50 | 8 | 1536 |
| 2 | 1 | 16 | 64 | 21.3 | 50 | 6 | 2048 |
| 4 | 3 | 16 | 48 | 16 | 25 | 4 | 3072 |
| 4 | 3 | 16 | 64 | 21.3 | 25 | 3 | 4096 |
| 6 | 5 | 16 | 64 | 21.3 | 16.7 | 2 | 6144 |
| 8 | 7 | 16 | 48 | 16 | 12.5 | 2 | 6144 |
| 12 | 11 | 16 | 64 | 21.3 | 8.3 | 1 | 12.288 |
| 16 | 15 | 16 | 48 | 16 | 6.3 | 1 | 12.288 |

Figure 46a

| EXTCLK=19.200 MHz ||||||||
|---|---|---|---|---|---|---|---|
| Total number of bit streams | Number of audio bit streams | Output sample frequency [kHz] | Oversampling rate | Control operations || EXTCLK divide | Bus clock frequency [kHz] |
| | | | | Frequency [kHz] | Bandwidth [%] | | |
| 2 | 1 | 16 | 50 | 16.7 | 50 | 12 | 1600 |
| 3 | 2 | 16 | 200/3 | 22.2 | 33.3 | 6 | 3200 |
| 4 | 3 | 16 | 50 | 16.7 | 25 | 6 | 3200 |
| 6 | 5 | 16 | 50 | 16.7 | 16.7 | 4 | 4800 |
| 6 | 5 | 16 | 200/3 | 22.2 | 16.7 | 3 | 6400 |
| 12 | 11 | 16 | 50 | 16.7 | 8.3 | 2 | 9600 |

Figure 46b

| EXTCLK=12.288 MHz |||||||||||
|---|---|---|---|---|---|---|---|---|---|---|
| Number of audio streams | Output sample frequency [kHz] | Subframe length [bits] | WORD [Bits] | Repeat | Number of audio channels | Output sample frequency [kHz] | WORD [Bits] | Repeat | Cont. oper. Freq [kHz] | Bus clock frequency [kHz] |
| 5 | 48 | 640 | 24 | 5 | 1 | 9.6 | 24 | 1 | 3.2 | 6.144 |
| 2 | 48 | 128 | 16 | 3 | 2 | 8 | 16 | 1/2 | 5.3 | 2048 |
| 2 | 48 | 256 | 16 | 6 | 3 | 8 | 16 | 1 | 2.7 | 2048 |

Figure 47

| EXTCLK=12.000 MHz | | | | | | | | | |
|---|---|---|---|---|---|---|---|---|---|
| Total number of bitstreams | Number of bit streams | Output sample frequency [kHz] | WORD [Bits] | Number of audio channels | Output sample frequency [kHz] | WORD [Bits] | Control operations | | Bus clock frequency [kHz] |
| | | | | | | | Frequency [kHz] | Band width [%] | |
| 10 | 5 | 24 | 50 | 5 | 48 | 20 | 25 | 10 | 12000 |

Figure 48a

| EXTCLK=12.288 MHz | | | | | | | | | |
|---|---|---|---|---|---|---|---|---|---|
| Total bit streams | Number of audio streams | Output sample frequency [kHz] | OSR | Number of audio channels | Output sample frequency [kHz] | WORD [Bits] | Control operations | | Bus clock frequency [kHz] |
| | | | | | | | Frequency [kHz] | Bandwidth [%] | |
| 4 | 1 | 16 | 48 | 2 | 48 | 16 | 48 | 25 | 3072 |
| 8 | 3 | 16 | 48 | 4 | 48 | 16 | 16 | 12.5 | 6144 |
| 8 | 3 | 16 | 48 | 2 | 48 | 32 | 48 | 12.5 | 6144 |
| 8 | 4 | 16 | 48 | 3 | 48 | 16 | 16 | 12.5 | 6144 |
| 8 | 4 | 16 | 48 | 3 | 32 | 24 | 16 | 12.5 | 6144 |
| 8 | 5 | 16 | 48 | 2 | 48 | 16 | 16 | 12.5 | 6144 |
| 8 | 6 | 16 | 48 | 1 | 48 | 16 | 16 | 12.5 | 6144 |

Figure 48b

| EXTCLK=19.200 MHz | | | | | | | | | |
|---|---|---|---|---|---|---|---|---|---|
| Total bit streams | Number of audio streams | Output sample frequency [kHz] | OSR | Number of audio channels | Output sample frequency [kHz] | WORD [Bits] | Control operations | | Bus clock frequency [kHz] |
| | | | | | | | Frequency [kHz] | Bandwidth [%] | |
| 8 | 3 | 24 | 50 | 5 | 48 | 20 | 25 | 12.5 | 9600 |
| 8 | 3 | 48 | 50 | 10 | 48 | 20 | 50 | 12.5 | 19200 |
| 8 | 5 | 48 | 50 | 5 | 48 | 20 | 50 | 12.5 | 19200 |

Figure 48c

| Bit | $B_{N-1}$ | $B_{N-2}$ | $B_{N-3}$ | ... | $B_2$ | $B_1$ | $B_0$ |
|---|---|---|---|---|---|---|---|
| Value | -1 | $+2^{-1}$ | $+2^{-2}$ | ... | $+2^{-N+3}$ | $+2^{-N+2}$ | $+2^{-N+1}$ |

Figure 49a

| Original content [kHz] | Oversampled frequency [kHz] | Oversample ratio | Typical bus clock frequency [kHz] | Typical system clock frequency [kHz] |
|---|---|---|---|---|
| 48 | 3072 | 64 | 3072 or 6144 | 12288 |
| 48 | 2400 | 50 | 4800 | 19200 |
| 48 | 4800 | 100 | 4800 | 19200 |
| 48 | 3200 | 66.67 | 3.200 | 19200 |
| 44.1 | 2822.4 | 64 | 11289.6 | PLL needed |
| 48 | 7056 | 147 | 7056 | PLL needed |
| 44.1 | 7056 | 160 | 7056 | PLL needed |

Figure 49b

| Preamble | Byte 1 | Byte 2 | Byte 3 | Byte 4 | Byte 5 | Byte 6 | Byte 7 | Byte 8 | Byte 9 |
|---|---|---|---|---|---|---|---|---|---|
| 0 (NULL) | 0=Empty | 0 | 0 | 0 | 0 | 0 | 0 | 0 | 0 |
| 13 (CR) | String (unknown length), each character ≠ 0 ||||||| 0 = END OF STRING | 0 | 0 |
| 32 (SP) | Unlimited (isochronous) sequence of characters |||||||||
| 35 (#) | String or file length: Most significant byte, MSB-1, ... , LSB. String max $2^{64}-1$ bytes long. ||||||||| First byte |
| 64 (@) | Reserved for future expansion |||||||||

Figure 49c

Initialize accumulator ACC = 0

{
Loop: ACC=ACC+reg_X if (overflow carry from MSB(ACC)) then ACC=ACC-reg_Y and DSO:=1

Else DSO:=0

Continue loop
}

Figure 50a

| Step | ACC=ACC+X | Carry from MSB(ACC) | ACC=ACC-Y | SYNC |
|---|---|---|---|---|
| Initialization | 96 | 0 | 96-0=96 | 0 |
| 1 | 96+147=243 | 0 | 243-0=243 | 0 |
| 2 | 243+147=134 | 1 | 134-160=230 | 1 |
| 3 | 230+147=121 | 1 | 121-160=217 | 1 |
| 4 | 217+147=108 | 1 | 108-160=204 | 1 |
| 5 | 204+147=95 | 1 | 191 | 1 |
| 6 | 191+147=82 | 1 | 178 | 1 |
| 7 | 178+147=69 | 1 | 165 | 1 |
| 8 | 165+147=56 | 1 | 152 | 1 |
| 9 | 152+147=43 | 1 | 139 | 1 |
| 10 | 139+147=30 | 1 | 126 | 1 |
| 11 | 126+147=17 | 1 | 113 | 1 |
| 12 | 113+147=4 | 1 | 100 | 1 |
| 13 | 100+147=247 | 0 | 100 | 0 |
| 14 | 247+147=138 | 1 | 234 | 1 |

Figure 50b

| Fsample Pipe [kHz] | Fsample audio [kHz] | X | Y | Comments |
|---|---|---|---|---|
| 48 | 44.1 | 147 | 160 | |
| 3.25=13/4 MHz | 8 | 4 | 1625 | |
| 48 | 8 | 1 | 6 | |
| 96 | 8 | 1 | 12 | |
| 16 kHz | 48 kHz | 3 | 1 | Not a fraction |

Figure 50c

| | S command word | | | | | | | | | | | | | | | |
|---|---|---|---|---|---|---|---|---|---|---|---|---|---|---|---|---|
| Bit | S15 | S14 | S13 | S12 | S11 | S10 | S9 | S8 | S7 | S6 | S5 | S4 | S3 | S2 | S1 | S0 |
| Field | IRQS (r/w) | PAR (w) | CONSTANT SYNC SYMBOL (w) | | | | | | | | | DYNAMIC SYMBOL (w) | | | | ACK (r) |

| Bit | 0-15 | 16-31 | 32-47 | 48-63 | 64-79 | 80-95 | 96-111 |
|---|---|---|---|---|---|---|---|
| Content | S | Audio 1 | X | Audio 1 | Y | Audio 1 | S |

PARITY: Master writes S14
ACK/NACK: Slave responds S 0

Figure 68

| Register | Purpose | B7 | B6 | B5 | B4 | B3 | B2 | B1 | B0 |
|---|---|---|---|---|---|---|---|---|---|
| 0x0000 | Data port | DATA (7:0) | | | | | | | |
| 0x0001 | | DATA (15:8) | | | | | | | |
| 0x0002 | Setup port | ACTIVATE | PREPARE | IRQ23 MASK | DIR | PORT | | | |
| 0x003 | | CHANNEL SELECTION | | | | | | | |
| 0x004 | | START | | | | | | | |
| 0x0005 | | SUBGROUP | | | | REPEAT | | | |
| 0x006 | | SYNCHRONIZE | | | | CHANNEL LENGTH | | | |
| 0x007 | | Future Expansion | | | | SKIP | | | |
| 0x008 | | FRAME STRUCTURE | | | | | | | |
| 0x009 | | PCLKD | | | | TDM bit column | | | |

Figure 69a

| B5 | B4 | B3 | Maximum channels per subgroup |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 (all) |

Figure 69b

| X3 | X2 | X1 | X0 | Function | Function data used | Required | Support broadcast |
|---|---|---|---|---|---|---|---|
| 0 | 0 | 0 | 0 | Hard reset | No | Yes | Yes |
| 0 | 0 | 0 | 1 | Soft reset | No | Yes | Yes |
| 0 | 0 | 1 | 0 | Request device ID | No | Yes | Yes |
| 0 | 0 | 1 | 1 | Select group address | Yes | Yes | Yes |
| 0 | 1 | 0 | 0 | Invert BANK selection | Yes | Yes | Yes |
| 0 | 1 | 0 | 1 | Request capability information | No | No | No |
| 0 | 1 | 1 | 0 | Read IRQ source | No | No | No |
| 0 | 1 | 1 | 1 | Perform device self test | DATA | No | Yes |
| 1 | 0 | 0 | 0 | Set power level | DATA | No | Yes |
| 1 | 0 | 0 | 1 | Set conversion gain | DATA | No | Yes |
| 1 | 0 | 1 | 0 | Set delay | DATA | No | Yes |
| 1 | 0 | 1 | 1 | Request calibration data | No | No | No |
| 1 | 1 | 0 | 0 | Read and increment address | DATA | No | No |
| 1 | 1 | 0 | 1 | Write and increment address | DATA | No | No |
| 1 | 1 | 1 | 0 | Execute function at address | ADDRESS | No | Yes |
| 1 | 1 | 1 | 1 | Execute function at address indirect | ADDRESS | No | Yes |

Figure 70

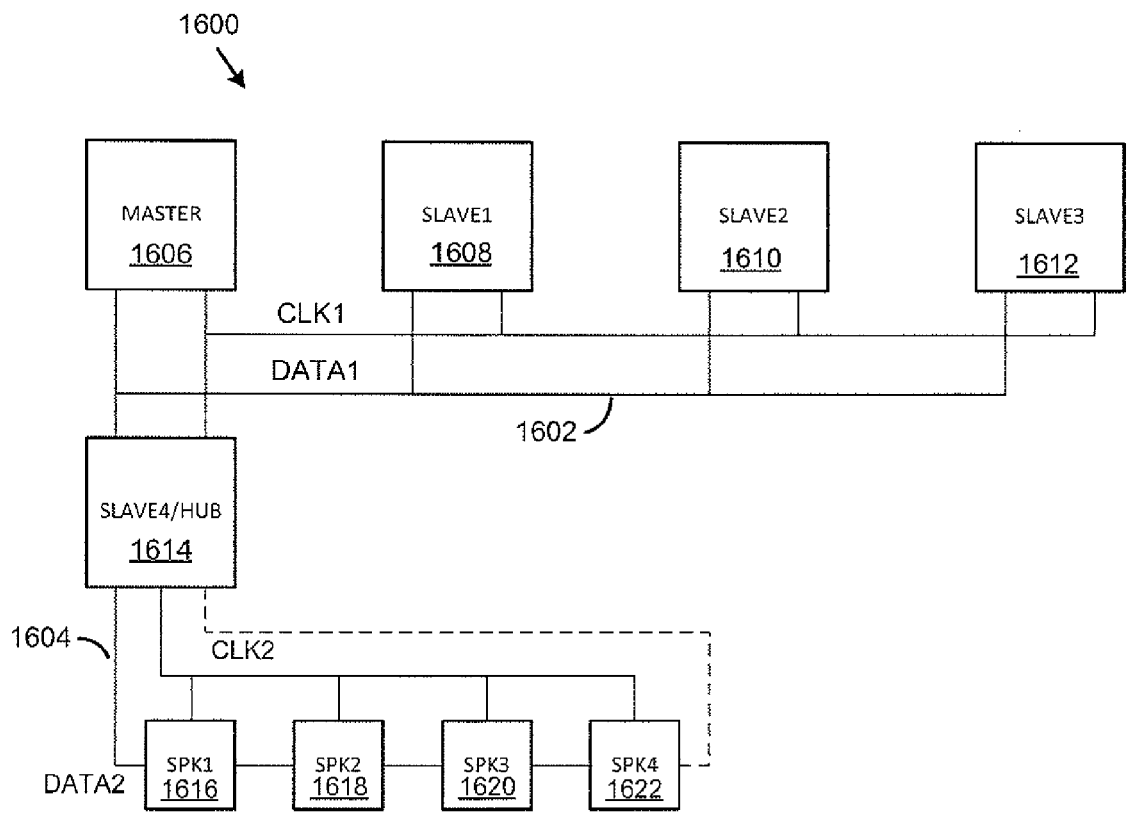

Figure 71

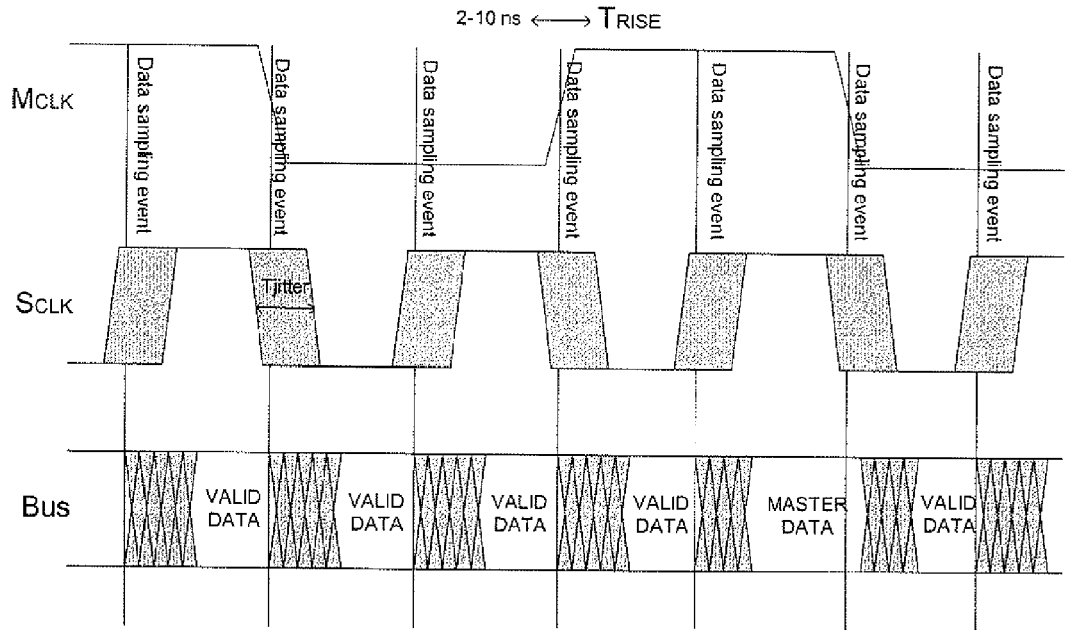

Figure 77a

| PARAMETER (OVERCLOCKED DEVICES ONLY) | MIN | NOM | MAX | UNIT |
|---|---|---|---|---|
| Bus frequency, OVERCLOCK = 1x | 0 | 9.6 | 19.20 | MHz |
| Bus frequency, OVERCLOCK = 2x | 2.40 | | 7.14 | MHz |
| Bus frequency, OVERCLOCK = 4x | 1.20 | | 3.57 | MHz |
| Bus frequency, OVERCLOCK = 6x | 0.80 | | 2.45 | MHz |
| VCO range⁺, OVERCLOCK=2x, 4x & 6x | 4.80 | | 15.5 | MHz |
| Clock half period $T_{CKMIN}$, OVERCLOCK = 1x | 26 | | — | ns |
| Clock half period $T_{CKMIN}$, OVERCLOCK = 2x | 70 | | 225 | ns |
| Clock half period $T_{CKMIN}$, OVERCLOCK = 4x | 140 | | 450 | ns |
| Clock half period $T_{CKMIN}$, OVERCLOCK = 6x | 204 | | 900 | ns |
| Time to disable output, $T_{DZ}$ | -2 | | 5 | ns |
| Time to enable output, $T_{ZD}$ | 9 | | | ns |
| Time to data settled, $T_{CLKDAT}$ | | | 16 | ns |
| Internal data delay, slave device, $T_{DLY}$ | 2 | 3 | 4 | ns |
| Slave PLL uncertainty, $T_{SJITTER}$ | -4 | 0 | +4 | ns |
| PLL include rms jitter | -250 | | 250 | ps |
| Master sampling uncertainty, $T_{MSJITTER}$ | -1 | 0 | 1 | ns |
| $T_{PLLLOCK}$ | | | 10 | ms |

Figure 77b

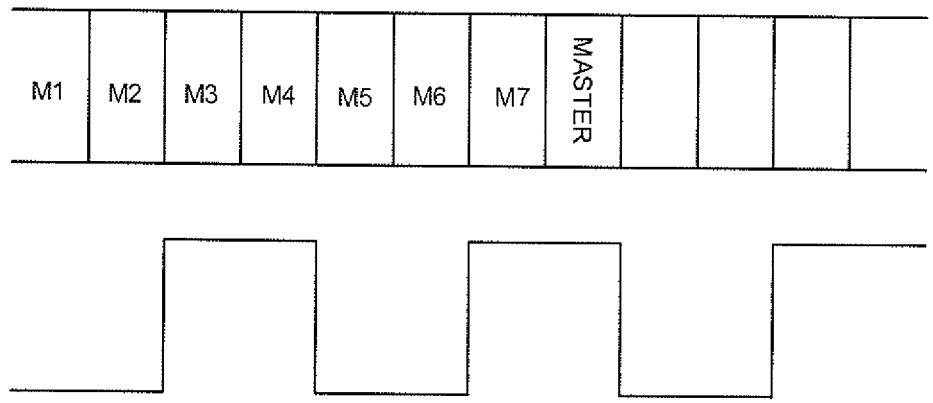
Figure 77c
| B0 | B1 | Overclocking factor | Power [%] |
|---|---|---|---|
| 0 | 0 | 1 | 100 |
| 0 | 1 | 2 | 66.7 |
| 1 | 0 | 4 | 50.0 |
| 1 | 1 | 6 | 44.4 |
Figure 77d
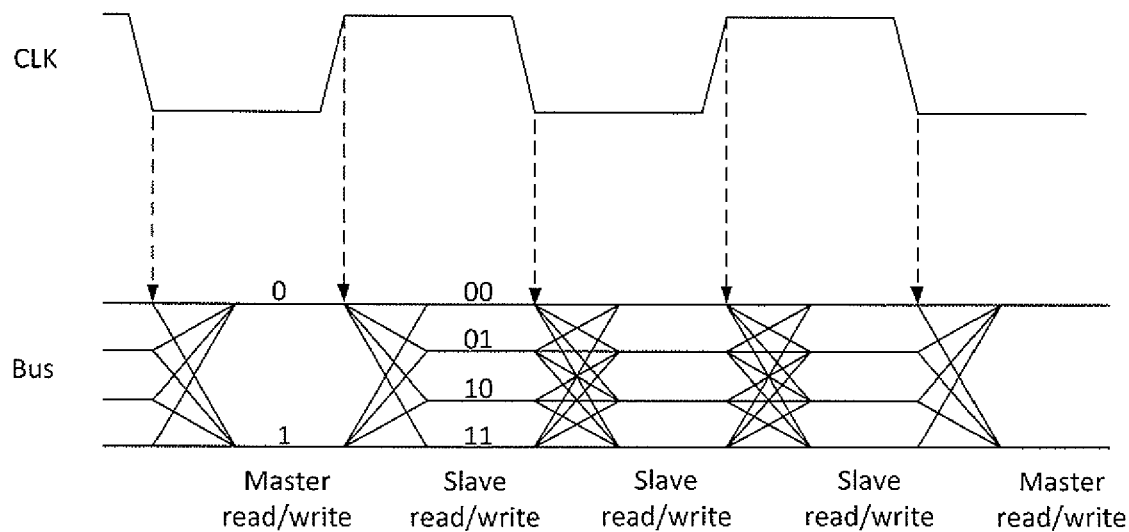
Figure 78a
| Bit number | Bitstream samples | Binary samples |
|---|---|---|
| First bit in slot (N) | First bit ($B_N$) | First bit ($B_N$) |
| Subsequent bits until last bit in slot (N+1) | $B_{N+1}$ XNOR $B_N$ | $B_{N-1}$ XOR $B_N$ |
Figure 78b

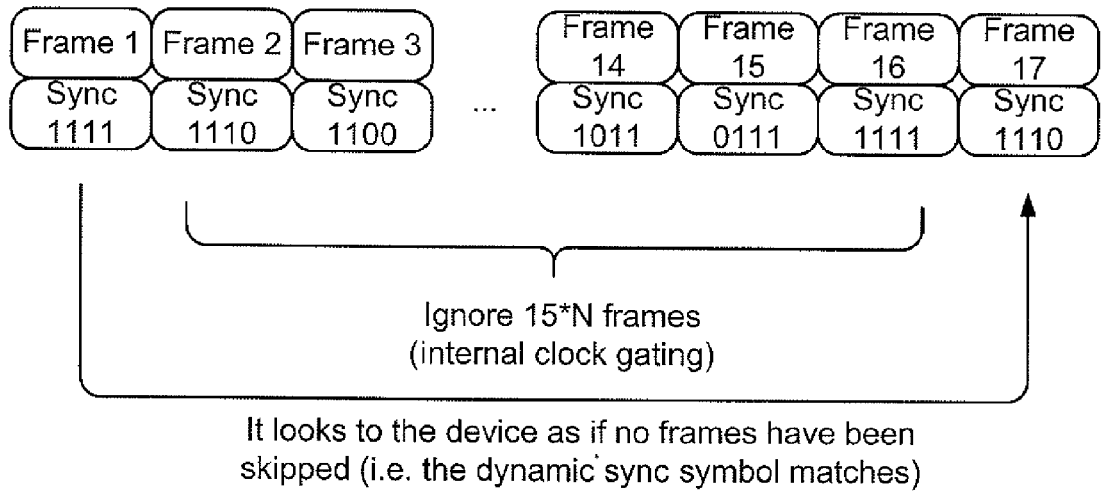

It looks to the device as if no frames have been skipped (i.e. the dynamic sync symbol matches)

Figure 79

| B3 | B2 | B1 | B0 | Approximate power [%] | Functionality | Change of operation mode |
|---|---|---|---|---|---|---|
| 0 | 0 | 0 | 0 | <0.1 | Shutdown at next frame boundary | Device can only activate itself |
| 0 | 0 | 0 | 1 | <0.1 | Partial shutdown (monitor 1/256) | Master activated (reverse PING) |
| 0 | 0 | 1 | 0 | <0.1 | Partial shutdown (monitor 1/16) | |
| 0 | 0 | 1 | 1 | <0.1 | UART mode, bandwidth control | Device activates bus clock |
| 1 | 0 | 0 | 0 | 2 | Control only, limited functionality | Master activated using FUNCTION SET POWER |
| 1 | 0 | 0 | 1 | 25 | Lowest power with functionality | |
| 1 | 0 | 1 | 0 | 50 | Low power mode II | |
| 1 | 0 | 1 | 1 | 75 | Low power mode I | |
| 1 | 1 | 0 | 0 | 100 | Normal mode | |
| 1 | 1 | 0 | 1 | 150 | Improved performance mode | |
| 1 | 1 | 1 | 0 | 200 | High performance mode | |
| 1 | 1 | 1 | 1 | 400 | Highest performance mode | |

Figure 80a

| Parameter | Min | Typical | Max | Unit |
|---|---|---|---|---|
| Startup time | 1 | 3 | 10 | µs |
| Frequency range | 2 | 4 | 10 | MHz |
| Master wait for clock after enabling DATA | 0.033 | 0.040 | 2000 | ms |

Figure 80b

BW=1/3, Power = 2 transitions/bit

BW=2/3, Power = 0.875 transitions/bit

BW=5/6, Power = 0.7

SYNCHRONIZATION OF ELECTRONIC DEVICE WITH ANOTHER ELECTRONIC DEVICE ON BUS USING SYNCHRONIZATION FIELD

TECHNICAL FIELD

The various embodiments described herein generally relate to methods, devices and systems for synchronizing to a multiformat or unified communication protocol.

BACKGROUND

In a computer or processor architecture, a bus is a subsystem that transfers data between devices within an electronic device or transfers data between electronic devices. Bus architectures are also used in common data signalling paths for multiple devices rather than having separate connections between each set of devices that may communicate with one another. In other words, the bus structure can be used to allow one or more slave devices to communicate with one or more master devices.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which:

FIG. 5 is a diagram of an example embodiment of the fields and bit allocations for a synchronization word;

FIG. 6 is an example timing diagram showing data operations to the data synchronization field of an S word in word mode;

FIG. 7 is an example of the parity and acknowledgement calculation that may be done by a master device and a slave device based on different command operations;

FIG. 8 shows various combinations of the command operation (PING, READ, and WRITE), the value of the interrupt mask bit, the S0 DELAY bit and the action that should be taken;

FIG. 9a shows various fields and bit allocations for an example embodiment of an X command word for various command operations;

FIG. 9b shows various fields and bit allocations for another example embodiment of an X command word for various command operations;

FIG. 10 shows various fields and bit allocations for an example embodiment of a Y command word for various command operations;

FIG. 11a shows an example list of functions and corresponding bit settings that may be set in the X word;

FIG. 11b shows an example of encoding position information in a device using two terminals using a fixed address and this configuration is also compatible with legacy systems;

FIG. 11c shows an example of encoding position information in a device using either a fixed address or a variable address 0-N based on a ring topology and this configuration is also compatible with legacy systems;

FIG. 11d shows an example of the layout of a digital microphone with a standard layout and full positional information;

FIG. 11e shows an IO cell that is capable of distinguishing between GND, VDD and FLOAT conditions by using a weak output driver and feedback;

FIG. 12 shows an example of reading from a register after activating a FUNCTION CAPABILITY to obtain capability information for a master device or a slave device;

FIG. 13 shows an example of the various data formats that can be supported in an example embodiment of the unified bus communication protocol;

FIG. 14 shows an example of a status read from data registers after the execution of the function READ LAST ERROR;

FIG. 15 shows an example of error codes that may be used with an example embodiment of the unified bus communication protocol;

FIG. 16a is an example of a definition of registers that can be used for a master device or a slave device for an example embodiment of the unified bus communication protocol;

FIG. 16b is another example of a definition of registers that can be used for a master device or a slave device for an example embodiment of the unified bus communication protocol;

FIG. 17 is an example of various power consumption levels or power management modes that can be set for a port or a device in an example embodiment of the unified bus communication protocol;

FIG. 20 shows an example operation with regards to address and bank selection during READ and WRITE operations;

FIG. 21 shows an example of data from a single port being repeated more than once in a frame in word mode;

FIG. 22a shows an example of various field values that are set depending on the use of isochronous, asynchronous and multi-frame transfers in a given frame;

FIG. 22b shows an example of a compressed format that can be used to encode the PCLKD field of FIG. 16a;

FIG. 22c shows an example of an alternative embodiment of various field values that are set depending on the use of isochronous, asynchronous and multi-frame transfers in a given frame;

FIG. 25b shows an example definition of a number of subframe lengths that can be used in bitstream mode to reduce the time for synchronization;

FIG. 25c shows an alternative example of the definition of the COMMAND SEPARATION field depending on the frame type used in the unified bus communication protocol;

FIGS. 26a and 26b show examples of different frame formats that can be achieved by using different values for the HSTART and VSTART fields in bitstream mode;

FIG. 28b shows an example of a bitstream frame format that can be used for the stereo system of FIG. 28a;

FIG. 28c shows another example of a bitstream frame format that can be used for the stereo system of FIG. 28a and uses less bandwidth for the sensing signals;

FIG. 28d shows an example of a bitstream frame format that can be achieved by setting values for the HSTART, VSTART, HSPACING and VSPACING fields in bitstream mode where the bandwidth between the audio data and the control data is changed so that less bandwidth is used on the control data as compared to the audio data;

FIG. 29a is an example embodiment of a definition of registers that can be used for the master device;

FIG. 29b is another example embodiment of a definition of registers that can be used for the master device;

FIG. 29c is an example of a definition of sampling ratios for a first stage;

FIG. 30 shows combinations of WRITE and READ operations based on the FRAME CONTROL field and example operations that can be monitored depending on the values of the FRAME CONTROL field in an example embodiment;

FIG. 31 shows combinations of WRITE and READ operations based on the FRAME CONTROL field and example operations that can be monitored depending on the values of the FRAME CONTROL field in another example embodiment;

FIG. 32a shows an example embodiment of the components of an INTERFACE CONTROL register;

FIG. 32b shows another example embodiment of the components of the INTERFACE CONTROL register;

FIG. 33a shows an example of how the MCLKD field can be encoded in at least one example embodiment that corresponds to the register definition of FIG. 29a;

FIG. 33b shows example frequency divisions that may be used to generate a clock signal for the bus in at least one example embodiment that corresponds to the register definition of FIG. 29b;

FIG. 34a shows an example embodiment of the subfields that can be used in the IRQ MASK register;

FIG. 34b shows another example embodiment of the subfields that can be used in the IRQ MASK register;

FIG. 35 shows an example timing diagram for changing the FRAME DONE MASK field;

FIG. 36a shows an example embodiment of the components of an INTERFACE STATUS register;

FIG. 36b shows another example embodiment of the components of an INTERFACE STATUS register;

FIG. 37 shows an example definition for the slave status registers;

FIG. 38a shows an example embodiment of a compact encoding format that can be used to encode a device ID for a slave device;

FIG. 38b shows an example embodiment of a general encoding format that can be used to encode a device ID for a slave device;

FIG. 39 shows a general word frame format used in word mode for a single time frame;

FIG. 40 shows an example embodiment of a word frame format for a single time frame;

FIG. 41 shows another example embodiment of a word frame format for a single time frame;

FIG. 43 shows an example embodiment of a unified frame format for a single time frame;

FIG. 44 shows another example embodiment of a unified frame format for a single time frame;

FIGS. 45a and 45b show tables of example combinations of bus frequency, number and types of channels for the unified bus communication protocol when operating in word mode;

FIGS. 46a and 46b show tables of example combinations of bus frequency, number of channels and oversampling rate for the unified bus communication protocol when operating in bitstream mode and using bitstream frame formats;

FIG. 47 shows a table of example combinations of bus frequency, number and types of channels for the unified bus communication protocol when operating in a hybrid word mode;

FIGS. 48a, 48b and 48c show tables of example combinations of bus frequency, number and types of channels for the unified bus communication protocol when operating in bitstream mode and using unified bitstream frame formats;

FIG. 49a shows an example embodiment of a general format for encoding N bits in digital word format in the unified bus communication protocol;

FIG. 49b shows an example of some common oversampling factors that can be used with a bitstream encoding format for mobile phone systems;

FIG. 49c shows an example of possible combinations for a string encoding format;

FIG. 50a shows an example embodiment of an algorithm that can be used to implement a fractional flow;

FIG. 50b shows an example of the calculations of the algorithm of FIG. 50a for an example scenario;

FIG. 50c shows an example of various values that can be used for fractional flows for various playback scenarios;

FIG. 68 is another example timing diagram showing data operations to the data synchronization field of the S word of FIG. 67 in word mode;

FIG. 69a is another example of a definition of registers that can be used for a master device or a slave device for an example embodiment of the unified bus communication protocol;

FIG. 69b is an example showing various maximum channels that can be used per subgroup;

FIG. 70 shows another example list of functions and corresponding bit settings that may be set in the X word;

FIG. 71 is an example embodiment of a system that uses a ring topology to couple devices to a bus and the system uses the unified bus communication protocol;

FIG. 72 is an example embodiment of a system that uses a pipe topology to couple devices to a bus and the system uses the unified bus communication protocol;

FIG. 73 is an example embodiment of a system that uses pipe control to couple many devices to a bus and the system uses the unified bus communication protocol;

FIG. 74 is an example embodiment of a system that uses a single dimension, staggered ring topology to couple devices to a bus and the system uses the unified bus communication protocol;

FIG. 75 is an example embodiment of a system that uses a two-dimensional ring topology to couple devices to a bus and the system uses the unified bus communication protocol;

FIG. 76 is another example embodiment of a system that uses pipe control to couple many devices to a bus and the system uses the unified bus communication protocol;

FIG. 77a is a timing diagram for an example of 2× overclocked data slots;

FIG. 77b is a table showing an example embodiment of timing parameter values that may be used for devices that utilize overclocked data slots;

FIG. 77c is an illustration of data transfer and timing on a bus for an example in which there is overclocking by a factor of two;

FIG. 77d is a table of example settings for a register to implement overclocking and an estimate of associated power savings;

FIG. 78a shows a timing and voltage level scheme for sending out multiple bits of data at a time;

FIG. 78b is a table of example encoding that may be used when a device sends out multiple packed bits in a data slot using the overclocking mode;

FIG. 79 is an example of data seen by a slave device during the MASTER INITIATED DEVICE WAKE UP FROM SLEEP mode;

Figure 81A:
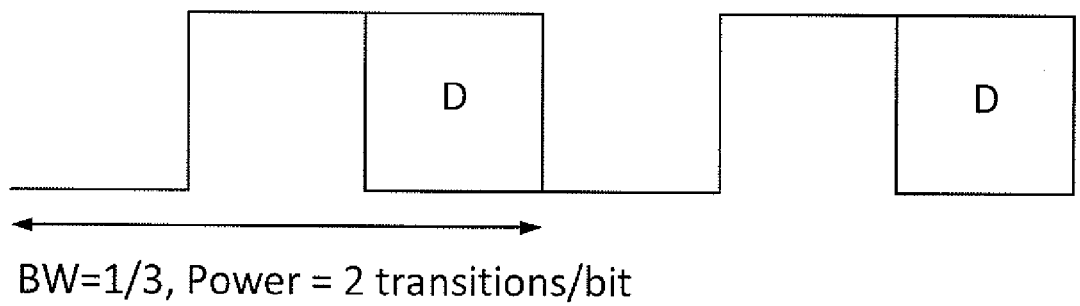
Figure 81B:
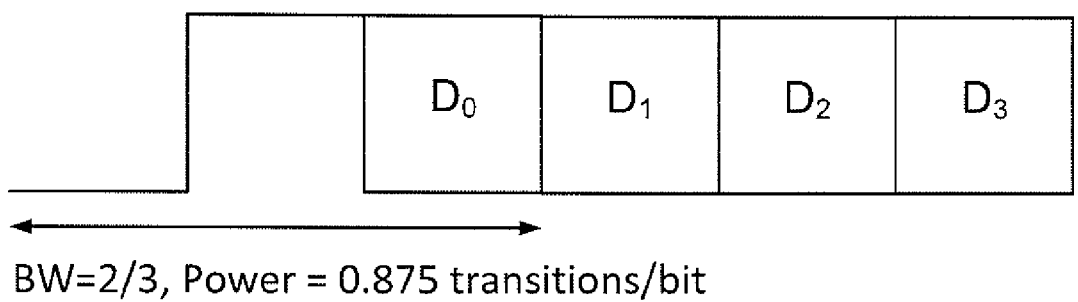
Figure 81C:
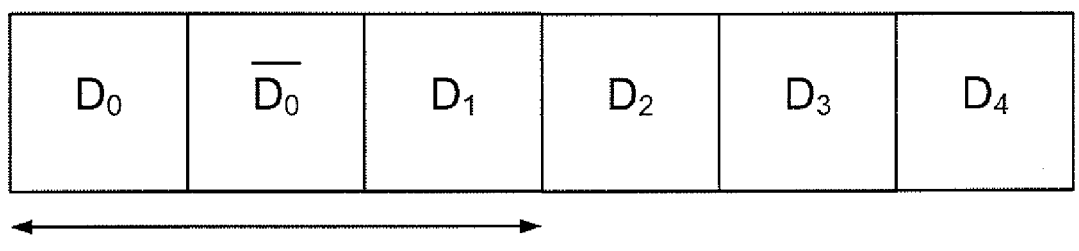

FIG. 80a is an example of an alternative embodiment for various power consumption levels or power management modes that can be set for a port or a device using the unified bus communication protocol;

FIG. 80b is a table of an example UART timing specification;

FIG. 81a is an example of a single wire signaling system utilizing two slots for synchronization and one for data;

FIG. 81b is an example of a single wire signaling system to transfer both clock and data information utilizing two slots for synchronization and four slots for data; and FIG. 81c is an example of a single wire signaling system utilizing one slot for synchronization and four slots for data thereby increasing the bandwidth and lowering the power consumption.

DETAILED DESCRIPTION

Various systems or processes will be described below to provide an example of one or more embodiments of the concepts. No embodiment described below limits any of the claims and any of the claims may cover processes or systems that differ from those described below. The claimed features are not limited to systems or processes having all of the features of any one system or process described below or to features common to multiple or all of the systems or processes described below. It is possible that a system or process described below is not an embodiment that is recited in any of the claims. Any concept disclosed in a system or process described below that is not claimed in this document may be the subject matter of another protective instrument, for example, a continuing patent application, and the applicants, inventors or owners do not intend to abandon, disclaim or dedicate to the public any such concept by its description in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the term coupled as used herein can have several different meanings depending in the context in which the term is used. For example, the term coupling can have a mechanical, electrical, optical or communicative connotation. For example, in some contexts, the term coupling indicates that two elements or devices can be physically connected to one another or connected to one another through one or more intermediate elements or devices via a physical or electrical element, such as but not limited to a wire, a cable, a non-active circuit element (e.g. resistor) and the like, for example. In some contexts, the term coupling indicates that two elements or devices can be connected through other means such as a wireless signal or an optical signal. In some contexts, the term coupling indicates that elements or devices may be communicatively connected to one another through a signal, such as an electrical, optical or wireless signal, for example. Furthermore, the term "communicative coupling" indicates that an element or device can electrically, optically, or wirelessly send data to another element or device as well as receive data from another element or device.

It should also be noted that the terms "master" and as "slave" as used herein are meant purely from a technological point of view and in particular denotes the technical relationship between a host device or element and a peripheral device or element in which one element or device provides instructions or control signals to another element or device. Accordingly, the use of the terms "master" and "slave" as used herein is not meant to carry any connotation beyond the technical meaning given here.

It should also be noted that although the communication protocol is described as a bus communication protocol and various example embodiments are provided that show a physical bus that couples elements together, the various embodiments of the communication protocol described herein can also be implemented over a non-physical interface such as a wireless or optical interface.

It should be noted that terms of degree such as "substantially", "about", "approximate" and "approximately" as used herein mean a reasonable amount of deviation of the modified term such that the end result is not significantly changed. These terms of degree can be construed as including a deviation of up to ±10% of the modified term if this deviation would not negate the meaning of the term it modifies. Also, as used herein, elements may be described as "configured to" or "adapted to" perform one or more functions. In general, an element that is configured to or adapted to perform a function is suitable for performing the function, or is operable to perform the function, or is otherwise capable of performing the function. Further, the word "current" may be used herein to mean "electrical current" (a quantity measured in units of amperes), although there may be instances in which the term refers to events occurring contemporarily or presently; the meaning in a particular instance is generally clear from context.

Furthermore, in the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous. A feature or component that may be preferred or advantageous is not necessarily essential.

The detailed description begins with a general description of a mobile device and then proceeds to describe example embodiments of a unified bus communication protocol that can be used to couple devices with a fewer number of wires while being able to support different types of data formats. Accordingly, the unified bus communication protocol acts as a unified interface for devices that generate numeric data in different formats but can be coupled to the same bus.

The unified bus communication protocol allows for communication between at least two devices, such as between a master device and a slave device, between two master devices, between two slave devices and between a master device and more than one slave device. The data communication between the devices generally utilizes a continuous clock unless otherwise specified and the communication can be bi-directional unless otherwise specified.

The numeric data can be audio data or measurement data such as current, voltage, pressure, temperature and the like.

The numeric data can be initially produced by a device in a bitstream format or a digital word format. Digital words are meant to cover binary coded words, and floating point words (i.e. unsigned or two's complement word).

In word mode, the digital words can be transmitted along the bus without being converted to another format. In bitstream mode, the data is packaged using either a bitstream frame format or a unified frame format, which is a type of bitstream frame format. In a bitstream frame format, bitstreams are transmitted one bit at a time from different bitstream data channels using frame channels. It should be noted that the term Pulse Density Modulated data (PDM) data is sometimes used instead of the term bitstream data.

The term data channel generally refers to a channel that generates or receives data in a certain format. Accordingly, a word data channel comprises digital word data and a bitstream data channel comprises bitstream data.

The term frame channel is used to define channels of data in a bitstream frame or a unified bitstream frame in which the frame channels are multiplexed and are given certain time slots in a frame.

In a unified frame format, there is at least one virtual frame channel in which digital words for at least one word data channel are converted to a bitstream and transmitted one bit at a time. In the unified frame format, there may also be at least one bitstream frame channel which receives bitstream data from one or more bitstream data channels. The bitstream frame format and the unified frame format include a bitstream of command words in a control frame channel, which results in cost reduction due the use of a reduced number of terminals. These frame formats will be described in more detail later in this description.

Bitstream data is data that is transmitted as a series of bits and is sometimes referred to as pulse-density-modulated (PDM) data. They are typically generated as the output of oversampled systems such as of delta-sigma converters. The oversample rate is used to indicate the ratio between a sampling clock and the final output sample rate after decimation (or vice-versa for interpolation). Bitstreams are used to transfer data in telecommunication and audio applications and as a storage format (e.g. on super audio CDs (SACD)).

A digital word is a sequence of 0's and 1's having a certain resolution that is used to represent an analog value in a digital format. For example, a 16-bit digital word has 16 bits where each bit can be a 0 or a 1. The digital word can be produced using a method called Pulse Code Modulation (PCM) in which case the digital words are referred to as PCM words or audio words (for audio applications). PCM words are used for digital audio in a variety of devices including CDs, Blu-ray players, DVD players, computers, smart phones, laptops, tablets and the like.

The data that is communicated on the bus includes synchronization data, control data, numeric data, and a clock signal. Power can also be transmitted over the bus. The unified bus communication protocol allows for a reduction in the number of wires that may be used for the bus and can be generally implemented on a single wire bus or a two wire bus, as will be described in more detail. The single wire bus uses one wire to transmit the synchronization data, control data, numeric data, clock signal and power. The two wire bus can use a first wire to transmit the synchronization data, control data, numeric data, and power and a second wire to transmit the clock signal. Accordingly, the bus and the associated unified bus communication protocol may be used for operation where the number of pins or wires is limited or where high reliability with respect to noise immunity is desired. The bus and the associated unified bus communication protocol described herein allow for continuous operation, unless otherwise stated, of a variable number of devices that are all synchronized by the same clock signal and discharge the bus at specified time instants, according to the frame format, in order to provide a communication link. In embodiments where the system clock frequency is low, one or more bus holders can be added to maintain charge on the bus.

The second part of the detailed description provides various example embodiments of synchronization methods that can be used by a slave device to synchronize with a master device or with a bus which utilizes at least one of the various embodiments of the unified bus communication protocol described herein. The synchronization methods generally involve techniques for searching for particular synchronization patterns, which is a series of data bits (i.e. 1's and 0's) that may be ordered sequentially in word mode, or the bits of the synchronization patterns may be multiplexed or interfaced with other data bits, although still transmitted in the same order, in bitstream mode.

In general, at least one of the synchronization methods may be used to advantageously allow a slave device to attach to the bus after the bus has been initialized and has been operating for some time. This is referred to as hot plug in. Accordingly, the slave device can determine for itself what mode of operation and frame format is being used for the bus communication protocol without being told this information, which is advantageous and is generally not done for conventional bus communication protocols.

In bus architectures, there is often a mechanism for devices to signal when they need to use the bus, while it is in use, and the nature of the use, such as for numeric data and the transmission of command instructions, for example. However, bus control can become quite complicated when numerous asynchronous processes are attempting to share the bus efficiently as well as when those processes use different data formats such as bitstream data and digital word data. For example, in conventional bus systems, different interfaces are needed to support various kinds of data. As an example, PCM interfaces support digital word data but not bitstream data and bitstream interfaces do not support digital word data. There are often systems that use both types of data since in some applications sensors use Nyquist-type converters (e.g. temperature sensors, accelerometers, and displays) that use binary words and in some applications bitstream interfaces are used for low latency applications such as beamforming, active noise cancellation or low latency control applications. Conventional bus systems use one interface to communicate digital word data (such as a McBSP interface which requires 4 bus wires), another interface to communicate bitstream data (such as at least one McPDM interface which requires another 4 bus wires) and another interface for control data (such as $I^2C$ which requires another 2 bus wires) for a total of at least three interfaces and at least 10 bus wires and terminals. This adds costs and extra space requirements for the components involved as well as increased power consumption. Furthermore, when such systems are used with external devices, multiple connectors are used resulting in larger space requirements.

Accordingly, in at least one embodiment described herein, one aspect of the unified bus communication protocol described herein is the provision of a unified interface that can handle bitstream data, digital word data and control data while using a smaller number of wires and therefore a smaller number of terminals. The advantages of bitstream processing, such as low latency and fast transient response, can be maintained by avoiding the use of the digital word format. Therefore, an aspect of at least one embodiment of the unified interface described herein is that bitstream data can be multiplexed in order to achieve the same latency for bitstream processing (i.e. one bit latency). Furthermore, digital word data can be transmitted one bit a time with each bit being multiplexed with the bitstream data, which eliminates the use of a digital word data interface. In addition, control data, such as synchronization data and command data, can be converted to a bitstream format and embedded as part of the multiplexed data using the unified bus communication protocol, which eliminates the use of an extra interface (e.g. I$^2$C) and also provides a robust programmable multiformat data interface. Accordingly, an aspect of at least one embodiment of the unified bus communication protocol includes support for tunneling PCM/TDM/I$^2$C streams and for transmitting bit streams with low latency.

Clock data can also be incorporated into the control data (in a one wire bus embodiment) or it can be provided using a separate wire (in a two wire bus embodiment). Transmitting the clock signal on another wire allows for the implementation of slave devices to be simplified and also reduces the impact on clock jitter.

Accordingly, the unified bus communication protocol can be implemented using one or two wires depending on the specific requirements of the system (e.g. as a headset interface or as a general bus system). However, it should be noted that in alternative embodiments, the unified bus communication protocol described herein can be used with buses having more than two wires. Embodiments in which the bus uses more than one wire can enable higher bandwidth and some simplifications in the physical layer.

In order to multiplex the digital word data with the bitstream data, in at least one embodiment described herein, one or more frame channels in the unified interface can be allocated as virtual frame channels, where the digital word data are multiplexed (i.e. interleaved or interlaced) one bit at a time along with the bitstream data while maintaining the proper order of data for the data channels. There can also be embodiments in which there are programmable combinations between frame channels that use bitstream data and frame channels that use digital word data which allows for at least one of bandwidth control and combining data that is sampled at different sampling rates depending on the particular embodiment. A control channel is also allocated in at least one embodiment of the unified interface so that the control data can be multiplexed or interlaced one bit at a time along with the other types of data.

In at least one embodiment described herein, an aspect of the unified bus communication protocol is the use of a varying frame length that makes it easier to support various clock frequencies and sample rates, such as those that are commonly used in telecommunication applications (e.g. 19.2 and 13.0 MHz) for example, in a more efficient manner. Furthermore, the unified bus communication protocol can accommodate other commonly used frame lengths such as the frame length of 768 bits that is chosen for the SLIMbus bus communication protocol and is suited for 12.288 MHz applications. The control functionality that is provided by the unified bus communication protocol has a wider functionality than the I$^2$C bus communication protocol and supports special functions such as those that are used for audio in at least some embodiments, for example. At least one embodiment of the unified bus communication protocol supports isochronous transfer of bitstream data with low latency simultaneously with control data.

Furthermore, in at least one embodiment described herein, the bus structure has a low complexity that is suitable for use in sensor applications and audio applications, where a low gate count is advantageous for integration, power consumption and economic reasons. A low gate count can be achieved for both master and slave devices that use a sync engine and associated hardware to communicate and synchronize according to the various embodiments of the unified bus communication protocol described herein. The lower gate count also results in lower driver complexity, smaller silicon area and lower cost in Integrated Circuit (IC) implementations. Furthermore, since the unified bus communication protocol is suited for I$^2$C tunneling, legacy systems can continue to be supported with little effort.

In at least one embodiment described herein, an aspect of the unified bus communication protocol is the support for continuous monitoring of the status of slave devices. This allows for hot plug-in and removal of slave devices without any handshaking. This also allows slave devices to withdraw themselves from the bus in case of errors in order to disturb the bus as little as possible. Accordingly, it is not possible for a slave device to stall the bus using the unified bus communication protocol which is not the case for the I$^2$C bus communication protocol. Furthermore, detection and correction of errors can be implemented much faster, in at least some embodiments of unified bus communication protocol described herein, as compared to the SMbus communication protocol. For example, SMbus can take about 35-40 ms before detecting errors. The detection of a stalled bus is activated by the internal time-out function (in case of no activity on the bus). This situation can be discovered much faster using at least one embodiments of the unified bus communication protocol described herein. In some worst-case scenarios, it might take the slave device about 50-100 ms to get back in synchronization with the bus, but typically it would take about 1-10 ms for at least one embodiment of the unified bus communication protocol described herein.

Figure 1:
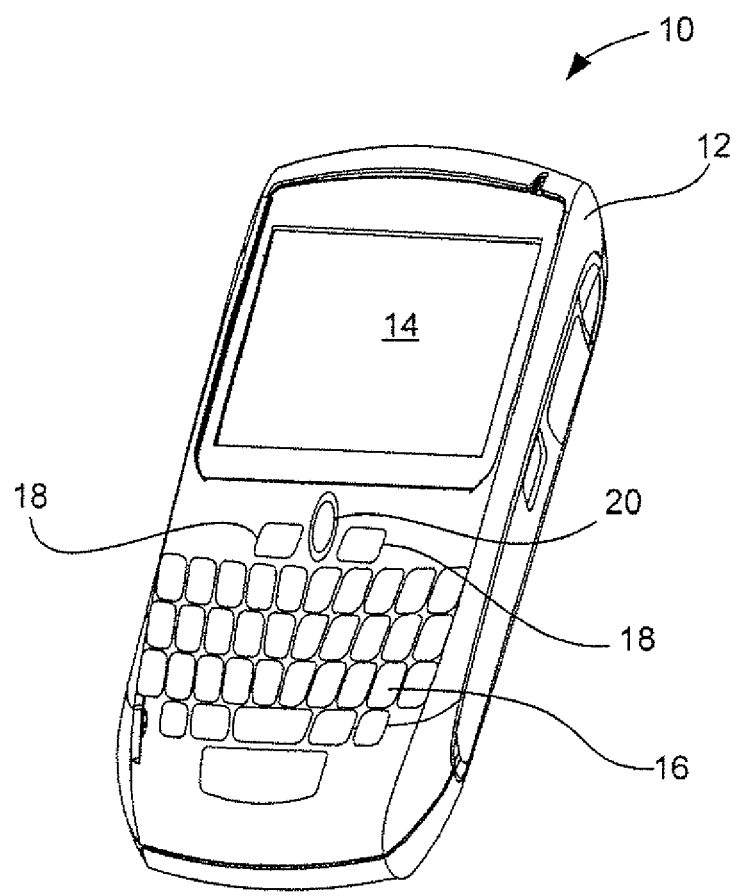
FIG. 1 is a perspective view of a portable electronic device.

Referring now to FIG. 1, shown therein is a perspective view of a portable electronic device 10. In this example, the portable electronic device 10 is a mobile communication device such as a cellular phone or a smart phone. However, it should be understood that the embodiments described herein are not limited to a phone but can be extended to any electronic device that can benefit from a bus communication protocol that provides a unified interface for different data formats. Examples of such electronic devices generally include any portable electronic device such as cellular phones wireless organizers, personal digital assistants, computers, laptops, handheld wireless communication devices, wireless enabled notebook computers, tablet computers or e-readers, electronic security devices, wireless Internet appliances and the like. Other examples are provided throughout this description. The electronic devices listed herein which are mobile are generally portable and thus are battery-powered and may have limited processing power, in which case it is beneficial to use a bus communication protocol that provides a unified data interface, such as at least one of the embodiments of the unified bus communication protocol described herein.

The portable electronic device 10 has a body 12 which includes a display screen 14, a keyboard/keypad 16, a set of buttons 18 and a user input device 20, such as a trackpad or a trackball. It will be understood that the user input device 20 is representative of a user-operated pointing or input device, which could also be presented as a joystick, scroll wheel, roller wheel, mouse or touchpad or the like, or another button. The portable electronic device 10 includes other parts that are not shown or described because they are well known to those skilled in the art. The portable electronic device 10 also includes at least one port for receiving a jack, but this is not shown in FIG. 1.

Figure 2:
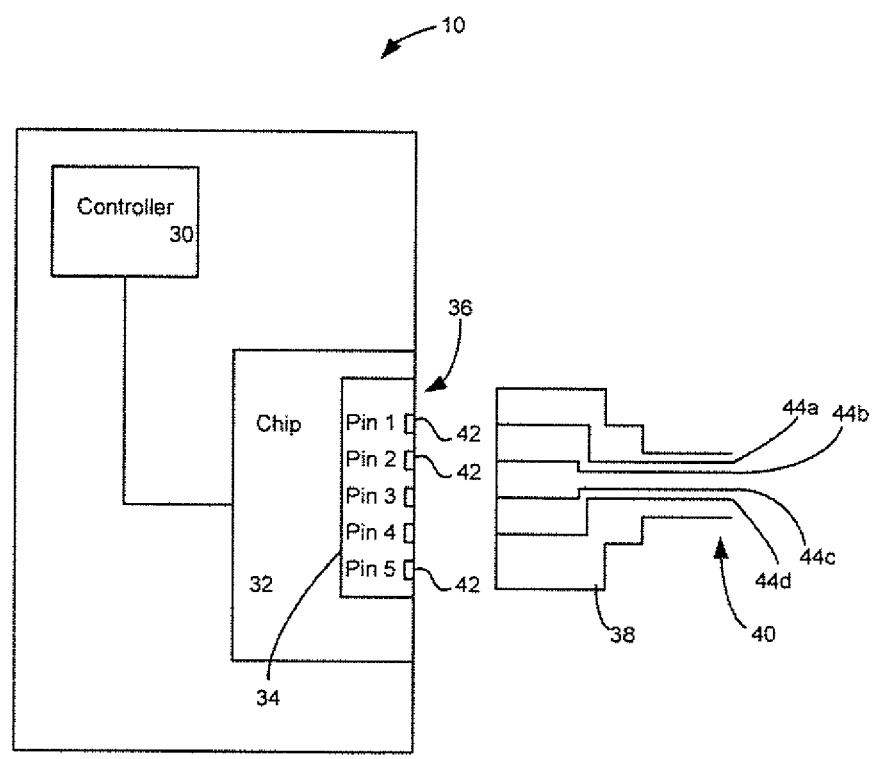
FIG. 2 is a block diagram of a portion of the portable electronic device.

Referring now to FIG. 2, shown therein is a block diagram of a portion of the portable electronic device 10. The portable electronic device 10 further includes a controller 30, which is connected to a chip 32, such as a headset or headphone interface chip, which is integrated within the portable electronic device 10. The controller 30 can be implemented using a processor or dedicated circuitry. The chip 32 includes a switch matrix and jack configuration detect portion 34 which is integrated with a port 36 for receiving a jack 38 associated with a cable 40, such as a video cable or a headset cable. The switch matrix 34 includes a plurality of individual input and output ports 42 for receiving and transmitting signals with corresponding wires or lines 44a to 44d within the jack 38.

The wires 44a to 44d within the jack 38 represent signal lines, such as audio and video lines. The set of individual lines, typically four, although other jack configurations with other number of wires are contemplated, allow for communication between the portable electronic device 10 and a device located at the other end of the cable, such as a headset. In one embodiment, the wires 44a and 44b can be a pair of audio lines, the wire 44c can be a ground line and the wire 44d can be a microphone line. However, only one of the lines is used for communication and thereby serves as the communication bus for a single wire bus embodiment. The remaining lines may be used for other functionality. Typically, one line will be used for ground while the remaining two lines may be used for headphone output. In another configuration, one line may be used for bus communication, one may be used for ground, a third line may be used for power and the last line is left for other purposes such as a separate clock line, for transmission of video signals or for other functionality. In other embodiments, a single wire bus may be used in digital or analog transmissions between devices. Alternatively, a two wire bus embodiment is useful for providing communication between two chips, as will be described in more detail below.

Figure 3A:
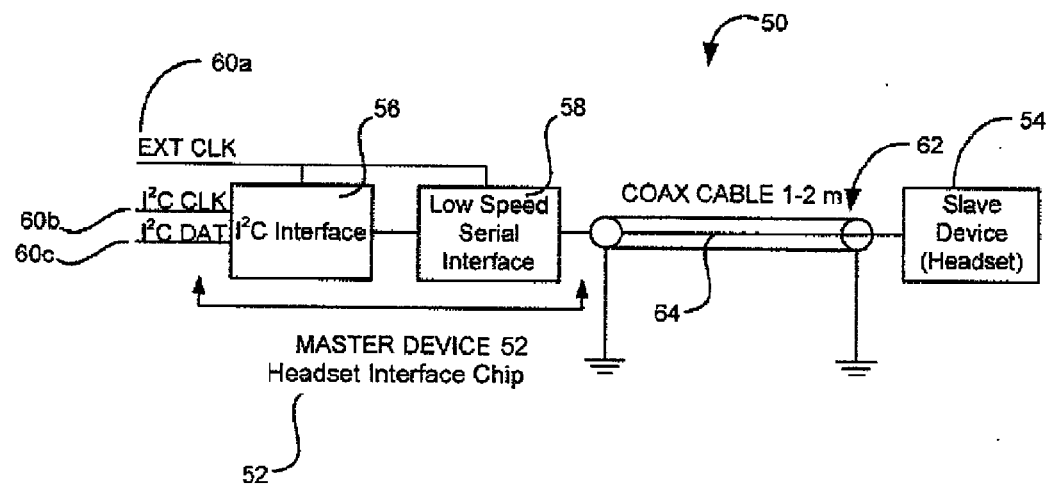
FIG. 3a is a schematic diagram of an example embodiment of a bus system.

Referring now to FIG. 3a, shown therein is a schematic diagram of an example embodiment of a bus system 50. The bus system 50 includes a master device 52, such as a portable electronic device or a headset interface chip within a portable electronic device, and a slave device 54, such as a headset. Although only one slave device 54 is shown, it will be understood that multiple slave devices may be coupled to the bus system 50 for communication with the master device 52. Accordingly, the description provided herein for the slave device 54 can be generally applied to other slave devices that are connected to the bus system 50.

The master device 52 or the slave device 54 may include an Inter-Integrated Circuit (I²C) interface 56 which is connected to a baseband processor or other mobile processing unit. The master device 52 or slave device 54 may also include an I²C interface for digital audio data. Inputs, or input signals, 60 to the I²C interface 56 and a serial interface 58 may include, but are not limited to, an external clock signal 60a (EXT CLK), an I²C clock signal 60b (I²C CLK) and an I²C data signal 60c (I²C DAT). An output of the low speed serial interface 58 is connected to the slave device 54 via a cable 62, such as a co-axial cable. As described above, one of the wires or lines within the cable 62 provides a bus 64 that is used for communication between the slave device 54 and the master device 52 and can be seen as the single wire bus. The bus 64 may be used where the number of pins or wires is limited or for high reliability with respect to noise immunity. In other embodiments, a two wire bus can be used.

In a single wire bus embodiment, a single wire may combine multiple functions, including, but not limited to, the transmission of both clock and data in a single bus cycle. In operation, the I²C interface 56 retrieves and sends data to the slave device 54 over the bus 64. In other embodiments, communication over the bus 64 may be controlled via a connection to a baseband processor or another processing unit. Accordingly, control of the master device 52 can be via the I²C interface 56, through another control interface or as part of a connection to the baseband processor or other processing unit that has the master device 52 perform various operations such as, but not limited to, PING, READ, WRITE and FUNCTION commands or operations. In at least one embodiment described herein, the PING, READ, WRITE and FUNCTION commands many not occur in the same frame since each frame is defined by only one operation. These operations will be described in more detail throughout the description.

The master device 52 generates framing information in order to allow the slave device 54, or multiple slave devices, to be synchronized to the bus 64. In one embodiment, the frame length is determined by an 8-bit register that provides a separation distance between the start of each block of command data. In another embodiment, the unit of measure is a nibble which equals four (4) bits. The frame length is determined by the command pattern and in one embodiment, in word mode, may be 48 bits with a default sync separation value of 28 nibbles thereby resulting in a frame length of 384 bits.

In operation, a synchronization (sync) signal, control signals of information, data, a clock signal and power is transmitted between the master device 52 and the slave device 54 over the bus 64. Accordingly, the bus 64 allows continuous operation of a number of external devices and all devices are synchronized by the same clock signal. The clock signal can be used as a sampling clock for internal circuits such as sigma-delta converters or for continuous operation of a complex logic circuit. In other embodiments, there may be instances in which the clock signal is kept at a steady level such as static low logic level or a static high logic level to save power when there is no activity on the bus 64 as will be explained in more detail below.

The size of components that communicate via the bus 64 may be decreased by using at least one embodiment of the unified bus communication protocol described herein. For example, if implemented in the portable electronic device 10 of FIG. 2, the unified bus communication protocol allows the bus 64 to transmit the clock signal and the data over a single wire which reduces the number of pins that are occupied in the chip 32 thereby allowing the other pin ports 42 to be used for other functionality or to reduce the total pin-count, silicon area or cost of the chip at the Printed Circuit Board (PCB) level.

Figure 3B:
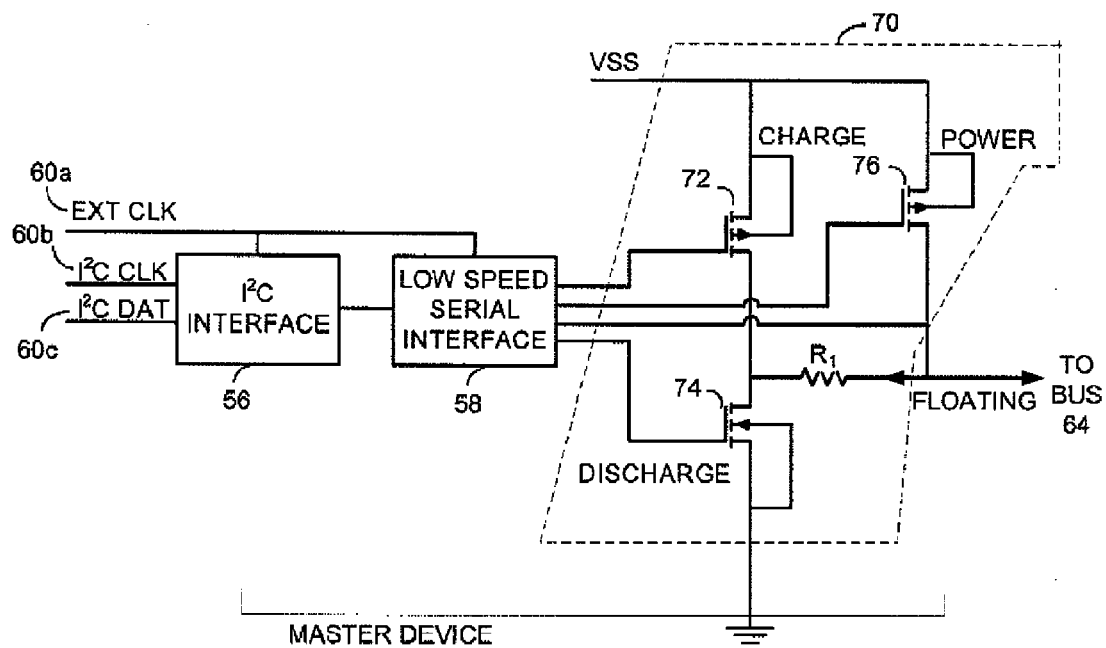
FIG. 3b is a schematic diagram of the bus system of FIG. 3a showing an example of interface circuitry for coupling a master device to the bus.

Referring now to FIG. 3b, shown therein is a schematic diagram of the bus system 50 showing an example of interface circuitry 70 for coupling the master device 52 to the bus 64. This schematic is primary for the single wire version of the bus, but could also be used for the data line in the two wire version. Similar circuitry can be used to couple the slave device 54 to the bus 64. The interface circuitry 70 includes a charge transistor 72, a discharge transistor 74, a power transistor 76 and a resistor R1. The charge transistor 72 is used to assert a logic "1" on the bus 64 and the discharge transistor 74 is used to assert a logic "0"

on the bus 64. The power transistor may be used to charge a slave device quickly (e.g. a battery) when more current is used than the current that is normally provided through the series termination resistor R1. With this arrangement, the bus 64 does not suffer from time-constrained implementations such as open-collector and open-drain types, where the signaling speed is a compromise between power consumption, noise immunity and bandwidth. The power transistor 76 is optional and may be included in some embodiments for charging devices and powering external devices when there is no communication. The power transistor 76 may be controlled by a register and updated at the beginning of a frame.

The charge transistor 72 and the power transistor 76 are PMOS transistors while the discharge transistor 74 is an NMOS transistor, in this particular example embodiment. A source node of the charge transistor 72 is coupled to the supply voltage VSS, a gate node of the charge transistor 72 is coupled to a first pin of the low speed serial interface 58 and a drain node of the charge transistor 72 is coupled to a drain node of the discharge transistor 74. The gate node of the discharge transistor 74 is coupled to a second pin of the low speed serial interface 58 and the drain node of the discharge transistor 74 is coupled to ground. The gate node of the power transistor 76 is coupled to a third pin of the low speed serial interface 58, the drain node of the power transistor 76 is coupled to the supply voltage VSS and the source node of the power transistor 76 is coupled to a fourth pin of the low speed serial interface 58 and a first node of the bus 64. One node of the resistor R1 is coupled to the source node of the charge transistor 72 and the source node of the discharge transistor 74 and a second node of the resistor R1 is coupled to the first node of the bus 64. In an example embodiment, the resistance of resistor R1 can be selected such that the output resistance of the interface circuitry 70 is generally about 75 Ohms and the supply voltage VSS may be 3V.

The node of the low speed serial interface 58 connected to the charge transistor 72 applies a low voltage so that the charge transistor 72 may charge the bus 64 at the start of every bus cycle. After that, the bus 64 is left floating by deactivating the charge transistor 72. The master device 52 may then drive the bus 64 by activating the discharge transistor 74 by applying a high voltage to its gate, which will discharge the bus 64. The connection to the bus 64 after the resistor R1 is used to receive data from the bus 64 (in some cases, a delay may be included for improved setup/hold timing margins). The node of the low speed serial interface 58 that is coupled to the power transistor 76 is used to supply larger power to the bus 64 than is available through the resistor R1. This may lead to some initial ringing, unless certain actions are taken, such as first applying the full power after the transistor 72 has been activated (this will decrease the ringing).

Figure 4A:
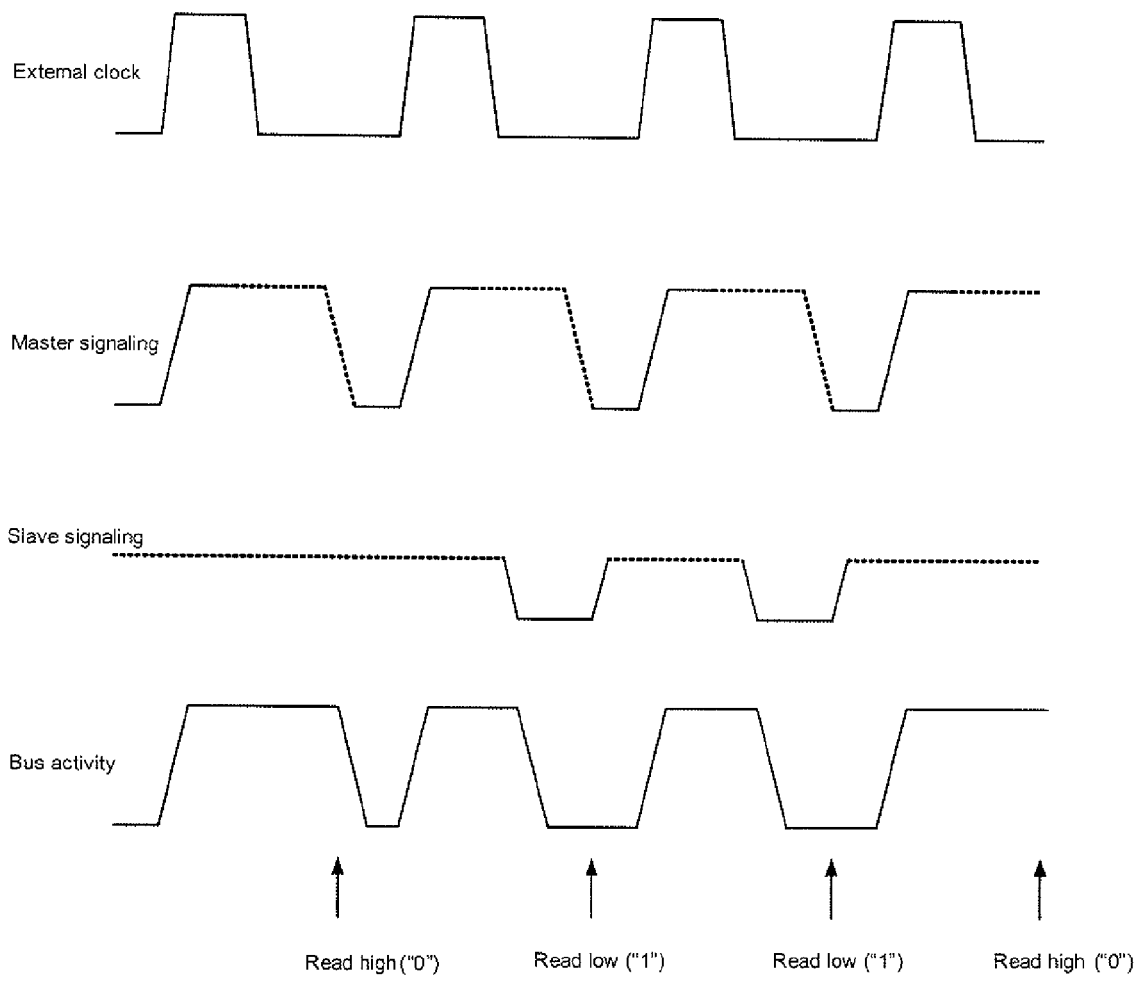
FIG. 4a is an example timing diagram of a transaction on the bus in which a slave device writes "0110" on a single wire bus.

In one embodiment, the bus 64 is implemented using a low-high-float cyclic pattern but may alternatively be implemented as a high-low-float pattern. The actual transfer of data occurs during the floating period, while the low-high (or high-low) period is used to transfer power and for clock synchronization. If the slave device 54 or the master device 52 wants to signal a logic zero, that particular device will leave the bus 64 in the same state as before, i.e. floating and with the same value on the bus 64. The slave device 54 or the master device 52 may signal a logic one by discharging the bus 64 during the floating period thereby changing the state of the bus 64 to the opposite logic level. An example of the signalling scheme is shown in FIG. 4*a* which shows a timing diagram of a transaction on the bus 64 in which the slave device 54 writes "0110". The external clock signal is typically provided to the master device 52 (in alternative cases, the master device 52 may generate a clock signal). When the master device 52 or the slave device 54 goes into tri-state mode, this has been drawn as a dashed line in FIG. 4*a* for illustrative purposes. In practice, the output voltage will be determined by the remaining charge left on the bus 64. However, once the bus 64 has been discharged, there will be no more changes no matter how many devices try to attempt this discharge. This signalling scheme therefore allows for the reduction or avoidance of bus contention, or congestion, when multiple devices try to signal, or communicate over the bus 64, at the same time, since once the bus 64 has been discharged, the discharge of the bus 64 by subsequent devices is not detected and bus collision is not possible.

As can be seen by the example in FIG. 4*a*, timing is implemented on the bus 64 such that the bus 64 is time-multiplexed in four time intervals. In alternative embodiments, it may be possible to use another number of time intervals. For the example of FIG. 4*a*, in a first time interval, the master device 52 drives the bus 64 active low during the first 25% (i.e. quarter) of the clock period. In a second time interval, the master device 52 drives the bus 64 active high during the second 25% of the clock period. The low-high clock transition may be used as a continuous sampling clock signal. In the third and fourth time intervals, the master device 52 leaves the bus 64 in a floating state for the remainder of the clock period unless the slave device 54 or the master device 52 pulls the bus low to signal a "1". For example, in the third interval the slave device 54 may pull the bus 64 active low, for example, starting between 50-62% of the clock period. The bus 64 may typically be fully settled before the clock period is complete. The bus value is sampled in the fourth interval near the end of the clock period, for example, at 88-100% of the clock period, after which the master device 52 will begin to drive the bus 64 active low again. In one embodiment, the first half of the clock cycle may be used for the clock signal while the second half of the clock cycle may be used for the data transmission. However, other divisions of the clock cycle are contemplated in which a first percentage of the clock cycle is used for the clock signal and a second percentage of the clock cycle is used for data transmission, such as 67% for the clock signal and then 33% for the data transmission, for example.

In the example of FIG. 4*a*, the bus 64 is initially active low at the beginning of the clock cycle. After a particular period of time, the bus 64 is driven active high by the master device 52. As the slave device 54 wishes to transmit a "0", the slave device 54 does not do anything with the bus 64. The value of "0" is then read by the master device 52 and the slave device 54 before the master device 52 drives the bus 64 to an active low prior to the next clock cycle. During the second clock cycle, the master device 52 drives the bus 64 to an active high after a particular period of time. As the slave device 54 wishes to transmit a "1", the slave device 54 pulls or drives the bus 64 to an active low where the value is then read by the master device 52 and the slave device 54. As the bus 64 is active low, the master device 52 does not have to drive the bus 64 active low, although it may perform that function as shown in FIG. 4*a*. In the third clock cycle, after a particular period of time, the master device 52 drives the bus 64 to an active high. As the slave device 54 wishes to transmit a "1", the slave device 54 pulls or drives the bus 64 to an active low where the value is then read by the master device 52 and the slave device 54. At the start of the fourth clock cycle, the bus 64 is active low and after a particular period of time is driven active high by the master device 52. As the slave device 54 wishes to transmit a "0", there is no activity on the bus 64 until after the value has been read and then the master device 52 drives the bus 64 active low in preparation for the next clock cycle.

The bus timing allows for the slave device 54 to continue to pull the bus 64 active low during the period where the master device 52 drives the bus 64 active low. Therefore, the release timing of an output driver of the slave device 54 is not so stringent. However, the slave device 54 generates a floating output when the master device 52 drives the bus 64 active high, including line delays. The reason the floating period is longer than the active low period and the active high period is to allow the slave device 54 to drive the bus 64 active low in the same amount of time as the master device 52, and allow some tolerance to the time instant, when the activation starts, since the slave device 54 depends on the timing of the master device 52. Furthermore, there are delays on the bus 64.

The timing of when the bus 64 is pulled low by the master device 52 is after a particular period of time so that incorrect data is not sampled by the master device 52 or the slave device 54. Accordingly, the slave device 54 has a floating output when the master device 52 pulls the bus 64 high.

When the master device 52 or the slave device 54 enters the tri-state, this is represented by dashed lines even though the actual voltage will be determined by the previous values written to the bus 64. As the period during which the bus 64 floats is very short, it may be kept stable due to parasitic capacitances coupled to the bus 64 or may be kept stable for longer periods of time by including at least one bus holder within the system 50. Therefore, the charge and the voltage on the bus 64 may be considered stable, if unloaded statically or loaded by high impedance.

The slave device 54 activates the bus 64 at certain time intervals, which can be done by implementing a local clock, using a PLL, a Delay Locked Loop (DLL) or a simple delay circuit. The delay circuit may comprise two capacitors that are being alternately charged by a fixed current and then using the charging voltage on the capacitors to determine the points where the bus 64 should be activated and sampled. These two capacitors may be charged from one fixed clock edge to the next fixed clock edge and discharged before starting this cycle. During long periods where information is not transferred, it is possible to let the bus 64 go idle by gating the clock signal to a high level. In this case, there will be a small delay in order to restart the bus 64. Since the master device 52 controls the timing, any analog controlled delays are generally not used.

In general, a small enough bus capacitance and a clock frequency that is sufficiently high is used so that the reading of the status of the bus 64 during the floating, or tri-state, period is uniquely defined. If the bus system 50 is implemented on a printed circuit board, in some embodiments, a small capacitor may be used to provide a significantly large charge to protect against data errors. In this case, a small but finite bus capacitance is used or alternatively implemented using a bus holder (e.g. using two inverters coupled back-to-back) to maintain a stable bus value. This method may be chosen for low frequency operation of the bus 64, where small leakage currents may slowly discharge any charges left on the bus 64, but a bus holder will keep the value stable. The bus holder will normally be implemented in the master device 52 to limit the power efficiency loss associated with its operation but can also be implemented in the slave device 54 for data integrity purposes. The timing characteristics for an example embodiment of when the bus 64 is implemented using a single wire are shown in Table 1.

TABLE 1

An Example of Timing Characteristics for a Single Wire Bus

| PARAMETER | MIN | NOM | MAX | UNIT |
|---|---|---|---|---|
| Bus frequency (1.8 m cable) = EXTCLK/divider | 1 | 6 | 12 | MHz |
| Duty cycle clock | 45 | 50 | 55 | % |
| Setup time (slave device) | | | 5 | ns |
| Hold time (slave device) | | | 5 | ns |
| Slew rate (master device), charge | VDD*0.1 | | VDD*0.5 | V/ns |
| Slew rate, discharge | VDD*0.1 | | VDD*0.5 | V/ns |

An estimation of the maximum disturbance on the bus 64, if a lower clock frequency of 2 MHz is used (normally a 6 MHz clock frequency is recommended) can be made. Assuming a maximum leakage current of 10 μA, a period of 1 μs and a line capacitance of 100 pF, the maximum voltage drop is equal to about 0.05 V. When the clock frequency is increased further, the noise immunity increases. The output impedance of the master device 52 is about 75±12Ω to match to a 75Ω transmission line. When received at the end of the transmission line, the reflection will immediately bring the voltage up to the full level with little impact on the slew-rate. With these characteristics, the noise immunity will be better than that of an I²C type implementation. For a 2 meter long cable, an estimate of the cable delay is about 10 ns (delay approximately 20 cm/ns). The use of a 75 Ohm cable to implement the bus 64 has the advantage of lower capacitance per length than a 50 Ohm cable and lower electrical losses. The electrical characteristics for an example embodiment of the bus 64 when using a single wire is shown in Table 2.

TABLE 2

An Example of Electrical Characteristics for a Single Wire Bus

| PARAMETER | MIN | NOM | MAX | UNIT |
|---|---|---|---|---|
| VDD | 1.62 | | 1.98 | Volt |
| VL, in | | | 0.65 | Volt |
| VH, in | 1.40 | | | Volt |
| Iload (bus stopped, sync off, power transistor on), Vdrop = 300 mV (POWERMODE) | | | 30 | mA |
| Bus holder output impedance (master device) | 600 | 1200 | 1800 | Ω |
| Slew-rate limit (at master device) with 75 pF load or smaller | 0.3 | 0.6 | 1.0 | V/ns |
| Output impedance of driver | 63 | 75 | 87 | Ω |

When implementing the unified bus communication protocol on a bus having a two wire implementation, the clock and data information can be transmitted on separate wires (i.e. a clock line and a data line). In this case a delay circuit may not be used inside the slave device 54 and internal timing circuits that use both clock edges will have better jitter performance. This bus structure is suited for implementation on a PCB where the pin requirement is less strict. In an embodiment, the method used to signal can be NRZI signaling, i.e. a logic zero is signaled by maintaining the level on the bus 64, while a logic one is signaled by changing the level on the bus 64.

Figure 3C:
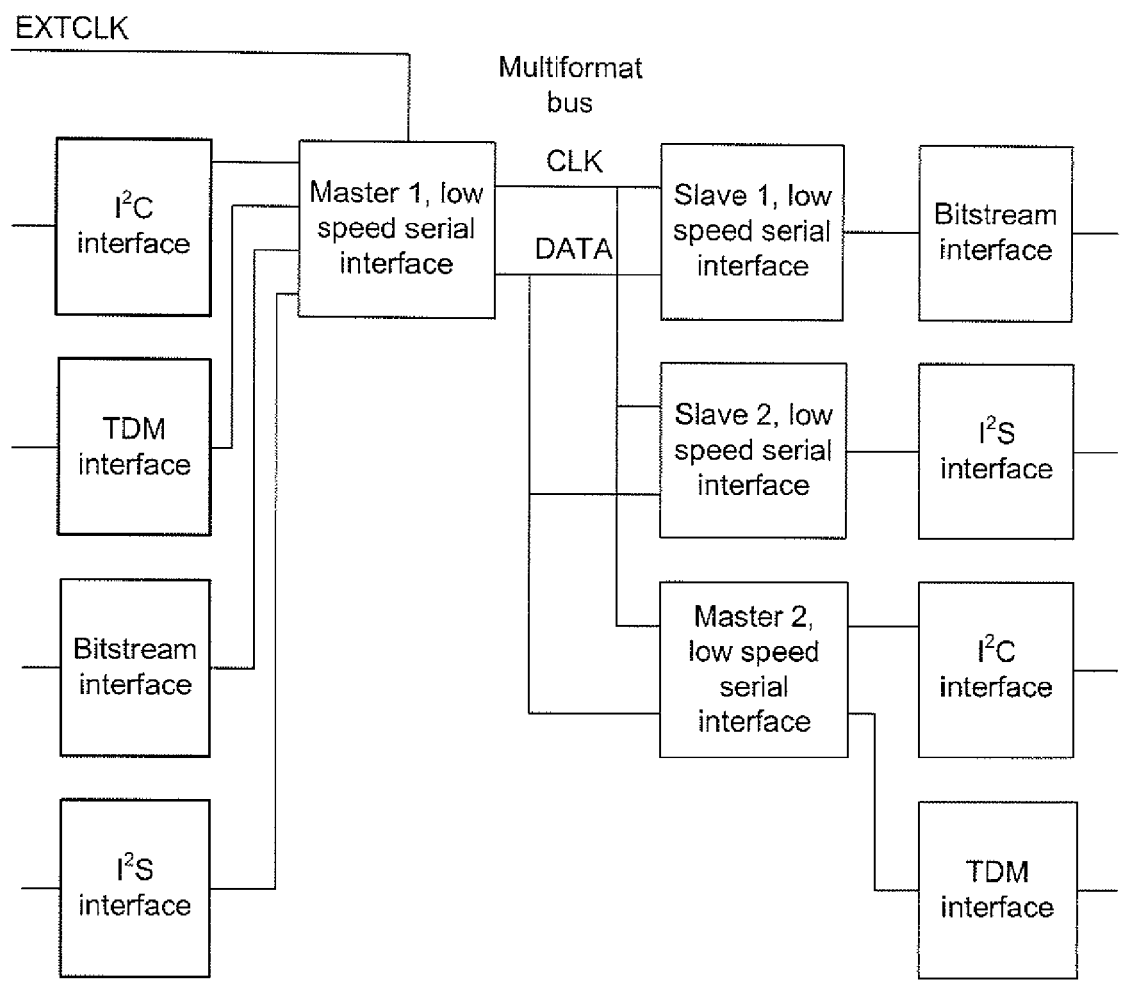
FIG. 3c is a block diagram of an example embodiment of a two-wire bus system.

Referring now to FIG. 3c, shown therein is an example embodiment of a two wire bus system. In this example, the master device 1 is coupled to an I²C interface, a TDM interface, a bitstream interface, and an I²S interface through a low speed serial interface. The master device 1 is then coupled to a slave device 1, a slave device 2 and a master device 2 via a two-wire bus that may operate according to at least one of embodiments of the unified bus communication protocol described herein. The two-wire bus has a first wire that carries clock information and a second wire that carries data, synchronization and command information. In this example, each of the slave devices 1 and 2 and the master device 2 is coupled to the bus via a low speed serial interface. The slave device 1 is also coupled to a second bitstream interface. The slave device 2 is also coupled to a second I²S interface. The master device 2 is also coupled to a second I²C interface and a second TDM interface.

When a two-wire bus with separate clock and data lines is used, the clock signal will merely provide timing information on when the information as signaled on the DATA line is valid or not. In some cases, information may be transferred on a single clock edge or on both clock edges. In some cases, information on the DATA line may change more than twice within a single clock cycle in order to reduce power consumption of the clock line.

Figure 4B:
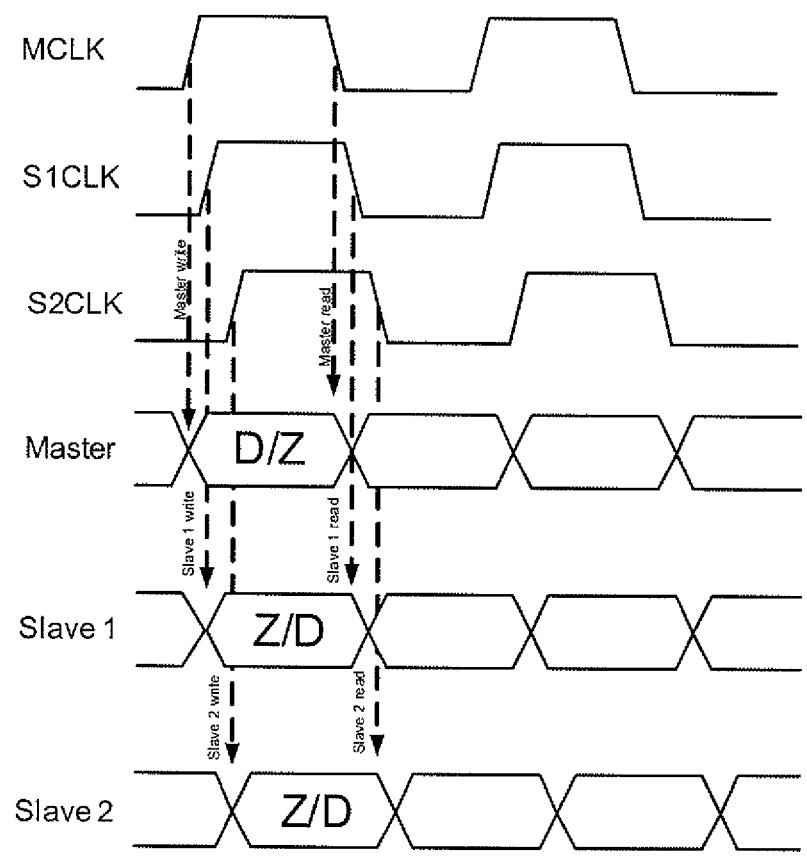
FIG. 4b is an example timing diagram when the bus is implemented using two wires.

Referring now to FIG. 4b, shown therein is an example timing diagram when the bus 64 is implemented using two wires. When using the protocol with two wires, it is possible to either transfer data on one clock edge only (either rising or falling) or on both clock edges. The advantage of using both clock edges is that it allows for higher bandwidth and lower current consumption. However, there are constraints on the bus radius once the physical characteristics of the interface have been chosen. If only one clock edge is used, it is possible to use a very long bus radius, as long as the clock frequency is reduced. However, when two clock edges are used a slave device that is located close to the master device 52 may begin to output data before they have been sampled from a slave device that is located further away from the master device 52. One way to solve this problem is to ensure that the time before the data are enabled on the bus 64 for a device that has been tri-stated in the previous data slot is longer than the time it takes for a device to go from the data state to the tri-state. Furthermore, the timing margins may be improved by delaying the output clocking of data to the bus 64 a little bit while the data are clocked in from the bus 64 immediately on the clock edges. In some embodiments, the timing margin may be adjusted to depend on the clock frequency in order to enable operation either at high frequency or with a large bus diameter. As an example, the data could be kept stable for a longer time after a clock transition for a lower frequency of operation. In other cases, it may be decided to use fixed parameters for the timing margin and use bitstream mode with every second channel empty (effectively tri-stated) for systems with a large bus radius to avoid problems when two slave devices receive the clock signal at different times, which could result in one slave device located close to the master device 52 overwriting the result from a slave device located far away from the master device 52. In alternative embodiments, different structures can be used for connecting the slave devices 54 to the bus 64 such as a ring structure or a pipe structure, for example. These structures are described in more detail with respect to FIGS. 71 to 76. In some embodiments, the master device 52 may contain a direct connection to a pipe or ring structure; in other embodiments a hub device may act as the interface between a one-wire or two-wire multiple-drop bus and the alternate pipe or ring topology.

This implementation of a 2 wire bus reduces power consumption as compared to an I²C implementation and similar open-collector structure implementations and does not infer a compromise between bandwidth and power consumption as is the case with the I²C and similar open-collector structure implementations. In some cases, a two wire embodiment of the bus 64 which uses the unified bus communication protocol results in a 40% lower power consumption than SLIMbus and double the bandwidth. Furthermore, in some embodiments, the same physical layer as is used in SLIMbus can be used to implement the unified bus communication protocol.

In at least some embodiments, a bus holder can be implemented in the master device 52. This gives predictable noise performance in situations where there are few and many slave devices. When no power is applied to a device connected to the bus 64, it should still be possible to operate the bus 64 even though the device with no power is still connected to the bus 64, e.g. (Electro-Static Discharge) ESD structures should not stall the bus 64 when no power is applied. The electrical characteristics for an example embodiment of the bus 64 when using two wires are shown in Table 3.

TABLE 3

An Example of Electrical Characteristics for a Two-Wire Bus

| PARAMETER | MIN | NOM | MAX | UNIT |
|---|---|---|---|---|
| Bus frequency (0.30 cm PCB) = EXTCLK/divider | 0 | 10 | 20 | MHz |
| Clock half period (high or low but not both) | 23 | | | ns |
| Setup time | | | 2 | ns |
| Hold time | | | 2 | ns |
| Bus holder (master device only) | 600 | 1200 | 1800 | Ohm |
| Slew rate | VDD*0.1 | | VDD*0.5 | V/ns |
| Time to disable output, $T_{D-Z}$ | | | 5 | ns |
| Time to enable output, $T_{Z-D}$ | 6 | | 12 | ns |
| Internal delay on data line before sampling | 1 | 2 | 3 | ns |

Regarding power consumption, if it is assumed that data changes on one clock edge for the two wire bus embodiment, dynamic power consumption due to capacitive charging will be lower for the single wire bus embodiment as compared to the two wire bus embodiment. The state changes used per transmitted bit will be two for the single wire bus embodiment (i.e. a signal going up and down), while the two wire bus embodiment will on average use 2½ signal changes due to the clock signal going up and down and the data signal on average changing every second time. The single wire bus embodiment allows additional data information to be carried in the clock signal without any extra power consumption (i.e. no extra charging of the lines), since the signal may be duty cycle modulated. This is an example of when the clock and data lines are combined into a single line in order to reduce the number of terminals and to reduce power consumption by reducing the number of signal transitions. In other embodiments, the single wire bus may also be level modulated in order to transfer more bits per clock cycle. However, if data changes on both clock edges of the two wire bus embodiment, then it will be more power efficient since the two wire bus embodiment will only use 1½ state changes for every bit transmitted, i.e. one clock change and an average of a ½ data signal change.

It should be noted that it should be more efficient in terms of power, to have as few devices as possible connected to the bus 64, since the power efficiency degrades linearly with the number of devices attached to the bus 64. If multiple devices may be attached to a single bus line, it is advantageous to reduce the input capacitance of each device to lower the resulting power consumption. Alternatively, there can be embodiments in which more than one bus is used so that some of the devices are coupled to one bus and other devices are coupled to another bus and there is a device that is common to both buses, such as a master device.

In general, the slave device 54 can indicate that it wishes to communicate with the master device 52 by actively pulling the signal down during a PING operation. In this case, data can then be transmitted between the slave device 54 and the master device 52 via a READ, WRITE or FUNCTION operation. The master device 52 can also initiate a READ, WRITE or FUNCTION operation on its own. In order to initiate the communication, the master device 52 and the slave device 54 are synchronized to each other as described in more detail below.

In an example embodiment of the unified bus communication protocol, a frame is defined to include three control words: a synchronization word (i.e. the S word) and two command words (i.e. the X word and the Y word) for communicating commands to and from the slave devices. The control words may be 16 bits long and are generally sent out during every frame. In other embodiments, the length of the control words may be some other length, e.g. 8 bits and the number of control words in a frame may differ from three. However, the control words can be transmitted differently during a frame depending on the mode of operation: e.g. a word mode and a bitstream mode. For example, in word mode, the distance between the control words can vary which enables support of different oversample ratios and clock frequencies. In the bitstream mode, data bits are interleaved between the individual bits in each control word; one benefit of this data interleaving is the support of multiple low latency bitstream data channels.

In an example embodiment, the master device 52 performs several control functions including: status monitoring (i.e. a PING operation), reading a register (i.e. a READ operation), writing to a register (i.e. a WRITE operation) and executing functions (i.e. a FUNCTION operation). The type of operation is determined by the master device 52. In some embodiments, the master device 52 is controlled by a system controller (not shown). In these cases, the interface between the master device 52 and the system controller can be implemented using an I²C bus or by integrating these two system components into one device (i.e. a processor).

In order to communicate with the slave device 54, the master device 52 transmits a synchronization (i.e. sync or S) word that has synchronization data that the slave device 54 (or devices) may use to synchronize their internal timing, or clock, with the master device 52 and consequently the bus 64 as well. In general, the first control word that the master device 52 transmits in a frame is the S word. Accordingly, the S word can be used to initiate the start of a frame. The first bit that is transmitted is the S15 bit followed by the S14 bit and so on. The bits will be transmitted immediately after each other in word mode while there will be a constant gap between the transmission of these bits in bitstream mode. The Input/Output (I/O) direction (e.g. r/w) is given with respect to the master device 52.

Referring now to FIG. 5, shown therein is a diagram of an example embodiment of the fields and bit allocations of the S word. In this example, the S word comprises four fields: a DATA SYNCHRONIZATION field, a nine bit CONSTANT SYNC SYMBOL field, a DYNAMIC SYNC SYMBOL field, and an INTERRUPT field. Other embodiments may use other fields for the S word or more or less bits for the fields shown in FIG. 5. These fields can be implemented using one or more bits of a register. In alternative embodiments, different implementations can be used for these fields, the fields may be ordered differently, or there may be other fields that are used or other registers that are used.

The DATA SYNCHRONIZATION field of the S word includes a parity bit PAR (S15) and an acknowledgement bit ACK (S14). The calculation of the parity bit is based on all traffic encountered on the bus 64 including the last parity bit written up to and including the last bit before writing the new parity bit (i.e. the parity may be calculated for a full frame). The parity bit is set to be one if the total number of bits equal to one in a frame is even; otherwise the parity bit is set to be zero. The initial parity value of the master device 52 at power-up is zero. In at least one embodiment, the master device 52 may write parity information for all operations (PING, READ, WRITE and FUNCTION) to ensure that any device that is attached to the bus 64 can detect a signal integrity problem or a data collision.

The acknowledgement bit is calculated based on traffic on the bus 64 in the last frame. The slave device 54 should signal a logic low, if the data transmission has been corrupted during a READ, WRITE or FUNCTION operation to the slave device 54. If there is no error in parity, the slave device 54 will respond with a logic one. This is useful for added security during I/O WRITE OPERATIONS. Based on the past operation, the slave device 54 sets the acknowledgement bit, since it knows if an error has occurred, e.g. that the parity bit is wrong or a bus error has occurred. If no slave device is present on the bus 64, a logic low will be returned from the bus 64, by nature of the bus signaling scheme indicating a problem to the master device 52. If the previous operation was a PING operation, any slave device that has detected an error based on the parity bit and the entire activity of the past frame may activate this bit (i.e. write a logic one). This means that the acknowledgement bit is effectively inverted during a PING operation (a logic zero means no error). If an error is detected, the master device 52 may activate an IO ERROR bit for a missing ACK bit after a READ, WRITE or FUNCTION operation and BUS ERROR for NACK during a PING operation. In the example shown in FIG. 6, which is a timing diagram showing operations to the DATA SYNCHRONIZATION field of the S word in word mode, the master device 52 writes an even parity in time slot 96, based on activity in time slots 0-95. The slave device 54 responds in time slot 97. During a READ, WRITE or FUNCTION operation, the slave device 54 will only respond in the case of an error (i.e. by NACK).

Referring now to FIG. 7, shown therein is an example embodiment of the parity and acknowledgement calculation that is done by the master device 52 and the slave device 54 based on different command operations. If there is no error in parity, the device that is being addressed will respond with a logic one (i.e. active action). This is useful for added security during I/O WRITE operations. If there is a parity error during a WRITE operation from the master device 52 to the slave device 54, the slave device 54 does not complete the WRITE operation internally if there is a parity error and the master device 52 will respond to the bus controller with an IO ERROR interrupt. If there is a parity error during a READ operation from the slave device 54, the master device 52 will generate an IO ERROR IRQ, while the slave device 54 will not do anything if the master device 52 does not receive an active ACK. By reading the device register and the last written word, it is possible to identify which device is in question. Before performing a new READ, WRITE or FUNCTION operation, in one embodiment, it is possible to wait until the current IO operation is complete and to check the status of the IO ERROR bit. This methodology provides a more robust error performance.

Accordingly, an aspect of at least one embodiment of the unified bus communication protocol is to provide data integrity support by monitoring all data transmitted within a frame, calculating the parity of the transmitted data and checking for acknowledgement for a READ/WRITE/FUNCTION operation from one or more slave devices attached to the bus 64 that received a command to perform the operation. The master device 52 can perform the monitoring, calculating parity and checking actions.

During some operations, e.g. a PING operation, no one single device in particular is being addressed. Therefore, any device could detect a parity error. The master device 52 will then write to the parity bit as it has completed reading the frame and any device that detects a parity error will respond with a logic one, which has the same effective function as a NACK (not acknowledge). This allows multiple devices to respond at the same time since the bus 64 both in the one-wire and two-wire implementations allows for wired-or functionality. In general, FUNCTION operations may be treated like a PING operation, except for commands that use function data which may be treated like READ and WRITE operations to a specific device or to a group of devices.

Accordingly, an aspect of at least one embodiment of the unified bus communication protocol is to provide data integrity support by monitoring all data transmitted within a frame, calculating the parity of the transmitted data and checking for a not acknowledgement message for an operation other than a READ, WRITE or FUNCTION operation from one or more slave devices attached to the bus that received a command to perform the operation. The master device 52 can perform the monitoring, calculating parity and checking actions.

In at least some embodiments, the CONSTANT SYNC SYMBOL field (S13:S5) can be used by the slave device 54 to quickly eliminate most false synchronization positions within a frame, while the DYNAMIC SYNC SYMBOL field (S4:S1) is used to verify that the current position is indeed the start of a frame (it should be noted that the nomenclature S13:S1 used herein indicates bits S13, S12, S11, S10, S9, S8, S7, S6, S5, S4, S3, S2 and 51). This approach is used to get quick time-to-lock and help to prevent the slave device 54 from locking onto false starts created by random static data on the bus 64. For example, the following nine bits {S13:S5}="101100011" is a constant that can be used to obtain fast initial synchronization on random bus data by the slave device 54. Accordingly, the constant sync portion of the S word is used by the slave device 54 to reduce the likelihood of a false S word in a frame. For instance, data may be transmitted over the bus 64 by other slave devices which appear to be the S word, but since it is not transmitted by the master device 52 it is false and should be ignored by non-connected slave devices. Accordingly, the selection of the value for the constant portion of the S word (i.e. the CONSTANT SYNC SYMBOL field) is such that it is a pattern of bits that does not regularly occur in digital words, audio data or bitstream data so that its use as an S word is not compromised.

The DYNAMIC SYNC SYMBOL field (S4:S1) comprises a pseudorandom value that can be implemented by a pseudorandom counter such as Cyclic Redundancy Check (CRC) generator, for example, with a generator polynomial $X^4+X+1$, $X^8+X^5+X^4+1$ or $X^{15}+X^{14}+X^{10}+X^8+X^7+X^4+X^3+1$ that is also used by the slave device 54 for synchronization. For example, the DYNAMIC SYNC SYMBOL field can be updated as follows (the Most Significant Bit (MSB) first): {S4, S3, S2, S1}={S3, S2, S1, (S4 XOR S3)}. In this example, the DYNAMIC SYNC SYMBOL field is initialized to "1111" at reset. The "0000" condition is not used and shall result in the "1111" state during the next cycle if it is ever encountered. The entire sequence in hexadecimal is as follows: {F, E, C, 8, 1, 2, 4, 9, 3, 6, D, A, 5, B, 7}.

In at least some embodiments, the pseudorandom value can also be used for synchronization, which will allow for a quicker time-to-lock and reduce the likelihood that the slave device 54 locks onto a false S word that is created by random data on the bus 64. In at least one embodiment, the slave device 54 can verify the pseudo-random pattern multiple times before locking on to the bus 64. In at least one embodiment, the slave device 54 can wait until it has verified the entire sync generator cycle before allowing it to communicate on the bus 64. The number of synchronization patterns that a slave device may use for detection until it decides that it has obtained synchronization with the master device 52 is a question of how low a probability of an error of false synchronization is acceptable. For example, if the slave device 54 uses N frames before a lock is accepted, then the chance that this happens by random data is $15^{-(N)}$, which is a very small probability and in practice even lower, since the constant sync portion is usually uniformly spaced and is also found during synchronization. Therefore, a smaller or higher number of synchronization patterns (and therefore frames) may be used in different applications before declaring synchronization (i.e. lock) is considered safe. In an alternative embodiment, the slave device 54 may use 7 frames to lock on to the bus 64. In other embodiments, a different number of bits can be used for the constant sync portion and the dynamic sync portion. In alternative embodiments, other techniques can be used to generate content for the DYNAMIC SYNC SYMBOL field.

Depending on the use of the bus 64, e.g. for transmission of digital word data, the transmission of bitstream data, etc., different values or schemes may be used to generate values for the CONSTANT SYNC SYMBOL FIELD and/or the DYNAMIC SYNC SYMBOL field. As an example, the constant portion for an S word may be 0xB25 (hexadecimal) when the bus 64 is used in word mode and the constant portion for an S word may be 0xFFE when the bus 64 is used in bitstream mode.

The INTERRUPT field (IRQS (S0)) is included in the S word to implement prioritized interrupt control and can enable fast response to interrupt requests for many use scenarios. The slave device 54 can generate an interrupt to the master device 52 during a frame. If the slave device 54 wants immediate attention it signals a logic "1" level in the INTERRUPT field, which in this example embodiment is during the last bit of the S word. The IRQ bit is used as a general interrupt control and can be activated by any slave device during any frame. For example, the IRQS bit can be used to delay a READ, WRITE or FUNCTION operation, if the slave device 54 has an important status message to send. This is done by activating the bit in the INTERRUPT field. If no slave device has activated this bit (a logic '1' means activate) or if the IRQS interrupt is disabled by the IRQ mask bit B4 (S0 DELAY ENABLE—see FIGS. 29*a* and 29*b*), the READ, WRITE or FUNCTION operation will proceed. The delay is activated, if the slave device 54 has a status level equal to "10" or "11" (this is described in more detail below). Accordingly, the slave device 54 can copy the contents of the MSB of its status register (which holds the slave status bits) onto the bus 64 during the time slot for this IRQS bit in a frame. The slave status bits are further discussed in the description of the X and Y words. Including the slave status data in portions of the X and Y words allows for data from other slave devices to be collected while not disabling the bus 64 if one of the slave devices has an error. On the other hand, a READ, WRITE or FUNCTION transaction/operation is allowed to proceed, if the value of the IRQS bit is inactive or if an IRQ is not allowed as determined by the IRQ mask bit in which case the status of the devices coupled to the bus 64 is polled using a PING operation. FIG. 8 shows various combinations of the command operation (PING, READ, WRITE AND FUNCTION), the value of the interrupt mask bit and the action that should be taken.

The type of control operation within a frame (i.e. a PING, READ, WRITE or FUNCTION operation) is determined by the first three bits of the X word in this example embodiment. These bits are followed by information used by the particular operation. In the case of the PING operation, a register bank select bit may be used to determine a configuration mode for the slave device 54; for audio applications, this can be referred to as the audio mode which can be used for seamless transfer between different audio modes and this transfer is inaudible in the resulting audio. Data synchronization bits may be included to support odd sample rates and asynchronous transfers with little hardware in the slave device 54. Subsequent bits are grouped in pairs and used to read the current status of all devices attached to the bus 64. In other embodiments support for multimaster operation is accomplished by including a REQUEST FOR BUS bit that can be activated by another master device and a RELASE BUS bit that grants access to the bus 64. In this type of operation, true multimaster operation is possible since both master devices can write commands at the same time in the X and Y words. If there is a bus collision, the device that writes a zero but reads back a one will lose the arbitration. By allocating the PING operation to "000" it is possible to combine true multimaster operation with continuous monitoring of the bus 64 (i.e. the master device performing the PING operation will lose arbitration if another master device requests a READ/WRITE or FUNCTION).

The READ, WRITE and FUNCTION operations send out information to one specific device attached to the bus 64. The number of bits allocated for a unique slave address is four bits in this example embodiment. Other embodiments can use more or less bits for the slave address. The actual address can be dynamically assigned after power-up to prevent address collisions from occurring, i.e. as long as at most 16 devices are attached to the bus 64 at the same time (although normally up to eleven devices are used). The four bits are followed by register address and data information. The address and data field length generally depends on the type of operation (eight or 16 bit data) and will extend into the Y word. The master device 52 writes the parity it has calculated based on the current data transfer and the slave device 54 acknowledges that the operation was successful. This approach for parity verification gives extra security since both the master device 52 and the slave device 54 will know if the other device failed in receiving correct data.

The FUNCTION operation can be used for a variety of purposes. For example, in at least one embodiment, the FUNCTION operation is used to set the slave device 54 in a certain state, to request information about a specific device or for testing.

Referring now to FIG. 9a, shown therein are various fields and bit allocations for the X command word for various command operations. These fields can be implemented using one or more bits of a register. In alternative embodiments, different implementations can be used for these fields, the fields may be ordered differently, or there may be other fields that are used or other registers that are used. The read (r) and write (w) direction is defined with respect to the master device 52, i.e. a (w) means that the direction of the data flow (i.e. transfer or transmission) is from the master device 52 to the slave device 54 and a (r) means the opposite direction of data flow compared to a (w) operation. The structure of the X word will depend on what operation is currently under way. FIG. 9a provides some example combinations. In this example, the X command word comprises a COMMAND field, two DATA SYNCHRONIZATION fields, a SLAVE DEVICE field, a BANK SELECT field, an ADDRESS field, a SLAVE STATUS field and a FUNCTION field. Some of the fields are only used during certain command operations as will be described. The FUNCTION field will be described when FUNCTION operations are discussed below. In general, the first three bits (X15-13) are part of a command field that indicates the command that is being issued by the master device 52, such as a READ, WRITE, PING, FUNCTION or OTHER command, while the structure of the remaining bits will depend on the chosen command. FIG. 9b provides an alternative embodiment for the X word that may be used. This encoding has the advantage that it is possible to perform asynchronous, fractional or multiframe data transfers in any operation mode (PING/READ/WRITE/FUNCTION) at the cost of some complexity in decoding and activation of the BANK bit.

With regards to the COMMAND field (X15:X13), in at least some embodiments, the command can be an 8 or 16 bit READ/WRITE operation, a PING operation or a FUNCTION operation in this example embodiment (more or fewer bits may be used in other embodiments). In general, the PING command is active all the time, unless the master device 52 has received a READ, WRITE or FUNCTION command and is currently processing it.

In some embodiments, the X12 bit can be a BANK bit or BANK field that is used during a PING operation. When a PING command is issued, the master device 52 uses the BANK bit to indicate which register bank should be used for all devices for internal timing of data transfer. In audio applications, the BANK field can be used to switch between two register banks to avoid any glitches during playback while changing audio modes. In general, the BANK field can be used to switch between different register banks that specify different frame formats for different data modes that can be used for data transmission during a frame. The different data modes can specify different sampling rates, different channel selections, different port selections, using bitstream mode or word mode and the like for different audio scenarios. For example, in one data mode, data from data channels can be defined to be placed in a first set of time slots in a frame and in a second data mode, the data from the same data channels can be defined to be placed in a second set of time slots in a frame. During frames that do not use the PING operation, the previous value of the BANK field may be used for register selection. When the slave device 54 is being addressed, it uses the BANK field to select which register bank to perform a READ, WRITE or FUNCTION operation on. The slave device 54 may use at least one shadow register for all registers that change in more than one data mode of operation. It may be used to select between internal registers and/or internal programs. In order to provide robustness against errors, the BANK field can be read more than once, such as twice, with the same value, before a change happens.

In at least one embodiment, in order to provide robustness against errors, the BANK SELECT field can be read more than once, such as twice, to ensure that there is the same value in this field in at least two consecutive frames, before a change happens, i.e. in this example a change of the register bank will take at least two frames.

The SLAVE DEVICE field (X11:X8) is used during READ, WRITE and FUNCTION operations. The SLAVE DEVICE field specifies the address of a slave device that is attached to the bus 64. All slave devices start to communicate with the master device 52 using an address of zero after power-up after which they will be assigned a new address by the master device 52. Slave devices with addresses 0-12 can communicate full status information to the master device 52. In this example embodiment, the address 15 is reserved for broadcast of information to all of the devices that are attached to the bus 64. This broadcast may be useful for using one command to reset all slave devices, for example.

A DATA SYNCHRONIZATION field (DS0-DS1 in X11-10) may be used to synchronize data over several frames and is transmitted during PING operations. The slave device 54 may select this field to synchronize the start of internal counters that select when data starts to be transmitted. If the slave device 54 uses the data synchronization bit DS0 or DS1 and it is set to one, the slave device 54 resets its internal counters (which can occur at a normal frame start), otherwise if the DS0 or DS1 bits are set to 0 these internal counters are not reset. This is useful to synchronize the transmission of data that best fits into several frames e.g. for fractional flows.

A bit REQUEST (REQ) BUS ACCESS (X9) is used during PING operations. By activating this bit (setting it equal to one), another master device can request access to the bus 64.

A bit RELEASE (REL) BUS (X8) is used during PING operations. If the current master device activates this bit (a logic value zero for inverted logic), another master device is allowed to begin to send out commands to the bus 64. The current master device 52 may simultaneously send out commands, if it chooses to do so. Data arbitration will determine who wins the request for a specific command if there is contention between the two master devices. If another master device ignores the RELEASE BUS bit and begins to write in the command words when this field is inactive (e.g. logic one), this will be considered a bus error.

In an alternative embodiment, the X12-X9 bits can be used for data synchronization (DS0-DS3) as described above. Furthermore, the X8 bit can be used as the BANK bit as described above (e.g. see FIG. 9b).

The ADDRESS field (X7:X0) is used during READ, WRITE operations and some FUNCTION operations and is the lower eight bit address that is used to select a specific register address inside the slave device 54. If 16 bit operations are used, the higher 8 bits may be assumed to be zero.

The SLAVE STATUS field (X7:X0) is used during PING operations and provides the status for a portion of the slave devices ST11 to ST8 (the remaining status information is provided in the Y word as will be described). In this example embodiment, all slave devices include a status register which consists of two bits. The value of the status register is used to determine which action the master device 52 should take for a given slave device. Each slave device responds with status information by writing to dedicated time slots for each slave device in the X and Y words. In this example, the total number of status bits is 24 and the slave devices transmit the most significant status bit first. The status bits may generate a master interrupt depending on the value of the interrupt mask bit. After a power-on reset event, all slave devices will start responding at slave address zero to signal that they have just been attached to the bus 64. In other embodiments, the status register of the slave devices may have more than two bits if there are more status levels that are used.

In this example embodiment, using two bits, the slave device 54 can have four different status levels. A status level of '00' is the lowest status level and is the initial value inside the slave device 54 when the slave device 54 first attaches to the bus 64 but is not locked onto the bus 64 (i.e. not synchronized to the master device 52). Only logical ones will affect the physical operation of the bus 64 (due to the signaling scheme used in this example embodiment) so this status value will leave the bus 64 unchanged. A status level of '01' signals that the slave device 54 has locked onto the bus 64 and can be used to detect when the slave device 54 connects to and disconnects from the bus 64. This may be monitored by reading the slave status level and enabling an interrupt using the ATTACHMENT bit. This value affects a PING operation. A status level of '10' is used to request attention to the slave device 54 after it has locked onto the bus 64 (due to buffer level or an error condition, for example). This condition may be monitored by enabling the ATTENTION interrupt mask bit. This status level will delay a READ, WRITE or FUNCTION operation, if both the S0 and the S0 DELAY IRQ mask bits are simultaneously active (i.e. a '1'). A status level of '11' signals that the slave device 54 has an emergency situation that may have to be handled quickly such as, but not limited to, the temperature of the slave device 54 being too hot or there is a critical undervoltage or overvoltage at the slave device 54. This condition may be monitored by enabling the ATTENTION IRQ mask bit. This status level will also delay a READ, WRITE or FUNCTION operation, if the S0 bit and the S0 DELAY IRQ mask bit are simultaneously active (i.e. set to logic level '1').

Referring now to FIG. 10, shown therein are various fields and bit allocations for the Y command word for various command operations. The structure of the Y word will also depend on what operation is currently under way. In general, the Y word is used to communicate data and possibly address information between the master device 52 and the one or more slave devices 54. FIG. 10 provides some example combinations. In this example embodiment, the Y command word comprises an ADDRESS field, a WRITE DATA field, a READ DATA field and a FUNCTION field. Some of the fields are only used during certain command operations as will be described. These fields can be implemented using one or more bits of a register. In alternative embodiments, different implementations can be used for these fields, the fields may be ordered differently, or there may be other fields that are used or other registers that are used. The FUNCTION field will be described when FUNCTION operations are discussed.

The ADDRESS field (ADDR 7-0) is an eight bit address that may be used together with the address field in the X word to form a 16 bit addresses for the slave device 54.

The WRITE DATA field (WD15:0) includes data from the master device 52 that is to be written to a register in the slave device 54. For 16 bit WRITE operations, the entire word WD15:0 is used. For 8 bit WRITE operations, only WD7:0 is used. The register WD15:0 can be set by external control of the master device 52.

The READ DATA field (RD15:0) includes data that is to be read from the slave device 54 to the master device 52. For 16 bit READ operations, the entire word RD15:0 is used. For 8 bit READ operations, only RD7:0 is used. The register RD15:0 can be read by external control of the master device 52.

Referring now to FIG. 11a, shown therein is an example list of functions and corresponding bit settings in the X word. In other embodiments, other functions and/or bit settings can be used. For example, there can be other embodiments which use different sub-combinations of the functions listed in FIG. 11a. These embodiments could add other functions, remove certain functions or both add some functions and remove other functions. The FUNCTION operation may be used to start the execution of special commands that are useful for the control of system functionality and device control. Some functions support broadcast, i.e. all ports (e.g. slave devices) are affected by this command. The upper bits of the FUNCTION field in the X word (X7:X4) is equal to 0000 for all the functions defined in FIG. 11a. If a function has not been implemented, the slave device 54 should not acknowledge (ACK) the corresponding request from the master device 52. If the master device 52 is writing to multiple slave devices, the slave devices can use not acknowledge (NACK) instead in this example embodiment.

The execution of the REQUEST ID function (X3:X0=0000) is used to uniquely identify the master device 52 used in a system or to distinguish between multiple slave devices attached to the bus 64 so that the master device 52 is able to differentiate between these slave devices and assign each of them a unique individual slave a number (e.g. 1-14). This enables support for several slave devices to be connected to the master device 52 via the bus 64 at the same time and avoids address collision problems (which are typically seen with the I²C bus protocol). Each slave device has a manufacturer part ID. This name will consist of a manufacturer code and a part number. In at least one embodiment, the manufacturer code is used during arbitration to assign an individual device address to each slave device that is connected to the bus 64. The situation of slave devices having identical part numbers can be handled by adding position information, as described below.

After a reset event has happened on the bus 64, all slave devices will start by looking at slave address zero (i.e. register address 0x0000) for setup information. The master device 52 will initiate the address arbitration process by writing to address zero and then reading from this address as described in the dynamic address assignment process which is described later in this description. Since there is only a single master device 52, the position field will be equal to "0000" when reading from the master device 52.

After a power-on reset event, all slave devices will set their device address to zero and the master device 52 communicates with the slave devices to assign addresses to them. After the slave device 54 has locked on to the bus 64 it will indicate a status of "01" or higher during a PING operation and the master device 52 will discover that a new device has just attached to the bus 64. The master device 52 will start the arbitration process by activating the REQUEST ID function. When the slave device 54 receives this request, it enables an internal name character counter which is used to encode an internal identification, i.e. a unique name, associated with the slave device 54. Slave devices that have not locked on to the bus 64 at this moment will not be activated and will not respond during this arbitration cycle. Furthermore, if no slave devices are currently connected to the bus 64, the master device 52 continues to complete the frame and then issues a further PING operation in the next frame cycle.

Subsequently, the master device 52 will read from register address zero from slave device zero. This can be done using either a 16 bit or an 8 bit READ operation depending on the particular implementation. The value returned will be the part number of the highest value part ID (i.e. unique name) of any slave device attached to the bus 64 with slave device address zero. The master device 52 reads the first bit of the unique name of all the slave devices looking to be assigned a unique address. The first bit of the unique name for each slave device is then reviewed. If they are all the same i.e. all "1" or all "0", the master device 52 proceeds to, or polls, the next bit of the slave device names. If there is a combination of "0" and "1" s, then the master device 52 continues only with the unique names which have a "1" as it will determine the bus value due to the dynamic nature of the bus 64. In other words, if there is more than one slave device attached to the bus 64, any slave device that tries to write a logic zero but reads back a logic one will back off and wait for the next arbitration cycle to start. The master device 52 continues to read from address zero until a slave device 54 indicates that the part ID is complete. This can be indicated by a zero byte, i.e. 0x00. The master device 52 then assigns an individual device address to this slave device by writing the desired device number to register address zero by setting data bits 3:0. The master device 52 can later change the device address of a slave device by writing to the current device address and setting bits 3:0 at register address zero to a desired value. A short encoding format can be used that uses four bytes only for encoding ID. If a slave device receives an IO request other than a read from address zero, before it has completed the read sequence, it may back off and terminate the process.

The dynamic address assignment process allows the master device 52 to review the unique names of the devices in an "alphabetical order", where the slave device with the higher numerical name value is assigned a slave address before or after a slave device with a lower numerical name value. The numerical value of the slave device name is determined from a sorting based on a search with the values being read as binary numbers. If there is only a single "1" value, then the master device 52 assigns the slave device associated with this unique name as the first device and assigns it a unique slave value 1-14. In at least some embodiments, only device values 1-11 are used to enable continuous monitoring of all attached devices while device values 12-14 are reserved for device grouping. It then proceeds to return to bus communication where it will encounter the next slave device that requires an address and assigns a slave device address that is different from the first slave device. This address assignment continues until there are no more unassigned slave devices attached to the bus 64. As each slave device has a unique name, there will not be any situation where the master device 52 does not know which slave device to associate with the current device address. In subsequent READ, WRITE and FUNCTION operations to the slave devices, the assigned slave addresses 1-14 will be used to identify the slave devices.

If two or more slave devices contain the same chip, these devices may be programmed with different POSITION information or have extra terminals to encode for position. As a simple example, a single input terminal can provide information between a left and a right channel. By adding two terminals instead of one, it is possible to assign up to 9 different positions by connecting each of these terminals to either GND, VDD or FLOAT (i.e. not connected or tri-stated, Z) (see FIGS. 11b-11e). Both terminals are initially considered as input terminals. In FIG. 11d, if the output terminal is floating (i.e. an open output terminal), then one can send out the address based on an input terminal. The output floating condition can be determined by the circuit as shown in FIG. 11e. Typically, the value X will be driven by an internal state machine while TEST is the external terminal and Y is the test result. This I/O circuit may be used for both the SEL_IN and SEL_OUT terminals to obtain all 9 combinations. In other embodiments, the test for the FLOAT (Z) condition may be removed and the ring structure may still be utilized. The high value pull-down resistor may be included to reduce power consumption with no connection to the input terminal TEST but may be optional if power consumption is not an issue. If the output from the inverter following the input X is typically active, then the 2 kΩ resistor may alternatively be increased in value and the 100 kΩ resistor be omitted. An example pin configuration is shown in FIG. 11d which is also compatible with legacy systems for digital microphones. The example encoding as shown in FIGS. 11b and 11c allows for at least 9 positions and compatibility with current legacy systems without any programming and no changes in physical layout. The ring topology encoded as shown in FIG. 11c will connect a first device to a fixed input value, and all subsequent devices will connect the input terminal SEL_IN to the SEL_OUT terminal of a previous device. During start-up, the devices will auto-configure themselves, by incrementing from a first value (0) until the last device which will be numbered N−1 (i.e. N devices connected in a ring topology). This topology has the advantage that more than 9 positions can be obtained, but the disadvantage that if a single device fails, the enumeration will also fail. Thus, it is more prone to errors and less robust as compared to the configuration in FIG. 11b which uses a fixed address of 0-8 in this example (other ranges can be used in other embodiments). In both cases, the devices should first attach to the bus 64 after the enumeration of the internal position has been completed. This process will take longer for the ring topology, since each device typically waits until it has received information from the previous devices or it has been confirmed that it is the first device in a ring.

In an embodiment, if the slave device 54 enters a hardware error condition and is reset, its slave address is set to the default value of zero. If the slave device 54 loses synchronization with the master device 52, it disables its output and tries to regain synchronization with the master device 52. The slave device 54 should keep its current device address and start searching using the last obtained command separation value (which is described later in this document). After regaining synchronization, the slave device 54 may signal a bus error by setting its device status to "10". The master device 52 will then ask the slave device 54 for the error type and it may respond with SLAVE_SYNC_ERROR or "0xFF" at device address zero, register address zero. If the slave device 54 receives an IO request other than a READ operation from address zero, before it has completed the read sequence, it should back off and terminate the process. In an embodiment, if the slave device 54 loses synchronization during operation and cannot resynchronize, then the master device 52 will know of this event within two frames by use of the PING operation and then change the value inside the STATUS register inside the master device 52 and set the ATTACHMENT bit.

To summarize, the slave device 54 deactivates the out-putting of a slave address under the following circumstances: after power-on reset, when the slave device 54 is not locked onto the bus 64, when the slave device 54 has lost synchronization with the master device 52, when another slave device has won arbitration and when the slave device 54 has completed outputting its own name ID.

The slave device 54 resets its own registers and prepares for a reading of its ID when the master device 52 starts the FUNCTION REQUEST_ID and the device address written by the master device 52 is equal to the slave device 54. If another slave device locks onto the bus 64 after this event happens, it should not start arbitrating even if its device address matches the master device address since it has not received the REQUEST_ID command. Thus, after power-on reset or immediately after the slave device has attached itself to the bus 64, it should not be allowed to participate in arbitration, unless it has received this command from the master device 52.

The execution of the HARD RESET function (X3:X0=0001) may be used to reset an entire slave device, which is similar to a power-on reset operation.

The execution of the SOFT RESET function (X3:X0=0010) may be used to reset all functionality except the previous programmed device address and synchronization engine. In general, the internal registers and functionality for a slave device will be the same as after a power-on reset event except the slave device is already locked onto the bus 64 and has already been assigned an address. This means that the slave device will behave as it would after a power-on reset event with the exception that the slave device is already attached to the bus 64 and has already been assigned an address that is different from zero. This can be used to correct for internal or external errors faster than when resetting all registers inside the slave device, having the slave device to lock on to the bus 64, and then assigning an address before the slave device can be programmed again.

The execution of the REQUEST CAPABILITY INFORMATION function (X3:X0=0101) may be used to get information about the capability of the master device 52 or the slave device 54. This can be used for automatically setting up ports. This function works by reading values from register zero and register one, just like the REQUEST ID function. The information that is returned corresponds to the port that is being addressed. When all information from channels connected to a port has been read, zeros can be returned instead, indicating an end of the information. In this example embodiment, the ports are defined consecutively.

An example of register 0x0000 to obtain the capability information of the master device 52 or the slave device 54 is given in FIG. 12. When reading from register 0x0000, the capability of the ports inside a slave device will be given. When reading the capability of a port, a zero-terminated string will be returned. This string will contain information about this port. The capability of a port will tell what direction it is (i.e. an input port or an output port), how many channels it has and what the data format for these channels is. After all ports have been read, the next read will return the value 0x00. The DATA registers 0x0000 (as well as 0x0001) are mainly used to transfer data (which in some cases can be large amounts of data) e.g. reading a string, the ADDRESS ID, calibration data, etc. The address 0x0000 is the low byte of the DATA register, while the address 0x0001 is the high byte. Another register 0x0C-0x0D can be used to transfer addresses and is called the ADDRESS register. The address is transferred in response to a request from the master device 52.

The DATA register 0x0000 generally includes a TYPE field, a CHANNEL INFO field and a DATA FORMAT field.

These fields can be implemented using one or more bits of a register. In alternative embodiments, different implementations can be used for these fields, the fields may be ordered differently, or there may be other fields that are used or other registers that are used.

The TYPE field (B7) may be used to indicate the direction of data transfers where a 0 can be used to indicate an input operation (i.e. reading data from the bus 64) and a 1 can be used to indicate an output operation (i.e. outputting or writing data to the bus 64), for example. Channels that support both input and output can be connected to two separate ports, in this example embodiment, one of those ports is defined as an input port and the other of those ports is defined as an output port. In at least some embodiments, all channels connected to one port share the same data format and the same sample rate.

The CHANNEL INFO field (B6:B4) may be used to define the number of channels associated with this port. Each port may be associated with one or more channels. The CHANNEL INFO field will return the total number of channels from a given slave device with the port number defined by a PORT field value. In an embodiment, the PORT field value can be encoded in binary minus one, in which case "000" means one channel or channel one, "101" means six channels, etc. By writing to the CHANNEL INFO field, the next READ operation for capability will yield information about that channel in a GENERAL INFO field. In an embodiment, the number of channels used per port may be eight and the sample rate for each channel within a port is the same. If multiple sample rates are used, the channels can be grouped in smaller groups that have the same sample rate.

The DATA FORMAT field (B3:B0) may be used to show the format of the data. For example, various data types can be used such as binary, bitstream, string and floating point. An example of the various data formats and their corresponding representation in the DATA FORMAT field is shown in FIG. 13 for an example embodiment of the unified bus communication protocol.

Referring once again to FIG. 11a, the execution of a READ IRQ SOURCE function (X3:X0=0011) may be used to return the first IRQ source since this function was last executed. This can return information about the bit position within a frame at which a bus error occurred, status information from sensors, etc. If an IRQ event has happened then an error code is reported in the DATA registers 0x0000 and 0x0001 as shown in FIG. 14. FIG. 14 shows an example of a status read from DATA registers after the execution of the function READ LAST ERROR for an embodiment of the unified bus communication protocol. No error code will be reported unless an IRQ event has happened. An example of various error codes that can be used in at least one embodiment of the unified bus communication protocol is shown in FIG. 15. In other embodiments, more or less error codes can be used.

Referring again to FIG. 11a, the execution of a REQUEST RELATIVE CALIBRATION DATA function (X3:X0=0110) may be used to decrease production variances of a component. The calibration coefficients are measured with respect to the typical performance of the component. The calibration data are returned in the data field using the same data format as specified by the port except as 16 bit digital words for bitstreams. In an embodiment, digital words may be encoded as a signed fraction in two complement notation with the MSB equal to −4.0 (e.g. 0x80 00 is −4.0000 and 0x7F FF is 3.99988). A digital word will be returned for every channel that is connected to the current selected port. The first word returned will indicate the relative accuracy of a measurement as compared to full scale. As an example, if the returned value is 2.00, then the values from the port are two times higher than what is the typical value as stated in the datasheet for this component. The value is stored in the same data format as the port data except for bitstreams where the coefficient may be stored as a 16 signed digital word. In some embodiments, digital words may be stored as unsigned integers with a value between 0 and 25%, i.e. "0001000000000000" which means that the measurement accuracy is about 3.125% of full scale.

The execution of a REQUEST ABSOLUTE CALIBRATION DATA function (X3:X0=0111) may be used to obtain absolute calibration information with output quantities in SI units. This is accomplished with interpolation. Various interpolation techniques can be used such as linear, polynomium, spline and Clenshaw, for example. This function can be used to return calibration information about offset and scaling of a measured physical parameter. The first word returned will indicate the absolute accuracy of a measurement as compared to full scale as described above for the REQUEST RELATIVE CALIBRATION DATA function. In some embodiments, the absolute and relative calibration data functions may be combined into a single command and the addressed slave device will either be requested to respond with either of these values or it may itself tell the master device what type of calibration information is available (i.e. relative or absolute calibration data).

The execution of a READ AND INCREMENT ADDRESS function (X3:X0=1000) may be used to read 16 bit data as specified by the register ADDRESS inside the slave device 54 and transfer the contents of this register to a Y word. Afterwards, the value of the ADDRESS register inside the slave device 54 is incremented by one.

The execution of a WRITE AND INCREMENT ADDRESS function (X3:X0=1001) may be used to take the 16 bit data in the Y word and write this data to the address specified by the register ADDRESS inside the slave device 54. Afterwards, the value of the ADDRESS register inside the slave device 54 is incremented by one.

The execution of an EXECUTE FUNCTION AT ADDRESS function (X3:X0=1010) may be used if the slave device 54 comprises a processor, in which case this processor will perform a jump operation to a subroutine with the 16 bit address defined by the Y word at the start of the next frame.

The execution of an EXECUTE FUNCTION AT ADDRESS INDIRECT function (X3:X0=1011) may be used if the slave device 54 comprises a processor, in which case the processor will perform a jump to a subroutine with the address that is contained inside the memory cell defined by the Y word at the start of next frame.

The execution of a PERFORM DEVICE SELF TEST function (X3:X0=0100) may be used to perform a device self-test, which may be done for debugging and production testing, for example. The result of the self-test will result in error codes or no error codes. For error codes, see the description of the READ LAST ERROR function. A low level interrupt will be activated at the end of the self-test. The error code "Device self-test" will be reported when the device test is complete.

The execution of a SET GAIN function (X3:X0=1100) may be used to set the gain of a channel to a desired value.

The execution of a SET DELAY function (X3:X0=1101) may be used to set the delay in number of samples to a desired value for either a port or for an individual channel. If an individual channel is selected, the channel number will have to be specified. This can be done using the CHANNEL SELECTION register. In some embodiments, the delay may be specified in a fractional number of samples for finer delay precision.

The execution of a SET POWER function (X3:X0=1110) may be used to set the power consumption of a port or of a device with bits B2:B0. An example of this is shown in FIG. 17 using bits B2:B0. In another embodiment, a different number of bits or a different encoding may be used.

The master device 52 and the slave device 54 setup communication channels in order to be able to support transfer of data over the bus 64. The input to the master device 52 may come from processed wireless data, from a processor or through some other digital communication link such as TDM or I²S-based channels. Associated to each port used by the master device 52 or the slave device 54 are registers to direct traffic to the correct data slots (i.e. time slots) in the data transmitted on the bus 64. For example, the master device 52 and the slave device 54 can include eight registers that set up port activity by commands (another number of registers can be used in alternative embodiments). Multiple channels can be allocated or grouped together in a data port, programmed and then selected channels can then be activated. This can be done by the master device 52 after the slave device 54 has locked onto (i.e. synchronized to) the bus 64. Data from or to these data channels can be programmed to occur more than once in a frame or have different spacing in a frame by using various parameters, such as SKIP and REPEAT, for example, which will be described in more detail later in this description.

In an embodiment, four types of operation are associated to these registers; the operations are Data port, Setup, Activate channel and Capability. In an alternative embodiment, other operations can be used. In addition, the master device 52 has an address port located at register 0x0C-0x0D. A slave device 54 may optionally include the address register for support of special functions such as the jump to address function, for example. The registers are byte-based and a 16 bit word READ operation from address zero will return the content of register address zero in the Least Significant Byte (LSB) and the content of register address one in the Most Significant Byte (MSB). Register addresses are multiplied by two when using 16 bit mode.

Port numbers are generally fixed in hardware on a device. The audio or data streams associated with a specific port number are device-specific. An example of port numbers is given in the port definition section of this description. A register map of the master device 52 can be directly accessed (e.g. through I²C), while the register map of the slave device 54 can be programmed by the master device 52. Channel information is used to assign data slots (i.e. time slots) using the unified bus communication protocol. Channel assignment can be changed and depends on the system and use case. The channel assignment defines which ports from the devices are assigned particular time slots on the bus 64. In an embodiment, the master device 52 can have at least two input and two output ports, each being able to handle up to 32 bits words. In other embodiments, a different number of input ports or output ports and different sized data can be used for the master device 52. In general, a slave device does not have any requirements for a port. The register map to these operations is shown in FIG. 16a which is an example of a register definition that can be used for the master device 52 or the slave device 54 in at least one embodiment of the unified bus communication protocol. Another example of a register map is shown in FIG. 16b. These fields can be implemented using one or more bits of one or more registers. In alternative embodiments, different implementations can be used for these fields, the fields may be ordered differently, or there may be other fields that are used or other registers that are used. An address OFFSET may be added to the absolute register addresses for the master device 52. All real addresses can then be calculated using OFFSET+ADDRESS. For a slave device, the OFFSET is 0x00. This means that a slave device will use absolute addresses for the primary bus registers (0x00-0x07) so that the master device 52 will know what address to read and write to. However, the master device 52 may itself use an offset different from zero in its register map, since it already has information about itself. However, the sequence of registers can be the same for software simplicity. In other embodiments the sequence of registers for the master device 52 and the slave devices can be different.

The Data Port function can be represented by one or two 8 bit registers. When performing a READ operation from these registers an 8 or 16 bit word will be returned in the Y word. When performing a WRITE operation to these registers (8 or 16 bits) the values will be updated. The default value of these registers is 0x0000 after a power-on reset operation. The DATA field (reg. 0x00, B7:0) represents the lower 8 bits of a 16 bit entity. In one embodiment, during 16 bit data transfers, the upper address bits are assumed to be zero (i.e. 16 bit data can only be written to even addresses for simplicity). The DATA field (reg. 0x01, B15:8) represents the upper 8 bits of a 16 bit data entity.

The registers associated with the setup port function are assigned values so that the master device 52 and the slave device 54 are able to transfer information to desired data slots (i.e. time slots) in the transmitted data on the bus 64 using the unified bus communication protocol. An example of the details of the assignment is given by the description of various fields shown in FIG. 16a.

The ACTIVATE field (reg. 0x03, B7) may be used to define the function of a data stream and how it is controlled. If an input stream is deactivated, the output will be zeros. If an output stream is deactivated, nothing will be written to the bus 64.

The PREPARE bit (reg. 0x03, B6) may be used to define the circuits associated with the current selected port that will be turned on. When reading from this bit, the current status of the port will be returned (a logic one means the port is ready to begin data transfers). This can be used to ensure all circuits are ready and no glitches occur when data transfers begin.

In an alternative embodiment (e.g. FIG. 16b), a POWER LEVEL field (reg. 0x02, B6:B4) may be used to set the power consumption and mode of operation of individual devices, ports and channels in order to optimize the power consumption for a system. System components can operate in several modes that can be used to minimize the power consumption. For example, individual channels can be selected using the CHANNEL SELECTION field. Channels that are not selected may be set in a low power mode of operation, in order to save power. For instance, in one usage of the unified bus communication protocol, until the PREPARE bit has been activated, all channels may be in a low power mode of operation. After the PREPARE bit has been activated, the channels that have been selected in the CHANNEL SELECTION field may be put into normal operation mode. By reading the status of the PREPARE bit, it is possible to know when the channels that have been selected are ready to receive or transmit data and can be activated by using the ACTIVATE bit (i.e. the PREPARE bit will be at a logic one level when all selected channels are ready), such as, but not limited to, after some device dependent initial power on delay, for example.

In at least one embodiment, when no power is applied to a device, the bus 64 may still be able to continue operation, i.e. ESD structures should not stall the bus 64 when no power is applied to the slave device 54 or the master device 52.

Referring now to FIG. 17, shown therein is an example of various power consumption levels in an example embodiment. In this example, the power consumption scaling is defined by function and is not absolute. In other words, the exact power levels indicated in FIG. 17 may vary for different slave devices. Furthermore, for the power consumption levels defined by B6:B4=011 to 111, the port or device may or may not be fully functional. If the power consumption of an entire device is to be set, the port for broadcast (15) may be used. A port or device may support only a few power levels. In an example embodiment, if the master device 52 writes a value for the POWER LEVEL that is not supported by the slave device 54, it can be mapped to the closet value that is supported. The default value for the POWER LEVEL field is 010 (i.e. SLEEP mode).

Referring again to FIG. 16a, the IRQ23 MASK field (reg. 0x03, B5) is used to enable or disable interrupts from a slave device communicated over the bus 64 as slave status levels '10' and '11' that would normally activate the S0 bit. When the IRQ23 MASK field is equal to one, the slave device 54 will issue a high level interrupt when the internal logic indicates that the slave status level is a level two or a level three (i.e. the slave device 54 is requesting an interrupt and is allowed to admit this interrupt to the bus 64). When this bit is equal to zero, nothing happens and the indicated slave status level will not affect the S0 bit. The default value for the IRQ23 MASK field is one (i.e. normally interrupts are enabled).

The IRQF MASK field (reg. 0x03, B4) is used to enable an interrupt that is generated if a slave device does not support a given FUNCTION that the master device 52 requests this slave device to perform. When the IRQF MASK field is equal to one, the slave device 54 will be set to a low level interrupt when the master device 52 asks the slave device 54 to execute a FUNCTION operation that it does not support. This will automatically set the S0 interrupt bit. If the slave device 54 is already in a situation where an interrupt is pending, nothing new will happen. When the IRQF MASK field is equal to zero, nothing happens. The default value for the IRQF MASK field is one.

The PORT field (reg. 0x03, B3:B0) indicates which port within a device is being addressed. In this example embodiment, the port number can be 0-15, where the number 15 is reserved for broadcasting (i.e. all ports listen to commands from the master device 52). A port can be connected with anywhere from zero up to eight channels, and this mapping is hardwired. In alternative embodiments, the port can be connected with more than eight channels. All channels are connected to a specific port such that they have the same data format. The slave device 54 or the master device 52 can have multiple ports. During broadcast commands, all ports will listen for changes to certain functions such as ACTIVATE and BANK, for example. In order to use a port, the channels that are going to be activated should first be selected. The PREPARE bit should then be activated if the device takes some time before data are ready, the appropriate frame and data format should be chosen and finally the port should by activated by setting the ACTIVATE field to true.

Figures 18, 19:
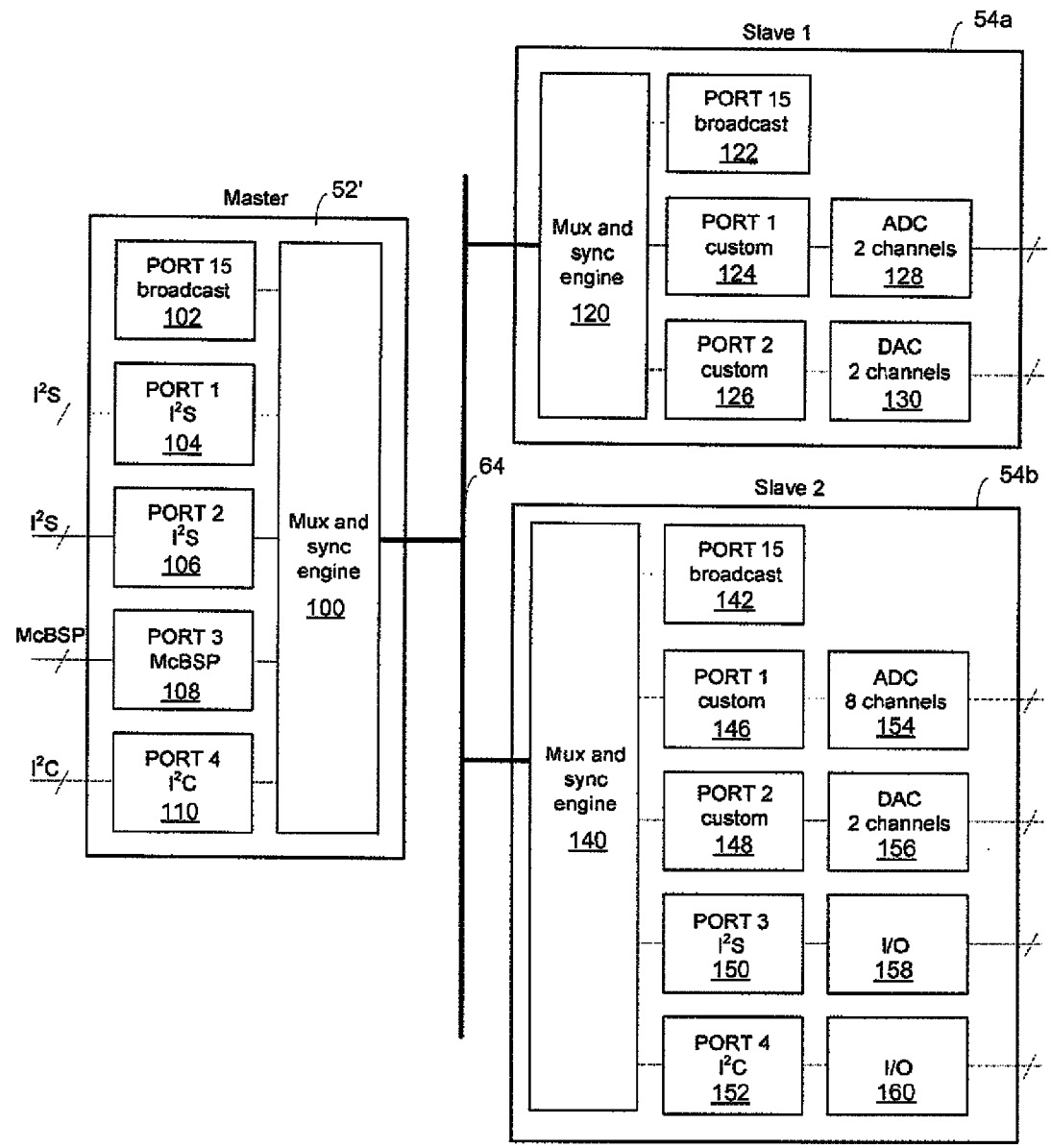
FIG. 18 shows an example embodiment of a master device that communicates with two slave devices using the unified bus communication protocol and the devices have ports that are allocated to various channels.
FIG. 19 shows an example mapping between channels and the CHANNEL SELECTION field that describes which channels of a port are used for communication.

Referring now to FIG. 18, shown therein is an example embodiment of a master device 52' that communicates with two slave devices 54a and 54b using the unified bus communication protocol and the slave devices 54a and 54b have ports that are allocated to various channels. The port numbers for various audio and data channels are shown within each logical block. These port numbers, channels and interfaces are provided as an example only and there can be various other embodiments with various combinations of port numbers, channels and interfaces.

The master device 52' includes a mux and sync engine 100 and ports 102 to 110. The mux and sync engine 100 is used to generate data and place the data in certain time slots on the bus 64 according to the frame format of the unified bus communication protocol that is being used. The mux and sync engine 100 is also used to generate synchronization information for the unified bus communication protocol. A word frame format is used when communication on the bus 64 is performed under word mode and a bitstream frame format is used when communication on the bus 64 is performed under bitstream mode. Both of these formats will be described in greater detail later in this description. In this example, part of the data that is to be transmitted is received from the ports 104 to 110.

In general, a mux and sync engine can be implemented using a processor. However, since there is approximately a 2K gate count for a mux and sync engine, a state machine or other dedicated circuitry can also be used for implementation. For example, in a typical 0.18 µm process, a sync engine for a master device can be implemented in 0.04 mm$^2$. A complete master device with full audio support may be somewhat larger, but may be less than 0.1 mm$^2$. Sync engines for slave devices can be of a similar size in both cases. This is beneficial since a small size means simpler device drivers and better testing of hardware implementation. In an alternative embodiment, the master device 52' can be implemented using a main processor for the electronic device that contains the master device 52', such as a baseband processor for a cell phone or a smart phone, in which case the control information may be generated internally by the master device 52' and the ports 104 to 110 may be optional.

Port 102 is a broadcast port that is used to transmit information to the ports of all devices that are connected to the bus 64. It is connected to the register map of all other ports and is used to control all ports at once. It is normally not used for audio data transfers. Port 104 is coupled to an I$^2$S interface to transfer information according to the I$^2$S format in one direction (e.g. acts as a transmitter). Port 106 is coupled to another I$^2$S interface to transfer information according to the I$^2$S format in the opposite direction (e.g. acts as a receiver). Port 108 is coupled to a McBSP interface to transfer information according to the McBSP TDM format. Port 110 is coupled to an I$^2$C interface to receive control information according to the I$^2$C format.

The slave device 54a comprises a mux and sync engine 120, ports 122 to 126, an Analog to Digital Converter (ADC) 128 and a Digital to Analog Converter (DAC) 130. The ADC 128 and DAC 130 both have two channels in this example. The mux and sync engine 120 of the slave device 54a is used to synchronize to the master device 52' as will be described in more detail below. Port 122 is a broadcast port. In this example, the port address 15 is used for broadcast of commands, i.e. any command sent to address 15 will affect all ports connected to a specific slave device. Furthermore, the slave address 15 is also reserved for broadcasting, i.e. a WRITE operation to this address will affect all slave devices. Therefore, a write to the slave address 15 and to port 15 will affect all devices and all ports in the system (e.g. for shutdown or simultaneous activation of data at the same time). Port 124 is a custom port (meaning that it comprises a non-standard interface such as I²C or I²S for a parallel connection using a direct wire for every data bit) that is connected to two channels of the ADC 128. In an alternative embodiment, there can be more than two channels and the port 124 may be connected to more than two channels. The ADC 128 is connected to one or more devices which generate data, such as a microphone, a current sensor, a voltage sensor, a pressure sensor, a temperature sensor and the like. There can be embodiments in which two of the same type of device are connected to the ADC 128 such as two microphones positioned at different locations. Port 126 is connected to two channels of the DAC 128. In an alternative embodiment, there can be more than two channels and the port 126 may be connected to more than two channels. The DAC 126 is connected to one or more devices which receive data, such as, but not limited to, an output speaker, a digital FM receiver, a digital FM transmitter, a Bluetooth interface, a vibrator, a temperature sensor, a sensor monitoring the status charging of a battery, an accelerometer, a gyroscope, a GPS receiver or a digital compass, for example.

The slave device 54b comprises a mux and sync engine 140, ports 142 to 152, ADC 154, DAC 156, and I/O 158 and 160. The I/O 158 and 160 can be a stereo ADC (represented as two channels) and a four channel DAC (represented as four channels) respectively for example. Ports 142 to 148, ADC 154 and DAC 156 are similar to ports 122 to 126, ADC 128 and DAC 130 except that more channels are used for port 146 and ADC 154 compared to port 124 and ADC 128. Port 150 is configured to send or receive data according to the I²S protocol to I/O 158 which is in turn connected to an I²S interface. Port 152 is configured to send or receive data according to the I²C protocol to I/O 160 which is in turn connected to an I²C interface. The port 150 is connected to a physical I²S interface and contains two audio channels, left and right. The two channels can either be input or output but not both. The port 150 will capture the data from the multiformat bus 64 and transfer the data to an I²S format or vice-versa in the opposite direction. The port 152 is connected to an I²C interface and can function as an I²C master device or an I²C slave device. By using appropriate timing, I²C commands can be transferred over the multiformat bus 64 and written to the I²C interface or read from the I²C interface (when operated as slave device) and I²C commands can be used to request register data from the multiformat bus 64, thereby tunneling I²C activity over the multiformat bus 64, simultaneously with all of the other activity that is going on.

In some cases, the slave device 54b may instead be implemented as an extra master device without a framing capability (i.e. the ability to set the frame format) and thereby get direct access to the registers of other devices for accessing these registers without any intervention from the original master device 52'. Notice, due to the encoding of commands (e.g. PING is encoded as 000 in the command field), any PING command can be changed to an alternate command, if the primary master device 52' allows for this to happen.

In some cases more than one data line may be used to transfer the data if data bandwidth is not enough over a single wire or two separate buses may be used between the master device and the slave devices. This may be beneficial if some devices only use a low bandwidth (e.g. which is mostly used for control or slow isochronous transfers) while other parts of the system, e.g. a digital speaker or microphones, may use a higher clock frequency. By splitting the system into a low bandwidth portion and a high bandwidth portion, the power consumption can be reduced and wiring can be made simpler in some cases.

Referring once again to FIG. 16a, a CHANNEL SELECTION field (reg. 0x02; B7:0) may be used to decide which channels from a given port are selected for use when the given port is activated. The number of channels from a port is fixed and the CHANNEL SELECTION field is used to select which channels are affected by various parameters including the word start, channel length and skip fields. The channels that are selected to be activated have the corresponding bit set to one in the CHANNEL SELECTION field. An example of the mapping between channels and the CHANNEL SELECTION field that describes which channels of a port are used for communication is shown in FIG. 19. In an alternative embodiment, a direct ordering of the channels from 0 to 7 can be used rather than the ordering of 7 to 0 as shown in FIG. 19. For simplicity a descending ordering is used, however, other ordering can be used in other embodiments. Data from channels that are not activated will not appear on the bus 64.

In an example embodiment, all channels that are defined by the CHANNEL SELECTION field will have the same sampling frequency and be sampled at the same time to simplify implementation. The sampling takes place in the analog domain, when converting these values to digital signals. Similarly, a port containing multiple digital to analog converters should have the same delay within a frame so that these analog signals will appear the same, if the same signal is applied to all channels, even though this information is transferred sequentially over the bus. When the samples are placed once per frame, the sampling event is taken as the start of a frame. If more than one sample exists they may be equidistantly spaced with the start of a frame as the first sample. If the sampling is not the same over every frame, such as when using fractional flows, the synchronization bits DS0 to DS1 can be used as sampling reference to synchronize sampling across multiple frames. Each port will have its own CHANNEL SELECTION field and the port that is active is selected by the PORT field in reg. 0x02.

Referring once again to FIG. 16a, a START field (reg. 0x04; B7:B0) may be used to define the first time slot in a frame at which point a port is defined to transmit or receive data using the command words as a time reference. In an embodiment, this value is given in units of semi-nibbles (a semi-nibble is two bits) in unsigned binary. As an example, a value of "00001000" in semi-nibbles for the START field indicates that the data starts 16 bits after the end of a command word.

The CURRENT BANK field (reg. 0x0F; B4) (see FIG. 29a) may be used to select which register is used for the next READ, WRITE or FUNCTION operation. During every frame with a PING operation, the active memory bank will be outputted. However, in at least one embodiment, a device attached to the bus 64 will first change its register bank after a delay of two frames to ensure against single bit errors. This allows for the seamless changing between two operation modes with no output or input glitches. The CURRENT BANK bit is used by the master device 52 to select the active register bank.

It should be noted that conventionally, switching between these different data modes is done by decreasing volume, changing the settings for the register, and then increasing the volume. Advantageously, an aspect of the unified bus communication protocol is the ability to immediately switch between data because the registers can be switched and the active register is shown in the PING operation; e.g. it is possible to change the audio scenario with no clicks in the audio output.

In the alternative embodiment of FIG. 16*b*, a BANK MODE field (reg. 0x05, B7) may be used to determine the interpretation of the BANK SELECT bit. When the BANK MODE field is equal to zero, the BANK SELECT bit replaces the most significant address bit during I/O operations. Furthermore, the most significant bit of the I/O address (as given by the master device 52 during I/O operations) is used to select the current bank. When the BANK MODE field is equal to one, the BANK SELECT bit will select which bank the next I/O operation affects. The various possibilities are shown in FIG. 20 which shows an example of the bank and the address selected during a READ or WRITE operation depending on the BANK MODE field and the BANK SELECT field in an example embodiment.

Again referring to the alternative embodiment of FIG. 16*b*, the BANK SELECT field (reg. 0x05, B6) may be used to select which register is used for the next READ or WRITE operation. During every frame with a PING operation, the active memory bank will be outputted. However, in an embodiment, a device attached to the bus 64 may first change the BANK MODE field after a delay of a certain number of frames, such as two for example, to help prevent single bit errors. In this case, the CURRENT BANK bit is used by the master device 52 to select the active register bank. The BANK MODE field determines interpretations of the BANK SELECT field as shown in FIG. 20.

Referring once again to FIG. 16*a*, the LENGTH field (reg. 0x06, B5:B0) may be used to define the data size of each channel, in a number of semi-nibbles (i.e. units of 2 bits). In an example embodiment, the value in the LENGTH field is encoded in binary minus one and given in units of two bits (e.g. "01011"=0x0B is interpreted as 11+1=12 times two bits or 24 bit data width). A maximum channel width is also defined, which in this example is 128 bits. If more than the maximum channel width is used to describe a quantity (e.g. an IEEE quad precision complex number) this can be accomplished by merging two channels in a port. It is still possible to add spacing between merged channels using the SUBGROUP field. The LENGTH field is ignored for ports that transfer bitstream data since the channel size is 1 bit for bitstream data. In bitstream mode, the length of a channel is one.

The SKIP field (reg. 0x06, B7:B6) may be used to define a number of time slots or data slots that are skipped when the REPEAT field is active. In this example, the value in the SKIP field may be encoded in binary (e.g. "00000" means no skip if the port is repeated and "00001" means the next block of data from the same port comes 16 bits after the previous one). This can be used to mix data from multiple ports in a subframe, as will be described further below in this description. An example of using the SKIP field is shown in FIG. 21 in which data from a single port is repeated more than once in a subframe (i.e. between two command words) since there is a skip of 1 being used and word mode is being used. Each port will have its own SKIP field and the port that is active is selected by the PORT field in register 0x02.

Referring once again to FIG. 16*a*, the SYNCHRONIZE field (reg. 0x05, B7:B6) is used to select between isochronous, asynchronous and multi-frame transfers. The various field values that are set depending on the use of isochronous, asynchronous and multi-frame transfers in a given frame according to an example embodiment is shown in FIG. 22*a* (FIG. 22*c* shows an alternative embodiment which may be used in some cases).

Referring once again to FIG. 16*a*, the field PCLKD (reg. 0x07, B7:B4) sets the ratio between the bus clock and the internal sampling clock of a port in a slave device. It is not necessary to code for the divide by a fraction option (e.g. clock on both edges, divide by 2.5, 6.5 & 12.5) unless support for 26.00 MHz is provided. In order to save space, the field can be encoded in a compressed manner as shown in FIG. 22*b*. In at least some embodiments, each port can have its own PCLKD field and the port that is active is selected by the PORT field in register 0x02.

Referring now to FIG. 22*a*, configuration 1 is the default configuration and will result in isochronous data transfers, i.e. data are valid during every subframe. Configuration 2 handles asynchronous transfers by adding two status bits in front of data from the first channel of a port. The first status bit indicates if the port data that follows are valid (in asynchronous data transfers data that is not ready is considered invalid and discarded), and the second status bit indicates whether the receiving device can accept them. In an alternative embodiment, one bit preceding the data can be used to indicate that a transmitting device has new data and the receiving device has to accept them. Alternatively, one bit preceding the data can be used to indicate that a slave device is ready to accept data and this data should already be available from a master device or another transmitting device. Configuration 2 is useful for multiple asynchronous channels when bandwidth is available for these bits.

Configurations 3 and 4 are used for fractional synchronization, e.g. for data sampled at 44.1 kHz in a 48 kHz channel. In this case, the transmitting device may extend the transmission of data from a single port into several frames. In this case, the DS0 and DS1 bits are valid every third frame and are used to reset the internal fractional phase adder (fractional counter) that is used to determine if the samples are valid or not when these bits are not active. The start of this transmission is signaled by setting the DS0 or DS1 bit to a logic one. The transmitter either located in the master device 52 or the slave device 54 can control the flow of data by activating the DS0 and DS1 bits.

Referring once again to FIG. 16*a*, the SUBGROUP field (reg. 0x05, B5:B3) may be used to group channels from a given port up into several subgroups in order to lower latency for the sources that provide data for the channels in the subgroup. When the number of channels that are transmitted is equal to the value of the SUBGROUP field, the transmission of data from these channels will stop for a number of time slots equal to the number of nibbles specified in the SKIP field and then be repeated. If the SUBGROUP field is equal to "111" then the SUBGROUP field will be ignored and data from the channels in the port will be transmitted in one group (e.g. there will be no subgroups). The default value is "111".

Figure 23:
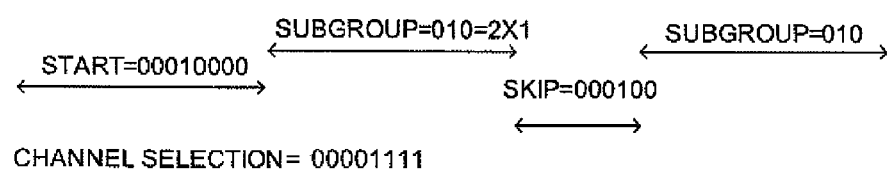
FIG. 23 shows an example of a frame format when using multiple data channels with divisions between the channels from the same port for achieving lower latency in word mode.

FIG. 23 shows an example of a frame setup (i.e. frame format) when using multiple channels with divisions between the channels from the same port for achieving lower latency in word mode and the SUBGROUP field is used to split data from the channels of the port into several subgroups. The SUBGROUP field is composed of two multipliers specified by B3 and B4:B5, respectively. The number of channels transmitted before a SKIP occurs is equal to the product defined by the fields B3 and B4:B5. As can be seen from the example in FIG. 23, the SUBGROUP field specifies how many channels are grouped together in subgroups and this may be done for all active channels for a port. Therefore, in one example, if the port of FIG. 23 has four channels that provide Audio 0, Audio 1, Audio 2 and Audio 3, then the channels for Audio 0 and Audio 1 form a first subgroup and the channels for Audio 2 and Audio 3 form a second subgroup. It should be noted that FIG. 23 only shows the structure of a single subframe. This structure will be repeated two more times to complete the frame. Accordingly, a subframe is defined in word mode to be a portion of the frame which comprises a control word followed by data that occurs prior to the next control word.

Figures 24, 25A:
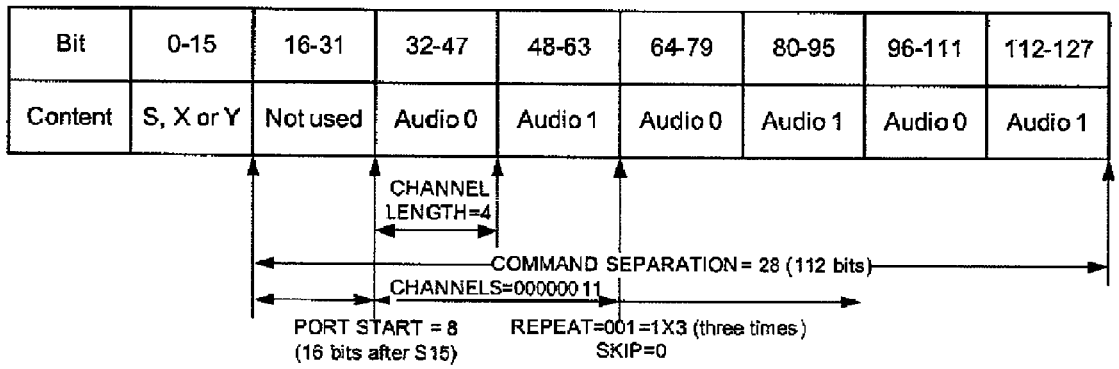
FIG. 24 shows an example of a frame setup when data from multiple data channels are repeated several times in a frame in word mode.
FIG. 25a shows an example of the definition of the COMMAND SEPARATION field depending on the frame type used in the unified bus communication protocol.

Referring again to FIG. 16a, the REPEAT field (reg. 0x05, B2:B0) may be used to determine how many times data from a port is repeated within a subframe. The default value for the REPEAT field is "000". An example of a frame setup when data from multiple data channels are repeated several times in word mode using the REPEAT field is shown in FIG. 24. In an embodiment, the REPEAT field is composed of two multipliers, B0 and B1:B2. The number of times the channels defined by the CHANNEL SELECTION field is transmitted during a frame is equal to the product as defined by the fields B0 and B1:B2 of the REPEAT field. Accordingly, in the example of FIG. 24, data from 2 data channels (Audio 0 and Audio 1) of a port are used. The START field is set to 8 in nibbles, the LENGTH field is set to 4 in nibbles, the REPEAT field is "001" in nibbles, the CHANNEL SELECTION field is "00000011", the SUBGROUP field is "000" (in nibbles) and the COMMAND SEPARATION field is 112/4=28 in nibbles (remember that all values in nibbles are multiplied by 2 to get the value in base 10 format). It can be seen in the example of FIG. 24 that data from the channels Audio 0 and Audio 1 are grouped together in a subgroup and repeated three times and there are no gaps between the subgroups since the SKIP field has a value of 0. It should be noted that after the data from data channel Audio 1 at bits 112-127, the structure from bit 0 to bit 127 will be repeated two more times to complete the frame. Accordingly, FIG. 24 shows a single subframe and three subframes are used to complete a frame.

If a subframe is completed before all data words have been transferred, the transmission can be terminated in which case the master device 52 or the slave device 54 is not allowed to write into the S, X or Y words, even if a programming error has been made. Thus, the same configuration as shown in FIG. 24 could be obtained with any REPEAT value greater than "010" since there are no other data following after the end of the three data pairs in this example. Each port will have its own REPEAT field and the port that is active is selected by the PORT field in reg. 0x02.

In bitstream mode, data are transferred one bit at a time and are multiplexed from different data channels instead of transferring all the data from each data channel one data channel at a time. In order to implement bitstream mode, the definitions of some fields change in this example embodiment. For example, when transferring data from a bitstream data channel of a port, the following fields are currently not used: LENGTH, SKIP and SYNCHRONIZE. The interpretation of the START, REPEAT and the SUBGROUP fields are modified to fit the nature of multiplexed bitstreams. All other fields are unchanged.

Referring again to FIG. 16a, in bitstream mode, the START field may be modified to be the START IN BITSTREAM MODE field (reg. 0x04, B7:B0), which is divided in two fields (HSTART and VSTART) and is used for ports that transfer bitstream data or ports that transfer digital word data which is converted to bitstream data (as will be described later in this description). The value of the HSTART field (reg. 0x04, B7:B4) gives the start of channel data from a port within a single subframe and can be coded in binary. The value in the VSTART field (reg. 0x04, B3:B0) gives the start of channel data from a port in the vertical direction in a frame.

In bitstream mode, the SUBGROUP AND REPEAT fields may be modified to be the VSPACING and HSPACING fields in bitstream mode (reg. 0x05, B5:B0), which is divided into two fields. The value in the HSPACING field (B2:B0) gives the distance between repetitions of a bitstream within a single subframe. A subframe is the interval defined from the bit (e.g. S15, X15, Y15) of one of the three control words, S, X and Y and the start of the following bit from one of the control words S, X and Y (e.g. S14, X14, Y14) since the control words inside a subframe are divided into the individual bits in bitstream mode. The value in the VSPACING field (B5:B3) gives the distance between repetitions of a bitstream in the vertical direction.

The structure used in bitstream mode can be understood with the examples of FIGS. 26a to 28d.

Referring now to FIGS. 26a and 26b, shown therein are examples of different frame formats that can be achieved by using different values for the HSTART and VSTART fields in bitstream mode. In both cases the CHANNEL SELECTION field is set to 00000011 (i.e. select the first two bitstream data channels from the port). The bits are transmitted starting at the top left corner, moving along the row to the end of the row, then moving to the leftmost bit of the next row and continuing until the end of the row and so on and so forth until all of the data for the frame is transmitted. It should be noted that the bitstream frame format defines the time slots for the various bits in the frame. The bits are actually sent by the corresponding device which has data for the bit. For example, in FIG. 26a, the S15 bit is sent by the master device 52 and the first bit from bitstream data channel M0 is sent by the slave device that has that channel.

Figures 27, 28A:
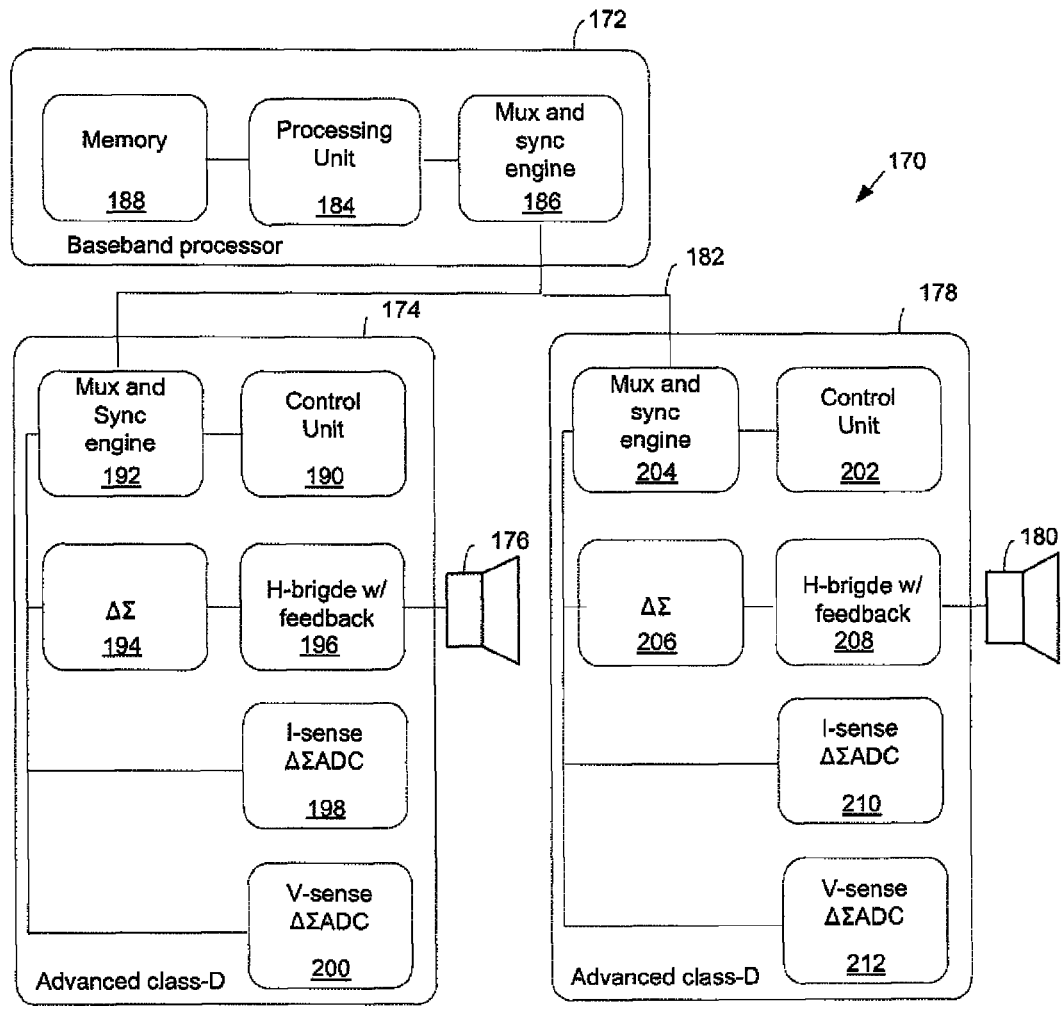
FIG. 27 shows the definition of the LSB, MSB and LSB+1 bits of the HSPACING and VSPACING fields for an example embodiment in bitstream mode.
FIG. 28a shows an example embodiment of a stereo system with current and voltage sensing that uses the unified bus communication protocol.

In FIG. 26a, a value of 0001 is in the HSTART field, a value of 0000 is in the VSTART field, a value of 000 is in the VSPACING field (which means the repetition rate will be one; i.e. with no gaps) and a value of 111 is in the HSPACING field (which means we will only have one channel) (these values are encoded according to FIG. 27). As can be seen, the frame begins with the S15 bit of the S word, then a first bit from the first data channel M0 of the port and a first bit from the second data channel M1 of the port. The next bit S14 from the S word is sent followed by the second bit from the first data channel M0 of the port and the second bit from the second data channel M2 of the port. This pattern continues until all of the bits from the S word of the frame are sent at which time the bits from the X word of the frame are sent in a similar fashion as the bits of the S word followed by the bits of the data channels M0 and M1. This pattern continues until all of the bits from the X word of the frame are sent at which time the bits from the Y word of the frame are sent in a similar fashion followed by the bits of the data channels M0 and M1. At this point a full frame has been sent on the bus 64.

In FIG. 26b, a value of 0001 is in the HSTART field, a value of 0000 is in the VSTART field, a value of 010=2×1 is in the HSPACING field, and a value of 000 is in the VSPACING field (the values are derived from the table shown in FIG. 27). As can be seen, the frame begins with the S15 bit of the S word, then a first bit from the first data channel M0 of the port and a first bit from the second data channel M1 of the port. However, at this point, the data from the data channels of the port are repeated. Accordingly, the second bit from the data channel M0 is sent followed by the second bit from the data channel M1 because the HSPAC- ING field has a value of 2. This can be thought of as repeating data from the data channels of the port after HSPACING columns has been reached and then sending the next bit from the command word. The next bit S14 from the S word is then sent followed by the third bits from the data channels M0 and M1, respectively, followed by the data channels M0 and M1 of the port again. This pattern continues until all of the bits from the S word of the frame are sent at which time the bits from the X word of the frame are sent in a similar fashion as the bits of the S word followed by the bits of the data channels M0 and M1 sent out two times. This pattern continues until all of the bits from the X word of the frame are sent at which time the bits from the Y word of the frame are sent in a similar fashion followed by the bits of the data channels M0 and M1 sent out two times. In some embodiments, the encoding of the VSPACING and HSPACING may be done differently, e.g. with direct binary encoding using 4 bits for each field and no compression of the information used.

It is generally illegal to write to the bitstream channel in a bitstream frame that is used as the command channel since this would crash the bus 64. Thus, in at least one embodiment, if a value of 0000 is written to the HSTART field, then no data output should be allowed on the bus 64.

In at least one embodiment, in bitstream mode, the LSB value in the HSPACING and VSPACING fields are defined as shown in the first table of FIG. 27 while the MSB and LSB+1 values in the HSPACING and VSPACING fields are defined as shown in the second table of FIG. 27. If all bits are set to 1 in one of the HSPACING and VSPACING fields, then that field will be ignored. Otherwise, the bitstream from the bitstream data channels will be repeated with a distance that is the product of the multiplier defined by the LSB and the multiplier defined by the MSB and LSB+1. If the value of the HSPACING field is 111, then this means that the bitstreams from the bitstream data channels of a port will not be repeated in the horizontal direction. If the value of the VSPACING field is 111, then this means that the bitstream from the bitstream data channels of a port will be sent without interruptions in the vertical direction. An example of this is shown in FIG. 28d. In another embodiment, when transferring TDM words in bitstream mode, the VSPACING field can be used to indicate how many bitstreams are used to carry the port information (a value in the range 1-8 where the value is encoded in unsigned binary plus one) and the HSPACING field can be used to indicate the first of these bitstreams.

It should be noted that the HSTART, VSTART, HSPACING and VSPACING fields are specified for the data channels that are included for each port of a device as will be seen from the following example.

Referring now to FIG. 28a, shown therein is an example embodiment of a stereo system 170 with current (I) and voltage (V) sensing that uses the unified bus communication protocol. The stereo system 170 comprises a baseband processor 172, a first amplification unit 174 with a first speaker 176, a second amplification unit 178 with a second speaker 180 and a bus 182. The first amplification unit 174 and the speaker 176 can be considered to be a left audio channel for the stereo system 170 while the second amplification unit 178 and the speaker 180 can be considered to be a right audio channel for the stereo system 170. The bus 182 couples the baseband processor 172 with the first and second amplifier units 174 and 178. Transmission on the bus 182 is in accordance with the unified bus communication protocol.

The baseband processor 172 comprises a processing unit 184, a mux and sync engine 186 and a memory 188. The processing unit 184 can be a processor, such as a DSP, or a dedicated hardware circuit. The mux and sync engine 186 is configured so that the baseband processor 172 acts as a master device so that it can communicate with and control the operation of the first and second amplification units 174 and 178 over the bus 182 in accordance with the unified bus communication protocol.

The first amplification unit 174 comprises a control unit 190, a mux and sync engine 192, a delta sigma converter 194, an amplifier 196, a current sensor 198 and a voltage sensor 200. The mux and sync engine 192 is configured so that the first amplification unit 174 acts as a slave device and can communicate with the baseband processor 172 over the bus 182 in accordance with the unified bus communication protocol. The control unit 190 can be implemented by a processor or dedicated hardware and firmware that control the operation of the first amplification unit 174. In operation, audio data is transmitted from the baseband processor 172 to the first amplification unit 174 for amplification. The audio data is converted to an analog format via the converter 194, amplified by the amplifier 196 and output by the speaker 176. Current and voltage information related to the operation of the amplification unit 174 is measured by the current sensor 198 and the voltage sensor 200, respectively, and transmitted to the baseband processor 172 for monitoring the operating condition of the amplification unit 174. If the monitoring indicates that the amplification unit 174 is in a dangerous state, such as overheating, overcurrent or undervoltage, the baseband processor 172 can send control instructions to the amplification unit 174 to deal with the dangerous situation, as is understood by those skilled in the art.

The second amplification unit 178 comprises a control unit 202, a mux and sync engine 204, a delta sigma converter 206, an amplifier 208, a current sensor 210 and a voltage sensor 212. The mux and sync engine 204 is configured so that the second amplification unit 178 acts as a slave device and can communicate with the baseband processor 172 over the bus 182 in accordance with the unified bus communication protocol. The control unit 202 can be implemented in a similar fashion as the control unit 190. In operation, the second amplification unit 178 operates in a similar fashion as the first audio amplification unit 174.

It should be noted that the mux and sync engine blocks 192 and 204 can be implemented as hardware blocks. Furthermore, in an alternative embodiment, the control units 190 and 202 can be integrated with the mux and sync engines 192 and 204, respectively.

Referring now to FIG. 28b, shown therein is an example of a bitstream frame format that can be used for the stereo system of FIG. 28a. In this bitstream frame format, only the horizontal dimension is used to multiplex bitstream data channels. In this case, there are eight frame channels that are used. The first frame channel is used as a control channel to transmit control bits for control words. The second frame channel is used to transmit audio data for the left stereo channel. The third frame channel is used to transmit voltage information for the left stereo channel. The fourth frame channel is used to transmit current information for the left stereo channel. The fifth frame channel is not used to transmit data. The reason for this is that in order to support an operating frequency compatible with current systems, 8 bitstreams can be used instead of 7, thereby leaving one channel empty. The sixth frame channel is used to transmit audio data for the right stereo channel. The seventh frame channel is used to transmit voltage information for the right stereo channel. The eighth frame channel is used to transmit current information for the right stereo channel. The data for each frame channel is sent one bit at a time and is time multiplexed with the other frame channels. This bitstream frame format has a length of 48 bits and a width of 8 bits for a total of 384 bits. In an example, the clock rate is 48 kHz×64×7=7×3.072 Mbit, thus fclock=12.288 MHz (found by using both clock edges and rounding up to the nearest common clock frequency). In order to determine how much bandwidth to use, one can multiply the output sample rate with the oversampling rate and the number of bitstream frame channels. For example, assuming a 48 kHz output sample rate, an oversampling rate equal to 64 and 7 channels, this would equal 21.504 MHz. However, in order to make this compatible with a 12.288 MHz system, one empty channel may be used and a 24.576 MHz clock system is used. If data are transferred on both edges of the clock, a 12.288 MHz clock is used.

However, the full audio bandwidth that is used for the audio bitstream channels L and R is not used for current and voltage sensing. This is because the mechanical resonance of the speakers 176 and 180 is much lower than the full audio bandwidth. In addition, the thermal time constants are much longer than the changes in the audio data. Therefore, less bandwidth can be used for current and voltage sensing/control data since impedance modeling does not use as much bandwidth as the audio data.

In the example system of FIG. 28*a*, bandwidth use can be improved by multiplexing within a given frame channel. This concept can be used for other types of applications other than audio applications in which there are differences in bandwidth of the various data similar to this current example. Multiplexing within a common frame channel is accomplished by sharing a bitstream frame channel among multiple data channels which results in a reduction in bandwidth use. In other words, assigning more than one data channel to a single frame channel effectively results in oversampling and a change in bandwidth use. This can be easily implemented by using several counters and buffers.

Referring now to FIG. 28*c*, shown therein is another example of a bitstream frame format that can be used for the stereo system of FIG. 28*a* in which several data channels are multiplexed into a common frame channel (e.g. the third frame channel). This allows the same data to be transferred over the bus 182 using a lower clock frequency, which in this example is half of the clock frequency for the frame format used in FIG. 28*b*.

In the example of FIG. 28*c*, there are four frame channels that are used. The first frame channel is used as a control channel to transmit control bits for control words. The second frame channel is used to transmit audio data for the left stereo channel. The third frame channel is used to transmit voltage and current information for the left and right stereo channels. The fourth frame channel is used to transmit audio data for the right stereo channel. Once again, the data for each frame channel is sent one bit at a time and is time multiplexed with the other frame channels. This bitstream frame format has a length (or number of rows) of 48 bits and a width of 4 bits for a total of 192 bits. The number of rows can be longer than 48 if the data in the frame channels are partitioned across several frames (this can be done using the DS0-DS1 bits). In this example, the clock rate is 48 kHz×64×(3+1)=4×3.072 Mbaud=6.144 MHz. The output sample rate is 48 kHz, the oversample rate is 64 times higher (i.e. the bitstreams occupy 64 bits per output sample), and there are three bitstream frame channels plus one control frame channel. The total bandwidth this occupies is therefore 48 k/s×64 bit×4=12.288 Mbaud (Mbit/s=Mbaud) or 6.144 MHz if sampling on both data edges is used.

The third frame channel is an example of a multiplexed frame channel in which data from a data channel for voltage information for the left audio channel, data from a data channel for current information for the left audio channel, data from a data channel for voltage information for the right audio channel and data from a data channel for current information for the right audio channel are multiplexed together in a common frame channel in the vertical direction.

This concept of bandwidth control can also be extended to control the bandwidth of the control channel by adding additional frame channels to the bitstream frame format to repeat data from data channels. In other words, by repeating data from bitstream data channels in the horizontal direction of a bitstream frame format, the bandwidth allocated to the control frame channel can be reduced and therefore bandwidth that is used for the transmission of control words is smaller. An example of this is shown in FIG. 28*d* in which the control frame channel is now 1 out of 6 bitstream frame channels for a bandwidth of ⅙=16.7% as compared to the example in FIG. 28*c* in which the control frame channel is 1 out of 4 bitstream frame channels for a bandwidth of ¼=25%. In this case the clock rate is 48 kHz×(200/3)×(2+1)=9.6 Mbit=4.8 MHz (200/3 is the oversampling ratio and 2+1 represents 2 channels for audio data and 1 channel for the other data).

Referring now to FIG. 28*d*, shown therein is an example of a bitstream frame format that can be achieved by setting values for the HSTART, VSTART, HSPACING and VSPACING fields in bitstream mode in an example embodiment. The amplification unit 174 is designated as Slave D1 and the amplification unit 178 is designated as Slave D2. Slave D1 provides a first port for a left audio channel and has the following settings for the bitstream fields: HSTART=0001 (i.e. the first bitstream channel after the command channel), VSTART=0000 (i.e. start at the top of the frame), HSPACING=001=1×3 (i.e. repeat after three bits in the horizontal direction), and VSPACING=000 (i.e. repeat immediately at the next bit in the vertical direction). Slave D1 provides a second port for IV-sense and has the following settings for the bitstream fields: HSTART=0011 (i.e. the third bitstream channel after the command channel), VSTART=0000 (i.e. start from the top of the frame), HSPACING=111 (i.e. no repeating in the horizontal direction), and VSPACING=100 (i.e. repeat data from a port after 4 bits in the vertical direction). Slave D2 provides a first port for a right audio channel and has the following settings for the bitstream fields: HSTART=0010 (i.e. the second bitstream after the command channel), VSTART=0000 (i.e. start at the top of the frame), HSPACING=001=1×3 (i.e. repeat after three bits in the horizontal direction), and VSPACING=000 (there are no gaps in the vertical direction). The slave D2 also provides a second port for IV-sense and has the following settings for the bitstream fields: HSTART=0011 (i.e. the third bitstream channel after the command channel, VSTART=0010 (i.e. start two bits below the top of the frame in the third bitstream channel), HSPACING=111 (i.e. no repeating in the horizontal direction), and VSPACING=100=4×1 (i.e. repeat after four skipped bits in the vertical direction).

It can be seen, that by varying the parameters of HSPACING and VSPACING, the proportion of bandwidth that is allocated to isochronous bitstream frame channels can be varied as compared to the proportion of bandwidth that is allocated to the control channel. If the channel is repeated often in the horizontal direction (i.e. a low value of HSPACING) then more bandwidth is allocated to the isochronous channel as compared to the control channel. If the VSPACING is large, less bandwidth is allocated in the isochronous channel as compared to the control channel. The example shows that by using a double edge sampled data line operating at 4.8 MHz, one can still transfer 2 audio bitstream channels that are oversampled by a factor of 200/3 (close to 64) and yet also carry 4 data channels suited for feedback applications. Attempting to do the same with SLIMbus would require a system clock of 24.576 MHz. In this example, the bus clock frequency is only 4.8 MHz with full stereo audio, device control and IV-sensing. Therefore, a considerable amount of power savings is obtained by the possibility of using bandwidth control of the bitstream frame channels with at least one embodiment of the unified bus communication protocol.

Accordingly, by performing at least one of combining data from different bitstream data channels into a common frame channel and by repeating the allocation of bitstream data channels to different frame channels, the bandwidth of the various data channels and the control frame channel can be varied depending on the specific application for more efficient bandwidth use and therefore more efficient data transmission.

In at least some embodiments, it is possible to transfer TDM words in bitstream mode. In this case, the SUBGROUP field has a different interpretation. The TDM words will be transferred in a single column (i.e. a single frame channel), as if the other columns (i.e. frame channels) did not exist. Referring again to FIG. 16a, in the bitstream mode, the SUBGROUP field is then modified to become the TDM WORDS TRANSFERRED in bitstream mode field (reg. 0x05, B5:B3). The previous definition of the SUBGROUP parameter is then not possible, and all ports will transfer all data from all selected channels without any interruptions in between these data channels. The TDM WORDS TRANSFERRED in bitstream mode field indicates which bitstream frame channels in a bitstream frame format are used to transfer word data. In an embodiment, bitstream frame channels 0-7 can be used to transfer Time Division Multiplexed (TDM) data.

TDM data are digital words that can be supported in bitstream mode as will be explained. The bitstream frame channel 0 is used as the control channel and is mapped to no data output since it is only used to send bits from an S word, X word or Y word in this example embodiment. In the bitstream mode, the DS0 bit can be used to indicate the start of data transmission in order to support numerous data channels within a single bitstream frame channel or to support data lengths that are not compatible with the bitstream frame length, which is 48 bits in this example embodiment due to sending an S word, X word and Y word in each frame with no gaps in the control channel and in which these words are 16 bits each. For example, when four data channels each having 16 bits, which equals 64 bits in total, have to be sent in one frame channel in bitstream mode, this can be done using data synchronization across several frames. In other embodiments, there can be spacing between the control words, even in bitstream mode, to allow for better synchronization of TDM words that are placed in bitstream channels.

Referring now to FIG. 29a, shown there is an example of a definition of registers that are can be used for the master device 52. An alternative embodiment is shown in FIG. 29b but the following description will focus mainly on the embodiments related to FIG. 29a. The registers are generally separated into three groups that provide the following functions: address port, command port and setup port. The registers provide values for a plurality of fields that will now be described. It should be noted that in alternative embodiments, other registers can be defined and these fields can be implemented using one or more bits of a register. In alternative embodiments, different implementations can be used for these fields, the fields may be ordered differently, or there may be other fields that are used or other registers that are used.

A COMMAND SEPARATION field (reg. 0x08; B7:B0) is 8 bits long and represents an unsigned integer in an embodiment. The function of the command separation register will depend on the value of the frame format type as shown in FIG. 25a. FIG. 25c shows an example of an alternative embodiment of the definition of the COMMAND SEPARATION field depending on the frame type that is used in the embodiment of the unified bus communication protocol. FIG. 25c is used in conjunction with FIG. 29b.

If the frame type is set to word mode, a word frame format is used and the command separation distance is specified in units of nibbles (i.e. four bits) and gives the distance between two command words, not including the command word itself. The separation value may be zero in which case only the command information is transferred to the bus 64 (this is shown in FIG. 40). The default value can be set to be equivalent to a default frame length of 48 bits which enables an increase in bandwidth for programming registers thereby allowing the bus 64 to be quickly setup and the attached slave devices to quickly obtain synchronization with the master device 54.

If the frame type is set to bitstream mode, a bitstream frame format is used and the control bits will be interlaced between data bitstreams. In this mode, the command separation register will give the number of data bits between the command bits. For example, a value of three in the COMMAND SEPARATION field means that a command bit will be encountered every four bits (i.e. the command bits will be separated by 3 bits which may be data bits or empty time slots). In bitstream mode, the S, X and Y words are spaced between the bitstream data, resulting in low latency for the bitstreams. If bitstream mode is used, in at least one embodiment, an address may first be assigned to all slave devices before the master device 52 begins data communication and send out zeros in all data slots until all slave devices have obtained synchronization with the master device 52 in order to reduce the time-to-lock for all of the slave devices. If the slave device 54 gets out of lock with the master device 52, the slave device 54 may try to regain synchronization with the previous value of the COMMAND SEPARATION field and the same frame type in order to avoid a longer, full synchronization search. The internal register controlling the frame type will be updated at the start of the next frame when it is written to. In an embodiment, the default value of the COMMAND SEPARATION field can be 0x1C at power-up, which is equivalent to a default frame length of 384 bits. It is possible to add spacing between the command words in bitstream mode. To limit the search time and for simplification purposes, in some embodiments a limited number of subframe lengths are used as shown in FIG. 25b.

In at least some embodiments, this register is not used inside slave devices unless the slave devices are able to simultaneously change the percentage of bandwidth allocated to the control channel and the frame format without any interruptions in data transfer. In other cases, the internal synchronization engine of the slave devices may be provided with the necessary information. In some embodiments, the COMMAND SEPARATION field can be shared for all ports but there can be a COMMAND SEPARATION field for each bank register and the active field can be selected by the BANK bit. In some embodiments, the COMMAND SEPARATION field including the frame type bit may be replaced by a FRAME STRUCTURE field. Both of these structures contain information about the separation between command words and if word mode or a number of bitstreams is used to carry the data.

A SAMPLE RATE RATIO field (reg. 0x09) may be used to indicate the oversampling rate for a sigma-delta converter with TDM output. This register may be used to setup decimation and interpolation filters in a simple manner and for support of multi-frame synchronization. This information can often directly be inferred from the COMMAND SEPARATION value (which can also be referred to as the FRAME STRUCTURE value—see FIG. 69a) and the REPEAT parameter, or from the FRACTIONAL register. However, there are cases (e.g. during a change of current BANK and if a parameter is repeated more than six times using REPEAT) where it is convenient to directly program a ratio between the bus clock frequency and the frequency of output samples as defined for a data channel. This is accomplished by using the SAMPLE RATE RATIO register. In addition, this register may comprise a field that is reserved for multi-frame synchronization in some embodiments. In this example embodiment, the SAMPLE RATE RATIO field comprises subfields: MULTI FRAME, FIRST STAGE, OPTIONAL STAGE, SECOND STAGE and THIRD STAGE.

The MULTI FRAME field (reg. 0x09; B7) may be used to select synchronization by the DS0 and DS1 bits as a replacement for subframe synchronization. Port information is normally defined with respect to the last bit of the S, X & Y words. However, in some cases for efficient data transfers a different timing reference is used rather than the start of a subframe, e.g. the start of every second subframe. This can be accomplished by setting the MULTI FRAME bit to true and selecting either the DS0 bit or the DS1 bit as the source of synchronization (this is done by setting SYNCHRONIZE equal to '10' or '11'). If the MULTI FRAME bit is false or this register is missing, only fractional transfers are supported when the DS0 and DS1 bits are used for synchronization.

Figures 29D, 29E, 29F, 29G:
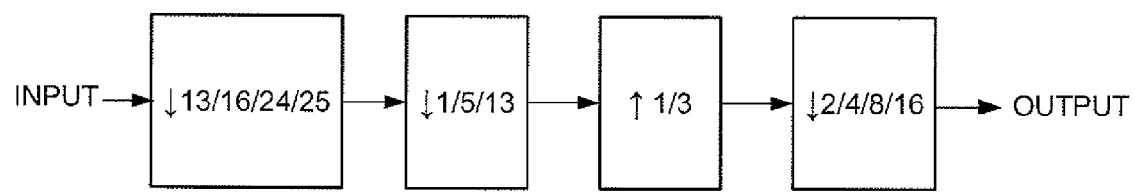
FIG. 29d is an example of a definition of sampling ratios for an optional stage.
FIG. 29e is an example of a definition of sampling ratios for a second stage.
FIG. 29f is an example of a definition of sampling ratios for a third stage.
FIG. 29g is an example of a multiformat decimator system that may be suitable for multiple sample rate ratios.

The FIRST STAGE field (reg. 0x09, B6:B5) may be used to define the sample rate conversion ratio for the first stage of a multistage synchronous sample rate converter. An example of how the FIRST STAGE field may be encoded is shown in FIG. 29c. The sample rate conversion ratio is found by the product of the fields as shown in FIGS. 29c-29e.

The OPTIONAL STAGE field (reg. 0x09, B4:B3) may be used to define the sample rate conversion ratio for an optional stage of a multistage synchronous sample rate converter. This stage can be used for direct support of a 26.00 MHz frequency if needed. In order to save space, an example of how the OPTIONAL STAGE field may be encoded is shown in FIG. 29d.

The SECOND STAGE field (reg. 0x09, B2) may be used to define the sample rate conversion ratio for the second or third stage of a multistage synchronous sample rate converter. This section can be implemented opposite sections one and three, i.e. if the overall action is decimation, the second stage can perform interpolation and if the overall action is interpolation, the second stage can perform decimation by the given factor. This is enables better performance in some system configurations. In order to save space, an example of how the SECOND STAGE field may be encoded is shown in FIG. 29e.

Figures 29H, 29I:
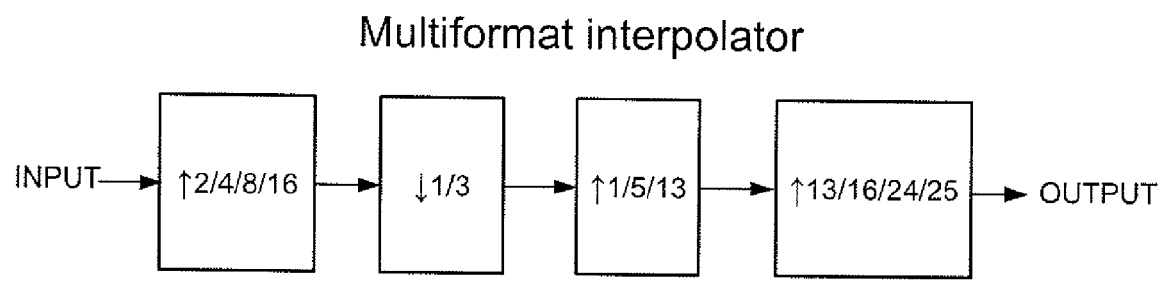
FIG. 29h is an example of a multiformat interpolator system that may be suitable for multiple sample rate ratios.
FIG. 29i is an example of an interpretation of writing to the FRAME CONTROL field.

The THIRD STAGE field (reg. 0x09, B1:B0) may be used to define the sample rate conversion ratio for the last stage of a multistage synchronous sample rate converter. In order to save space, an example of how the THIRD STAGE field may be encoded is shown in FIG. 29f. FIGS. 29g and 29h show the complete multiformat decimator and interpolator systems. In particular, FIG. 29g shows an example of a multiformat decimator system that is suitable for multiple sample rate ratios and compatibility with a variety of clock frequencies. Each sample rate conversion section may be preceded or followed by a scaling factor so that the overall gain is constant regardless of the chosen sample rate ratio. FIG. 29h shows an example of a multiformat interpolator system that is suitable for multiple sample rate ratios and compatibility with a variety of clock frequencies. Each sample rate conversion section may be preceded or followed by a scaling factor so that the overall gain is constant regardless of the chosen sample rate ratio. It is possible to change the order of the sections if this is beneficial or to add scaling between the sections to ensure the total gain of the sample rate converters is constant.

A FRACTIONAL field has two subfields, FRACTIONAL LOW (reg. 0x0A, B7:B0) and FRACTIONAL HIGH (reg. 0x0B, B7:B0), and may be used for data transmission of fractional flows. This is because the ratio between the system clock and the number of samples per frame (specified by the REPEAT field) and clock cycles per frame (specified by the LENGTH field) are already defined. By setting the FRACTIONAL field, the fractional oversampling ratio Y/X is defined as the ratio between the FRACTIONAL HIGH (i.e. Y) field and the FRACTIONAL LOW (i.e. X) field. For the master device 52, this function is used to control fractional data flows and is optional. The default value is all zeros. The FRACTIONAL HIGH (X) field and FRACTIONAL LOW (Y) field may also be used to define the oversampling ratio used by decimators and interpolators. In other embodiments, the encoding of this field may be different, but is still used to indicate the ratio between two binary encoded words.

An ADDRESS field (registers 0x0C and 0x0D) may be used to select which register the master device 52, and optionally the slave device 54, performs a READ, WRITE or FUNCTION operation on. It can also be used by slave devices when executing internal functions.

A FUNCTION field (reg. 0x0E) may be used to define what operation is initiated when starting a FUNCTION operation using the FRAME CONTROL register.

A frame control register field (reg. 0x0F) may be used which has the following fields: FRAME CONTROL, CURRENT BANK and SLAVE DEVICE ADDRESS. These fields can be implemented using one or more bits of a register. In alternative embodiments, different implementations can be used for these fields, the fields may be ordered differently, or there may be other fields that are used or other registers that are used. For example in an alternative embodiment, the frame control register field may comprise DATA SIZE and POWER fields.

The FRAME CONTROL field (reg. 0x0F, B7:B5) may be used to initiate READ/WRITE/FUNCTION operations and to monitor the progress of WRITE operations. An example of an interpretation of writing to this field is shown in FIG. 29i. When reading from this field, the value returned will be equal to the current frame operation. After writing to this field, the desired operation can be executed once. After this, the operation can be a PING operation in this example embodiment. The FRAME CONTROL register selects the mode of operation for the next frame. Therefore, in order to initiate a READ operation, the correct three bit code constant for a READ operation (either 8 or 16 bits read data) is written to the FRAME CONTROL register inside the master device 52, after which a device register READ operation will start in the next frame.

The CURRENT BANK field (reg. 0x0F, B4) may be used to select the current register bank the slave device 54 should use to specify parameters for data transfer. This field has a different meaning during PING and other operations. The default value is zero. During a PING operation, this field can be used to select which memory bank is used to control the slave device 54. Therefore, in order to change the frame format or audio mode, a PING command is first issued that changes the CURRENT BANK bit so that the devices attached to the bus 64 may use a different memory bank. During other operations, such as READ, WRITE and FUNCTION operations, for example, this field can be used to select which memory bank the current operation (i.e. READ, WRITE or FUNCTION) is applied to. This can be used to select between two alternate register sets to seamlessly switch between two data different modes without any glitches in the output such as switching between two different audio modes without any glitches in audio output. The slave device 54 should internally update its own registers so that the new setting is used at the start of next frame. One way to do this it to bit copy the CURRENT BANK bit onto the BANK field (X12). All values in slave registers 0x02 to 0x07 are selected by the X12 time slot (i.e. in the X word). In an example embodiment, every slave device can have two modes of operation for streaming of data to and from ports. The actual change between data modes will happen after two frame boundaries after the transmission of the X command word (i.e. the slave device can first change its internal bank when two equal readings of the X12 bit has been obtained, for example). This means that when the BANK bit is changing from one value, e.g. zero, to another value, e.g. one, the slave device will use an auxiliary register bank (e.g. an alternative set of registers 0x02-0x07) with different values than those that were used previously. This change happens in all slave devices after the second frame where the BANK bit has changed in a PING frame. The two register banks are selected during READ, WRITE and FUNCTION operations by the same BANK bit. The CURRENT BANK bit is used by the master device 52 to determine the value of the X12 (BANK) bit for the next frame.

The SLAVE DEVICE ADDRESS field (reg. 0x0F, B3:B0) has B3 as the most significant bit and may be used to specify the selected slave device address. The default value after reset is "0000". When the slave device address "1111" is used, the command will be broadcast to all devices. However, one should be careful about use of the broadcast command since it can result in ambiguity if reading from multiple devices at the same time. There can also be embodiments in which specific groups of devices selected by the master device 52 can be defined so that several devices can be selected at the same time as will be described in more detail below.

An INTERFACE CONTROL register (reg. 0x010) may be used to control the basic operation of the bus 64 such as setting the operating frequency, the clock source and selection of multi-master device operation. In an example embodiment, the INTERFACE CONTROL register comprises the following sub-fields: MCLKD, CLOCK SOURCE, ENABLE MULTI MASTER, ENABLE MASTER IRQ, and REQUEST MULTI MASTER which are also shown in FIG. 32a (an alternative embodiment corresponding to FIG. 29b is shown in FIG. 32b). These fields can be implemented using one or more bits of a register. In alternative embodiments, different implementations can be used for these fields, the fields may be ordered differently, or there may be other fields that are used or other registers that are used. The default value of the INTERFACE CONTROL FIELD after a reset event is set to "00010000".

The MCLKD clock division field (reg. 0x10, B7:B4) may be used to set the frequency of the clock signal used for the bus 64 (i.e. clock bus signal). In an embodiment, the frequency of the bus clock signal may be derived from an external clock source signal (EXTCLK) by using frequency division. The frequency division is determined by the MCLKD field of the INTERFACE CONTROL field. In an example embodiment, the external bus clock signal has only a single rising edge, but internal circuits of the master device 52 use at least two rising edges. Therefore, all division ratios are based on a factor of two. FIG. 33a shows an example of how the MCLKD field may be encoded in order to save space in at least one example embodiment. FIG. 33b shows the frequency divisions that may be used in the embodiment corresponding to FIG. 29b in which case, the factor used for frequency division is specified in the second last column for the single wire bus embodiment and the last column for the two wire bus embodiment. When the clock division ratio is '0000', the bus clock signal will stop and the clock output will be driven low. Systems that employ a PLL can use a custom register to setup the mode of operation, e.g. a low or high frequency operation or the divisors for a fractional PLL clock system. The default value for the MCLKD field is "0001".

In at least some embodiments, the clock signal line may also be kept at a static level (e.g. either a low logic or a high logic value) to conserve power. In this case, the clock divider changes the output on a rising clock edge, unless the division ratio is not an integer. Therefore, it is an advantage to use integer divide values for power down modes. In addition, the clock change happens at the start of a frame. If the clock divide factor is zero, there is no clock output. In this condition, and if the multi-master mode is not enabled, then if the data line changes before a change happens on the clock line, the clock restarts again. This can be used for very low power operation. In some embodiments, the system will have a well-defined time to start the clock again, e.g. 1 us, in order to be able to quickly respond to requests from a UART controller that may signal a buffer full condition. The initial clock signal supplied after the data line has changed may be a less accurate clock signal than normally used (typically a crystal oscillator) such as an RC driven relaxation oscillator, that has the advantage of a very quick start-up time, that can be on the order a single microsecond. A relaxation oscillator will have considerable more jitter than a high quality crystal oscillator and is not suited for high quality audio purposes where there may be increased precision in the sampling events. Later, when the main crystal oscillator has fully settled the master device 52 may change the clock source to this other source. By using this scheme, it is possible to both get a fast startup time to capture data quickly from a UART controller when recovering from a low power mode thereby loosing no data and still be able to supply a high quality low jitter clock signal for precision audio purposes.

The CLOCK SOURCE field (reg. 0x10, B3) may be used to select between two different clock sources. It is optional for the master device 52 to support this feature. There could be a high frequency clock, e.g. 19.20 MHz for audio use, and a low frequency clock, e.g. 32.768 kHz used for low power operation. In these cases, the master device 52 gates or switches between these clock sources so that no glitches in the data occur. The change between the clock sources can be done at the end of a frame when the clock signal is low. In another embodiment, the master device 52 can disable the clock and leave the clock line low using a bus holder for the possibility that another device can drive the clock. In some embodiments, one of the clock oscillators may be a high quality clock source and the other a fast settling clock source with poorer jitter performance.

The ENABLE MULTI MASTER field (reg. 0x10, B2) may be used to enable the use of multiple master devices and is active when it is set to one. If a master device sets this bit to one, another master device can begin to write commands in the command field section. It is used to determine the value of the X8 bit during a PING operation. When reading from this bit, it will return the status of the last read X9 bit. This bit can be activated by a master device that generates the bus clock signal. The default setting is one (i.e. enabled).

The ENABLE MASTER IRQ MASK field (reg. 0x10, B1) may be used to enable an interrupt based on the activation of the X9 bit during a PING operation. When set to one, the X9 bit will generate an IRQ to the master device 52. Furthermore, the X9 bit can be treated like an IRQ from a slave device (i.e. the S0 bit should be set in this example embodiment). The default setting is zero (i.e. disabled).

The REQUEST MULTI MASTER field (reg. 0x10, B0) may be copied onto the X9 bit and may be used to signal a request for multi master operation. If granted, it should release this bit again (i.e. set it to zero). When reading this bit, it will give the status of the last X9 bit read from the bus 64.

The IRQ MASK register (reg. 0x11) may be used to determine which events are allowed to generate an interrupt request to the master device 52. FIG. 34a shows an example of the subfields that can be used in the IRQ MASK register (an alternative embodiment is shown in FIG. 34b which corresponds to FIG. 29b). In the embodiment of FIG. 34b, the subfields include a BUS ERROR MASK field, an IO ERROR MASK field, an ATTENTION MASK field, an S0 DELAY ENABLE field, an ATTACHMENT MASK field, a WRC MASK field, a RDC MASK field, and a FRAME DONE MASK field. These fields can be implemented using one or more bits of a register. In alternative embodiments, different implementations can be used for these fields, the fields may be ordered differently, or there may be other fields that are used or other registers that are used. Each of the bits within the IRQ MASK field are read by or written to by the master device 52. A slave device may indirectly set or clear some of these bits, e.g. indicating a slave status level of '10' or higher, or by changing device status level. In an alternative embodiment (i.e. FIG. 34a), the WRC and RDC bits will be replaced by an IOC (10 operation complete) bit and a COMMAND ERROR bit (to monitor changes in the X and Y words, used for multi-master operation) and corresponding mask bits.

The BUS ERROR MASK field (reg. 0x11, B7) may be used to enable or disable master interrupts. When this field is set to high, it will enable an interrupt based on an active bus error bit in the status register. This interrupt is signaled by an active low level output and cleared when reading the status register 0x12.

The IO ERROR MASK field (reg. 0x11, B6) may be used to enable or disable I²C interrupts. When this field is set to high, it will enable an interrupt based on an active IO error bit in the status register (i.e. the acknowledge bit S14 following a READ/WRITE/FUNCTION command is not set). This interrupt is signaled by an active low level output and cleared when reading the status register.

The ATTENTION MASK field (reg. 0x11, B5) may be used to enable or disable master interrupts based on a slave device attention request by activating the S0 bit. When this field is set to high, it will enable an interrupt based on a slave status level of "10" or "11". In other words, when the ATTENTION MASK field is enabled, the master device 52 will generate an interrupt whenever the slave device 54 requests attention. The interrupt is signaled by the master device 52 to the controller as an active low level output and cleared when reading the status register. If the slave device 54 is still requesting attention and the ATTENTION MASK field is still enabled during the next frame, a new interrupt will be generated. The master device 52 can clear the ATTENTION MASK field when an IRQ occurs to avoid multiple interrupts from being generated.

The S0 DELAY ENABLE field (reg. 0x11, B4) may be used to enable or disable the delay of READ, WRITE or FUNCTION operations when the slave device 54 requests attention. When the S0 DELAY ENABLE field is set to high, it will enable a forced PING operation based on the value read from the bus 64 during the S0 time slot. The slave device 54 can activate the S0 bit to signal a need for attention when it has a slave device status of "10" or "11" (i.e. the slave device 54 can copy the MSB of its status register during the S0 time slot). If the current operation is a READ, WRITE or FUNCTION operation, it will be delayed until the next frame and be replaced by a PING operation if the S0 DELAY ENABLE field and the S0 bit are equal to one. At the start of the next frame, a READ, WRITE or FUNCTION operation will be reattempted. A PING operation will proceed unaltered irrespective of the value of the S0 bit. By enabling the S0 DELAY ENABLE field there will be a latency of at most one frame if any slave device should require attention. Data traffic other than the command words can still continue while reading device status. If the S0 DELAY ENABLE field is '0' any READ, WRITE or FUNCTION transaction proceeds irrespective of the value of the S0 bit. The master device 52 can clear the S0 DELAY ENABLE field when an IRQ is signaled to avoid blocking the reading or writing of slave registers.

The ATTACHMENT MASK bit (reg. 0x11, B3) may be used to control device attachment monitoring by enabling or disabling these interrupts. When this bit is low, any interrupts due to an active ATTACHMENT bit are disabled. When this field is set to high, it will enable an interrupt based on a device being attached or removed from the bus 64 and thereby setting the ATTACHMENT bit high. This can happen if a slave device changes its status value, or if the slave device is removed from the bus 64 (thereby not signalling during a PING operation effectively changing its status value) or if the slave device is no longer in sync with the master device and thereby stops signalling or if the slave device gets in sync with the master device (after physical attachment or after synchronization has been obtained) and this status value has been read by a PING operation. The ATTACHMENT interrupt is cleared when reading the status register 0x12 (i.e. the register that contains the ATTACHMENT bit). If the status value that is read indicates the need for intervention from the master device 52 (i.e. the status value is "10" or "11"), the normal operation for a controller of the master device 52 would be to read back the device status values from the slave status register to find the source of the interrupt. After this has been completed, any necessary action can be carried out by writing register control commands to the slave device that needs attention.

The WRC MASK field (reg. 0x11, B2) may be used to enable or disable an interrupt. THE IRQ MASK REGISTER 0x11 enables and disables interrupts going directly to the master device 52 through a dedicated (i.e. physical) interrupt line that is either external or internal. These interrupts are not the same as the interrupt from a slave device, which is typically communicated over the bus 64, and not through a dedicated line from the master device 52 after a WRITE operation is complete. The interrupt is communicated directly from the master bus controller through a dedicated line. When this field is set to high, it will enable an interrupt based on the completion of an active WRITE operation. This can be found from a high to low transition on the WRC bit. The interrupt can be signaled by an active low level output. The interrupt can be cleared when reading the status register 0x12. In an alternative embodiment (i.e. FIG. 34a), this bit may be used to mask for the completion of IO operations and to enable an interrupt when an IO operation (READ/WRITE/FUNCTION) has been completed. The masking of the interrupt will be similar to the WRC MASK field.

The RDC MASK field (reg. 0x11, B1) may be used to enable or disable an interrupt from the master device after a READ operation is complete similar to what was described above for the WRC MASK field. When this field is set to high, it will enable an interrupt based on the completion of an active READ operation. This can be found from a high to low transition on the RDC bit. The interrupt can be signaled by an active low level output. The interrupt can be cleared when reading the status register 0x12. In an alternative embodiment (i.e. FIG. 34a), this bit may be used to mask for a COMMAND ERROR interrupt, i.e. a change in the bits located in the X and Y words done by a device other than the main master device. This bit is active high. This may be used as a safety precaution, when multimaster mode is not permitted. This IRQ mask bit should be disabled in multimaster mode of operation.

The FRAME DONE MASK field (reg. 0x11, B0) may be used to enable or disable master interrupts (signaled through a dedicated line or through I²C in an alternative embodiment) activated at the completion of a frame on the rising clock edge. When this field is set to high, it will enable an interrupt based on the completion of an internal frame counter. The internal frame counter in the master device 52 should still be running during charge mode as shown in FIG. 35 which shows an example timing diagram for changing the FRAME DONE MASK field. In charge mode, the power transistor 76 (see FIG. 3b) in the interface 70 is turned on.

With reference to FIG. 36a, in an example embodiment, the INTERFACE STATUS register (reg. 0x12) comprises a number of subfields (an alternative embodiment is shown in FIG. 36b which corresponds to FIG. 29b). In the example embodiment of FIG. 36b, the INTERFACE STATUS register comprises a BUS ERROR field, an IO ERROR field, STATUS1 and STATUS0 fields, an ATTACHMENT field, a WRC field, an RDC field, a FRAME DONE field and a SLAVE STATUS field. These fields can be implemented using one or more bits of a register. In alternative embodiments, different implementations can be used for these fields, the fields may be ordered differently, or there may be other fields that are used or other registers that are used. The default value of the INTERFACE STATUS register after a reset event can be "00000000". In general, the INTERFACE STATUS register has status information from the bus 64 and is used to control IRQ. In an alternative embodiment (i.e. FIG. 36a), the WRC and RDC bits will be replaced by an IOC (IO operation complete) bit and a COMMAND ERROR bit (to monitor changes in the X and Y words, used for multi-master operation) and corresponding mask bits. The multimaster operation may use both of these bits and the X9 and X8 control bits during a PING operation. This can be used in situations with multiple I²C connections or for test purposes, where an external unit may read back the internal status of devices connected to the bus 64 without requiring changes to the system hardware or software.

In operation, the INTERFACE STATUS field may be used to provide status information from the bus 64 and activates IRQs to the master device 52. It is controlled by READ, WRITE, PING and FUNCTION operations by the master device 52 or the slave device 54. Each of the bits within the INTERFACE STATUS register can be read and used by the master device 52. This field assists in controlling the data communication between the master device 52 and the slave device 54 and can also be used to monitor the status of slave devices attached to the bus.

The BUS ERROR field (reg. 0x12, B7) may be used to indicate that an illegal bus operation has occurred when it is active high. This condition can be detected if the value on the bus 64 is different than it should be when the master device 52 is driving the bus 64 (e.g. a slave device is conflicting with the synchronization pattern). Once an illegal bus operation has been detected, it will remain set until the BUS ERROR field has been read. An interrupt will be generated if an illegal bus operation is observed and the corresponding IRQ MASK bit is enabled (i.e. set high). When multi master operation status has been granted (the RELEASE BUS bit (X8) in a PING operation is zero), any bus conflict in the X and Y fields of the command words should be ignored, since it is assumed these are caused by another master device. In this case, the other master device 52 will write the parity bit.

The IO ERROR field (reg. 0x12, B6) may be used to indicate an error during a READ/WRITE/FUNCTION operation or a parity error during a PING operation (i.e. an error in the data). The IO ERROR field will be set if the slave device 54 does not acknowledge a READ, WRITE or FUNCTION command. For example, if the acknowledge bit S14 following a READ or WRITE or some FUNCTION commands is not activated by the addressed slave device then the IO ERROR field will be set and if the acknowledge bit S14 is activated following the completion of a PING or some FUNCTION commands then the IO ERROR field will also be set. The IO ERROR field is reset upon reading the status register 0x12. This scheme allows for all bus traffic on the bus 64 to be checked for errors by reading a single register.

The STATUS1 and STATUS0 fields (reg. 0x12, B5:B4) may be used to store the highest status level read from any slave device that is attached to the bus 64. If any slave device has a status level higher than indicated by the STATUS1 and STATUS0 fields, these fields will be updated to this new value during the next PING operation. A read of the INTERFACE STATUS register will not clear the STATUS1 AND STATUS0 fields. These fields are updated during every PING operation and power-on reset event and thus are valid. As an example, the slave status value is "00" after reset and "01" after a slave device has attached to the bus 64. Then assuming that the slave device needs urgent attention and signals "11" as a slave status during a PING operation, then the STATUS1 and STATUS0 fields are then updated to this value. After reading the slave status register, the value is still "11". Assume during the next frame that the highest slave status level is now "10". At the end of this PING operation, the STATUS1 and STATUS0 fields will be updated to this new value ("10"). This is done so that errors are first cleared when the slave device indicates this to be the case. If the corresponding INTERRUPT MASK bit has been enabled and an interrupt has been generated as a result of a slave device requesting attention, the IRQ line from the master device 52 to the controller will be cleared upon reading the INTERFACE STATUS register. A new interrupt will be generated during the next PING operation, if the slave device still requests attention and the interrupt mask bit is set. During normal operation, a read from this field will return "01", i.e. one or more slave devices are attached to the bus 64 and there is no requirement for special service. Accordingly, the STATUS1 and STATUS0 fields can both be used to determine if any slave devices are attached to the bus 64 or to distinguish between slave devices requiring attention with low priority (e.g. a status level of "10") or high priority (e.g. a status level of "11"). If no slave devices are attached to the bus 64, the STATUS1 and STATUS0 fields will be set to "00".

The ATTACHMENT field (reg. 0x12, B3) may be set to active high to indicate if a slave device has disconnected or connected to the bus 64 since the last PING operation. The value for the ATTACHMENT field can be found by comparing the status levels for the slave device indicated in the X and Y words during a PING operation to the previous status levels for the slave devices. If the status level for any slave device has changed from {"01", "10", "11"} to "00" (i.e. a slave device has disconnected from the bus 64), the ATTACHMENT field will be set low. In case there is more than one master device, any secondary master device will attach to the bus 64 like any slave device and be enumerated with a device address in a similar fashion as the slave devices. If the status has changed from "00" to {"01", "10", "11"} (i.e. a slave device has attached to the bus 64), the ATTACHMENT field will also be set high. The ATTACHMENT field will stay high ("1") after being set until the INTERFACE STATUS register has been read at which moment it is cleared. In any other case, the ATTACHMENT field will stay low. The default value of the ATTACHMENT field after a reset event is "0".

The WRC field (reg. 0x12, B2) may be used to indicate the completion of a WRITE operation. This bit signifies the activation of a WRITE operation and is active high. It is activated after a write to the FRAME CONTROL register. It will remain high until the end of a WRITE operation immediately after the S14 (acknowledge) bit has been written. If an IO error occurs (e.g. no acknowledge), this bit is not reset until after the status register has been read. An attempt of performing a WRITE operation will start in the next frame. Unless delayed by a device interrupt (i.e. both the S0 bit and the S0 DELAY are activated), the WRITE operation will proceed; otherwise it will be delayed to the next frame and again attempted. After the WRITE operation is complete, this bit will be set immediately after a valid ACK in S14. If the slave device does not acknowledge the WRITE operation then the IO ERROR field will be set and the WRC field will not be reset. In this case it will first be reset after reading this register. In an alternative embodiment (i.e. FIG. 36*a*), this bit may be used to indicate the completion of IO operations and to enable an interrupt when an IO operation (READ/WRITE/FUNCTION) has been completed. The bit may be active high.

The RDC field (reg. 0x12, B1) may be used to indicate the completion of a READ operation. This bit signifies the activation of a READ operation and is active high. It is set high after a write to the FRAME CONTROL register. It will remain high until the end of a READ operation immediately after the S14 (acknowledge) bit has been written. If an IO error occurs (e.g. no acknowledge), this bit is not reset until after the status register has been read. Unless delayed by a device interrupt (i.e. both the S0 bit and the S0 DELAY are activated), the READ operation will proceed otherwise it will be delayed to the next frame and attempted again. After the READ operation is complete, this bit will be reset again immediately after a valid ACK in S14. If the slave device does not acknowledge the READ operation, the ERROR IO field will be set, and the RDC field will not go low. In this case it will first be reset after reading this register. In an alternative embodiment, this bit may be used to indicate the change of any bit (e.g. COMMAND ERROR) within the X and Y words that is done by a device other than the main master device. This bit is active high. In some embodiments, the field COMMAND ERROR will become active if any bits within the command words (S, X, Y) have been changed to a value that is not compatible with what is allowed by the master device 52. As an example, if a bit within the S word or the command type (B15:B13) in the X word are changed, this is an indication of electric noise or of another device trying to take over the bus 64. If however, another device has made a request to be able to control the bus 64 (via the REQUEST BUS command) and the master device has allowed this (via the RELEASE BUS command), then changes in the X word should be allowed and not result in the activation of COMMAND ERROR.

The FRAME DONE field (reg. 0x12, B0) may be used to indicate that a frame has been completed. The FRAME DONE field is set active high at the last bit of a frame. Accordingly, the FRAME DONE field may be used to synchronize operations with a basic timing of the bus 64. In an embodiment, the FRAME DONE field is still valid when a device is being charged, no data communication is active and the frame counter is usually running internally. The FRAME DONE field will continue to be set until the status register has been read. The FRAME DONE field can be used to tell if a PING operation has been completed or for basic timing, e.g. to count a certain number of frames before starting communication to ensure that all devices have been charged. When the corresponding IRQ MASK bit is enabled, an interrupt will be generated at the end of every frame.

The SLAVE STATUS registers (regs. 0x13 to 0x15) may be implemented using registers that reside inside the master device 52 and will indicate the status of the slave devices that are attached to the bus 64 with a slave address 0-11. These registers contain 12 values, each being two bits, corresponding to the status of slave devices 0-11 for a total of three bytes. In some embodiments, it is not possible to directly monitor slave devices 12-14 (device 15 is reserved for broadcast), but they can still issue an interrupt through activating the S0 bit. In some alternative embodiments, the addresses 12-14 are used to address groups of devices as will be described in more detail below. In either case, the status values are read during a PING operation. The highest status value read from any slave device is compared to the corresponding two bit unsigned status bits. If this slave status value is larger than the value in these bits, these bits are updated to this new value. When the SLAVE STATUS register is read, its value is not cleared but will be overwritten during the next PING operation, i.e. if a maximum value of "11" has been read from the SLAVE STATUS register from one slave device and the maximum value during the next PING operation is "10", the SLAVE STATUS registers value for this device will be updated to "10" at the completion of the next PING operation. The initial value of all three SLAVE STATUS registers is "00000000" after a reset operation. If no slave devices are present on the bus 64, nothing will be activated and a constant high level will be read on the bus 64, which is equal to a logic zero since a negative logic signaling scheme is used for this example embodiment of the bus 64.

With respect to the alternative example embodiment of FIG. 29b, there are different register definitions in comparison to those shown and described for FIG. 29a. In particular, the definition in FIG. 29b includes a FRAME RATE field, an OVERSAMPLE (X) field, an OVERSAMPLE (Y) field, a MULTI MASTER field, a POWER CONTROL field, and a CLOCK DIV field. Other fields are similar to those shown in FIG. 29a but may be located at different registers and/or have a different number of bits assigned to the fields and will generally not be discussed with respect to FIG. 29b. The OVERSAMPLE (X) OVERSAMPLE (Y) fields correspond to the FRACTIONAL (LOW) and FRACTIONAL (HIGH) fields of FIG. 29a and will not be discussed. The MULTI MASTER field of FIG. 29b has a different meaning compared to the ENABLE MULTI MASTER field of FIG. 29a as will be discussed. The CLOCK DIV field is similar to the MCLKD field of FIG. 29a and will not be discussed.

The FRAME RATE field (reg. 0x009, B7:B0) may be used to define the system frequency of the bus 64. The value can be defined in units of 200 kHz, coded as unsigned binary in an embodiment. The values encoded for 12.2 MHz and 11.2 MHz may be treated as 12.288 and 11.2896 MHz (and the same for multiples thereof).

Combinations of WRITE and READ operations based on an example embodiment of the FRAME CONTROL field of FIG. 29b are shown in FIG. 30. In at least one embodiment, and with respect to FIG. 29b, the first bit (B7) in the FRAME CONTROL field provides the status of a pending WRITE operation and is active high. A register WRITE operation may start by the controller writing to the data register (WD15:WD0 or WD7:WD0) of the master device 52 and then to the address register (ADDR6-0 and optionally REG7-0 for 8 bit WRITE operations) of the master device 52. The controller may then start the actual WRITE operation by writing to the IO CONTROL REGISTER (IOC) and setting B7:B6="10". Then an attempt at performing a WRITE register operation may start in the next frame. Unless delayed by a device interrupt, the WRITE operation will proceed otherwise it will be delayed to the next frame and again attempted. After the WRITE operation is complete, the FRAME CONTROL field will be reset again immediately to '00' after the last bit of the Y word is written except during an error condition. If there is an IO ERROR, the first bit of the FRAME CONTROL FIELD will continue to stay high until the IO ERROR bit has been read and cleared. This enables the master device 52 to find the source of the IO ERROR. When the WRITE CONTROL bit (reg. 0x00F, B7, i.e. the first bit of the FRAME CONTROL FIELD) is high, a new READ or WRITE operation should not be initiated until the WRITE CONTROL bit has returned to low.

In an embodiment, it is illegal to activate both the WRITE CONTROL and READ CONTROL bits in the same operation. This condition is ignored by the master device 52 and the previous state of bits B7:B6 can be maintained in this case. In this case, the master device 52 can encode this condition to be a PING operation (i.e. no change).

In at least one embodiment a READ CONTROL bit (reg. 0x00F, B6) of the FRAME CONTROL field of FIG. 29b may be used to initiate operations and to monitor the progress of these operations, an example of which is shown in FIG. 31. Reading from the READ CONTROL bit will give the status of any pending operations. The DATA and ADDRESS register will be used for READ and WRITE operations. After the operation is complete, this READ CONTROL bit will be reset again. If there is an IO ERROR, the READ CONTROL bit will continue to stay high until the IO ERROR bit has been read and cleared. This enables the master device 52 to find the source of the IO ERROR. In other embodiments, the type of operation (i.e. PING/FUNCTION/WRITE 8 bits/READ 8 bits/WRITE 16 bits/READ 16 bits) may be determined by the bits B7-B5 of register 0x00F.

When an operation is under way, a new operation is not initiated. When the FRAME CONTROL field='11', a FUNCTION operation is initiated. Functions that utilize the FUNCTION DATA field will be treated like a READ/WRITE operation (with respect to reading from the FRAME CONTROL field). The type of FUNCTION operation that is performed will be determined by the FUNCTION register (0x15).

The DATA SIZE (reg. 0x00F, B5) field may be used to select the data width for READ and WRITE operations. A logic zero in the DATA SIZE field results in 8 bit data and a logic one in the DATA SIZE field results in 16 bit data operation. The default value after a power-on reset event is '0', i.e. 8 bit operations.

The ENABLE MULTI field (reg. 0x15, B7) of FIG. 29b may be used to enable the use of the DS0 bit for multiframe synchronization (i.e. synchronizing data that is transmitted over multiple frames). When the ENABLE MULTI field is set to one, multiframe synchronization is enabled and the CLOCK DIVIDER field may be used to select the distance in number of frames, where the DS0 bit may be set to one (normally zero). This can be used by the slave device 54 for more efficient data transfers in some data modes of operation. When the ENABLE MULTI field is set to one, the CLOCK DIVIDER field will not be updated. After changing the ENABLE MULTI field from a zero to a one, the first frame that follows will have the DS0 bit set to one. The activation of the DS0 bit is done by writing the oversample ratio to the data registers using the SET OVERSAMPLE RATIO function. As an example, if the register 0x0000 is set to 0x02 and the register 0x0001 is set to 0x01 (see FIG. 16b for these registers), then the DS0 bit will be set equal to 1 in every second frame.

The POWER CONTROL field (reg. 0x15, B5) of FIG. 29b may be used to control the operation of the bus 64 for single wire embodiments. If the POWER CONTROL field is set to 0, then there is no charging of slave devices when data is transmitted on the bus 64. If the POWER CONTROL field is set to 1, then there is charging of the slave devices when there are no data transfers on the bus. The POWER CONTROL field can be updated internally at the last bit of a frame irrespective of the time that this information is received from an I²C command.

It should be noted that the example embodiments shown in FIGS. 9a, 16a, 22a, 22b, 25a, 25b, 29a, 29c-29i, 32a, 33a, 34a and 36a can be used together in a first alternative example embodiment, while the example embodiments shown in FIGS. 9b, 16b, 17, 22c, 25c, 29b, 30, 31, 32b, 33b, 34b and 36b can be used together in a second alternative example embodiment. The example embodiments shown in the other figures not mentioned in this paragraph can be used with both the first and second alternative example embodiments.

In at least one embodiment, up to 12 slave devices (0-11) may respond with status data. Any write to the SLAVE STATUS registers by the master device 12 is ignored (no action). An example definition for the SLAVE STATUS registers is shown in FIG. 37, though other definitions and another number of slave devices can be used in other embodiments.

In at least one embodiment, a manufacturer encoding sequence in the part ID is used in a dynamic address allocation of addresses to the slave devices that first attach to the bus 64. This can be done by using a compact encoding format or a general encoding format as will now be described.

In an example embodiment, the compact encoding format encodes the part ID into 32 bits which can be used as a device ID for the slave device 54. The format includes position encoding, manufacturer name and a part number as shown in FIG. 38a. In this example embodiment, the position encoding allows up to fifteen values (1-15), the manufacturer name is encoded as two letters and the part number is encoded in binary and allows five decimal digits (position encoding is explained later in the description). The letters used in the manufacturer name uses the five least significant bits of the ASCII letter code for each letter, i.e. A="000001", B="000010", etc. The two letters for the manufacturer name are chosen to result in unique two letter acronyms. The master device 52 can read four bytes of information when using the compact encoding format. If 16 bit READ operations are used by the master device 52, two bytes will be returned during every READ operation. The most significant byte represents the first byte, while the least significant byte represents the second byte.

An example of the compact encoding format now follows. Assume that the manufacturer XMCO wants to code a part named XM007000. The first two letters is the manufacturer code "XM", the part number is "07000" and there is no position information. The compact encoding uses B31='0'. Since there is no position information, this results in B30: B27="0000". The letter 'X' has an ASCII code of 88 and the letter CM' has an ASCII code of 77. The ASCII codes can be compressed from eight bits to five bits by subtracting 64 from the original value. Therefore, bits B26:B17 are equal to {'X'-64, 'M'-64}={24, 13}={"11000", "01101"}. Alternatively, the values can be found from the ASCII codes logically AND'ed with 0x1F to get the five bits. The part number is then converted to binary, i.e.: "07000"= "0x1B58"=0.0001.1011.0101.1000. The 32 bit ID in compact encoding format is therefore {B31, B30:B27, B26:B17, B16:B0}="0000.0110.0001.1010.0001.1011.0101.1000"}= 0x061A. 1B58.

In an example embodiment, the general encoding format defines the part number as a sequence of ASCII characters to encode a device ID for the slave device 54, an example of which is shown in FIG. 38b. A part number may have any name that can be expressed as an ASCII string terminated by the NULL character (i.e. a byte equal to zero). The first byte is used to encode the format (i.e. short encoding or general encoding), the part grade and optional positional information. The second byte is used to indicate the version of the bus and the version of the chip. Characters that follow the second byte are interpreted as the part name using ASCII values. The part grade can be used to differentiate between different qualities of types of a specific part. The bus version may start with version "0001" equivalent to version 1.00. The chip version may start with version "0000" and increment for subsequent versions. The increment in chip version number does not have to be in single steps. For example, the first version can be "0000" followed by later versions of "0001", "0011", "0111 and finally "1111" used for the last version instead of counting "0000", "00001", "0010", etc. This scheme could be used for practical reasons (more easy for metal mask changes), but a larger number generally corresponds to a newer version. If 16 bit READ operations are used by the master device 52, then two bytes will be returned during every READ operation. The eight most significant bits represents the first byte, the eight least significant bits represents the second byte. When the string has an odd number of bytes, it will not fit with 16 bit data reads. Therefore, if a single byte is expected to terminate the string and a word is read, the most significant byte is used, e.g. when a sequence is terminated in the middle of a word boundary, the most significant byte is zero. There is no byte equal to zero in the ID in this mode to ensure the sequence is not terminated early. Also manufacturer names other than the actual manufacturer are not used when encoding a part.

An example of the general encoding format now follows. Manufacturer ADI would like to encode a ship with the part name "ADI-SSM2377ACBZ-RL". The chip has no position information and a part grade of CA'. The bus version is the first official version 1.00="0001". The version of the chip is the first version="0000". The general coding is done by a 16 bit compressed information field followed by the part number encoded in ASCII. The encoding is done as follows: B7=(general encoding), B6:B3="0000" (no position information), B2:B0="000" (part grade A), i.e. the first byte read is 0)(80. The second byte is the bus version followed by the chip version, i.e. "0001" & "0000"=0x10. The full part name read using multiple reads from address zero is (the actual characters are shown, the returned value is the ASCII encoding of these): {'A', 'D', 'I', '-', 'S', 'S', 'M', '2', '3'. '7', '7', 'A', 'C', 'B', 'Z', '-', 'R', 'L'}. The last byte read is NULL: B7:B0="00000000". Assuming this device has the highest arbitration priority, reading from address 0, device 0 would result in the following sequence of values: {0x80, 0x10, 0x41, 0x44, 0x49, 0x2D, 0x53, 0x53, 0x4D, 0x32, 0x33, 0x37, 0x37, 0x41, 0x43, 0x42, 0x5A, 0x2D, 0x52, 0x4C, 0x00}.

It is sometimes necessary to distinguish between several identical parts based on their positional placement on a board since these devices may contain identical part information. In this case, an extra field is used in order to differentiate between these devices to be able to assign a unique slave address to them. A position field is used for this purpose. In an embodiment, the position field can have 16 different values. The value "0000" is reserved for the case where no positional information is available or necessary. The remaining 15 values are used to indicate position.

The numbering of the devices can be specified in a variety of ways. For example, if there are six microphones (defined as now follows) in a handheld unit, a primary microphone can be assigned position 1, a left microphone can be assigned position 2, a right microphone can be assigned position 3, a noise microphone at the back can be assigned position 4, a second noise microphone can be assigned position 5, and a microphone next to the loudspeaker can be assigned position 6.

As another example, when using multiple microphones inside a headset, the following numbering scheme may be used: a left primary microphone may be assigned position 1, a right microphone may be assigned position 2, a left ear external microphone may be assigned position 3, a right ear external microphone may be assigned position 4, a left ear internal microphone may be assigned position 5, a right ear internal microphone may be assigned position 6 and an additional left microphone may be assigned position 7.

As another example, for a DOLBY™ surround sound multi-speaker system, the following numbering scheme may be used: a left front speaker may be assigned position 1, a right front speaker may be assigned position 2, a center speaker may be assigned position 3, a rear left speaker may be assigned position 4, a rear right speaker may be assigned position 5, a sub-woofer speaker may be assigned position 6, a side left speaker may be assigned position 7 and a side right speaker may be assigned position 8.

In at least one embodiment, a general positional assignment can be done for multiple elements based on the location of the elements. For example, first the elements can be sorted from the left to the right (left being first), then the elements can be sorted from the front to the back (front being first), then the elements can be sorted from up to down (up being first) and then the elements can be sorted from largest to smallest (largest being first).

As described earlier, the unified bus communication protocol has different frame formats based on the mode of operation. In the word mode of operation, a word frame format is used. In the bitstream mode of operation, a bitstream frame format or a unified frame format is used. Examples of word, bitstream and unified frame formats now follow.

Referring now to FIG. 39, shown therein is a general word frame format that is used in word mode for a single time frame. Communication between the master device 52 and the slave device 54 occurs during frames that commence with the S word, followed by the X word and then the Y word. Between the S word and the command words, there may be empty space allocated for data transmission depending on the use scenario. The length of the empty space is defined by the COMMAND SEPARATION register.

The transmission of an S word by the master device 52 allows the slave devices that are physically connected to the bus 64 to be locked on (i.e. synchronized) for communication with the master device 52 (the method to synchronize is described in more detail later in the description). Transmission of the S word also allows the master device 52 to determine if any interrupts have been set that require attention.

Between the transmission of the S word and an X word, random data or information may be transmitted over the bus 64 which can be picked up by at least one of the slave devices 54 or the master device 52. This information includes, but is not limited to, bitstreams, audio data or other numeric data such as sensor data for example. Transmission of the X word allows the master device 52 and the slave device 54 to determine if any specific function is to be executed or to determine the status of at least some of the slave devices or to specify a portion of an address for an operation. After transmission of the X word (assuming that there were no interrupts set), further data, as described previously, may be transmitted over the bus 64. A Y word is then transmitted which provides further address information or data information for the operation or status information for at least some of the slave devices depending on the operation.

Referring now to FIG. 40, shown therein is an example embodiment of a word frame format for a single time frame. In this example, the command separation is 0 bits, which is the smallest separation value since the control words follow one after the other and the frame length is 3*(4*command separation value+16)=3*(4*0+16)=48 bits. The bit numbers defined by the top row and the first column of the table in FIG. 40 indicate in which time slot a bit is transmitted on the bus 64, e.g. timeslot 0x02E contains bit Y1. This frame format is useful for situations where only control data are transferred or a very high bandwidth for control data is used for a short amount of time. The CURRENT BANK register bit can be used to change to and from this data mode if needed.

Referring now to FIG. 41, shown therein is another example embodiment of a word frame format used for a single time frame in word mode. In this example, the command separation is 4*28=112 bits and the frame length is 3*(4*28+16)=3*(128)=384 bits. This example shows five audio data channels (A, B, C, D and E) and two unused data channels with each channel having 16 bits. This example fits well with a 6.144 MHz bus clock and a 48 kHz sample frequency. If the value is "Z" (i.e. tri-state), the master device 52 will drive a "0-1-Z-Z" pattern. If the value is "0", the master device 52 will drive a "0-1-0-0" pattern. If the value is "1", the master device 52 will drive a "0-1-Z-Z" pattern. If the value is determined by the slave device 54, the master device 52 will drive a "0-1-Z-Z' pattern while the slave device 54 will drive either a "Z-Z-U-0" pattern or a "Z-Z-Z-Z" pattern for the single wire case depending on the value of the bit that the slave device 54 is transmitting. The shown data format fits well with a 12.288 MHz derived bus clock and there is shown 5 active audio sources. However, since this data format allows up to seven active sources simultaneously, there are two unused channels or empty channels in the frame.

Figure 42:
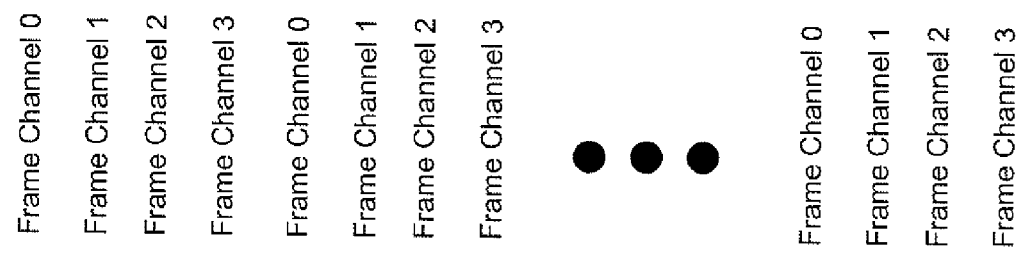
FIG. 42 shows an example embodiment of a bitstream frame format for a single time frame.

Referring now to FIG. 42, shown therein is an example embodiment of a bitstream frame format for a single frame in bitstream mode. In this example, the bitstream frame format comprises four bitstream frame channels: a control channel (frame channel 0) and three bitstream data channels (frame channels 1 to 3). The set of bitstream frame channels start at bits 0, 4, 8 and C of each row and are sent one bit at a time for each bitstream frame channel. The control channel is used to send bits from an S word, followed by bits from an X word, followed by bits from a Y word. The bitstream data frame channels are used to send bits from different bitstream data channels. In this example, 1 bit is sent from the control frame channel, followed by 1 bit from bitstream data frame channel 1, followed by 1 bit from bitstream data frame channel 2, followed by 1 bit from bitstream data frame channel 3. Accordingly, the command separation value is equal to 3 bits (i.e. there is a command bit from either an S word, X word or Y word transmitted every $4^{th}$ bit). The frame length is 4*48=192 bits.

The frame structure of the frame shown in FIG. 42 is actually 48 rows and 3 columns. However, the frame is shown according to bit number which corresponds to the time slot that the bit is transmitted on the bus 64. It should be understood that the time slots for this frame start at the left hand corner of the top row and continue to the end of the top row, and then from the left hand side of the next row to the end of that row and so on and so forth.

A typical scenario in which data is structured in the frame format shown in FIG. 42 is when there are two class D amplifiers with a digital input and a digital microphone and the amplifiers and microphone each generate bitstream data. Another scenario is three digital microphones that generate bitstream data. In this case, the three digital microphones can be sampled at 3.072 MHz and the bus clock frequency can be 6.144 MHz, for example. Accordingly, this frame format is suitable for interfacing to multiple bitstream data channels for both transmitters and receivers. This bitstream frame format enables small delay in processing since there is only a latency of one bit between each of the bitstream data channels that are transmitted over the bus 64. Also, the oversampling ratio of the sigma-delta converters used to generate the bitstreams is not restricted to a particular value using this scheme, because decimation by any value can later be used by the system. In practice, a limited and finite number of oversampling ratios are used in order to support 12.288, 19.20 and 26.00 MHz clock systems.

Referring now to FIG. 43, shown therein is an example embodiment of a unified frame format for a single time frame that can be used in bitstream mode. In this example, the unified frame format comprises a control channel (frame channel 0), five bitstream data channels (frame channels 1 to 5) and two virtual frame channels (frame channels 6 and 7). A unified frame format is a frame format that uses at least one virtual frame channel. The virtual frame channel is used to transmit data that has been converted from (i.e. in the case of input data) or will be converted to (i.e. in the case of output data) digital word data. The digital word data are converted into bitstream by transmitting the digital words one bit at a time in the time slot designated by the corresponding virtual frame channel.

In this example, the frame channels start at bits 0 and 8 of each row and are sent one bit at a time from each frame channel. Accordingly, the command separation value is equal to 7 bits (i.e. there is a command bit from either an S word, X word or Y word every 8th bit). The frame length is 8*48=384 bits. The frame structure for this frame is actually 24 rows and 8 columns. However, the frame is shown according to bit number as explained previously.

A typical scenario in which data is structured in the format shown in FIG. 43 is when there are five digital microphones that generate bitstream data and two speakers that either receive bitstream data or can reconstruct digital word data from the bitstream data that is provided by the virtual frame channels. In this example, the five digital microphone channels (frame channels M0 to M4) can be at 768 kHz (which is equivalent to a 16 kHz sampling frequency with a decimation ratio of 48) and the two virtual frame channels (frame channels A and B) are two audio channels that can each be at 48 kHz, with 16 bit binary words. The bus clock frequency can be at 6.144 MHz.

Referring now to FIG. 44, shown therein is another example embodiment of a unified frame format for a single time frame for use in bitstream mode. In this example, the unified frame format comprises a control channel (frame channel 0), five bitstream data channels (frame channels 1 to 5) and two virtual frame channels (frame channels 6 and 7). However, in this example, each virtual frame channel has data for at two word data channels. Therefore, in this example, two virtual frame channels are used to carry data from four word data channels. For example, frame channel 6 has bitstream data that corresponds to word data channel C and word data channel A. Frame channel 6 is used to either receive or send data to a device that uses word data channel C and either receive or send data to a device that uses word data channel A. The time slots are used for word data channel C first and then word data channel A. In addition, frame channel 7 has bitstream data that corresponds to word data channel D and word data channel B where the time slots are first used for word data channel D and then word data channel B. In this case, the data in the virtual frame channels are a bitstream version of digital word data as it is sent on the bus 64. The data synchronization bit (DS0) may be used to synchronize bitstream data that corresponds to word data across several frames to avoid ambiguity on when data for a data channel starts and stops (e.g. A or C). In order to save space, the DS0 and DS1 bits are transferred in the middle of a PING frame, i.e. not just before a frame starts. These bits are used to reset a fractional counter to a known value (e.g. zero) which is then incremented by a given phase during every subframe thereafter. The overflow bit is then used to select if it is data from source (i.e. data channel) A or source C. The frame starts at the first bit after the S word at which time the corresponding one or more slave devices have been updated about register bank selection and data synchronization. At the various devices that use word data channels, the digital word data is multiplexed with bitstream data for transmission on the bus 64 or demultiplexed from the unified bitstream version into word data where it is used by the device. As an example, a system could contain two digital amplifiers that receive bitstream data and a connection to a Bluetooth or digital FM receiver or transmitter. The first slave devices (i.e. the amplifiers) would use bitstream data or multiplexed TDM data while the other devices would use multiplexed TDM data.

In this example, the frame channels start at bits 0 and 8 of each row and are sent one bit at a time from each frame channel. Accordingly, the command separation value is equal to 7 bits (i.e. there is a command bit from either an S word, X word or Y word every $8^{th}$ bit). The frame length is 8*48=384 bits. The frame structure for this frame is actually 24 rows and 8 columns. However, the frame is shown according to bit number as explained previously. A typical scenario in which data is structured in the format shown in FIG. 44 is when there are five digital microphones that generate bitstream data and four auxiliary audio channels for devices that generate or use digital word data. For example, the five digital microphone channels (frame channels M0 to M4) can have a data rate of 1.536 MHz (which is equivalent to a 24 kHz sampling frequency with a decimation ratio of 64) and the four digital word channels (A, B, C and D) each represent a single audio channel sampled at 48 kHz, with a word length of 16 bits. The bus clock frequency can be at 12.288 MHz.

Referring now to FIGS. 45a to 48c, shown therein are examples of useful combinations of bus frequency, number and types of channels for the unified bus communication protocol. The tables in these figures have been sorted according to the external clock frequency that is used as a reference clock signal for the bus 64. Configurations with an odd divide ratio can be used in a two wire bus embodiment or with an external clock signal with double the frequency that is listed. The available control bandwidth is of the same order as a fast-mode $I^2C$ bus. A 400 kHz $I^2C$ bus using 16 bit data corresponds to 12.5 kHz operations per second.

Referring now to FIGS. 45a and 45b, shown therein are tables of example combinations of bus frequency, number and types of channels for an embodiment of the unified bus communication protocol when operating in word mode. These tables can be understood by looking at the example in the $6^{th}$ row of the table of FIG. 45a. In this case, there are five audio channels which are each 24 bits long and are repeated twice so that the subframe length is 5*24*2+16=256 bits where the addition of 16 bits is for the control word in the subframe. The repetition means that two digital words are taken from each of the channels in each subframe. The repetition can be done according to A-A-B-B-C-C-D-D-E-E for data from data channels A, B, C, D and E but for lower latency the repetition A-B-C-D-E-A-B-C-D-E may be used. The bandwidth used for the control data in a subframe is $16/256$=6.3% since there are 16 control bits in a subframe. The example shown in row 3 of FIG. 45a is well-suited for S/PDIF compatibility.

With respect to FIG. 45a, the example in row 1 has one audio channel repeated three times in a subframe in word mode. The example in row 2 has one audio channel repeated once in a subframe in word mode. The example in row 3 has two audio channels repeated two times in a subframe in word mode. The example in row 4 has three audio channels repeated once in a subframe in word mode. The example in row 5 has three audio channels repeated four times in a subframe in word mode. The example in row 6 has five audio channels repeated two times in a subframe in word mode. The example in row 7 has six audio channels repeated twice in a subframe in word mode. The example in row 8 has twelve audio channels repeated once in a subframe in word mode. In these examples, the bandwidth of the control channel can be decreased depending on the number of frame channels that are allocated in a frame for data and the width of those frame channels.

With respect to FIG. 45b, the example in row 1 has four audio channels repeated four times in a subframe in word mode. The example in row 2 has six audio channels repeated four times in a subframe in word mode. The example in row 3 has eight audio channels repeated two times in a subframe in word mode. The example in row 4 has twelve audio channels repeated two times in a subframe in word mode. In these examples, the bandwidth of the control channel is half of the bandwidth of each of the twelve audio channels.

Referring now to FIGS. 46a and 46b, shown therein are tables of example combinations of bus frequency, oversampling rate, number and types of channels for an embodiment of the unified bus communication protocol when operating in bitstream mode and using bitstream frame formats. These combinations can be used for combinations of several digital microphones, for example. It is also possible to extend the bandwidth of the bitstream channels using interleaved bitstream channels, e.g. a 48 kHz sample frequency uses 3 bitstream channels each at 16 kHz for the same clocking requirements as shown below. Accordingly, with interleaved bitstream channels, one bitstream channel (as shown as a column in the figures) can have bitstream data that is associated with more than one device. In this context, the phrase "associated with" means that the data is generated by a port or used by a port of a device and this can be extended to multiple ports for one device or multiple ports for more than one device. FIG. 28c and FIG. 28d show examples of sharing a bitstream frame channel (i.e. a column) between multiple sources/ports.

The tables in FIGS. 46a and 46b can be understood by looking at the example in the $3^{rd}$ row of the table of FIG. 46a. In this case, there are four total bitstream frame channels in the bitstream frame format in which three of these frame channels are used for audio data and one of the frame channels is used as the control channel. Accordingly, the bandwidth used for control data is ¼=25%. The actual sample rate varies for the examples shown in FIGS. 46a and 46b. The actual sample rate can be found from multiplying the output sample frequency with the oversampling rate, i.e. the actual sample rate for the first row in FIG. 46a will be 16*48=768 kHz. While the output bitstream from a sigma delta converter is at this sample rate (768 kHz), the output sample rate could be different from 16 kHz depending on what decimation filter is being used. For example, if the decimation filter decimates by a factor of 48, then the output sample frequency would be 16 kHz as shown in the first row. The control data for the frame control channel is also sampled at 16 kHz, but there are also examples where these sampling rates are different. All of the examples in FIGS. 46a and 46b utilize the bitstream frame format and the channels are only repeated once in a subframe. In bitstream mode, a subframe is defined as the portion of a frame with bits starting with a control bit and including the bits that follow before the next control bit. The example shown in row 2 of FIG. 46b with an oversampling ratio of $200/3$ is well suited for digital microphones (since the oversampling ratio is close to 64) with a 19.20 MHz system frequency.

With respect to FIG. 46a, the examples in rows 1 and 2 have two bitstream frame channels with one of the frame channels being used for a bitstream data channel and the other channel being used for a control channel. The examples in rows 3 and 4 have four bitstream frame channels with three of the frame channels being used for bitstream data channels and the other channel being used for a control channel. The example in row 5 has six bitstream frame channels with five of the frame channels being used for bitstream data channels and the other frame channel being used for a control channel. The example in row 6 has eight bitstream frame channels with seven of the frame channels being used for bitstream data channels and the other frame channel being used for a control channel. The example in row 7 has 12 bitstream frame channels with 11 of the frame channels being used for bitstream data channels and the other frame channel being used for a control channel. The example in row 8 has 16 bitstream frame channels with 15 of the frame channels being used for bitstream data channels and the other frame channel being used for a control channel. The bandwidth for the control channel varies depending on the number of bitstream frame channels as shown in the bandwidth column of FIG. 46a.

With respect to FIG. 46b, the example in row 1 has two bitstream frame channels with one of the frame channels being used for a bitstream data channel and the other frame channel being used for a control channel. The example in row 2 has three bitstream frame channels with two of the frame channels being used for bitstream data channels and the other frame channel being used for a control channel. The example in row 3 has four bitstream frame channels with three of the frame channels being used for bitstream data channels and the other frame channel being used for a control channel. The examples in rows 4 and 5 have six bitstream frame channels with five of the frame channels being used for bitstream data channels and the other frame channel being used for a control channel. The example in row 6 has 12 bitstream frame channels with 11 of the frame channels being used for bitstream data channels and the other frame channel being used for a control channel. The bandwidth for the control channel varies depending on the number of bitstream frame channels as shown in the bandwidth column of FIG. 46b.

Referring now to FIG. 47, shown therein is a table of example combinations of bus frequency, as well as number and types of channels for an embodiment of the unified bus communication protocol when operating in a hybrid word mode. This table shows combinations of different sample rates and different bandwidth (i.e. data from different sources are transferred with different bandwidth). The hybrid word mode is useful for situations, where different sample frequencies are used, e.g. Dolby 5.1 format or scenarios with voice calls and music being used for mixing, e.g. 8 and 48 kHz at the same time or if different word lengths are available at the same time. When the REPEAT parameter is less than one the data synchronization bits (DS0 and DS1) are used. The example in row 1 of FIG. 47 is suitable for Dolby 5.1 audio transfer, with a subframe length of 320 bits. It shows 5 audio channels (typically left, right, centre, rear left and rear right) with a sample frequency of 48 kHz, equivalent to a 24 kHz bandwidth and one channel (typically a subwoofer) sampled at 3.2 kHz, equivalent to a 1.6 kHz bandwidth. The repeat value of 5 will be coded as 7 (i.e. a continuous repeat until the end of the frame using DS0 synchronization). This means there are five channels with TDM words at 48 kHz, each with 24 bit resolution and each channel is repeated five times in a single long subframe of 640 bits. The single channel will have 24 bit resolution, and a 9.6 kHz sample frequency. The frame frequency is 9.6 kHz/3 i.e. 3.2 kHz. The example in row two means there are two channels sampled at 48 kHz and two channels sampled at 8 kHz, with all channels having 16 bit resolution. The example in row three means there are two channels sampled at 48 kHz and three channels sampled at 8 kHz, with all channels having 16 bit resolution. It can be seen that by varying the bandwidth allocated to the control channel, one can obtain more audio/data channels when using the same clock frequency.

Referring now to FIGS. 48*a*, 48*b* and 48*c* shown therein are tables of example combinations of bus frequency, number and types of channels for an embodiment of the unified bus communication protocol when operating in bitstream mode and using unified bitstream frame formats.

With respect to FIG. 48*a*, this combination is useful when there is input data from ports that use bitstream data channels and output data that is to be provided to ports that use word data channels. For example, the format in FIG. 48*a* can be used when there is input from several microphones (i.e. bitstream data channels) and an output in digital word data (i.e. word data channels) to two or more speakers. In this case some of the bitstream channels are used to transmit the digital word data as bitstream data according to a unified frame format. This example shows a grouping of the data into 10 bitstream channels (i.e. 10 columns). The first column is the control frame channel which is taken up by the command words. The next five columns are bitstream frame channels which are taken up by five audio bitstreams, each sampled at 1.2 MHz and with an expected output sample frequency of 24 kHz if the oversampling factor is 50. The last four columns are virtual bitstream frame channels which are expected to carry five TDM digital word streams, each operating at 48 kHz and with 20 bit resolution. The five TDM channels are transferred over 4 virtual frame channels that are interlaced (i.e. first all 5 MSB's are sent, then all 5 MSB's−1, etc.). The DS0 or DS1 bits can be used for synchronization. This can be done by programming the SUBGROUP and REPEAT fields that have a different interpretation in bitstream mode. The REPEAT field will indicate the number of bitstreams allocated for TDM transfers (i.e. four in this example, encoded as 011) and the SUBGROUP field will indicate the first bitstream used (when a numbering scheme of 0-7 is used). Normally, a TDM data channel is transferred inside one bitstream channel. However, in at least one embodiment, a special case can be added to handle the use of TDM words in bitstream mode in which the number of frame channels used to transmit the TDM words is less than the number of TDM data channels (e.g. the VSPACING definition can be changed for TDM words).

With respect to FIG. 48*b*, the example in row 1 has four bitstream frame channels with one of the frame channels being used for a bitstream data channel, two of the frame channels being used as virtual frame channels for word data channels that are converted into bitstream data channels and the other frame channel being used for a control channel. The example in row 2 has eight bitstream frame channels with three of the frame channels being used for bitstream channel data, four of the frame channels being used for word data channels that are converted into bitstream data and the other frame channel being used as a control channel. The example in row 3 has eight bitstream channels with three of the channels being used for bitstream channel data, four of the channels being used as virtual frame channels for word data converted into bitstream data and another frame channel being used as a control channel. In this case, two bitstream frame channels are used to carry each TDM data channel. The example in row 4 has eight bitstream frame channels with four of the frame channels being used for bitstream channel data, three of the frame channels being used as virtual frame channels for word data converted into bitstream data and the other frame channel being used as a control channel. The example in row 5 has eight bitstream frame channels with four of the frame channels being used for bitstream channel data, three of the frame channels being used as virtual frame channels for word data converted into bitstream data and the other frame channel being used as a control channel. In this example, the three TDM data channels are distributed into three bitstream frame channels. The example in row 6 has eight bitstream frame channels with five of the frame channels being used for bitstream channel data, two of the frame channels being used as virtual frame channels for word data converted into bitstream data and the other frame channel being used as a control channel. The example in row 8 has eight bitstream frame channels with six of the frame channels being used for bitstream channel data, one of the frame channels being used as a virtual channel for word data converted into bitstream data and the other frame channel being used as a control channel. For the 3rd and 5th examples, the data synchronization bit is used. The data synchronization bit can be activated at the start of a multiframe cycle, where both the transmitter and receiver use the same fractional counters to obtain synchronization between the fractional flows. As an example, the ratio of the fractional counter can be ½, i.e. the data starts in every second subframe and the data starts with channel A. Then in the next subframe the data continues to be outputted as if there had been no frame boundary. Then in the third subframe this process starts over again. All of this is initiated by the DS0 bit that resets the fractional counter every second frame. In this scenario, the fractional counter counts 0, ½, 1→0, ½, 1→0, etc. The device with the transmitter will control the DS0 bit.

With respect to FIG. 48*c*, in the example in row one, the frame format is divided into eight bitstreams. One bitstream frame channel is used to carry control information, three of the bitstream frame channels are used to carry oversampled information (e.g. three data bitstreams) and the four remaining bitstream frame channels are used to carry five word data channels with TDM information that is multiplexed between these channels. In the example in row two, one bitstream frame channel is used for control information, three bitstream frame channels are used for oversampled data (e.g. three data bitstreams) and the remaining four bitstream frame channels are used to carry ten multiplexed TDM (word data) audio channels each with a precision of 20 bits. In the example of row three, one bitstream frame is used to carry control information, five bitstream channels are used to carry oversampled data (e.g. five data bitstreams) and the remaining two bitstream frame channels are used to carry five multiplexed TDM word data channels.

It should be noted that the example combinations in FIGS. 45*a* to 47*c* can be used with different types of word data such as audio word data, instrumentation or sensor data that is in word format, bitstream format or a unified bitstream format as the case may be, for example.

The unified bus communication protocol can also support various data formats. In at least one embodiment, the unified bus communication protocol can support four different data formats: binary words, bitstream, string and floating point by providing a transport medium for data in these different formats. In other embodiments, different combinations of these data formats can be supported.

The binary word format can be used to represent word data that is transmitted on the bus 64 during word mode. The binary encoding can be done using a two's complement form, with the MSB being first. In this case, the numbers can be interpreted as having been scaled to have a maximum numerical value of one. An example of a general format for encoding N bits in binary word format for an embodiment of the unified bus communication protocol is shown in FIG. 49a. This data format is directly compatible with I²S and TDM encoding.

The bitstream encoding format can be used to represent oversampled data which is transmitted on the bus 64 during bitstream mode. The oversampled data is typically derived as the output from a sigma-delta converter such as, but not limited to, the output from a digital microphone, for example. Some class-D amplifiers also support oversampled data as input data. The oversampled data can be processed in raw form or can be later decimated to obtain baseband data. The oversampling factor that is used generally depends on system requirements. An example of some common oversampling factors that work well with a bitstream encoding format mobile for phone systems are shown in FIG. 49b.

The bitstream encoding format is not very bandwidth efficient and therefore can be used for low latency or on PCB lines, where the bandwidth can be higher. For example, if the bitstream format is used for a headset interface, a lower sample rate than 48 kHz can be used such as 16 kHz, for example, which gives a 1.024 MHz bandwidth requirement with an Over Sampling Ratio (OSR) of 64. It should be noted, that 7.056 MHz is a special frequency since it can support 44.1 and 48 kHz sample rates simultaneously with integer sample rate conversion. Thus, this frequency can support the highest audio quality possible (although non-integer upsampling and mixing may result in transient distortion). Decimation by a factor of 66.67 can be accomplished by performing interpolation by a factor of three as part of the decimation process. This configuration can be used for 19.200 MHz clock systems.

The string encoding format uses the ASCII format and all characters one byte long are allowed. In an example embodiment, if the first character is equal to one, the string will follow afterwards and be zero terminated. If the first byte is equal to 254, the next 8 bytes will indicate the length of the string. If the string has unlimited length, the first character will be equal to 255. If the character sequence has ended, a zero can be used. An example of the possible combinations for the string encoding format for an embodiment of the unified bus communication protocol is shown in FIG. 49c.

The string encoding format can be used both when the master device 52 reads from the slave device 54 and writes to the slave device 54. The definition of the start of a string is from the activation of a channel and starts at the beginning of the next frame after the X word, after the slave device 54 has received this command. The master device 52 does not interpret strings but merely transports these strings. If variables are encoded in BCD format (i.e. binary coded digital format, e.g. "34" is coded as "00110100"), the string format may be used. The device that receives the data in BCD format can remove the preamble.

In an example embodiment, the floating point format uses the IEEE numerical standard 754-2008 to describe the format of floating point numbers. When the compact encoding format is used, variables will be single precision, while the precision in the general encoding format will be the same as the precision specified in the encoding. The first byte read from a port or the first byte written to a port can be the most significant word. In at least one embodiment, the driver that supports the master device 52 can be configured to encode and decode the following IEEE floating point formats: binary32, binary64, decimal32 and decimal64.

It should be noted that it may not be possible to transfer data flows that exactly match the clock rate used for the bus 64 in some cases. As an example, it may be necessary to transfer 44.1 kHz content over a 48 kHz connection. If both sample rates are synchronized to the same clock source, the ratio between the two sample rates (i.e. 44.1/48) is not an integer. However, it is an exact fraction (147/160) and transport over the bus 64 can be controlled without resorting to asynchronous pushing/pulling. This type of transport is called a fractional flow and can be controlled by the master device 52 in at least one embodiment. Fractional flows allow for simple and efficient support of the above-noted scenarios. The DS0 and DS1 bits can be used to control fractional flows and is defined during all operations.

One way to set the DS0 bit can be to use a phase accumulator and use overflow carry to control the DS0 bit. As an example, writing to the DS0 or DS1 bits can be controlled using an 8 bit fractional phase accumulator (ACC). The fractional phase accumulator works in principle by adding a finite amount of phase $\Delta\phi=2\pi(X/Y)$ to the total phase $\phi$, and whenever $\phi$ is larger than $2\pi$, subtract $2\pi$ from $\phi$ and set the SYNC flag high. The algorithm shown in FIG. 50a can be used to implement this process in at least one embodiment of the unified bus communication protocol. However, it is possible to revise the algorithm so that a single adder is used, if the quantity $(2^N-Y)$ is first calculated.

As an example, assume X=147, Y=160, N=8 (this matches a 44.1 kHz data flow on a 48 kHz channel) and there is an 8 bit accumulator. Every cycle the value X will be added to the accumulator ACC and when the ACC value is larger than Y, then Y will be subtracted from the accumulator ACC value. The calculations under this example scenario are shown in FIG. 50b. It should be noted that the additions are shown using modulus 256 (for an 8 bit accumulator). In some embodiments, for generality, a 16 bit accumulator can be used. In other embodiments other resolutions could be used, such as 10 bits for one variable and 6 bits for the other. In some cases the variables might be swapped by use of a bit allocated for this purpose.

An example of some typical values of X and Y for various playback scenarios is shown in FIG. 50c. If special system frequencies (e.g. 26.000 or 27.000 MHz) may be used, then a clock divider may be used to get down to 1.00 or 2.00 MHz which can then be used as a time reference. In this way, the fractional divider can still support various frequencies even though only 8 bits of resolution is provided for X and Y.

Figure 51A:
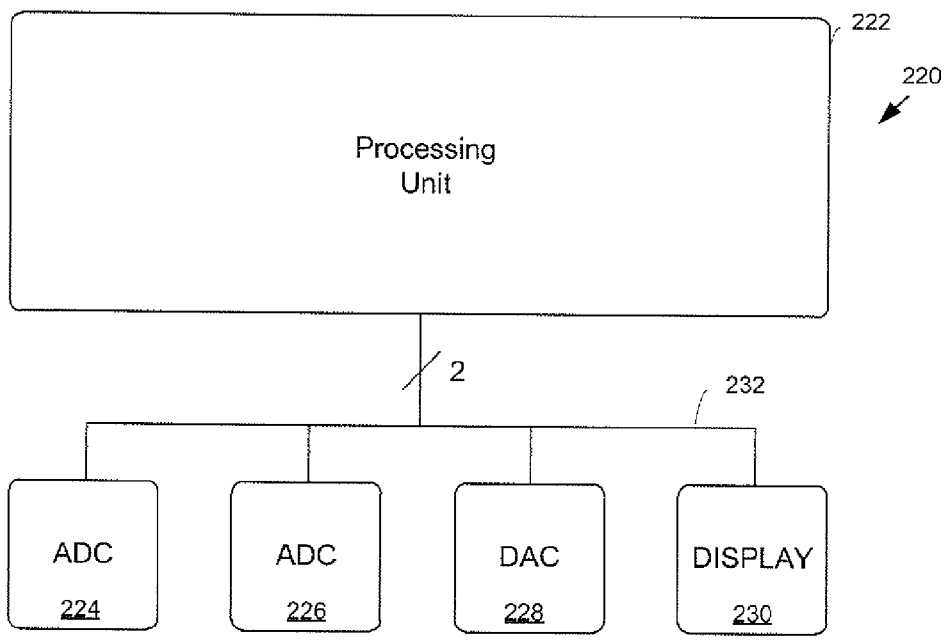
FIG. 51a shows an example embodiment of a control system with a display that uses the unified bus communication protocol.
Figure 51B:
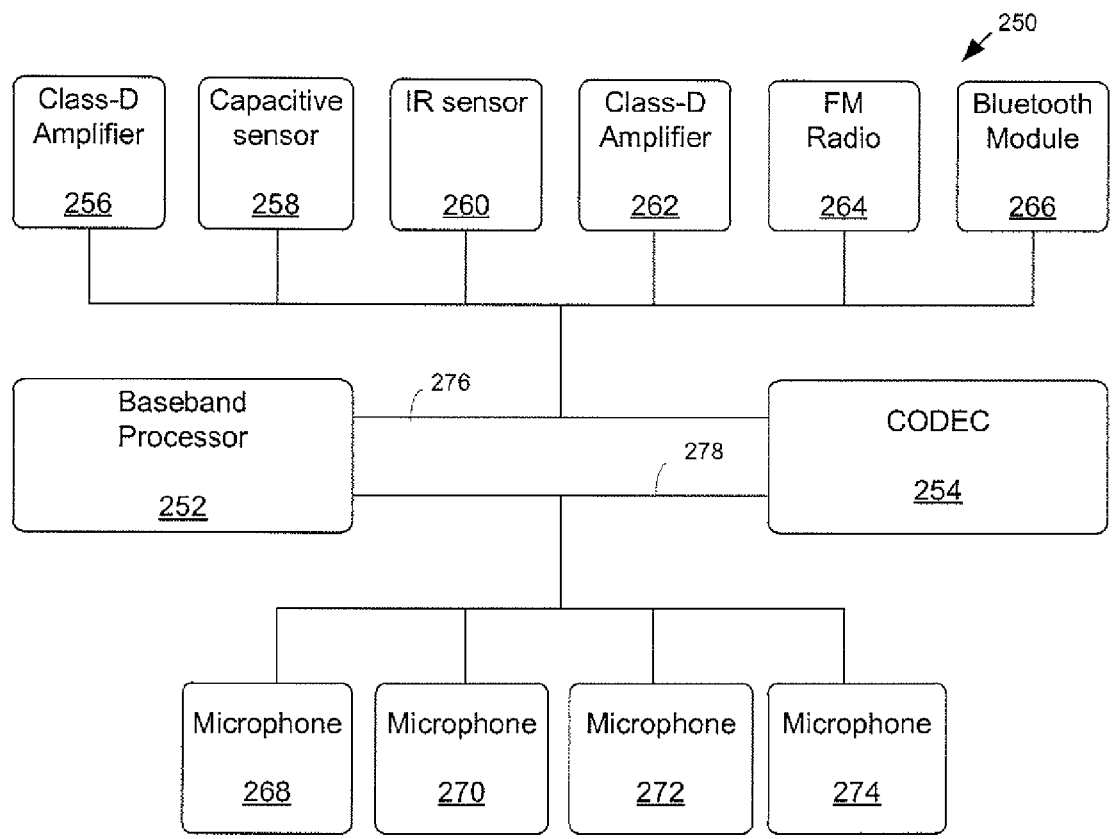
FIG. 51b shows an example embodiment of a mobile phone system that uses the unified bus communication protocol.

The various embodiments of the unified bus communication protocol described herein can be used in a variety of different applications. For example, the unified bus communication protocol can be used to facilitate chip to chip communication, examples of which are shown in FIGS. 51a and 51b. The unified bus communication protocol can also be used to facilitate communication between various devices, examples of which are shown in FIGS. 52a to 52i.

Referring now to FIG. 51a, shown therein is an example embodiment of a control system 220 with a display that uses the unified bus communication protocol. The control system 220 comprises a processing unit 222, an ADC 224, an ADC 226, a DAC 228, a display 230 and a bus 232 that couples all of these elements together. The processing unit 222 can be a processor, a Field Programmable Gate Array (FPGA), an Application Specific Integrated Circuit (ASIC) or some other processing circuit as is known by those skilled in the art. In this example, the bus 232 has a two-wire implementation in which one wire is used to transmit a clock signal and another wire is used to transmit data, synchronization and command data. In this example, the processing unit 222 acts as the master device and the slave devices are the ADC 224, the ADC 226, the DAC 228 and the display 230.

Referring now to FIG. 51b, shown therein is an example embodiment of a mobile phone system 250 that uses the unified bus communication protocol. The mobile phone system 250 can be a cellular phone or a smart phone, for example. The mobile phone system 250 comprises a baseband processor 252, a CODEC 254, a Class-D amplifier 256, a capacitive sensor 258, an IR sensor 260, a class-D amplifier 262, an FM radio 264, a Bluetooth module 266, four microphones 268 to 274 and two buses 276 and 278. The bus 276 is used to couple elements 252 to 266 and the bus 278 is used to couple elements 252, 254 and 268 to 274. In this example, the buses 276 and 278 are implemented using a two-wire bus embodiment as described previously. Furthermore, in this example, the baseband processor 252 acts as a master device and the other elements 254 to 274 act as slave devices. There can be applications in which more than one bus is used to make the system more energy efficient since when many devices are coupled to the same bus, there will be an increase in capacitive losses and less energy efficiency. In addition, the different buses can have different clock speeds with a lower clock speed being more energy efficient. Another aspect of the unified bus communication protocol is that it may be used on buses that connect low cost digital accessories to the mobile phone system 250.

Figure 52A:
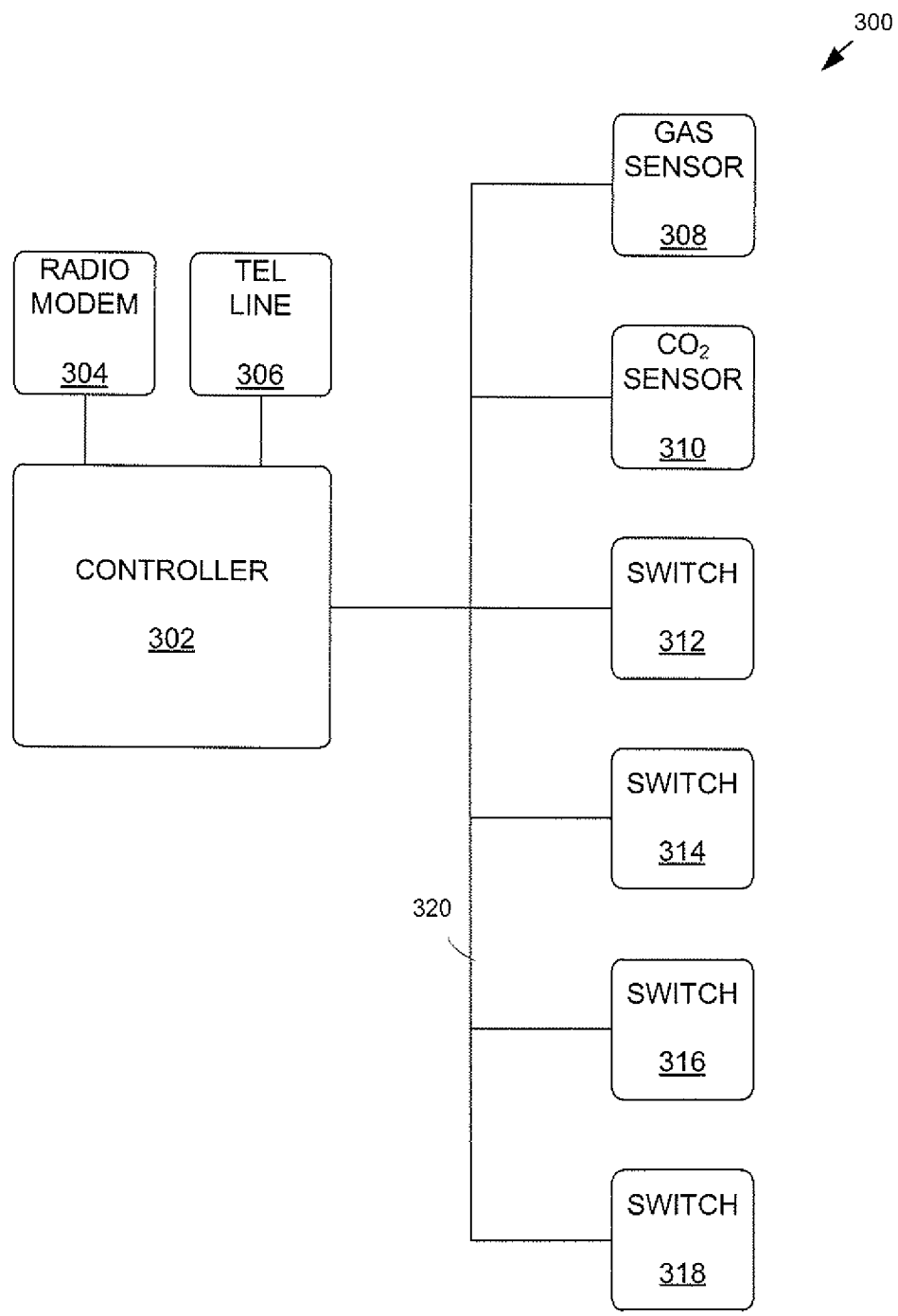
FIG. 52a shows an example embodiment of a house safety system that uses the unified bus communication protocol.

Referring now to FIG. 52a, shown therein is an example embodiment of a house safety system 300 that uses the unified bus communication protocol. The house safety system 300 comprises a controller 302, a radio modem 304, a telephone line 306, a gas sensor 308, a Carbon Dioxide ($CO_2$) sensor 310, switches 312 to 318 and a bus 320. The switches 312 to 318 are each connected to a slave device to give a logic zero output or a logic one output, which depends on the status of the switch (e.g. the window or door is open or closed). Even though there would be a small additional cost of including a slave device with each of the sensors, this would be offset by the lower installations costs, which may greatly exceed the added cost of a slave device. The controller 302 can be implemented by any processing unit described herein. The bus 320 can be implemented as a single wire embodiment in which the clock, data, command and synchronization information are sent on the same bus line. The bus 320 couples the controller 302 to elements 308 to 318. The controller 302 acts as a master device and the elements 308 to 318 act as slave devices. The radio modem 304 and the telephone line 306 may be used to communicate with a supervising central station or a home owner that could directly check the status of the line and report to an appropriate authority when a warning arrives (e.g. telephone the owner, fire department, police, etc. when certain conditions occur). The radio modem 304 can serve as backup in case the telephone line 306 is down or broken.

Figure 52B:
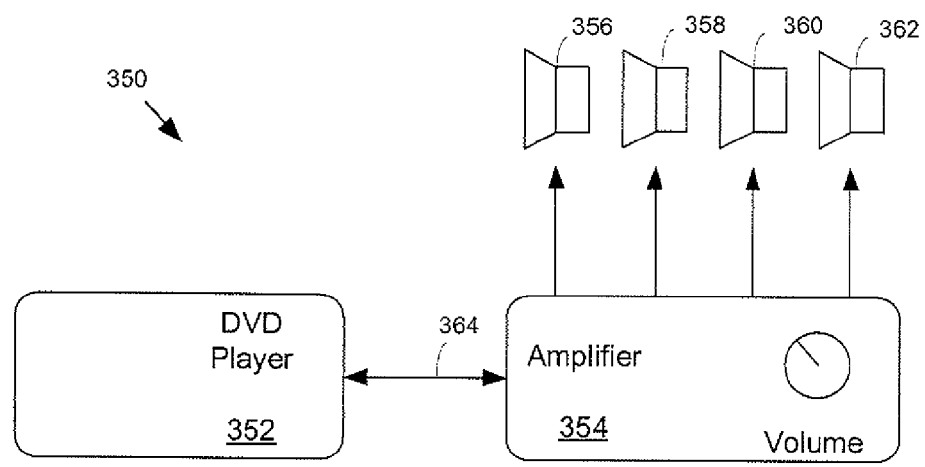
FIG. 52b shows an example embodiment of a home entertainment system that uses the unified bus communication protocol.

Referring now to FIG. 52b, shown therein is an example embodiment of a home entertainment system 350 that uses the unified bus communication protocol. The home entertainment system 350 comprises a DVD player 352, an amplifier 354, speakers 356 to 362 and a bus 364. The bus 364 couples the DVD player 352 to the amplifier 354. The bus 364 can be implemented as a single wire, for example, in a standard digital cable. In this example, the DVD player 352 acts as a master device and the amplifier 354, along with the four audio channels for the four speakers 356 to 362, acts as a slave device.

Figure 52C:
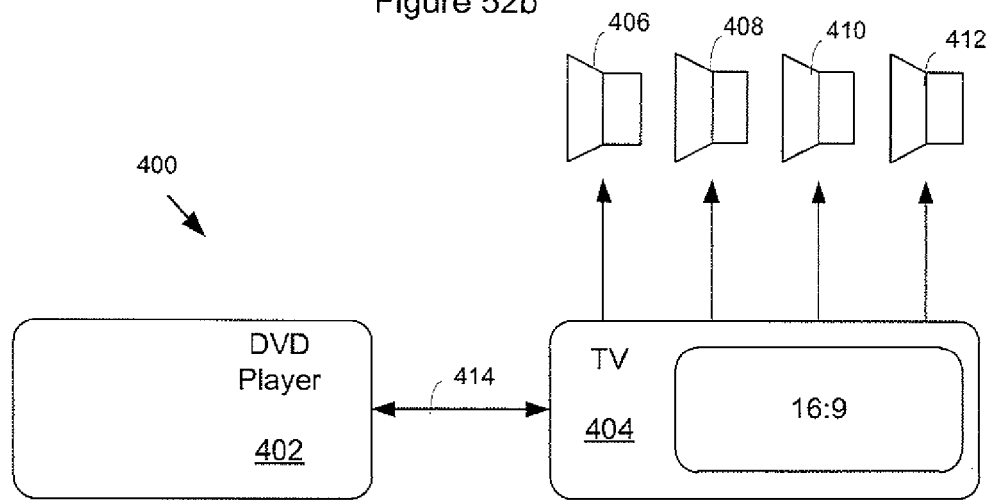
FIG. 52c shows an example embodiment of a home entertainment system that uses the unified bus communication protocol.

Referring now to FIG. 52c, shown therein is another example embodiment of a home entertainment system 400 that uses the unified bus communication protocol. The home entertainment system 400 comprises a DVD player 402, an HD TV set 404, speakers 406 to 412 and a bus 414. The bus 414 couples the DVD player 402 to the HD TV 404. The bus 414 can be implemented as a single wire, for example, in a standard digital cable. In this example, the DVD player 402 acts as a master device and the HD TV 404, along with four audio channels for the speakers 406 to 412, acts as a slave device.

Figure 52D:
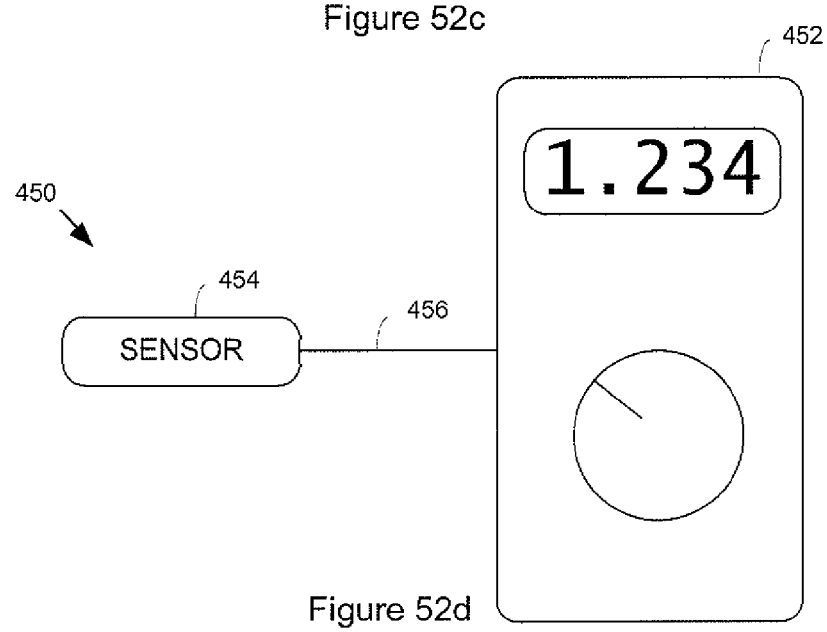
FIG. 52d shows an example embodiment of an instrumentation system that uses the unified bus communication protocol.

Referring now to FIG. 52d, shown therein is an example embodiment of an instrumentation system 450 that uses the unified bus communication protocol. The instrumentation system 450 comprises a multimeter 452, a sensor 454 and a bus 456 coupling these two elements. The bus 456 can be implemented as a single wire, for example, in a standard digital cable. In this example, the multimeter 452 acts as a master device and the sensor 454 acts as a slave device.

Figure 52E:
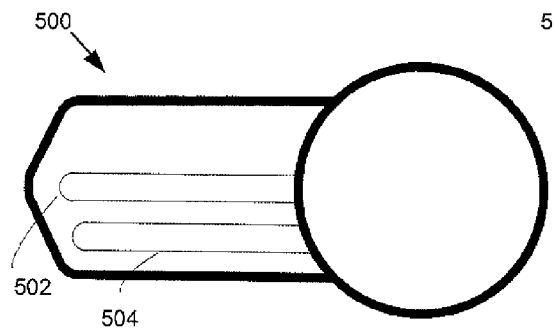
FIG. 52e shows an example embodiment of an electronic key that that can communicate using the unified bus communication protocol.

Referring now to FIG. 52e, shown therein is an example embodiment of an electronic key 500 that can communicate using the unified bus communication protocol. In this case, the electronic key 500 has two terminals 502 and 504 that can be connected to a bus (not shown) that uses the unified bus communication protocol so that an ID can be read from the electronic key 500. For higher mechanical robustness, the terminals can be implemented on opposite sides of the electronic key 500 in an alternative embodiment. The electronic key 500 acts as a slave device.

Figure 52F:
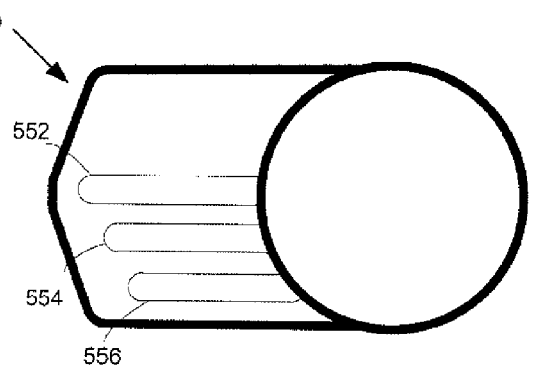
FIG. 52f shows an example embodiment of a memory stick that can communicate using the unified bus communication protocol.

Referring now to FIG. 52f, shown therein is an example embodiment of a memory stick 550 that can communicate using the unified bus communication protocol. The memory stick 550 has three terminals: a positive terminal 552, a negative terminal 554 and a data terminal 556. The data terminal 556 can be connected to a bus (not shown) that uses the unified bus communication protocol. The memory stick 550 acts as a slave device.

Figure 52G:
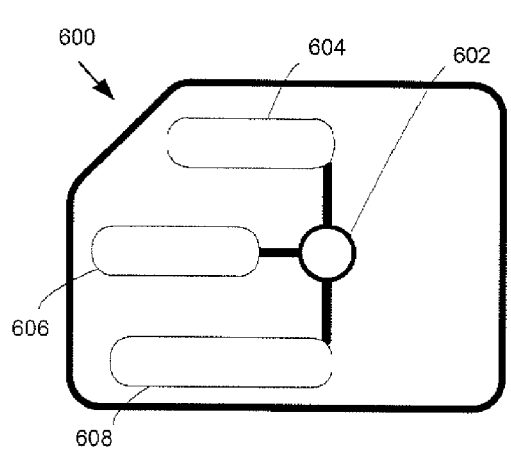
FIG. 52g shows an example embodiment of a Subscriber Identity Module (SIM) card that can communicate using the unified bus communication protocol.

Referring now to FIG. 52g, shown therein is an example embodiment of a Subscriber Identity Module (SIM) card 600 that can communicate using the unified bus communication protocol. The SIM card 600 has a chip 602 and terminals 604 to 608. The SIM card 600 can be implemented with two terminals if current consumption can be kept below a few mA. Alternatively, the SIM card 600 can be implemented using three terminals for higher power requirements, as is shown in FIG. 52g, in which case one of the terminals 604 to 608 is used for power and the other two of the terminals 604 to 608 are used to communicate information.

Figure 52H:
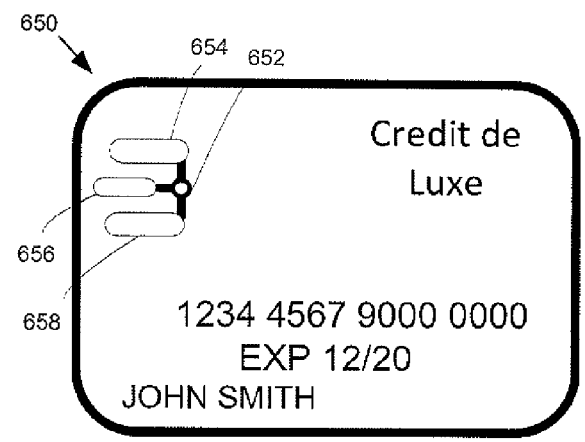
FIG. 52h shows an example embodiment of an encrypted credit card that can communicate using the unified bus communication protocol.

Referring now to FIG. 52h, shown therein is an example embodiment of an encrypted credit card 650 that can communicate using the unified bus communication protocol. The encrypted credit card 650 has a chip 652 and three terminals 654 to 658. The use of the unified bus communication protocol allows the encrypted credit card 350 to be implemented with fewer terminals. One of the terminals 654 to 658 may be used for power and the other two of the terminals 654 to 658 may be used to communicate information. If the power consumption of the credit card chip 652 is sufficiently low (say, below 3 mA), then the terminal used to transfer power may not be used and the single wire physical layer may be used instead.

In other embodiments, the unified bus communication protocol as described herein may be used for wireless communication. In one embodiment the credit card may include circuits based on induction for wireless transfer of information, e.g. using a carrier located at 13.8 MHz and the transfers are then handled by loading or not loading the RF field. The master device can then communicate with the slave device by varying the magnetic field, while the slave device may signal by a different loading of the field. A wireless version of the various embodiments of the unified bus communication protocol described herein can also be used for other applications.

Card readers are used to handle transactions and therefore data security is used to ensure against unauthorized copying and theft. One aspect of the unified bus communication protocol is enablement of a secure solution in these circumstances by use of encryption of the digitally transferred data. This would disable the possibility of copying an analog output signal from the card reader since the analog signals are not directly available and it is not possible to decrypt the digital encoded signals without the appropriate encryption key.

Figure 52I:
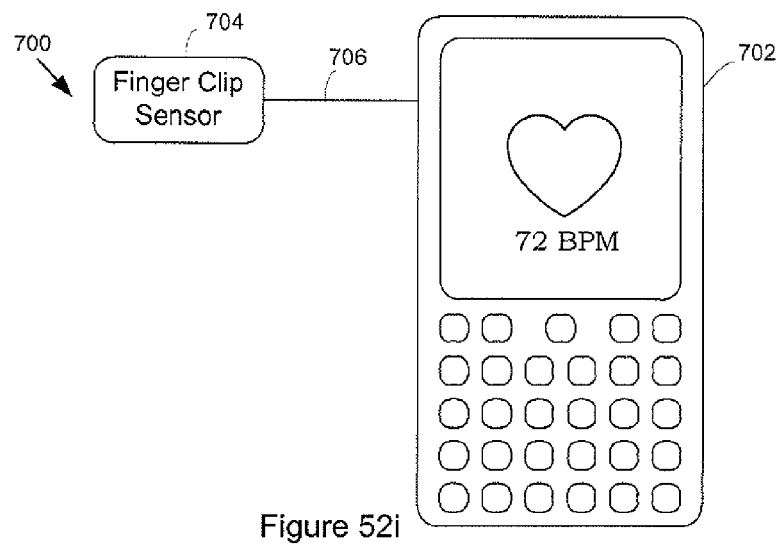
FIG. 52i shows an example embodiment of a heart rate monitor system that uses the unified bus communication protocol.

Referring now to FIG. 52i, shown therein is an example embodiment of a heart rate monitor system 700 that uses the unified bus communication protocol. The heart rate monitor system 700 comprises a monitoring device 702, a heart rate sensor 704, such as a finger clip sensor for example, and a bus 706 that couples them together. The bus 706 can be implemented using a single wire. In this example, the monitoring device 702 acts as a master device and the sensor 704 acts as a slave device. In one embodiment, the monitoring device 702 can be a smart phone that runs a specialized software application that calculates heart rate information based on information measured by the finger clip sensor 704. In an alternative embodiment, specialized hardware and firmware can be used to implement the monitoring device 702. In alternative embodiments, other types of sensors can be used to measure physiological information that is used to determine heart rate information.

Other examples of devices that can use the unified bus communication protocol include battery monitors, a headset with a display, a headset with multiple microphones for noise reduction, a headset with stereo recording capability, a headset that reports sensitivity and/or tuning, a headset with a fully digital interface, a low cost sensor interface and the like. In the case of a battery monitor, smart batteries typically have 3 terminals: a positive voltage terminal, a negative voltage terminal and a data line that allows the battery ID and other information to be read from the smart battery. Accordingly, the unified bus communication protocol can be used to communicate with the smart battery and monitor battery parameters such as temperature, for example.

Figure 53:
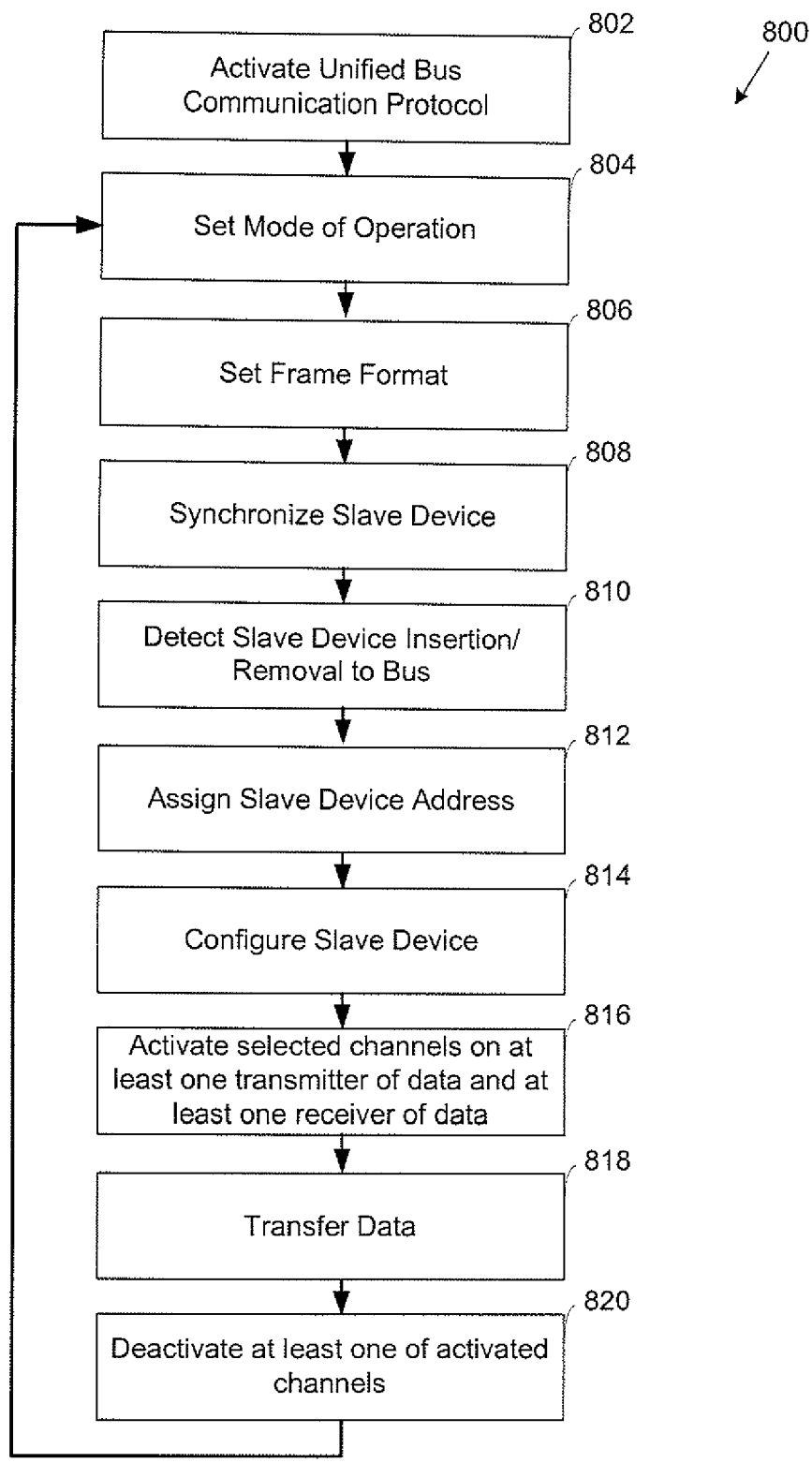
FIG. 53 shows an example embodiment of a method of operating a bus according to the unified bus communication protocol.

Referring now to FIG. 53, shown therein is an example embodiment of a method 800 of operating the bus 64 according to one or more embodiments of the unified bus communication protocol described herein.

At 802, the unified bus communication protocol is activated by the master device 52. This can occur after a power-on event, reset event or initiated by some other event after which a controller or state machine will begin to program the master device 52, for example. At 802, the various registers used by the master device 52 are initialized and set to the proper values so that it can communicate over the bus 64 using the unified bus communication protocol. This may be done by another device, such as a controller or the master device 52 can access these settings from memory, for example.

At 804, the mode of operation is configured. This mode of operation includes selecting various parameters for the frame format that is used for communication over the bus. For example, at this time, the master device 52 can choose between using word mode or bitstream mode.

At 806, the master device 52 can then configure the frame format that is used for the selected mode from one of the word frame format, the bitstream frame format or the unified bitstream frame format. At this time, in at least some embodiments, the master device 52 can also save different data modes of communication in various bank registers so that the master device 52 may seamlessly switch between the different data modes of communication during operation without causing glitches in the data transmission. The different data modes can specify various parameters for the selected frame format such as, but not limited to, a combination of one or more of the following: different sampling rates, different channel selections, different port selections, different allocations of frame channels for the various selected channels of a given port, different subgroups of port channels in the allocation of frame channels, different repetitions of port channels in the allocation of frame channels, and multiplexing of data from different channels into a common frame channel. In some embodiments, the master device 52 may enable a fast start up after a low power mode is completed by enabling a fast settling oscillator to better support UART devices.

At 808, slave devices that want to communicate over the bus 64 synchronize with the master device 52. This is done by a slave device by monitoring the activity on the bus 64 for the transmission of S word data. In word mode, the bits of the S words are transmitted consecutively on the bus 64. In bitstream mode, the bits of the S word are not transmitted consecutively, but rather are time multiplexed with bits from other frame channels. However, in both cases, in at least one embodiment, the slave device 54 recognizes the S words as well as determines the frame length and frame structure during the synchronization process. While the frame structure is recognized by the slave device 54 as part of the synchronization process, if there are times when the slave device 54 changes immediately from one frame format to another frame format without losing synchronization (i.e. lock) and thereby allowing immediate change of the frame format, a register inside the slave device 54 can be included to indicate what the next frame format will be. This information may be contained in the COMMAND SEPARATION register and can be programmed in the slave device 54 by the master device 52 after synchronization. In both word and bitstream modes, the slave device 54 attempts synchronization by monitoring the activity on the bus 64 to determine whether the bits of the S word are sent consecutively or are time multiplexed with other data bits.

In at least one embodiment, the slave device 54 monitors activity on the bus 64 by searching for the constant sync portion of a given S word, noting the dynamic sync portion of the S word, and calculating the dynamic sync portion of the next S word since the dynamic sync portion of the S word is produced using a deterministic method. In at least one embodiment, the deterministic method can be, but is not limited to, a CRC counter, for example. The CRC counter uses provisions so that the value zero is not typically encountered (in which case it would be stuck at zero). This can be done by gating for this value and setting the CRC counter to another value if the value of zero occurs. In another embodiment, the CRC word can be generated as the output from a binary counter with logic gates that are coded to generate the appropriate output patterns. In at least one embodiment, different constant portions can be used for the S word for word mode and bitstream mode. In at least one embodiment, a different constant portion can also be used for the S word when a unified bitstream frame format is used.

To make the synchronization process more robust, in at least one embodiment, the slave device 54 can search for a constant portion of an S word, note the dynamic portion of the S word and calculate the dynamic portion of the next S word several times. These three steps can be referred to as a synchronize check process. The more times this synchronize check process is repeated, the more robust the synchronization process will be as the slave device 54 is more likely to properly detect whether word mode or bitstream mode is being used and synchronize with the master device 52 rather than synchronizing to false synchronization patterns that are generated by other devices that are attached to the bus 64, such as a port for example. However, there is a trade-off between increasing the repetition of the synchronize check process and reducing the time for synchronization. Various methods to achieve synchronization are discussed in more detail later in this description.

At 810, the master device 52 detects whether slave devices have been inserted or removed, in other words, whether slave devices are attempting to connect with the bus 64 or are disconnecting from the bus 64. If the physical connection to the bus 64 from a device happens after the bus 64 has already started operation then this is referred to as hot insertion. This is possible with at least one of the unified bus communication protocols described herein as long as the slave device 52 either receives power before it is attached to the bus 64 or that it does not otherwise affect the bus 64, even when no power is applied. Furthermore the bus 64 allows a device to be physically removed even when the bus 64 is active and this is referred to as hot removal. In at least one embodiment, this can be performed by the master device 52 by issuing a PING command. After a PING command is issued, each slave device that has synchronized with the master device 52 and is locked onto the bus 64 can transmit its slave status by transmitting data in certain time slots when X and Y command words are transmitted over the bus 64 (see FIGS. 9a, 9b and 10 and the associated description for an example). The master device 52 can then read the values of the slave status fields in the X and Y command words to determine which slave devices are attempting to connect to the bus 62. In an embodiment, this can be determined when a slave device writes values of "01", "10" or "11" as the slave status. If a slave device disconnects from the bus, the address it had occupied becomes available and can either be used for another slave device or remain reserved for the same slave device, until it becomes synchronized with the master device 52 and the bus 64 again.

In at least one embodiment, an interrupt bit (IRQ) can be written to in a timeslot associated with an S word that notifies the master device 52 that one of the slave devices requires attention at which point the master device 52 can issue the PING command and determine the status of the slave devices that are attempting to connect to the bus 64. In at least one embodiment, the interrupt bit (IRQ) can be automatically issued if the status of a slave device changes in a certain manner.

At 812, the master device 52 assigns addresses to the slave device(s) that are attempting to connect to the bus 64 and have synchronized with the master device 52. In an embodiment, these slave devices will have a device address of zero and the master device 52 detects these slave devices by issuing a REQUEST ID function (see FIG. 11a and the associated description for an example). Slave devices that have not locked on to the bus 64 at this moment will not be activated and will not respond to the REQUEST ID function. Since multiple slave devices can have a device address of zero after a power-up event or a reset event, in at least one embodiment, the master device 52 can then perform the dynamic address allocation method described earlier in this description to assign different addresses to these slave devices. Accordingly, unlike other bus communication protocols, such as $I^2C$ for example, the default address of a slave device does not have to be fixed with the unified bus communication protocol. This enables the use of a relative (e.g. four bits) address space without having problems with device address collisions, which is often encountered in $I^2C$ (where 7 bits are used). In order to solve this problem, device manufacturers of $I^2C$ devices often include extra pins for alternative addresses; however this adds extra cost and space or makes programmed variants of the same chip, thereby leading to logistic problems. This can be avoided by using the dynamic address allocation method with the various embodiments of the unified bus communication protocol described herein.

At 814, the master device 52 configures the slave devices that have just synchronized and coupled with the bus 64 and have been given device addresses. This configuration can include a variety of operations such as port programming, and the assignment of time slots for data from selected data channels according to the selected frame format. In general, this configuration involves selecting data channels from at least one port of at least one of the synchronized slave devices for data transmission.

In at least one embodiment, the master device 52 instructs the slave device 54 on its port programming. This can include grouping together data channels that receive input data to a first port and grouping together data channels that transmit output data to a second port. In at least one embodiment, the grouping can also be done such that the channels of a given port have data that is sampled at the same frequency. The master device 52 can also assign numbers to the various ports that are defined for the slave device 54.

In at least one embodiment, even though several data channels can be assigned to a port, not all of the data channels may be used. Accordingly, the master device 52 can select a portion of the data channels of a port that will be active for data transmission or data reception. In at least one embodiment, this can be done using the CHANNEL SELECTION field (see FIG. 16 and the associated description for an example). For example, a port with 8 data channels can have the CHANNEL SELECTION field set to "00001100" in which case data channels 2 and 3 are selected to be active data channels (if data channel numbering starts at 7).

In at least one embodiment, the master device 52 then instructs the slave device where data is to be placed (i.e. which time slots are used) for the programmed ports based on the frame format that has been selected for use with the unified bus communication protocol. In at least one embodiment, a port is defined as to whether it will carry either bitstream or TDM data and different ports are used for different data format purposes.

In the case of word mode, the smallest distance between two command words can be specified, as well as the time slots in which data is first placed after a command word. In at least one embodiment, this can be specified by the START field. The data width of each data channel is also specified which can be done by using the LENGTH field in at least one embodiment.

In word mode, in at least one embodiment, it is possible to fine-tune the transfer of data, which is beneficial and efficient when multiple sample rates are used simultaneously for the different data channels for one or more ports of one or more slave devices. For example, in at least one embodiment, there can be gaps between the data for data channels in a subframe (see FIGS. 21 and 23 and the associated description for examples). In at least one embodiment, there can be various groupings of different data channels in a subframe (see FIGS. 21, 23 and 24 and the associated description for examples). In at least one embodiment, there can be a repetition of groupings of different data channels in a subframe (see FIGS. 21, 23 and 24 and the associated descriptions for examples). In at least one embodiment, only a single data channel may be repeated in a subframe. In at least one embodiment, these different configurations of data channels in a subframe can be achieved by using the REPEAT, SUBGROUP and SKIP fields. There can also be embodiments in which there can be various combinations of these features including at least two of these features are all of these features.

In word mode, it is also possible to support asynchronous data transfer efficiently. In at least one embodiment, this can be accomplished by adding two bits preceding data from a data channel in the first frame used for this data transmission. One of the bits may be used to indicate if a transmitting device has new data to transmit that is valid and one of the bits may be used to indicate if a receiving device has received the transmitted new data.

In word mode, in at least one embodiment, it may also be possible to support data flows that are of a fractional nature, such as when data sampled at 44.1 kHz are transferred over a 48 kHz path, for example. In at least one embodiment, fractional data flows can be supported by using a phase adder in the master device 52 and a bit located in the X command word to indicate data transfer over several frames.

In the case of bitstream mode, similar information can be specified as was done for word mode, although this is done slightly different due to the different frame format used in bitstream mode. For example, a distinction can be made between using a bitstream frame format and a unified bitstream frame format. In both cases, the smallest distance between two control bits can be specified, as well as the number of frame channels, the length of the frame channels, the allocation of data channels to the frame channels and the allocation of a frame channel as a control channel. The data width of each frame channel is one bit.

In the unified bitstream frame format, at least one frame channel is allocated as a virtual frame channel which is used to transmit digital word data one bit at a time. This allows for a common frame format that can support both bitstream data channels and word data channels at the same time. Accordingly, TDM signaling or TDM data transfer can be supported in bitstream mode. In an embodiment, this can be achieved by using the TDM WORDS TRANSFERRED IN BITSTREAM MODE field.

In at least one embodiment, at least one of the frame channels for both the bitstream frame format and the unified frame format can be allocated as a multiplexed frame channel in which bits from different data channels are multiplexed in a common frame channel, which can be referred to as the multiplexed frame channel (FIGS. 28c and 28d and the associated section of the description provide examples). This can be done when the data channels allocated to the different frame channels use different sampling rates, such that the data channels with lower sampling rates can be interlaced in a multiplexed frame channel (in the vertical direction of the multiplexed frame channel).

In at least one embodiment, for both the bitstream frame format and the unified frame format, the number of frame channels allocated to data channels can be varied to vary the bandwidth that is used by the control frame channel during data transmission and one or more data channels.

In at least one embodiment, for both the bitstream frame format and the unified frame format, it is possible to fine-tune the transfer of data, which is beneficial and efficient when multiple sample rates are used simultaneously for the channel data. For example, in at least one embodiment, there can be gaps between the frame channels that are allocated to data channels in a frame (see FIG. 28b and the associated description for an example). In at least one embodiment, there can be various groupings of frame channels that are allocated to different data channels in a frame (see FIGS. 26b and 28d and the associated description for examples). In at least one embodiment, there can be a repetition of the frame channels that are allocated to groups of different data channels in a frame (see FIGS. 26b and 28b and the associated descriptions for examples). In at least one embodiment, these different configurations and allocations of frame channels to data channels in a subframe can be achieved by using the HSTART, VSTART, HSPACING and VSPACING fields.

In at least one embodiment, it is possible to support asynchronous data transfer efficiently in bitstream mode in a similar fashion as was explained for word mode. This can be possible, if a channel/port was used that supported the fractional flow. For example, such a channel can be used to transfer 44.1 kHz×64 bitstream data in a 3.072 MHz channel Referring once again to FIG. 53, at 816, the selected data channels on at least one transmitter of data and at least one receiver of data are activated. In at least one embodiment, this can be done by writing to the ACTIVATE field (see FIG. 16 and the associated description for an example). The selected data channels can be one or more data channels from one or more ports of one or more slave devices.

At 818, data associated with the selected data channels are transferred over the bus 64. For selected data channels that are input data channels, data from these selected data channels are received from the corresponding slave device over the bus 64. For selected data channels that are output data channels, data for these selected data channels are sent to the corresponding slave device over the bus 64. In general, the data transfer at 818 includes transmitting data between at least two devices that are coupled to the bus 64 in which the transmitted data comprises at least one of numeric data, control data and clock data.

At 820, at least one of the selected data channels can be deactivated in cases where there data does not have to be sent to or received from a given selected data channel. In at least one embodiment, a selected channel can be deactivated by deactivating the ACTIVATE field of the corresponding port.

The method 800 can then go back to 804 where it can be determined whether the mode of operation or the frame format may have to be changed. For example, there can be instances in which the frame format is changed on the fly since some parameters of the data channels are changed such as sampling rate, for example. In other scenarios, the transmitters and receivers of data may vary. For example, in audio applications, in one scenario, audio data are directed to a headphone jack, while in another scenario they are directed to a receiver, a speaker or a combined receiver/speaker. In some scenarios gain changes may take place simultaneously in multiple devices in order to allow for some mixing situations such as changing from one signal source to another signal source gradually. At this point, the method 800 loops through acts 806 to 820. In an embodiment, this looping can be repeatedly done until the unified bus communication protocol is deactivated. For example, the loop can terminate if an external event closes down a particular application such as the audio section (e.g. the end of phone call) in which case the devices would be set to low power mode, and the clock set to idle (e.g. MCLKD=0000).

In at least one embodiment, various registers of the master device 52 can be configured as was explained for the slave devices in method 800.

At least one embodiment of the unified bus communication protocol described herein provides common interface support for at least one of the following: bitstream data, digital word data (e.g. for connecting to I²S or SPDIF), TDM data and control data, as well as I²C and I²S capability. Accordingly, the various embodiments of the unified bus communication protocol described herein can be used as a digital hub between various standard interfaces or in some cases at least one embodiment of the unified bus communication protocol described herein can be used to replace at least one of the SLIMbus, McBSP, McPDM and MISO bus communication protocols.

The ability to handle control data with bitstream data, as is done in at least one embodiment of the unified bus communication protocol described herein, is beneficial since a standard method for the transfer of control information for bitstream data has not yet been agreed on with conventional bitstream bus communication protocols. Furthermore, the conventional control methods result in disturbances to audio data that sound like clicks in some cases. Furthermore, conventional bitstream interfaces require more terminals when more than two bitstream data channels are transmitted over a bus. Conventionally, this can either be accomplished by adding more data lines (each data line would increase the number of channels by two) or by adding a dedicated frame sync terminal and multiplex the bitstream channels, e.g. as implemented in the McPDM interface. However, this is not the case with the unified bus communication protocol since multiplexed bitstream frame channels can be used for handling data for multiple bitstream data channels and no extra terminals are used for synchronization.

An aspect of at least one embodiment of the unified bus communication protocol described herein is the support of isochronous transfer of bitstream data with low latency simultaneously with control data as well as support for asynchronous data streams. For example, the low latency that is achieved in the bitstream mode allows for a variety of applications including beamforming, active noise cancellation, proximity sensing, leakage compensation, general control operations or other low latency applications.

It should also be noted that in at least one embodiment of the unified bus communication protocol described herein, there can be at least one slave device that does not support all features of the protocol. This is dealt with by the unified bus communication protocol by not requiring slave devices to carry out functions that they do not support.

An aspect of at least one embodiment of the unified bus communication protocol described herein is the use of gated clocks in slave devices that enables support for multiple bitstream data channels without increasing internal power consumption (i.e. power consumption independent of the number of channels). In this case, the slave devices can disable their internal clocks except when command data is available and when the slave devices input or output data to a dedicated space that is allocated for it. This means that even if the number of bitstreams increases, the internal clocking frequency will be the same and may be a small value that can support this particular frame structure. A part of a slave device that may have to run at the full system clock would be the small part of the slave device that checks for bitstream synchronization. However, the external switching losses would increase with a higher system clock.

An aspect of at least one embodiment of the unified bus communication protocol described herein is support for a broad class of frame structures for at least one of more efficient data packing, better clock support and more flexibility with respect to bandwidth. For example, a word frame format, a bitstream frame format or a unified frame format can be used depending on the application and the type of data being handled. In at least some embodiments, in the bitstream frame format and the unified frame format, bitstream data channels can be combined in various ways in a frame channel for better data transmission and bandwidth efficiency. In at least some embodiments, the unified bitstream format can be used to transmit word data channels with bitstream data channels for better data transmission and bandwidth efficiency. In at least some embodiments, in the bitstream mode, data from various channels can be combined in a variety of ways such as being grouped together and repeated to improve data transmission and bandwidth efficiency.

An aspect of at least one embodiment of the unified bus communication protocol described herein is the support of an instantaneous change (e.g. on the fly change) between two frame formats (i.e. data modes) since the protocol can allow for the preparation of the slave device in advance of this change which will avoid glitches in the data. This can be accomplished by using more than one register to keep track of the various data modes. For instance two different data modes can use different clock frequencies or frame formats.

An aspect of at least one embodiment of the unified bus communication protocol described herein is the support of hot insertion and hot removal of slave devices to the bus 64 without using a handshaking process. A slave device can be attached to the bus 64 after the bus 64 has commenced operation. The bus 64 will not crash in this case and the master device 52 will receive a notification from the slave device that it is present at address zero and needs attention in order to connect to the bus 64 and synchronize to the master device 52. Similarly, a slave device can be physically removed from the bus 64 without prior notification to the master device 52. The slave device can change its status level to indicate it is disconnecting from the bus 64 and the change in status level will then be communicated to the master device 52.

An aspect of at least one embodiment of the unified bus communication protocol described herein is the provision or error handling for internal or external errors by implementing at least one of the following features. For example, the slave status can be continuously monitored to detect a loss of synchronization or another problem, e.g. by monitoring for urgent requests from a slave device, which can be signified in a bit of the S word in at least one embodiment. Another feature that may be supported is all READ, WRITE and FUNCTION operations can include a parity check. Another feature that may be supported is that all READ, WRITE and FUNCTION operations can include an acknowledgement from the device receiving data and/or instructions for the operation to confirm that the operation occurred without any errors. Another feature that may be supported is the discovery of a device that is connected to the bus crashing or inadvertently writing in an illegal data slot which can be detected by checking various register bits as described herein. For example, in some errors, slave devices will back off by themselves and the bus 64 will restart within a few frames (e.g. self-healing error handling). Therefore, unlike the I$^2$C bus communication protocol, the bus 64 cannot crash indefinitely with the unified bus communication protocol.

The next section of this detailed description will now discuss the topic of synchronizing a slave device to a master device or to a bus that communicates according to the unified bus communication protocol, a word frame format, or a bitstream frame format.

In several conventional bus communication protocols, the frame length of the frame format that is used to transmit data on the bus is fixed and stays at the same value in order to facilitate synchronization. For example, the SPDIF/TOSLINK, AC-97 and SLIMbus bus communication protocols all use a fixed frame length. Therefore, when transmitting audio data over a limited number of wires using these protocols a fixed frame length is used making it difficult to efficiently support particular clock frequencies and sampling rates. Operation at these particular clock frequencies and sampling rates therefore results in increased power consumption and increased bandwidth consumption. For example, the SLIMbus protocol has limited ability to efficiently support a frequency of 19.2 MHz which is a standard frequency that is used in telecommunication applications. Furthermore, it is difficult to use a fixed frame length and transmit any data over the bus that does not fit into the frame format asynchronously. This scenario would involve extra bandwidth, extra buffers and extra power consumption. It may be possible to use an asynchronous sample rate in some instances, but this requires extra silicon area and power consumption and results in reduced audio quality for audio applications.

There are some conventional bus communication protocols that use a variable frame length for the frame format, such as I$^2$S, McBSP, McPDM and similar protocols. However, these protocols require the use of a separate wire or bus line for the bus in order to transmit a frame sync signal for synchronization purposes. This requires extra hardware cost and extra space and can only be used in those situations where it is possible to add an extra wire. Furthermore, they are not suited for data transmission over wireless media or two power terminals such as in the case of a charger, for example.

In some cases, a possible solution is to use a special well-defined start-up sequence, where all slave devices are connected to the bus at startup in order to receive frame length and frame format information so that they can communicate over the bus. However, this conventional scheme is not compatible with slave devices that can be dynamically connected to and dynamically disconnected from the bus, which is also referred to as the hot-plug-in of devices (i.e. a slave device connects to the bus at a later time after the bus has been activated) and the hot-removal of devices (i.e. a slave device disconnects from the bus before the bus is deactivated). Also, in the case of slave device failure or bus failure, with this conventional scheme, there is no way for the slave device to re-synchronize with the bus again, unless the bus is deactivated and then reactivated in order to run through the special start-up sequence. Finally, ring-based bus structures are prone to total failure for all devices following a single device that fails and with ring-based structures, all devices are attached before the bus is started.

In addition, there are no conventional bus synchronization algorithms that can synchronize to multiplexed bitstream sequences, when the frame synchronization signal has been imbedded in the bitstream data for cost, space and power reasons. Multiplexed bitstreams are useful for active noise cancellation, beamforming and low latency applications while reducing the number of wires or lines that are used for the bus. The only conventional solution is to add extra wires for a frame sync signal, which increases cost, area and power consumption. In addition to this, these conventional methods require additional wires for reset, control and device supervision as well as supporting logic. The issue of synchronization, while reducing the number of lines used for the bus, becomes an even more complicated problem when a multiformat or unified bus communication protocol is being used, where both the frame length and the frame format itself can vary during operation and these parameters are unknown at the beginning of the synchronization process.

Various example embodiments will now be described of universal synchronization methods that can be used to synchronize slave devices to the bus 64 when a unified bus communication protocol, as described herein, is used in which the frame length, frame format and frame type can vary during operation and is unknown at the beginning of the synchronization process. For example, the frame format could be a word frame format (i.e. in word mode), a bitstream frame format or a unified bitstream frame format (i.e. both in bitstream mode). In another aspect, at least one of the various example embodiments of the universal synchronization methods described herein supports the reduction of bus lines or wires that are used for the bus. Other aspects will become apparent during the description of the various example embodiments of the universal synchronization methods herein.

In general, the various example embodiments of the universal synchronization methods described herein involve searching for at least one synchronization pattern in the transmitted data on the bus 64. Once the slave device 54 has found the synchronization pattern, it communicates on the bus 64 with the master device 52 and is then configured for operation according to the frame format and mode of operation that is being used by the unified bus communication protocol. There are various alternatives for finding the synchronization pattern, as is described in more detail below. In at least some cases, the various example embodiments of the universal synchronization methods can be implemented by a sync engine of the slave device 54. As previously described, the sync engine can be implemented using a processor, a state machine or other dedicated circuitry, depending on whichever is more suitable for the particular application at hand.

In at least one embodiment of the universal synchronization methods described herein, searching for the synchronization pattern comprises searching for a constant synchronization symbol or the constant sync portion of an S word. The bits of the synchronization pattern may be transmitted in a consecutive fashion over the bus 64, as in word mode, or may be transmitted one bit at a time while being multiplexed or interlaced with other data bits, as in bitstream mode.

In at least one embodiment of the universal synchronization methods described herein, one of the two modes of operation can be assumed, such as word mode, before searching for the synchronization pattern. If the synchronization pattern is not located within a maximum allowed length of a frame then the other mode of operation may be assumed and the synchronization pattern is searched for once again. If the synchronization pattern is not located then the other mode of operation may be assumed once more and the synchronization pattern is searched for again. This process of alternating back and forth between the different modes can be done until synchronization (i.e. lock) is achieved. This switching between searching based on the different modes results in a more robust search process as will be described in more detail below.

It should be noted that, as used herein and according to context, the operation "assume" or "assuming" does not mean adopting a frame of mind, as a human being might do. Rather, the operation "assuming" may refer to operating or behaving, or trying or attempting to operate or behave, as a machine may do. Phrases such as "assuming a mode of operation", for example, may refer to operating or behaving according to a protocol or convention or standard or method of operation, without necessarily first verifying or validating a particular fact or functionality or any other condition that may be relevant to that operation or behaviour. In this context, "assuming a first mode of operation" may be thought of colloquially as operating as though the first mode of operation is valid, functional and a good way to achieve a result, which may turn out in practice not to be correct. Accordingly, when a particular act of a method is described as assuming a particular value for a particular parameter or assuming a particular condition, it generally means that an initial value for the particular parameter or the particular condition is selected as being valid. Depending on the particular embodiment, this selected value may then be checked to see if it is correct, and if not, then another action may be taken, such as selecting another value, for example.

In at least one embodiment of the universal synchronization methods described herein, a parallel implementation can be used where one implementation assumes the mode of operation is word mode and the other implementation assumes the mode of operation is bitstream mode. The implementations then search for the synchronization pattern at the same time under the assumed mode of operation until synchronization is achieved. In this case, when the synchronization pattern is not located for a given implementation, the same mode may be assumed and the search is carried out again. Again, this results in a more robust search process as will be described in more detail below.

In at least one embodiment of the universal synchronization methods described herein, once a first instance of the synchronization pattern has been located, a new search will be made for the next instance of the synchronization pattern in order to determine the frame length that is being used. In some embodiments, this may be done several times to verify that the determined frame length is correct. Once the frame length is determined, subsequent searches will search for the synchronization pattern using the determined frame length. It should be noted that, in at least one embodiment, synchronization patterns can be transmitted during every frame of data on the bus 64.

In at least one embodiment of the universal synchronization methods described herein, in order to reduce the chance of false synchronization between the master device 52 and the slave device 54, the synchronization pattern can have a constant sync portion and a dynamic sync portion. A deterministic method can be used to generate the dynamic sync portion such that the dynamic sync portion will be different between two consecutive synchronization patterns such as between the dynamic portions of two consecutive S words that are transmitted on the bus 64. The first time that the constant sync portion is located, the corresponding current dynamic sync portion (i.e. current dynamic sync portion) is read. The deterministic method is then used to calculate the next expected dynamic sync portion based on the current dynamic sync portion. The next time that the constant sync portion is located, the corresponding dynamic sync portion is read and compared to the next expected dynamic sync portion that was calculated to verify that a true synchronization pattern was located as supposed to a false synchronization pattern. Since the probability of false synchronization patterns matching both a constant sync portion and a dynamic sync portion is lower than just searching for a constant sync portion, most false synchronization patterns will be ignored in this case. This search process may be repeated one or more times to further reduce the chance of false synchronization (i.e. identifying a pattern as a valid synchronization pattern when in fact it is not) and to correctly determine the frame length, which also increases the robustness of the universal synchronization method. In at least some embodiments, the deterministic method that is used to generate the dynamic sync portions may be a Cyclic Redundancy Check (CRC) counter or generator.

In at least one embodiment, a random quantity based on bus traffic from the bus or obtained from some other source may be used to make a decision during the synchronization process. During the initial synchronization, it is not known whether the first data on the bus that matches the sync symbol pattern is truly the start of a frame. Therefore, when the CRC check fails, it is not known whether it is the first match or the second match of the constant sync portion that represents the start of a frame, or if neither of these matches represents the start of a frame. In order to reduce this ambiguity, a random component may be used during the initial synchronization process to randomly try different start positions to help reduce the chance that a situation occurs where the synchronization method continuously switches between a false sync pattern and a true sync pattern and has trouble achieving synchronization (i.e. lock). This may occur, for example, if there are one or more channels that have data traffic that matches the constant sync portion all the time.

In at least one embodiment of the universal synchronization methods described herein, to further reduce the chance of synchronizing to a false synchronization pattern, once synchronization has been achieved or late in the synchronization process (i.e. after several true synchronization patterns have been found), the determined frame length can be used to search for other synchronization patterns. Since the distance between consecutive synchronization patterns is the determined frame length minus the length of the synchronization pattern, synchronization patterns found at less than this distance can be considered to be false synchronization patterns and eliminated.

In at least one embodiment of the universal synchronization methods described herein, a random component may be used in the search for synchronization patterns in order to improve the chances of synchronization under conditions of static data bus traffic that matches the constant synchronization symbols that are used. The use of a random component is beneficial if synchronization errors occur due to random bus traffic that closely matches the synchronization pattern that is being searched for.

In at least one embodiment of the synchronization methods described herein, the random component of the universal synchronization method may include reading the parity of the bus traffic for a certain period of time and using the parity information to aid in determining whether the currently located synchronization pattern is a valid/true synchronization pattern or a false synchronization pattern. The parity information can be random as long as there is a physical sensor, such as a microphone, a temperature sensor, a pressure sensor, and the like, that is connected to and providing data to the bus 64. In other embodiments, a CRC generator utilizing input from the bus traffic and past history of operation of the CRC generator may be used to generate a random component. For example, in at least one embodiment, an adder with a finite word size that utilizes overflow wrapping (e.g. a simple binary counter) can be used to add the number of ones or zeros from the bus traffic, thereby generating a random component from the bus traffic. In other embodiments, a general function generator, based on the past history of the bus traffic, contents inside the function generator and the use of one or more mathematical operators may be used to generate a random component. The random component obtained from each of these various methods may be used to avoid getting stuck in a situation, where the synchronization method continuously switches between valid and invalid sync positions (i.e. sync patterns) because it is not initially known where the beginning of a frame is at the beginning of the synchronization process. In other embodiments, the bus may be started in a known state, where false sync patterns are not present, but this embodiment will not allow another device to obtain synchronization after the bus has started. Therefore, with this scheme, the bus will need to restart if a new device attempts to connect to the bus. Accordingly, if this solution is chosen, hot plug-in without any audio disturbances is not possible.

In addition to checking that there is a match for the dynamic sync portions in addition to a match of two constant sync portions, in at least some embodiments it is also possible to check if the distance between two constant sync patterns remains constant. This is true for a valid frame format. Therefore, it is possible to check that the distance between two synchronization patterns with valid dynamic sync portions also have a constant distance (in number of bits between, for example, the start or end of the two synchronization patterns). In order to perform such a check, at least three valid constant sync portions are located in order to be able to calculate two distances that can then be compared.

In an least one embodiment of the synchronization methods described herein, the random component can be used when the constant sync portion has been located but there are one or more errors, such as the current frame length determined based on the synchronization pattern that was just found is not the same as the previous frame length that was determined based on a previously located synchronization pattern. This extra information can be used to discard invalid sync positions.

In at least one embodiment of the universal synchronization methods described herein, the portions of the universal synchronization method that search for synchronization patterns in bitstream mode can utilize clock gating in order to skip data from channels in which the bits of the synchronization pattern are assumed not to exist (e.g. ignore every second bit if lock has already been achieved using information from only every second bit). One benefit of using clock gating is that it will allow for a reduction in power consumption thereby making the synchronization method more energy efficient since some frame channels are not processed since they are assumed not to have the bits of the synchronization pattern. Another benefit of using clock gating is that a common search structure can be used to search for the synchronization pattern under both word and bitstream modes of operation because clock gating in essence allows bitstream frame data to be processed in a similar fashion as word data, as will be explained in further detail below.

In general, the various universal synchronization methods described herein will employ an upper limit in order to reduce the time to synchronization. For example, when assuming the bus 64 is operating in word mode and searching for the synchronization pattern, an upper limit can be placed on the frame length. Accordingly, if the number of bits that are searched to locate the synchronization pattern is larger than the maximum defined frame length and the synchronization pattern has not been found then the search may switch to bitstream mode, where the synchronization engine assumes that the sync symbol patterns have been multiplexed with other information and will search for the correct channel position, the position within a channel and the number of channels in order to achieve synchronization. Alternatively, in at least one other embodiment, the search method may try one or more times again in word mode before switching to bitstream mode.

In at least one embodiment, when assuming the bus is operating in bitstream mode, an upper limit can be placed on the number of frame channels in the frame format when searching for the synchronization pattern. For instance, if the maximum number of frame channels is assumed to be Amax, then the search time for the synchronization methods described herein is approximately proportional to $Amax^3$. It has been found that setting Amax to 16 or less results in an acceptable amount of time to obtain synchronization. However, it may be possible to use higher values of Amax under conditions of higher clock frequencies, higher processing power or both in which the time to obtain synchronization is acceptable. If synchronization has not been obtained after trying all possible number of bitstream channels and synchronization positions within each of these channels, the synchronization method may switch back to word mode again and start the search process all over again. This could be beneficial, if a slave device is attached to the bus before a master device has attached to the bus and the slave device is receiving a clock signal but not any synchronization patterns since the master device is not yet ready to transmit synchronization patterns or the master device is idle due to some malfunction or for power saving reasons.

In at least one embodiment of the various synchronization methods described herein, if the slave device 54 gets out of lock (i.e. falls out of synchronization) with the master device 52, for example, due to a glitch on the clock signal, the slave device 54 can try to regain synchronization assuming the previously determined frame length and the same frame format in order to avoid a full, longer synchronization search. If this is not successful, the slave device 54 can reattempt synchronization several times using this same assumption. If this is still not successful, then the slave device 54 can assume that the master device 52 has switched to using a different frame format or mode of operation for communication on the bus 64 and the full synchronization search can then be used to enable the slave device to become synchronized with the master device.

It should be noted that in alternative embodiments, the steps of the various example embodiments of the universal synchronization methods described herein may be implemented in a different order. For example, rather than first assuming word mode and carrying out the search for the synchronization pattern, bitstream mode may be first assumed.

A benefit of at least one of the various synchronization methods described herein is that synchronization can be achieved quite quickly, such as in approximately 60 milliseconds or less in some cases assuming a 6 MHz clock rate. The average time-to-lock time may be much faster than this value. In some embodiments, not all combinations of number of channels and frame lengths are allowed in order to decrease the search time.

In an aspect, a benefit of at least one of the various example embodiments of the universal synchronization methods described herein is support for the hot plug-in and hot removal of slave devices to the bus 64 during operation. Accordingly, the slave device 54 can determine the frame format and mode of operation by itself and tell the master device 52 that it is attached and ready to communicate according to the bus communication protocol. This can involve the slave device 54 determining the mode of operation, the frame format, the subframe length and the starting position of a frame.

In an aspect, a benefit of at least one of the various example embodiments of the universal synchronization methods described herein is that the slave device 54 can synchronize with the bus 64 and communicate according to the bus communication protocol regardless of the condition that the slave device 54 starts in or the initial or later conditions of the bus 64 as long as the hardware representing the slave device 54, the bus 64 and the physical link between these system components is not physically broken. This provides increased robustness for synchronization in the case of noise occurring on the bus and in the case of devices malfunctioning due to random events such as alpha-particles changing internal register states or other changes of internal states that are beyond the control of the device itself. Furthermore, if a device breaks down due a poor implementation, it is still possible to get access to this device after this breakdown, since the internal synchronization engine will ensure the device backs off from the bus 64 after errors (either due to lack of synchronization or due to repeated bus collisions) and will then try to get back in synchronization again. The fact that the slave device 54 can attach to bus 64 itself without help from the master device 52 makes the system more robust.

In an aspect, a benefit of at least one of the various example embodiments of the universal synchronization methods described herein is that frame format parameters and/or the mode of operation can be changed during the operation of the bus and the slave device 54 can still achieve synchronization if it has not yet attached to the bus 64.

In the following descriptions of various embodiments of universal synchronization methods, it should be understood that the synchronization patterns that are described may be the S word, the sync constant (also known as a constant sync portion) may be the data in the CONSTANT SYNC SYMBOL field of an S word and the dynamic sync portion may be the data in the DYNAMIC SYNC SYMBOL field of an S word. Alternatively, there may be embodiments in which the synchronization pattern may comprise data from the CONSTANT SYNC SYMBOL field, data from the DYNAMIC SYNC SYMBOL field or a combination of data from the CONSTANT SYNC SYMBOL field and the DYNAMIC SYNC SYMBOL field. In other embodiments the constant sync symbol or the dynamic sync symbol could be used alone or in other combinations, e.g. used more than once within a frame, for synchronization purposes.

It should be noted that synchronization can be achieved in a number of different ways, and the embodiments that will now be described can be implemented with a low gate count. Alternatively, faster synchronization schemes can be implemented by using a higher gate count.

Figure 54:
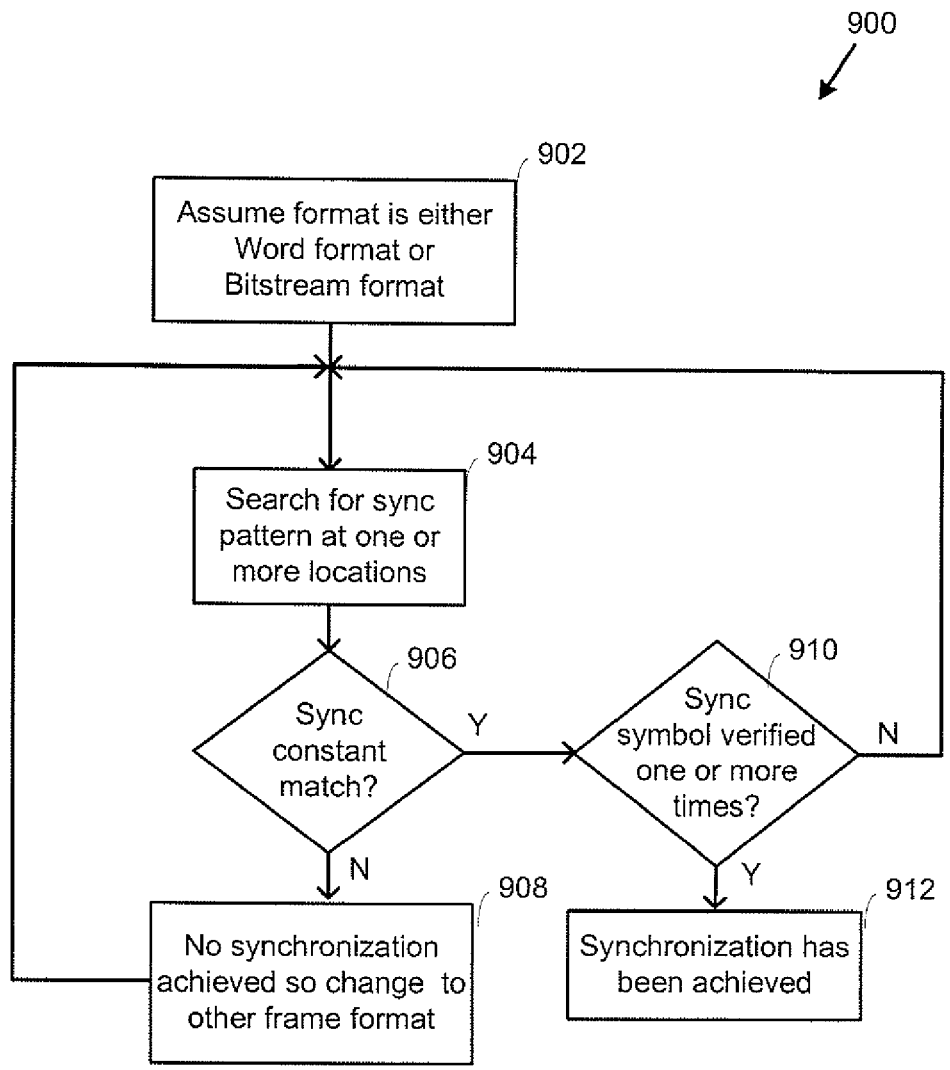
FIG. 54 is a diagram of an example embodiment of a universal synchronization method.

Referring now to FIG. 54, shown therein is a diagram of an example embodiment of a universal synchronization method 900. One of the aspects of the universal synchronization method 900 is the ability for the slave device 54 to synchronize to the master device 52 after the bus 64 has been activated regardless of the mode of operation and the frame format being used for the unified bus communication protocol that is used to communicate over the bus 64.

At 902, the method 900 assumes a first mode of operation for the unified bus communication protocol. Therefore, the method 900 assumes that the correct mode of operation is either word format or bitstream format and then proceeds to locate the synchronization patterns based on this assumption. In this example, the method 900 first assumes word mode of operation.

At 904, the method 900 searches for the synchronization pattern at one or more locations in the transmitted data over the bus 64 according to the first mode of operation. If the synchronization pattern comprises a constant sync portion and a dynamic sync portion, then act 904 comprises searching for the constant sync portion. In at least one embodiment, the constant sync portion may be different for the first and second modes of operation. Alternatively, in another embodiment, if the synchronization pattern comprises a fixed portion and a dynamic portion, then act 904 comprises searching for the dynamic sync portion.

Alternatively, in at least one embodiment, the method 900 can search for the entire synchronization pattern regardless of whether the synchronization pattern comprises a constant sync portion as long as the dynamic sync portion can be determined by a deterministic method. In at least one embodiment, the dynamic sync portion can be generated by a deterministic method such that the dynamic sync portions of two consecutive synchronization patterns are different but determinable. In at least one embodiment, the deterministic method may employ a CRC generator or one of the variations described previously.

In at least one embodiment, there can be several synchronization patterns that are used and act 904 can comprise searching for one of these synchronization patterns by comparing the transmitted data with each of these synchronization patterns.

In at least one embodiment, the different synchronization patterns can occur in a defined order and the method 900 can search for the different synchronization patterns using the defined order.

At 904, when word mode is assumed, the method 900 comprises picking a certain time slot for the transmitted data as the starting time slot of the synchronization pattern. The transmitted data from the starting time slot to an ending time slot such that the length is the same length as the synchronization pattern that is being searched for is then read from the bus traffic and compared to the synchronization pattern that is being searched for. In this example embodiment, the synchronization pattern being searched for is the constant sync portion. In other alternative embodiments, different lengths of data can be read and compared to different portions of the synchronization pattern, including the entire synchronization pattern, only the dynamic sync portion or both the constant sync portion and the dynamic sync portion. If there is no match, then the starting time slot can be advanced by 1 time slot and the process repeated. In a parallel implementation, it may be possible to pick several starting time slots, read the data from the bus traffic and compare the read data to a portion or the entirety of the synchronization pattern (as just explained) in parallel.

At 904, when bitstream mode is assumed, the method 900 comprises picking a certain time slot for the transmitted data as the starting time slot of the synchronization pattern. Next the number of bitstream frame channels is assumed. A frame length can then be calculated based on the assumed number of bitstream frame channels and the length of data for each frame channel. For example, using the bitstream frame formats described previously in which the control frame channel comprises an S word, followed by an X word and a Y word where each word is 16 bits, the length of data for each frame channel is 48 bits and the frame length is calculated as 48*(number of assumed bitstream frame channels) in bits. In some embodiments, there may be some spacing between the S, X and Y words. A maximum number of bitstream frame channels is defined and the search comprises searching through the transmitted data iteratively. This is done by first assuming a certain number of channels that are multiplexed. Then it is possible to search through each of these channels in all valid positions until a valid synchronization pattern has been obtained or not. If no synchronization pattern has been found, the next channel will be tried, and if all channels have been tried, the number of channels that have been assumed to be multiplexed will be increased and the same procedure repeated. This process may be continued until the maximum number of channels defined for the bus 64 has been exceeded in which case the process may either start over or start again in word mode. This search may begin by assuming 1 bitstream frame channel. It should be noted that in this portion of the description, the term bitstream frame channel is meant to cover or include control frame channels, bitstream frame channels, virtual frame channels and multiplexed frame channels.

For example, assuming that the maximum number of bitstream frame channels is 3, the search begins by assuming that there is 1 bitstream frame channel which would be the case where the frame only comprises a frame control channel with no data (unless spacing between the control words is also allowed). In this case, the bits of the synchronization pattern occurs every bit. Assuming the S word, X word and Y word scheme described previously, the bits transmitted for a frame in this case should comprise S word bit 15, S word bit 14, ..., S word bit 0, X word bit 15, X word bit 14, ..., X word bit 0, Y word bit 15, Y word bit 14, ..., and Y word bit 0 (it should be noted that the number of control words, the number of bits and the ordering of these bits and words may vary in alternative embodiments). Beginning at the starting time slot position, the next M transmitted data bits are read to determine if they match the synchronization pattern, where M is the number of bits in the synchronization pattern being searched for. If there is no match, then the starting time slot position is moved one position forward, the initial very first bit is discarded, the next transmitted bit is read and the M-bit comparison is repeated again. If there is no match, this process of moving the starting time slot position and performing the comparison is repeated until the synchronization pattern is located or the maximum frame channel length is reached. If the synchronization pattern has not been found, then this search process is repeated assuming there are two bitstream frame channels. It should be noted that the search process for one bitstream frame channel is the same as the searching that is done under word mode. In alternative parallel embodiments, a FIFO structure can be used to read and step through the transmitted data that is used for the comparison with the synchronization pattern, though normally a serial shift register may be used for the comparisons.

Now assuming that there are 2 bitstream frame channels in the frame format, the method 900 searches every two bits of the transmitted data since in this case, the bits of the synchronization pattern occur every two bits or every two time slots. Assuming the S word, X word and Y word scheme described previously, the bits transmitted for a frame in this case should comprise S word bit 15, data channel 1 bit 0, S word bit 14, data channel 1 bit 1, ..., Y word bit 0, and data channel 1 bit 47. Once again, beginning at the starting time slot position, the next M transmitted data bits (that are separated by 1 bit each) are read to determine if they match the synchronization pattern. If there is no match, then the starting time slot position is moved two positions forward, the next M transmitted data bits are read and the comparison is repeated. This can be done elegantly in hardware, if the algorithm used to find a match in word mode is reused, but this time is clock-gated (or clock enabled) so that it is only active every second bit. This way, the skipping of every second bit is equivalent to searching in the next position and adding a clock gating for every second position. This is equivalent to skipping two bits. Therefore, a simple and unified algorithm can be made, where the number of channels is assumed to be N and one skips N−1 channels by disabling the clock in these positions and the next bit to be investigated is the bit that is N positions after the last position that was investigated. If there is no match, this process of moving the starting time slot position and performing the comparison is repeated until the synchronization pattern is located or the maximum frame length is reached. The maximum frame length is the maximum channel length multiplied by the assumed number of bitstream frame channels. If the synchronization pattern has not been found, then this search process is repeated still assuming that there are two bitstream frame channels but delaying the start position by only 1 bit. This delay can be made by skipping a single clock cycle and thereby moving all searches to the next frame channel. The just described search process is repeated until the synchronization pattern has been found or the maximum frame channel length is reached. If the synchronization pattern has not been found, then this search process is repeated assuming that there are three bitstream frame channels.

Now assuming that there are 3 bitstream frame channels in the frame format, the method 900 searches every third bit of the transmitted data since in this case, the bits of the synchronization pattern occur every three bits or every three time slots. Assuming the S word, X word and Y word scheme described previously, the bits transmitted for a frame in this case should comprise S word bit 15, data channel 1 bit 0, data channel 2 bit 1, S word bit 14, data channel 1 bit 1, data channel 2 bit 1, ..., Y word bit 0, data channel 1 bit 47 and data channel 2 bit 47. Once again, beginning at the starting time slot position, the next M transmitted data bits (that are separated by two bits each or the number of assumed bitstream frame channels minus 1) are read to determine if they match the synchronization pattern. If there is no match, then the starting time slot position is moved three positions forward (or the number of assumed bitstream frame channels forward). In order to move forward in this case, in at least one embodiment, the clock signal to a word mode search algorithm may typically be disabled or gated for two clock periods, thereby making the next clock period equal to the next bit (thereby reusing the same algorithm). The first transmitted bit is then discarded, the next transmitted data bit is then read and the comparison is repeated. If there is no match, this process of moving the starting time slot position and performing the comparison is repeated until the synchronization pattern is located or the maximum frame length is reached. If the synchronization pattern has not been found, then this search process is repeated still assuming that there are three bitstream frame channels but delaying the start position by only 1 bit, which can again be done by skipping one clock cycle. The just described search process is repeated until the synchronization pattern has been found or the maximum frame length is reached. If the synchronization pattern has not been found, then this search process is repeated still assuming that there are three bitstream frame channels but delaying the start position by only 1 bit. The just described search process is repeated until the synchronization pattern has been found or the maximum frame length is reached. In this example the synchronization may now have been obtained, since the method has searched through all of the frame channels using three channel spacing. However, if the synchronization pattern has not been found, and the maximum number of channels allowed for the bus has been exceeded, the mode is changed to word mode or the entire process is started over again, assuming a single channel again (this could be beneficial if the master device 52 was not sending any synchronization information).

In general, when searching under the assumption of bitstream mode, the searching comprises assuming a maximum of A bitstream frame channels, a channel length of Q bits, and potentially performing several passes through the data to search for the synchronization pattern (if parallel hardware exists, a single pass may be used). A current number of frame channels C is set, and a current frame channel index B is set to 1. A starting time slot of TS0 is defined and under the $B^{th}$ pass, the synchronization pattern is assumed to be in the $B^{th}$ bitstream frame channel. For example, assuming that A is 4, then C is set to 1 and B is set to 1 and the first bitstream channel is searched. If the synchronization pattern is not found, then it is assumed that there are 2 bitstream frame channels, C is set to 2, B is set to 1, the starting time slot is delayed by 1 and the first bitstream channel is searched. If the synchronization pattern is not found, then B is set to 2 and the search is repeated for the second bitstream frame channel by skipping one time slot and starting in the second channel. If the synchronization pattern is not found, then it is assumed that there are 3 bitstream frame channels, C is set to 3, B is set to 1, the starting time slot is again delayed by 1 and the first bitstream channel is searched. If the synchronization pattern is not found, then B is set to 2 and the search is repeated for the second bitstream frame channel. If the synchronization pattern is not found, then B is set to 3 and the search is repeated for the third bitstream frame channel. If the synchronization pattern is not found, then it is assumed that there are 4 bitstream frame channels, C is set to 4, B is set to 1, the starting time slot is again delayed by 1 and the first bitstream frame channel is searched. If the synchronization pattern is not found, then B is set to 2 and the search is repeated for the second bitstream frame channel. If the synchronization pattern is not found, then B is set to 3 and the search is repeated for the third bitstream frame channel. If the synchronization pattern is not found, then B is set to 4 and the search is repeated for the fourth bitstream frame channel. If the synchronization pattern is not found, then since B=C=A, the max number of bitstream frame channels have been searched and the method 900 moves to 908. Alternatively, the method 900 does not have to go through all of the above noted actions once the synchronization pattern is located.

There can be various alternative embodiments for searching for bitstream mode, just as was described for word mode in which different lengths of data can be read and compared to different portions of the synchronization pattern. In addition, there may be an embodiment in which a parallel implementation is used in which it may be possible to pick several starting time slots, read the data from the bus traffic and compare the read data to a portion or the entirety of the synchronization pattern in parallel. As an example, if the number of bitstreams is limited to 2N, it is possible to reduce the search time by approximately (N+1) times by first reading a single channel and when this is completed, reading two channels in parallel (each offset by one slot), and when this is completed, reading three channels in parallel, and so on and so forth until the synchronization pattern is located or the maximum number of bitstream frame channels have been searched.

Due to the similarity between searching under word mode and bitstream mode, in at least one embodiment, it is possible to use a common search structure (i.e. computer code or logic structure such as a state machine) for searching for the synchronization pattern under both word mode and bitstream modes of operation by using clock gating when searching under bitstream mode. Clock gating is used to skip data from frame channels in which bits of the synchronization pattern are not assumed to exist. For example, when assuming there are three bitstream frame channels, assuming a starting time slot of TS0, under a first pass, the synchronization pattern is assumed to exist in a first bitstream frame channel which has bits transmitted at time slots TS0, TS3, TS6, and so on. Therefore, clock gating can be used to pick the data transmitted at these time slots and ignore the data transmitted at time slots TS1, TS2, TS4, TS5, and so on. If the synchronization pattern was not found during the first pass, the starting point is delayed by one time slot and the search repeated. Therefore, the synchronization pattern is assumed to exist in a second bitstream frame channel which has bits transmitted at time slots TS1, TS4, TS7, and so on. Therefore, clock gating can be used to pick the data transmitted at these time slots and ignore the data transmitted at time slots TS0, TS2, TS3, TS5, and so on. If the synchronization pattern was not found during the second pass, the starting point is delayed by one time slot and the search repeated. Therefore, the synchronization pattern is assumed to exist in a third bitstream frame channel which has bits transmitted at time slots TS2, TS5, TS8, and so on. Therefore, clock gating can be used to pick the data transmitted at these time slots and ignore the data transmitted at time slots TS0, TS1, TS3, TS4, and so on.

In some embodiments, it may be possible to reduce the search time by using a parallel implementation in bitstream mode. For example, instead of searching through the transmitted data assuming one bitstream frame format at a time, it could be possible to search through the transmitted data assuming multiple bitstream frame formats at the same time. This will result in a higher gate count and complexity but a reduced time to achieve synchronization.

At 906, if the synchronization pattern has been found, which depends on the particular embodiment as described, the method 900 moves to 910. However, if the synchronization pattern has not been found, the method 900 moves to 908. When assuming word mode as the mode of operation, the searching act is performed on the transmitted data for various starting time slot positions up to and including a maximum frame length unless the synchronization pattern has been located earlier. When assuming bitstream mode as the mode of operation, the searching act is performed on the transmitted data for various starting time slot positions up to and including a maximum frame length and this is repeated for any number of frame channels up to a maximum number of frame channels unless the synchronization pattern has been located earlier. In some embodiments, it may be chosen to only search for a limited subset of frame lengths and channel numbers in order to reduce the time to achieve synchronization.

In either bitstream mode or word mode, the searching can be conducted on new transmitted data or a portion of the transmitted data can be saved and the searches can be iterated on the saved data until the synchronization pattern is found or the searching limit has been reached. The selection between these two implementations depends on the amount of memory that the slave device 54 can devote to searching for synchronization patterns. For example, if only 1 buffer can be used for searching, then the first method of searching that was described is used. The advantage of this first method is smaller chip size, lower cost and simpler implementation.

At 908, synchronization has not been obtained assuming the first mode of operation (i.e. word mode), so a second mode of operation (i.e. bitstream mode) is assumed for the unified bus communication protocol. The method 900 then performs the searching acts 904 and 906 and the obtaining act 910 on the transmitted data according to the second mode of operation. More generally, act 908 comprises switching to the other frame format. Therefore, if the searching acts 904 and 906 are not successful under bitstream mode then at 908 word mode is assumed once more and the synchronization pattern is searched for again at 904 and 906. This switching between the different frame formats is repeated until synchronization is obtained. Under normal conditions, a slave device will continue to perform this search unless it has been programmed to be in a different state. The reason that the slave device should continue to perform the search again, even though it has already completed it once, is that the master device 52 may be temporarily down due to some malfunction or it may be slower to power-up than the slave device. Therefore, for robustness, the slave device should simply continue the search. If it is desired to stop the search, the master device 52 can optionally gate the bus clock and thereby stop the slave device from repeatedly performing the search for synchronization.

At 910, the method 900 comprises obtaining synchronization when the located synchronization pattern is verified according to at least one synchronization rule, which depends on a particular embodiment that is used. In general, the at least one synchronization rule can involve performing verification at 910 one or more times.

For example, in at least one embodiment, once the synchronization pattern has been located, the searching acts 904 and 906 and the obtaining act 910 comprise searching for the next synchronization pattern (i.e. consecutive synchronization pattern) in order to determine a frame length that is being used by the unified bus communication protocol. The synchronization rule can then comprise performing the searching acts 904 and 906 and the obtaining act 910 several times to verify that the determined frame length is correct. For example, if three consecutive synchronization patterns are found so that two frame lengths are calculated then if the two frame lengths are different there is an error. Alternatively, if the two frame lengths are the same then this may be used as verification in some cases. Once the frame length has been found, the spacing between the command words can be found by dividing the frame length by three, e.g. by binary division or by incrementing a counter by three until this counter is equal to the frame length value (the number of increments is then equal to the subframe length).

In at least one embodiment, the verification comprises using the dynamic portion of the synchronization pattern. For example, the searching acts 904 and 906 and the obtaining act 910 may comprise reading a current dynamic sync portion associated with a constant sync portion for a currently located synchronization pattern and the synchronization rule comprises calculating an expected dynamic sync portion based on a deterministic method and the current dynamic sync portion, locating a next constant sync portion and comparing a dynamic sync portion associated with the next constant sync portion with the expected dynamic sync portion to reduce the chance of false synchronization.

If the expected dynamic sync portion does not equal the next dynamic sync portion, then at least one of the two synchronization patterns (i.e. the current and previous synchronization patterns) may be incorrect. In at least one embodiment, if the expected dynamic sync portion does not equal the next dynamic sync portion, then the currently located synchronization pattern can be assumed to be invalid. In at least one alternative embodiment, if the expected dynamic sync portion does not equal the next dynamic sync portion, then the previously located synchronization pattern can be assumed to be invalid and the currently located synchronization pattern can be assumed to be valid. Selecting between either one of these choices can be made based on additional information such as including a random component in the decision process as described in further detail below.

In at least one alternative embodiment, the synchronization rule can include having the method 900 continue to search for the synchronization pattern that has a dynamic sync portion that matches the calculated dynamic sync portion and consider this located synchronization pattern to be a true pattern. A limit (FL) can be placed on the number of synchronization patterns that are searched to determine if they have a dynamic sync portion that matches the calculated dynamic sync portion. If this limit is reached, then the method 950 can randomly select any of the last FL located synchronization patterns as a true synchronization pattern or randomly select one of the next coming synchronization patterns as a true synchronization pattern and begin the search for the next synchronization pattern based on the updated dynamic sync portion by looking at the next FL located synchronization patterns.

In at least one embodiment, the deterministic method may comprise using a CRC generator (i.e. a shift register with feedback utilizing an LRS, i.e. a linear recurring sequence) having 4 bits that defines 15 states so that consecutive synchronization patterns have dynamic portions that are based on the consecutive states of the CRC. If one state is located for a current dynamic portion, then the next state for the next dynamic portion can be calculated using the deterministic method. In at least one alternative embodiment, a CRC with a different number of bits can be used. In at least one alternative embodiment, other deterministic methods can be used, such as but not limited to a CRC generator based on an LRS topology utilizing 8, 16 or a different number of bits. As another example, a simple adder can be used although it would have the disadvantage that the number of bits that changes during every iteration would be limited if the counter was incremented by one. In a general embodiment, a sequence of values may be found using a generator $X_{n+1}=F(X_n)$, where the generator function F will result in a mapping from a value $X_n$ to a different value $X_{n+1}$, which may be done utilizing a mathematical function so that as many values as possible within a given interval are utilized while at the same time changing as many bits randomly as possible in every step. An example candidate to achieve this is a mathematical algorithm that is written to generate random discrete numbers distributed uniformly over a closed interval. These random numbers may be transmitted on the bus 64 in addition to a single or a finite number of sync constants, that are intended to eliminate most but not all invalid sync positions and thereby speed up the synchronization process For example, assume that the CRC generator performs the following operation to calculate a dynamic sync portion: {S4, S3, S2, S1}={S3, S2, S1, (S4 XOR S3)}. In this example, the dynamic sync portion can be initialized to "1111" at reset. In at least one embodiment, the "0000" condition is not used and shall result in the "1111" state during the next cycle if it is ever encountered. The reason for this is that if the CRC counter is implemented with a small amount of logic using an LRS structure, the CRC counter will be stuck in the zero condition if this state is encountered by error. Therefore, it may have trouble recovering (at least for the transmitter), unless this value of "0000" is automatically mapped to a value with at least one bit that is different from zero. Similarly, if a number of bits different from four is used in the CRC generator, it is necessary to check for values (typically zero) that would result in the generator being stuck and map these to another value. The entire sequence in hexadecimal for this example will then be as follows: {F, E, C, 8, 1, 2, 4, 9, 3, 6, D, A, 5, B, 7}. The dynamic sync portion, which is a pseudorandom value, allows for a quicker time-to-lock and reduces the likelihood that the slave device 54 locks onto a false synchronization pattern that may be created by random bus traffic.

In general, the verification may be done several times to make the synchronization process more robust to errors. For example, the synchronization rule may comprise repeating the calculating, locating and comparing acts of the various embodiments one or more times to further reduce the chance of false synchronization. As another example, the verification using the CRC generator may be done two times, seven or eight times or up to the number of states that can be generated by the CRC generator, for example. In at least one embodiment, in order to ensure that the slave device 54 is continuously in lock with the master device 52, the slave device 52 may continue to perform the CRC checks and check for the occurrence of the sync constant portion during every frame after synchronization has been established.

In at least one embodiment, the synchronization rule may comprise adding a random component in the locating acts 904 and 906 and the obtaining act 910 in order to improve the chances of synchronization under noisy conditions on bus traffic and when bus traffic closely resembles the synchronization patterns.

For example, in at least one embodiment, the random component comprises reading the parity of the bus traffic for a certain period of time and using the parity information to make a random choice as to whether the currently located synchronization pattern is a true pattern or a false pattern. This way, the synchronization method will not get stuck in cycles, e.g. where every second located constant synchronization pattern is valid and every other second one is invalid, thereby making all CRC checks invalid. In at least one embodiment, the period of time can be one frame of transmitted data.

As another example, in at least one embodiment, the random component may be used when the synchronization pattern has been located in the wrong position (i.e. not at the start of a frame) thereby resulting in one or more errors during the synchronization process. For example, these errors may be due to the fact that there is a situation which results in transmitted data on the bus 64 that may look like the synchronization pattern that is being searched for but is actually a false synchronization pattern. If the false synchronization patterns are the result of truly random data traffic, they will normally only disturb the synchronization process for a short time and when they disappear, the method 900 will find true synchronization patterns and the slave device 54 will become synchronized to the bus 64. However, when searching for the constant sync portion, there could be a situation which results in constant activity, such as constant temperature data provided by a temperature sensor for example, that matches the constant sync portion. This may occur even though the constant sync portion can be many bits long. In this case, these false synchronization patterns can appear in the transmitted data on the bus 64 for a long time which will disturb the synchronization process.

Figure 55A:
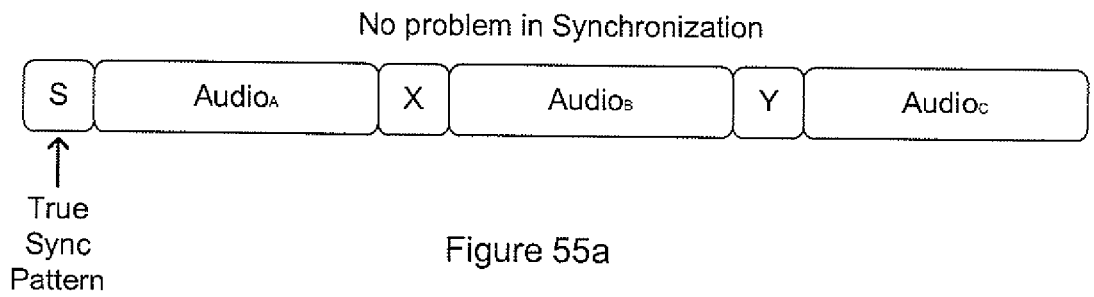
FIGS. 55a and 55b are diagrams, respectively, of a first scenario in which a true synchronization pattern is sent in the transmitted data and a second scenario in which true and false synchronization patterns are sent in the transmitted data.
Figure 55B:
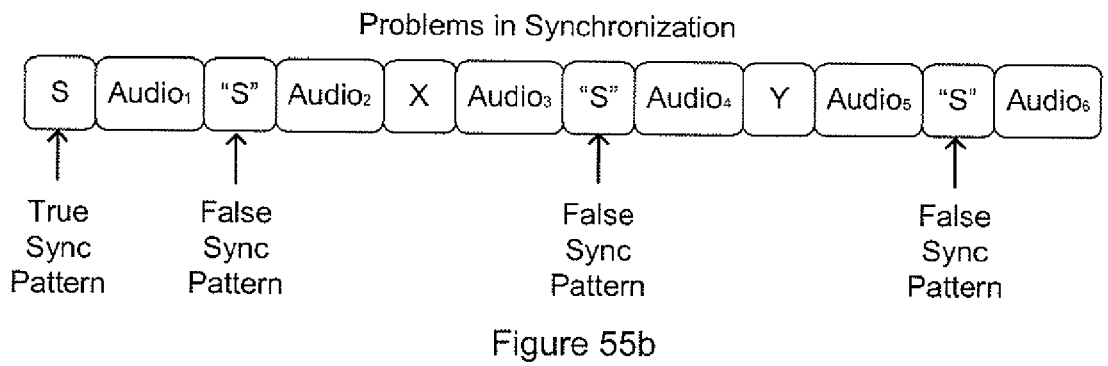

Referring now to FIGS. 55*a* and 55*b*, shown therein, respectively, are diagrams of a first scenario in which a true synchronization pattern is sent in the transmitted data and a second scenario in which true and false synchronization patterns are sent in the transmitted data. In this example, the transmitted data (other than the control data) are audio data. However, this example can also be true for other types of data such as instrumentation data (i.e. sensor data). In FIG. 55*a*, the control data comprises an S word, an X word and a Y word which are separated by data portions comprising audio data. The S word comprises the true synchronization pattern. In FIG. 55*b*, the control data comprises the same general components as was shown in FIG. 55*a*. However, there are now three false synchronization patterns (i.e. three false S words) that are sent in the data portions. In alternative cases, the false synchronization patterns can exist closer to the beginning or the end of the data portions, can only be in some of the subframes and/or possibly can be in different locations within the consecutive data portions. The false S words contain data bits that correspond to the true synchronization pattern. However, they are not in the correct location (i.e. correct sync position) at the start of a frame and are therefore false. Accordingly, these false S words may be determined based on their location once the true location is known. Alternatively, these false S words can be determined by checking the dynamic sync portion of these false S words to determine whether they match the expected dynamic sync portion as described earlier.

The situation of false synchronization patterns can be dealt with using a random component in the universal synchronization method 900. The random component is obtained by using a random variable. In at least one example embodiment, the random variable can be the parity of the transmitted data over a certain time period. For example, the parity can be set to 1 if the number of ones since the last synchronization pattern was even, otherwise it is set to 0 or vice-versa. The parity is the total number of bits modulus two, but other similar random quantities can be defined, e.g. total number of bits modulus four (i.e. last two bits when adding). In at least one embodiment an additional CRC generator may be used that is based on all bus traffic since the last frame synchronization pattern. The CRC generator could take as input the output from the CRC generator itself and XOR it with the input from the bus 64 (a special provision should be made to map the register value zero to some other value). Counting the number of 1's or 0's in the bus traffic is a random process since the quantization process itself is a random process due to thermal noise which is present in any physical measurement (e.g. quantum-electrical electrical noise or quantum-mechanical noise). A random decision is then made based on this computation. In at least one embodiment, the decision may be to either keep the previous synchronization pattern as a true pattern and to keep searching for the next true synchronization pattern or to keep the current synchronization pattern as a true pattern and to keep searching for the next true synchronization pattern. This decision can be made by checking if the calculated parity is equal to 0. Alternatively, this decision can be made by checking if the calculated parity is equal to 1. In each case the probability of a change in the sync position is ½. In the general case, the probability of staying in the current position based on a random variable will be p and the chance of changing to the new position will be (1−p). Regardless of whether the previous synchronization pattern or the current synchronization pattern is retained as a true synchronization pattern, with this methodology sooner or later the correct true synchronization pattern will be selected. In at least one embodiment, instead of just retaining the current synchronization pattern as a true synchronization pattern, a random but finite number of synchronization patterns starting from the current synchronization pattern can be discarded before the method 900 considers the next located synchronization pattern to be a true synchronization pattern.

The selection of the previously located synchronization pattern as the true synchronization pattern can be denoted as having a probability of p and the selection of the currently located synchronization pattern as the true synchronization pattern can be denoted as having a probability of 1−p based on the selected random variable (i.e. the parity as discussed in one embodiment). The method 900 then continues to search for the next constant sync portion and compare the associated dynamic sync portion with the expected dynamic sync portion. In some cases, where there is a lot of bus traffic that looks like the constant sync symbol, the likelihood that the method remains in the correct sync position between two frame start positions is $p^N$, where N is the number of false sync positions. However, once the correct sync position has been found, the search method will discard the false positions and only look at the correct positions.

In at least one embodiment, and in an attempt to make the search process fully deterministic, it may be possible to speed up this synchronization search by making a list of the last CRC values associated with a valid sync constant thereby quickly eliminating later sync constant matches that do not have a dynamic sync portion that matches to any position from this list (this may involve a list that is long enough to handle all possible disturbances on the bus 64).

In at least one embodiment, it may be possible to eliminate many false synchronization patterns, by observing how many time slots (i.e. the sync separation value) that are between the two located constant sync portions. The lower end of the spacing for the next located constant sync portion should be at least the sync separation value (in word mode). If the search method has already encountered a distance between two sync symbols of L, if the distance is shorter than L between two later found sync symbols, at least one of these sync symbols is false (it should be noted that the term sync symbol is similar to the term sync pattern or sync portion).

In at least one alternative embodiment, once a true synchronization pattern has been found, the method comprises continuing to search forward until the maximum frame length has been reached or the dynamic sync portion of a located synchronization pattern matches the expected dynamic sync portion. If this latter condition is valid, then the method continues to search for future synchronization patterns using the spacing between this current synchronization pattern and the previous synchronization pattern. This is different from the previous method in that it will continue to maintain a given first sync position until it has been proven that it is a false sync position or that is a good candidate for a valid sync position (since both the constant sync portion and the dynamic sync portion passes a check). This is in contrast to the technique of randomly choosing between two sync positions when in doubt. If it is proven that the given position cannot be a valid sync position, the synchronization method will move on to the next sync position that gives a possible valid sync symbol or it may exceed the maximum frame length. If this synchronization method fails to find the number of synchronization patterns that are used for verification, then the method can begin using the last located synchronization pattern as a true synchronization pattern, but this may involve some memory in order to perform. If the latter condition is true, and the maximum frame length is reached, the synchronization method begins anew and starts searching for the next true synchronization pattern. While this method may seem to offer a faster synchronization, there is the risk that synchronization may not be achieved, because the method may continue to skip over the true sync position due to the structure of the random data (although it might help to skip a prime number of positions forward, e.g. 11 positions). Therefore, in order for this method to work, it may be necessary to either store all sync positions and work with this information or to add some randomness to the method, e.g. skip a random number of sync symbols before starting again to search for a matching constant sync symbol and a matching dynamic sync symbol. This method seems to be most suited for parallel hardware implementation. If this is available, it is possible to implement a number of search engines, thereby making the entire algorithm work very fast and reliably. The first sync engine may look for a matching dynamic sync symbol to the first found sync constant, the second sync engine may look for a matching dynamic sync symbol from the second sync position, and so on until all N sync engines have been activated. This method will allow up to N−1 false sync positions between two frame start positions without encountering any problems.

In at least one alternative embodiment, a table can be made of the dynamic sync portions corresponding to all valid constant sync portions that have been found within a maximum length of data. The positions of these located dynamic sync portions are also recorded in the table. Next the positions of the dynamic sync portions in the table which match the expected dynamic sync portions can be recorded in a list of positions. If there is repetition in the separation of consecutive positions in the list of positions, then the distance between these positions will be the actual frame length, and these positions can be used to obtain synchronization. The main problem with this method is the hardware overhead, otherwise it offers robust synchronization.

In either of the above-noted variations, if synchronization is achieved, then the method 900 performs act 912. If synchronization is not achieved, and the mode of operation is still assumed to be correct, then the method 900 performs the searching acts 904 and 906 again and may reset one or more parameters.

It should be noted that there can be embodiments which use at least two of the synchronization rules that have been described herein. It should also be noted that there can also be embodiments which use various combinations of the synchronization rules that have been described herein. Furthermore, it should be noted that there can be embodiments which use at least one of the synchronization rules that have been described herein.

At 912, synchronization has been achieved by the slave device 54. Depending on the particular implementation of the unified bus communication protocol, the slave device 54 may be allowed to transmit some information back to the master device 52 to signal that it has achieved lock (i.e. synchronization). At that point, the master device 52 may perform various actions such as, for example, sending various parameter data to the slave device 54 in order to configure the slave device 54 so that it can communicate according to the unified bus communication protocol and have one or more input channels, one or more output channels or one or more input and output channels of at least one port that are enabled. In at least one embodiment, the slave device 54 will not have any port attached to the bus 64 and the bus 64 will merely be used for control purposes such as register READ/WRITE operations or the activation of FUNCTIONS within the slave device 54. In an alternative embodiment, the setup can also be done by the slave device 54 or by a combination of events, for example, involving the master device 52 and the slave device 54. In at least one embodiment, another master device can be involved in setting up all or some of the slave device settings.

It should be noted that there can be embodiments in which once synchronization has been achieved, the method 900 is continued to be performed to maintain the synchronization. In cases where there is an error and synchronization is lost just for one instance of a synchronization pattern, then the method 900 can involve assuming that the mode of operation and frame format parameters are the same so that the method 900 does not have to undergo the full synchronization process with all of its parameters being reset. For example, since the frame length and frame format has been determined once synchronization has been achieved then when maintaining synchronization other positions in the transmitted data are not examined unless they are in the vicinity of a determined frame length's distance from the last synchronization pattern. This allows the method 900 to ignore any false synchronization patterns that occur in the data blocks transmitted between the synchronization patterns. Alternatively, if synchronization is lost for an extended period of time, then the method 900 may be restarted with its parameters being fully reset to begin the synchronization process from the very beginning. As an example, if the slave device 54 has received no synchronization patterns for longer than the maximum possible frame length, there is something wrong and the slave device 54 should deactivate any ports that are active and restart the synchronization process.

It should also be noted that either mode of operation may be first assumed for the method 900. For example, the first mode of operation may be assumed to be word mode and the second mode of operation may be assumed to be bitstream mode (if synchronization is not achieved assuming word mode). However, in alternative embodiments, the first mode of operation may be assumed to be bitstream mode and the second mode of operation may be assumed to be word mode.

Figure 56:
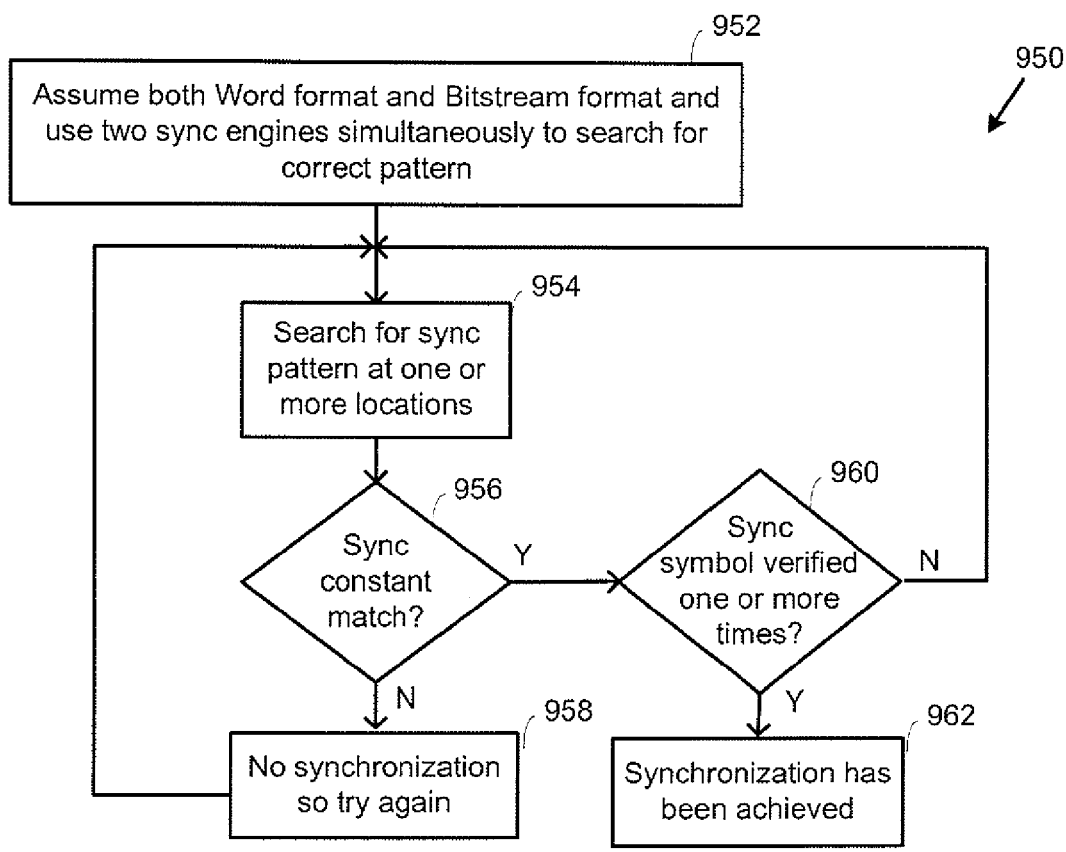
FIG. 56 is a diagram of another example embodiment of a universal synchronization method that utilizes a parallel implementation.

Referring now to FIG. 56, shown therein is a diagram of an example embodiment of a universal synchronization method 950 for synchronizing to a master device that communicates using a unified bus communication protocol. The universal synchronization method 950 utilizes a parallel implementation. The universal synchronization method 950 is similar to the universal synchronization method 900, along with the various alternatives described for the method 900, except that at 952, the method 950 assumes both first and second modes of operation (i.e. word mode and bitstream mode) for the unified bus communication protocol and uses two separate sync engines that simultaneously search for synchronization patterns under one of the assumed modes of operation (i.e. one sync engine searches for synchronization patterns under the assumption of word mode and the other sync engine searches for synchronization patterns under the assumption of bitstream mode). Accordingly, act 954 comprises concurrently searching for a synchronization pattern at one or more locations in data transmitted according to the first and second modes of operation. Likewise, act 960 comprises obtaining synchronization when the synchronization pattern is verified according to at least one synchronization rule for one of the first and second modes of operation. Therefore, acts 954, 956, 960 and 962 are similar to acts 904, 906, 910 and 912.

Act 958 is different than act 908 since at act 958, if synchronization is not obtained, the method 950 carries out the searching and obtaining acts according to both the first and second modes of operation on the transmitted data according to the unified bus communication protocol. Switching between the modes of operation is not performed for method 950 since a parallel implementation is used to search according to both modes of operation concurrently.

The loop back from act 958 to act 954 results in a more robust synchronization method since the same search process could repeated in both modes of operation and a different result can be achieved because in the first instance of the search, there could have been errors that affected the results of the search. For example, there could have been bus errors, the master device 52 may not have been properly started or initialized, or there could have been a bus collision and the like when a previous instance of the synchronization method 950 was being carried out. In some cases, there may be a faulty physical connection between the slave device 54 and the bus 64 when the synchronization method 950 is performed; for example, when first physically connecting the slave device 54 to the bus 64, there may not have been a proper physical connection and there was therefore a delay for the proper electrical connection to occur. All of these conditions would clear up or be resolved on a repetition of the synchronization method 950. Accordingly, repeating the synchronization method 950 provides for a more robust synchronization process. The same could be said of the synchronization method 900. Accordingly, there can be an alternative embodiment of the synchronization method 900 in which the search is repeated under the assumed mode of operation one or more times before switching over to the other mode of operation at act 908.

Figure 57:
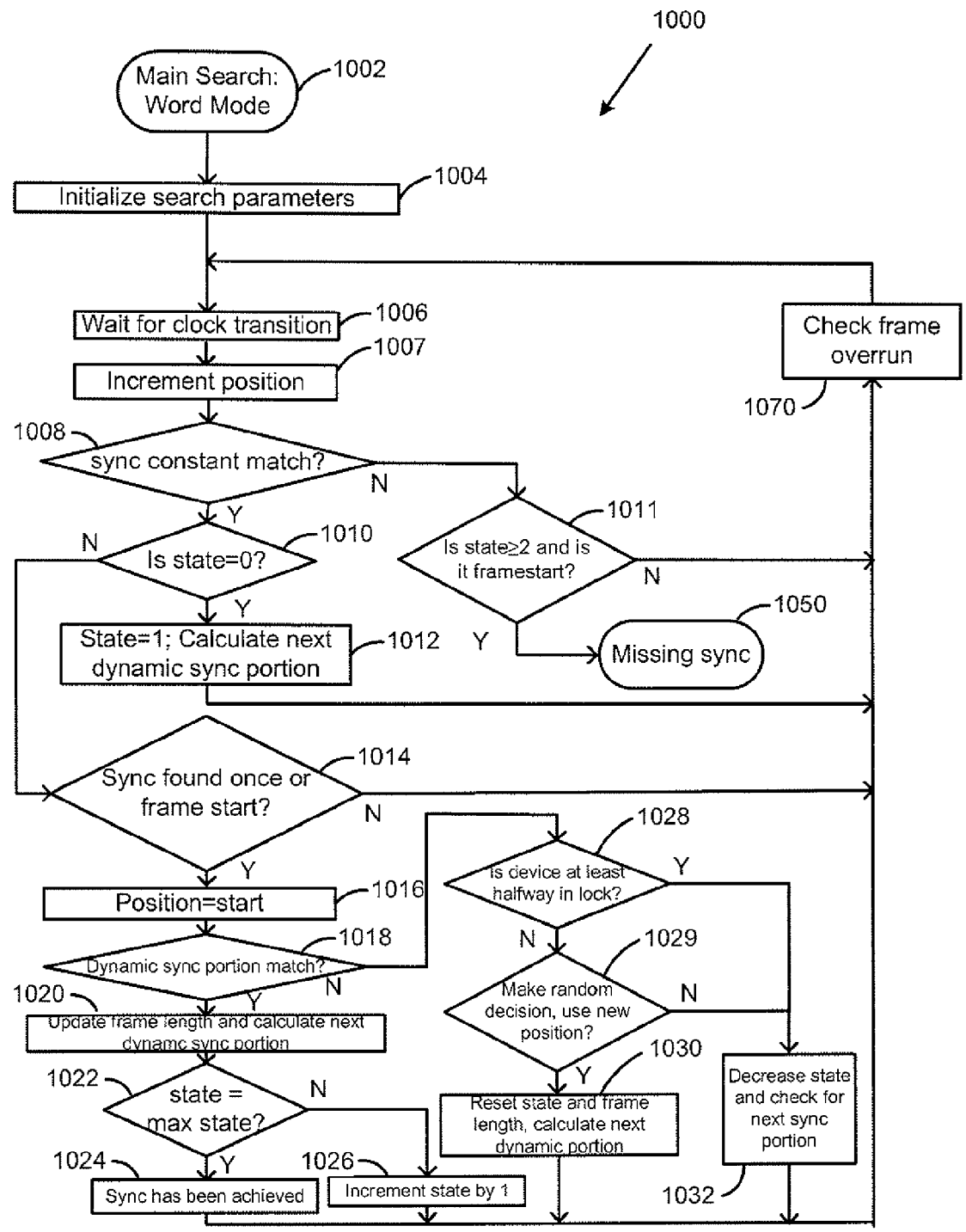
FIG. 57 is a diagram of an example embodiment of a word mode synchronization method that can be used with a universal synchronization method.

Referring now to FIG. 57, shown therein is a diagram of an example embodiment of a word mode synchronization method 1000 that can be used with a universal synchronization method to locate and verify synchronization patterns when the unified bus communication protocol is operating under word mode. However, the method 1000 can also be used when operating under bitstream mode if clock gating is used as will be described in further detail below.

At 1002, an instantiation of the method 1000 is initialized. Function calls to the method 1000 create an instantiation of the method 1000. At 1004, the parameters, states and counters that are used to search for, locate and verify the synchronization patterns are initialized.

At 1006, the method 1000 synchronizes with the clock. In other words, the remaining actions of the method 1000 start at a new clock cycle for the bus 64. For example, act 1006 can be configured such that if the clock signal is rising from a low logic value to a high logic value (i.e. a rising clock signal), then the remaining acts of the method 1000 are performed. Alternatively, the method 1000 can be synchronized to a falling clock signal. In yet another embodiment, the device can synchronize to both the rising and falling edges.

At 1007 the current position within the frame is incremented.

At 1008, the method 1000 determines whether a portion of the transmitted data on the bus 64 matches the constant sync portion as was described for methods 900 and 950. If there is not a match, then the method 1000 proceeds to 1011. If there is a match, then the method 1000 proceeds to 1010.

At 1010, the method 1000 determines whether the counter state is equal to 0. The state is used to count how far the method 1000 is along the synchronization process. For example, if the state value is equal to the maximum state value, then synchronization has been achieved. If the state is currently equal to 0, then this corresponds to a first location of a constant sync portion and the method 1000 proceeds to 1012. If the state is currently not equal to 0, then this corresponds to a subsequent location of a constant sync portion and the method 1000 proceeds to 1014.

At 1011, the method 1000 determines whether at least two matching sync symbols (i.e. synchronization patterns) have been obtained and if the current search position is framestart (i.e. a start of a frame). If this is the case, then the method 1000 would expect to find a synchronization pattern at this position and there is an error in which case the method 1000 will go to 1050 to check if there is a missing synchronization pattern; otherwise the method 1000 will go to 1070 and check for frame overrun before returning to 1006.

At 1012, the method 1000 sets the state to 1 and calculates the sync dynamic portion that is expected for the next constant sync portion by using a deterministic method and the current sync dynamic portion. One example of the deterministic method involving a CRC counter was described previously. The method 1000 then proceeds to 1070 to check for frame overrun and then back to 1006 to search for the next constant sync portion.

At 1014, the method 1000 then checks if the constant sync portion has already been found once before or if the current search position is at an expected frame start position. If this condition is true, the method 1000 proceeds to 1016 where the current position is set to the start of a frame. If the comparison at 1014 is false, the current located constant sync portion is ignored and the method 1000 proceeds to 1070 to check for frame overrun and then back to 1006.

At 1018, the method 1000 then checks whether the calculated dynamic sync portion matches the dynamic sync portion associated with the currently located constant sync portion (in this case the term associated means that the dynamic sync portion that is associated with a constant sync portion is part of the same synchronization pattern or S word). If the comparison at 1018 is true then the method 1000 proceeds to 1020. If the comparison at 1018 is false then the method 1000 proceeds to 1028.

At 1020, since there is a match between the calculated dynamic sync portion and the located dynamic sync portion, the method 1000 considers the currently located constant sync portion to be valid, updates the frame length and calculates the next dynamic sync portion. The frame length is updated by calculating the distance between the start of the synchronization pattern that contained the previous constant sync portion and the start of the synchronization pattern that contains the current constant sync portion. The method 1000 then proceeds to 1022.

At 1022, the method 1000 then checks whether the state is equal to the max state, which is the number of states where a synchronization word has been successively found in order to achieve synchronization. The value of max state is selected as a compromise between a low probability of false lock and a longer time to obtain lock. Setting the max state parameter to a higher number results in more iterations of the method 1000 before the method 1000 can determine that enough synchronization patterns have been located so that synchronization has been achieved. Accordingly, if the comparison at 1022 is true, then the method 1000 proceeds to 1024 at which point synchronization has been achieved. In this case, the method 1000 proceeds to 1070 and then to 1006 in order to maintain synchronization by checking for future synchronization patterns. If the comparison at 1022 is false, then the method 1000 proceeds to 1026 where the state counter is incremented by 1. In this case, the method 1000 then proceeds to 1070 and 1006 to search for the next constant sync portion in order to work towards achieving synchronization.

At 1028, the method 1000 first checks the value of the state counter. If several valid constant synchronization symbols have been located, the current dynamic sync symbol error will be ignored and the method 1000 will proceed and keep the previous position (i.e. position of the last located valid synchronization pattern) as a reference. The next dynamic sync symbol will be based on the one associated with the last located constant sync portion and not the one associated with the current located constant sync portion which is considered to be invalid. Alternatively, if only a few sync symbols have been successfully located, the method 1000 will go to 1029 where randomness of the transmitted data on the bus 64 is used to move towards obtaining synchronization. This comparison is done because the dynamic sync portion associated with the currently located constant sync portion does not match the calculated dynamic sync portion based on the dynamic sync portion associated with the previously located constant sync portion and the deterministic method. Accordingly, one of the previous constant sync portion and the current constant sync portion is invalid and act 1029 attempts to determine whether to keep the current constant sync portion or the previous constant sync portion as a valid constant sync portion. Act 1029 attempts to make this determination based on the randomness of the bus traffic (as described previously for methods 900 and 950 by using parity for example) as well as the value of the state counter.

If at 1028, it is determined that the value of the state counter is close to the max state value (for example, the value of the state counter is one less than the max state value in one embodiment or two less than the max state value in another embodiment or at least half of the max state value in another embodiment), then the method 1000 is close to achieving synchronization so the method 1000 considers the current constant sync portion to be a one-time error, assumes the previous located constant sync portion is valid and moves to 1032 where it decreases the value of the state counter by one and then checks for the next constant sync portion by proceeding to 1006. However, if the check based on randomness at 1029 is false and the value of the state counter indicates that the method 1000 is not close to achieving synchronization then a random decision is made that either keeps the previous constant sync position as a valid position or uses the new constant sync position as a valid position. The method 1000 then proceeds to 1030 and discards previous frame length and state information, calculates the next dynamic sync portion and then goes to 1070 and 1006 to continue searching for the next constant sync portion.

Figure 58A:
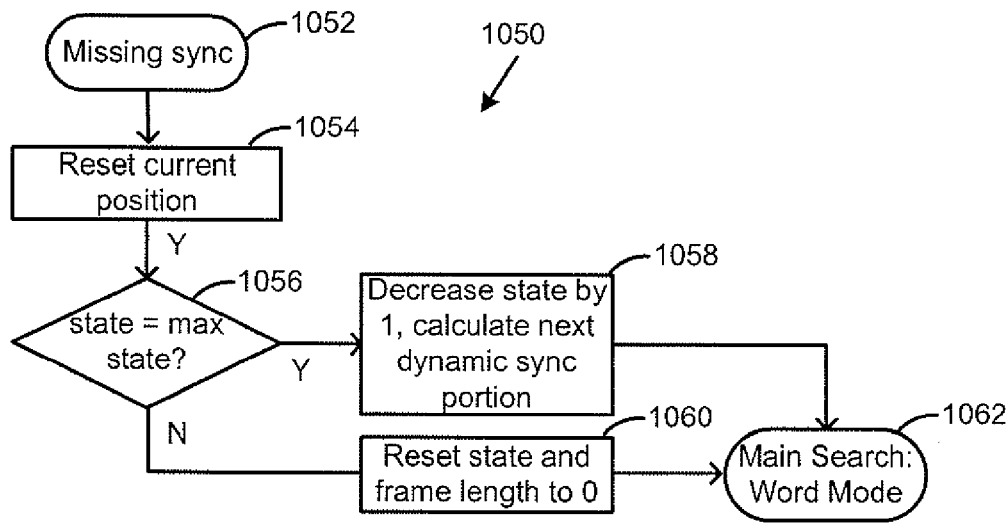
FIG. 58a is a diagram of an example embodiment of a method that may be used to handle missing synchronization patterns and used with the word mode synchronization method of FIG. 57.

Referring now to FIG. 58*a*, shown therein is a diagram of an example embodiment of a method 1050 that can be used to handle missing synchronization patterns and used with the word mode synchronization method 1000. In particular, the method 1050 attempts to determine if synchronization has been momentarily lost, if the method 1000 should re-initialize its parameters to look for the synchronization pattern under word mode or if the method 1000 should continue with the old search parameters.

At 1052, the method 1050 is called to handle the case of a potential missing sync symbol at the start of a frame.

At 1054, the current frame position is reset to cover both the case of a missing sync symbol and the reset of the method 1000.

At 1056, the method 1050 determines whether the current value of the state counter is equal to the max state value. If this condition is true, then it is possible that there was just one error that occurred which may be temporary in which case the method 1050 proceeds to 1058 where the value of the state counter is decreased by 1, and the next dynamic sync portion is calculated. The method 1050 then proceeds to 1062 where it returns to the method 1000 and continues to look for the next synchronization pattern. However, if the condition at 1056 is false, then the method 1050 proceeds to 1060 at which point the state counter and frame length parameter are reset to 0 and the method 1050 proceeds to 1062 where it returns to the method 1000 to restart the synchronization process from the beginning still assuming word mode.

Figure 58B:
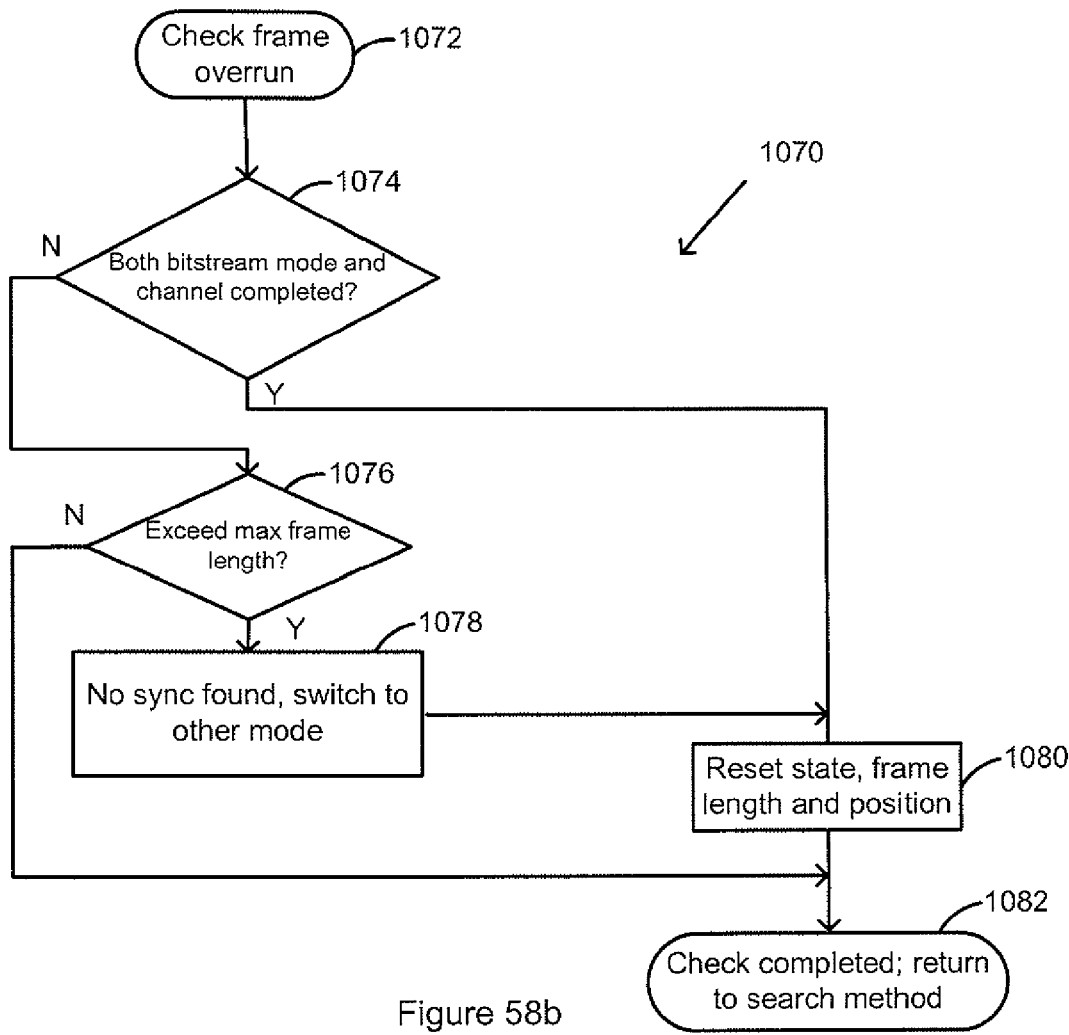
FIG. 58b is a diagram of an example embodiment of a method that may be used with the method of FIG. 57 to check if the current search position exceeds the maximum length of a frame or a channel.

Referring now to FIG. 58*b*, shown therein is a diagram of an example embodiment of a method 1070 that is used with the method 1000 to check if the current search position exceeds the maximum length of a frame or a channel (i.e. method 1070 checks for frame overrun).

At 1074, the method 1070 determines whether the current mode is bitstream mode and the current frame channel search is complete. If this comparison is true, the method 1070 proceeds to 1080 to reset the state counter, frame length and the search position. The method 1070 then proceeds to 1082 where a new search is started by returning to the search method that called the method 1070. If the comparison at 1074 is not true, the method 1070 proceeds to 1076.

At 1076, the method 1070 determines whether the current search position exceeds the maximum possible frame length. If this comparison is true, then no synchronization pattern has been found in word mode and the method 1070 proceeds to 1078. If this comparison at 1076 is not true, there is still a possibility of finding a synchronization pattern and the method 1070 proceeds directly to 1082 where it returns to the search method that called the method 1070.

At 1078, the method 1070 changes the assumed mode of operation to bitstream mode and starts a new search by proceeding to 1080 and then to 1082.

At 1080, a new search is started by resetting the current position, the frame length and the state value.

At 1082, the method 1070 exits and returns to the method that called it.

Figure 59:
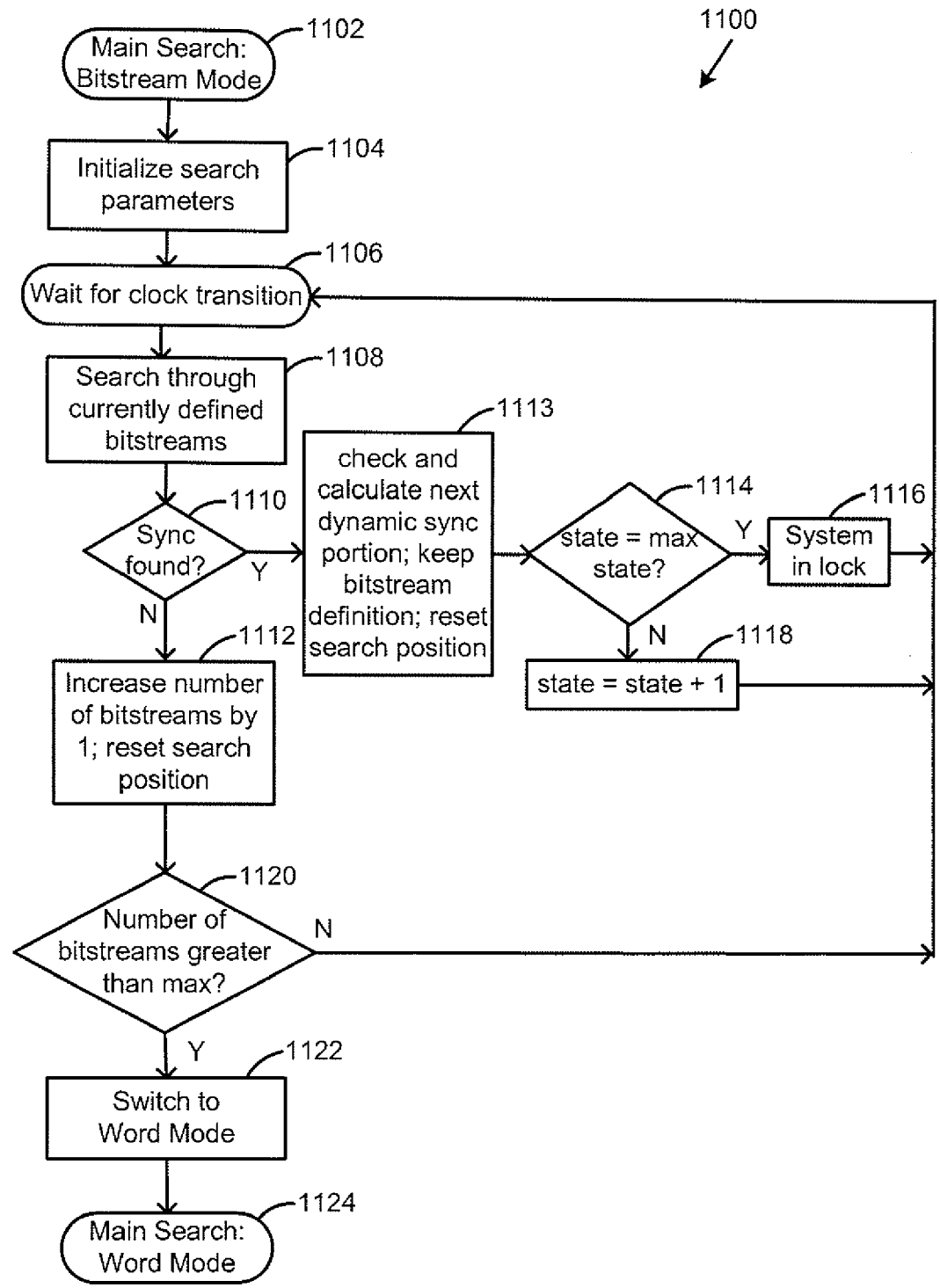
FIG. 59 is a diagram of an example embodiment of a bitstream mode synchronization method that can be used with a universal synchronization method.

Referring now to FIG. 59, shown therein is a diagram of an example embodiment of a bitstream mode synchronization method 1100 that can be used with a universal synchronization method to locate and verify synchronization patterns when the unified bus communication protocol is operating under bitstream mode.

At 1102, an instantiation of the method 1100 is initialized. Function calls to the method 1100 create an instantiation of the method 1100. At 1104, the parameters, states and counters that are used to search for, locate and verify the synchronization patterns are initialized. For example, the initialization includes defining a maximum number of bitstream frame channels and a maximum frame length. At 1106, the method 1100 synchronizes with the clock as described previously in order for the remaining actions of the method 1100 to start at a new clock cycle for the bus 64.

At 1108, the method 1100 determines whether a portion of the transmitted data on the bus 64 matches the constant sync portion as was described for the bitstream portion of the methods 900 and 950. This is done by searching through the currently assumed number of bitstream frame channels, one channel at a time. Alternatively, in a parallel implementation all of these channels can be searched at the same time.

At 1110, the method 1100 determines whether a valid constant sync portion has been located. This can be done by comparing the dynamic sync portion of the currently located constant sync portion with the calculated dynamic sync portion. If the condition is true, then the method 1100 proceeds to 1113. If the condition is false, then the method 1100 proceeds to 1112. The comparison at 1110 is not made on the first location of a constant sync portion in which case it is assumed that the constant sync portion is valid.

At 1113, the method 1100 calculates the next dynamic sync portion based on the current dynamic sync portion associated with the current located constant sync portion and the deterministic method. The bitstream definition is retained and the search position is reset to search for the next constant sync portion.

At 1114, the method 1100 determines whether the value of the state counter is equal to the max state value. If so, synchronization has been achieved. However, the method 1100 continues to search for synchronization patterns to ensure that synchronization is maintained. Therefore, the method 1100 moves to 1116. The method 1100 keeps the currently assumed number of bitstream frame channels and resets the search position to search for the next constant sync portion and proceeds to 1106.

At this point variations in the method 1100 include noting which bitstream frame channel the last constant sync portion was located in and using this information to estimate the next position of the constant sync portion in order to shorten the search time for the next iteration of the search. This may be done if at least one constant sync portion has been located. Alternatively, this may be done after finding the constant sync portion in the same frame channel location in two or more frames.

If the condition at 1114 was false, then the method 1100 proceeds to 1118 at which point it increases the value of the state counter by 1 and proceeds to 1106. In this case, although the located constant sync portion was valid, there have not been enough valid constant sync portions that were located to achieve synchronization so the method 1100 reiterates through the search once more to search for the next constant sync portion.

At 1112, if the constant sync portion has not been found, then the number of assumed bitstream frame channels is increased by one and the search position is reset. The method 1100 then proceeds to 1120 where it determines whether the assumed number of bitstream frame channels is greater than the maximum number of bitstream frame channels. If this condition is false, then the method 1100 proceeds to 1106 where it searches for the synchronization pattern in the bitstream frame channels for the newly defined number of bitstream frame channels. If the condition at 1120 is true, then the method 1100 proceeds to 1122 where it assumes that the mode of operation is not bitstream mode, switches to word mode and proceeds to 1124 where it proceeds to use a search method that searches for synchronization patterns under word mode (see FIG. 57 for a description of an example of such a method).

Figure 60:
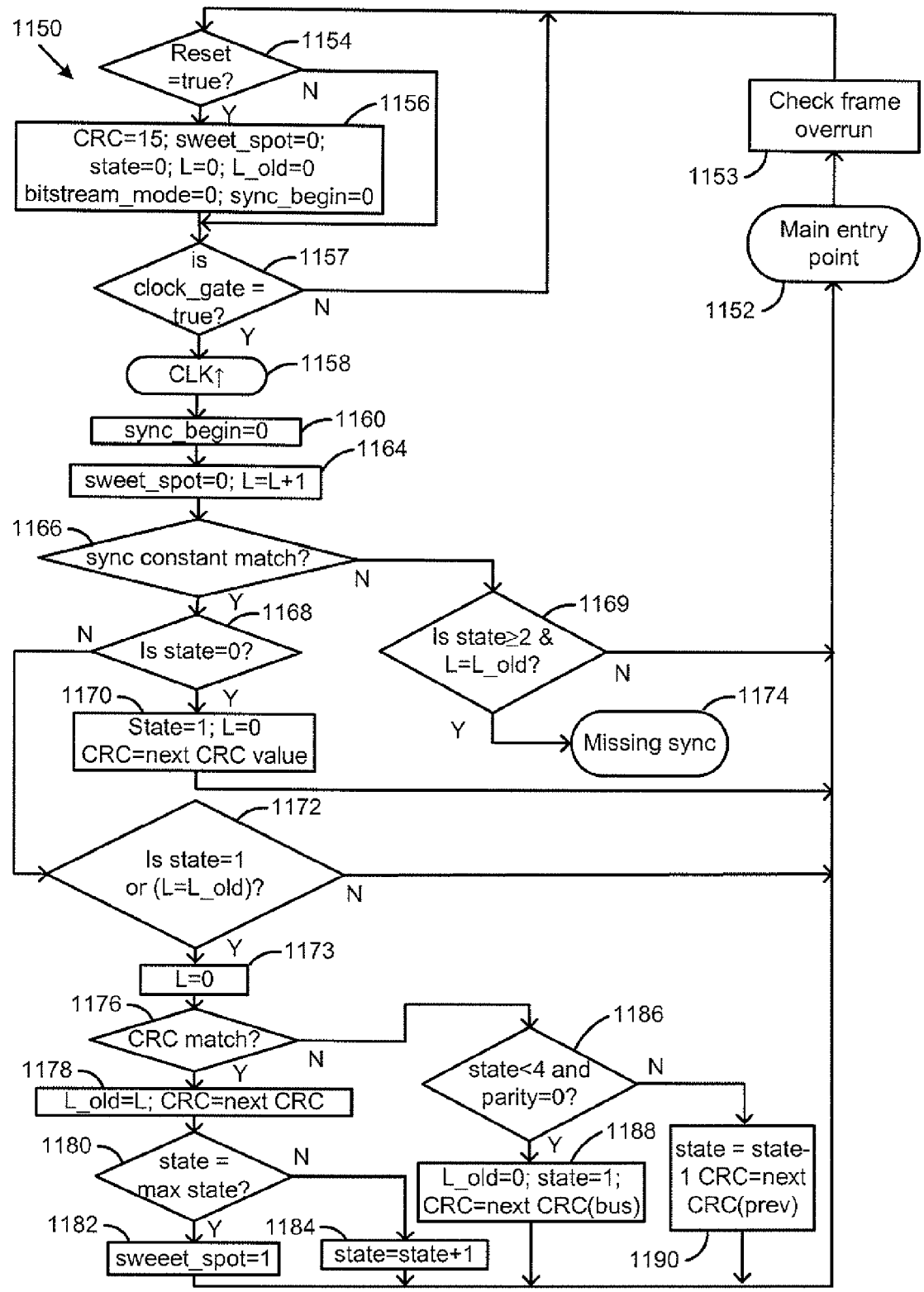
FIG. 60 is a diagram of another example embodiment of a universal synchronization method.

Referring now to FIG. 60, shown therein is a diagram of an example embodiment of a universal synchronization method 1150 that can be used with a universal synchronization method to locate and verify synchronization patterns when the unified bus communication protocol is operating under word mode. However, the method 1150 can also be used to search for synchronization patterns under bitstream mode by using clock gating.

At 1152, an instantiation of the method 1150 is initialized.

Figure 61A:
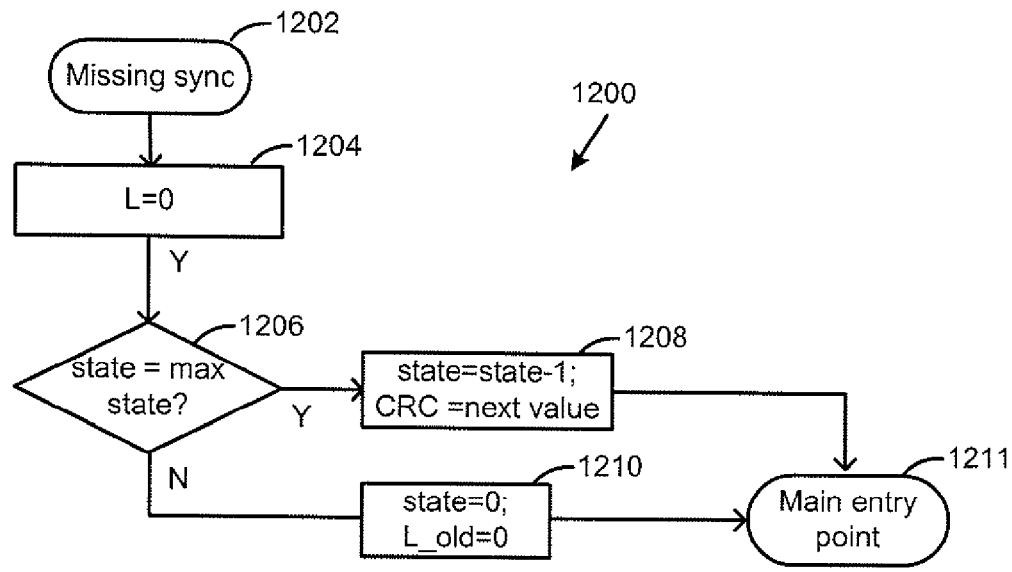
FIG. 61a is a diagram of an example embodiment of another method that can be used to check for missing synchronization patterns and may be used with the universal synchronization method of FIG. 60.
Figure 61B:
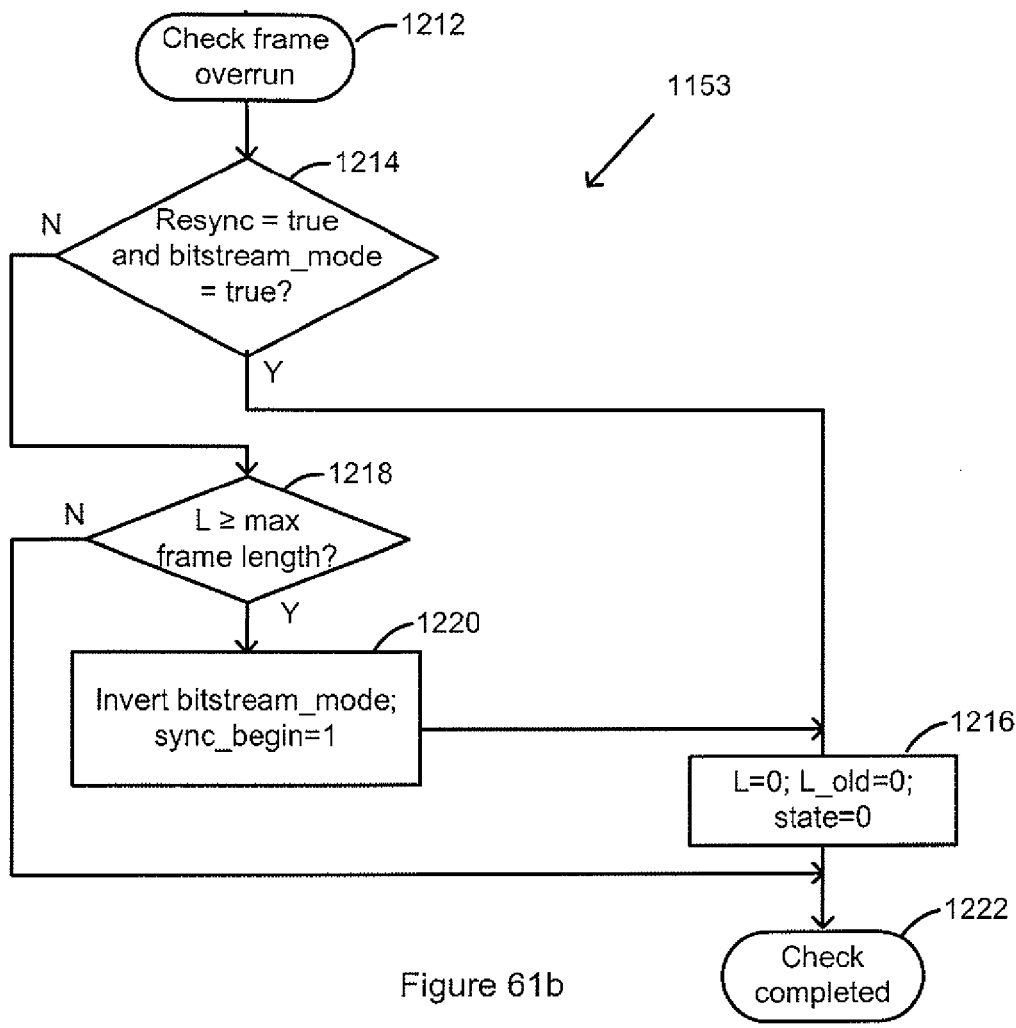
FIG. 61b is a diagram of an example embodiment of a method that can be used to check for frame overrun (i.e. the lack of synchronization patterns for a longer time than is possible within a frame) and may be used with the method of FIG. 60.

At 1153 the method 1150 checks for the possibility of frame overrun, i.e. that no sync symbol has been encountered within the current maximum framelength by calling method 1153 (see FIG. 61*b*). Function calls to the method 1153 create an instantiation of the method 1153 at 1212.

Referring now to FIG. 61*b*, at 1214, the method 1153 determines whether the mode of operation assumed for the searching is bitstream mode and that a search through the current channels has been completed (this is indicated when the flag resync is set to true). If this condition is true, the method 1153 proceeds to 1216 in order to prepare for a new search. At 1216, the current search position (L) is set to the start of a frame (i.e. L=0), the length of the current frame (L_old) is reset to 0 and the state counter is reset to 0 (in bitstream mode the channel position is simultaneously incremented). The method 1153 then proceeds to 1222 and then toll 54 of method 1150. If the condition at 1214 is not true, the method 1153 proceeds to 1218.

At 1218, the method 1153 determines whether the current position is larger than the maximum framelength. If this comparison is true (this would only happen if no sync symbol had been encountered during the current searching) then the method 1153 proceeds to 1220 where it switches the assumed mode of operation from word mode to bitstream mode or vice-versa and sets the parameter sync_begin=1 (this indicates the start of synchronization search process which is used to initialize counters used by the bitstream synchronization method). Afterwards, the method 1153 proceeds to 1216 to reset the current search position (L) to the start of a frame and resets the length of a current frame (L_old) and the state counter to 0. The method 1153 then proceeds to 1222 and then to 1154 of method 1150.

Referring again to FIG. 60, at 1154, the method 1150 checks whether the parameter reset is set to true (i.e. 1). If this condition is true, then the method 1150 proceeds to 1156. If this condition is not true, then the method 1150 proceeds to 1157.

At 1156, the variables, counters and parameters are initialized. For instance, in this example embodiment, the variable L_old represents the current frame length (based on information from the previous frame(s), L represents the current position within a frame, and state represents the number of valid synchronization patterns that have been found (although the state counter is bounded in value by the max state value). CRC represents the register that is used to generate a dynamic sync portion, and the parameters sweet_spot represents whether synchronization has been obtained (i.e. sweet_spot=1 during one clock cycle every frame after synchronization has been obtained), bitstream_mode represents whether the search is conducted under word mode (i.e. bitstream_mode=0) or bitstream_mode (i.e. bitstream_mode=1) and sync_begin represents whether the search for the synchronization pattern has to be restarted from the beginning (i.e. sync_begin=1). Some parameters, counters and variables may not be shown at 1156 for simplicity of illustration. In alternative embodiments, other parameters, counters or variables can be used. After initialization, the method 1150 proceeds to 1157.

At 1157, the method 1150 determines whether the parameter clock_gate is set to true (i.e. 1). This parameter is used so that the same search structure can be used when operating under word mode or bitstream mode. The use of clock gating is a way to save power and to simplify the logic that is used to implement the synchronization search methods. A benefit of clock gating is that the same power consumption per slave device can be achieved regardless of how many slave devices attempt to synchronize with the bus 64. However, clock gating can be optional in alternative embodiments.

After the check at 1157, the method 1150 proceeds to 1158 to wait for next clock transition. In another embodiment, the clock gating may be replaced by a clock enable signal. In this case this check would follow 1160 before entering 1164. This has the same advantage as using clock gating, namely that the same method may be used for both word mode and bitstream mode, but the disadvantage that power consumption is not reduced as much as compared to true clock gating. It can be used in configurations where clock gating is not available.

At 1158, the method 1150 synchronizes with the clock as described previously in order for the remaining actions of the method 1150 to start at a new clock cycle for the bus 64.

At 1160, the method 1150 sets the sync_begin parameter to 0. This is done to automatically reset this flag during every clock cycle, but when the frame format changes (see act 1220 in FIG. 61*b*) sync_begin will be set to true. The sync_begin parameter is used as a flag to reset the counters used in bitstream mode.

With clock gating, the transmitted data is read when the clock_gate parameter is set to 1. Therefore, in word mode, the clock_gate parameter is usually set to 1 but in bitstream mode, the clock_gate parameter is set to 1 for only those bits in the transmitted data that correspond to the current bitstream frame channel that is being searched for the synchronization pattern. This depends on the bitstream channel that is currently being searched through (B) and the current channel (C which changes during every clock cycle), which are both referenced starting at 0. The maximum number of channels that are investigated for a bitstream frame format is Amax, while the current search investigates the frame format that has a number of channels equal to A. The parameter DL is used to monitor the current position within a subframe, similar to L, except that a short format is used. For the first bitstream frame channel index (B=0) and for a currently assumed number of bitstream frame channels A (the position of C can vary from 0 to A−1), the value of B is used to obtain a starting position for reading data from the transmitted data and the value of C is used to skip over channels that are not being searched at the moment. In this example, with clock gating and bitstream mode, the method 1150 starts reading the transmitted data at position 0 and then skips ahead A time slots to read the next transmitted data for the bitstream frame channel that is being searched. Accordingly, in this example, the clock_gate parameter is set to 1 for the $0^{th}$, $A^{th}$, $2*A^{th}$, % etc. time slots and is set to 0 for the other time slots.

At 1164, the parameter sweet_spot is set to 0 and the current position L is incremented by 1. The method 1150 then proceeds to 1166.

At 1166, the method 1150 determines whether there is a match for the constant sync portion in the current transmitted data that is being searched. This act was described for method 900 and 950. If this condition is true, the method 1150 proceeds to 1168. If this condition is false, the method 1150 proceeds to 1169 to check if there is a missing sync symbol.

At 1168, since a constant sync portion has been located, the method 1150 determines whether the state counter is equal to 0. If this condition is true, then this is the first time a constant sync portion has been located and the method 1150 proceeds to 1170. If this condition is not true, then the method 1150 proceeds to 1172 to check if the located constant sync portion is valid.

At 1169, the method 1150 determines whether the state is at least 2 and that the current position matches the length of a frame (the length of a frame will have been obtained if the method has found at least two constant sync portions which means having a state value of 2). In this case the method 1150 expects to find a synchronization symbol, but none has been found for the current frame. Therefore, the method 1150 proceeds to 1174, where it calls the missing sync method 1200 (see FIG. 61*a*). If the comparison at 1169 is not true, the method 1150 is not at a position where a synchronization pattern is expected. Therefore, it is not an error and there is no synchronization pattern. The method 1150 therefore goes back to the main entry point 1152 to continue searching for the next constant sync portion.

At 1170, the method 1150 sets the state counter to 1 (which means that the sync symbol has been located for the first time), resets the current position L to 0 (this indicates the start of a frame) and calculates the next dynamic sync symbol (i.e. the next expected dynamic sync symbol) that should be associated with the next constant sync symbol that is located. The next dynamic sync symbol is calculated based on a read CRC value from the bus 64 following the sync constant and incremented to the next value using the deterministic method. The method 1150 then proceeds back to 1152 to search for the next synchronization pattern. Accordingly, the reset parameter is not set to true and the method 1150 proceeds to 1157.

It should be noted that the terms constant sync portion and constant sync symbol are analogous to one another. It should also be noted that the terms dynamic sync portion and dynamic sync symbol are analogous to one another.

At 1172, the method 1150 determines if it has located only a single sync symbol or if the current position matches the expected frame length. If this condition is not true, the current located constant sync symbol will be ignored and the method 1150 will proceed back to the main loop 1152. If the condition checked at 1172 is true, the method 1150 proceeds to 1173.

At 1173, the method 1150 sets the current search position (L) to zero. The method 1150 then proceeds to 1176.

At 1176, the method 1150 determines whether the dynamic sync portion associated with the currently located constant sync portion is equal to the expected dynamic sync portion that was calculated. If the condition is true, the method 1150 proceeds to 1178. If the condition is false, then there has been at least one error and at least one of the previous constant sync portion or the current constant sync portion is invalid. The method 1150 then proceeds to 1186 to use randomness in order to select between the position where the previous constant sync symbol was found and ignore the current constant sync symbol or use the new position where the current constant sync symbol has been found and ignore the previous position (since they don't match).

At 1178, the method 1150 sets the value of the current framelength L_old to the current position L and calculates the next dynamic sync symbol based on the value of the current dynamic sync symbol and the deterministic method. The method 1150 then proceeds to 1180.

At 1180, the method 1150 determines whether the state counter is equal to the max state value. For example, the max state value can be set to 7 when the maximum CRC index is 15. In another embodiment, the max state value could be 15 or some other integer N. Using a value of 7 (or using a value that is about half of the number of possible dynamic sync portions) is a compromise between the time to achieve synchronization and the robustness of the synchronization method. For example, based on a CRC counter with 15 values, 9 binary bits may be used for the constant sync portion and the chance of a false synchronization condition (i.e. achieving synchronization based on a false synchronization pattern) is $(2^{-9N})*(15^{-N})$ based on random bus traffic and verifying the synchronization patterns N times. However, if there is random static bus traffic that matches the sync symbol, the chance for this condition to happen is $15^{-N}$. For the case of N=7, the chance of false synchronization is at most $5.9*10^{-9}$, but usually much lower.

If the condition at 1180 is true, then synchronization has been achieved and the method 1150 proceeds to 1182 where the sweet_spot parameter is set to 1 to indicate that the slave device 54 is currently in synchronization with the master device 52 and the bus 64. This flag may be used by other logic in the slave device 54 to keep track of internal timing. In order to find the subframe length, the frame length may be divided by a factor of three. The method 1150 then proceeds to 1152 to continue searching for future constant sync portions to maintain synchronization.

If the condition at 1180 is not true, then synchronization has not yet been achieved and the method 1150 proceeds to 1184 where the state counter is incremented by one. The method 1150 then proceeds to 1152 to search for the next constant sync portion and to continue trying to achieve synchronization.

At 1186, there is a dynamic sync portion error and therefore at least one of the previously located constant sync portion or the currently located constant sync portion is invalid. The method 1150 then determines whether the state counter is less than 4 and the parity is equal to 0. If the state counter is 4 or higher, the method 1150 has already successfully located several constant sync portions and a single error will be allowed during synchronization. However, the method 1150 treats the previously located sync position with less faith by decreasing the state value. If the condition at 1186 is not true, the random component (e.g., but not limited to, the parity bit) indicates that the method 1150 should maintain the last sync position (e.g. parity equal to one) as a valid position or keep the current sync position (e.g. parity is equal to zero) as a valid position. Note that the value of 4 is actually the mid state value which is approximately the max state value divided by 2 (in this example, the max state value is set to 7). In other embodiments, other values can be used for the max state value and the mid state value. As long as there is anything with a physical nature (i.e. a sensor providing measurement data or an analog-to-digital converter providing voltage or current measurement) that is connected to the bus 64 there will be a random component to the bits appearing on the bus 64 due to the digitization process so that the value of the parity will be random from frame to frame. This fluctuation is guaranteed by quantum physics, since the fluctuation-dissipation theorem guarantees fluctuations for any system with dissipation. Therefore, unless all bus traffic is generated by a deterministic state machine, the parity will be truly random. Furthermore, in other embodiments, the parity could be checked to see if it is equal to 1 since both the number of 0's and 1's transmitted during a frame is random. If the condition at 1186 is true, the method 1150 proceeds to 1188. If the condition at 1186 is false, the method 1150 proceeds to 1190.

At 1188, the method 1150 rejects the previously located constant sync portions and resets the values of several variables and counters. The method 1150 will now use the current position as the start of a frame. The current position within a frame (L), the calculated frame length (L_old) and the state counter are all reset. The next dynamic sync portion is calculated using the deterministic method based on the last dynamic sync portion read from the bus 64. This is equivalent to saying there is no information about the frame, and it is assumed that the frame starts at the current position. The method 1150 proceeds to 1152 so that the synchronization process can be restarted from the beginning.

At 1190, the method 1150 accepts the previous located sync portion as valid and decreases the state counter. This indicates that the method 1150 has less faith in the current position as indicated before, because an error in the dynamic sync portion check has been encountered after several previous successful checks. The value of the next dynamic sync portion is then calculated based on the deterministic method and the previous dynamic sync portion that was located, and not on the dynamic sync portion that was just obtained from the bus 64 The method 1150 then proceeds to 1152 to find the next constant sync portion.

Referring now to FIG. 61*a*, shown therein is a diagram of an example embodiment of a synchronization method 1200 that can be used to check for missing synchronization patterns and used with the method 1150.

The method 1200 basically determines that if there is an error and synchronization has not been achieved, then the synchronization process has to be restarted from the beginning. Otherwise, if synchronization was achieved before the error occurred, then the method 1200 decreases the state counter by one and will search for the next sync symbol as if nothing happened rather than restart the entire synchronization process from the beginning.

Since the method 1200 expected a sync symbol, but there was none found, the current position is reset to zero at 1204, i.e. the method 1200 assumes that the frame starts at the current position even though the last located constant sync portion is in error, e.g. due to noise on the bus 64, for example. This will work for any data errors on the bus 64 but not for glitches on the clock signal.

At 1206, the method 1150 determines whether or not the slave device 54 is in lock with the master device 52. If it is in lock (state=max state), a single error will be allowed and the state value will be decreased at 1208. In this case the next dynamic sync portion is calculated based on the previous CRC value on the bus 64 and not the current CRC value on the bus 64, which seems to be wrong. Thus, the previous CRC value is updated. If this value does not match the current CRC value on the bus 64, then this updated CRC is updated once more to be compared to the next read CRC value. This scheme allows for a single CRC error while still maintaining synchronization (it is assumed that only the constant sync portion is in error). The method 1150 then proceeds to 1211 and returns to 1152 of the main search method 1150.

At 1210, there has been more than one error or the slave device 54 is not yet in synchronization with the master device 52. Therefore, the search method is restarted again by resetting certain parameters, since those conditions will not happen for a valid synchronization position. The method 1150 then proceeds to 1211 and returns to 1152 of the main search method 1150.

Figure 62:
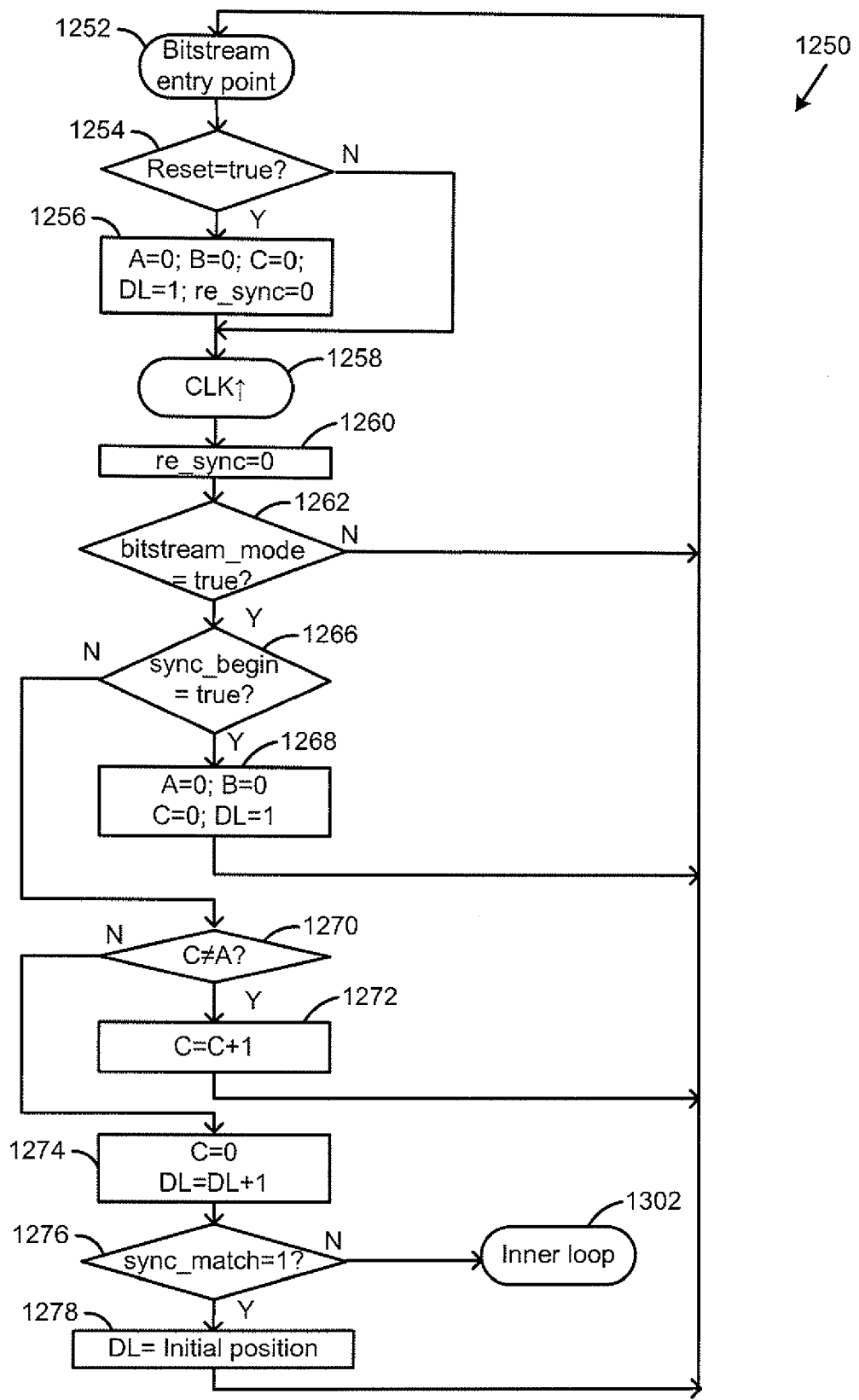
FIG. 62 is a diagram of another example embodiment of a bitstream mode synchronization method that may be used with the universal synchronization method of FIG. 60.

Referring now to FIG. 62, shown therein is a diagram of an example embodiment of a bitstream mode synchronization method 1250 that can be used with the method 1150.

At 1252, an instantiation of the method 1250 is initialized. Function calls to the method 1250 create an instantiation of the method 1250.

At 1254, the method 1250 determines whether the parameter reset has been set to true (i.e. to 1). If this condition is true, then this means that all of the parameters, counters and variables used to search for a synchronization pattern under the assumption of bitstream mode are reset to their initial values so the method 1250 proceeds to 1256. Otherwise if the condition at 1254 is false, the method 1250 proceeds to 1258.

At 1256, the parameters, states and counters that are used to search for, locate and verify the synchronization patterns under the assumption of bitstream mode are initialized. For example, the initialization includes defining the current assumed number of bitstream frame channels (A), a channel counter or index (B) indicating the channel that is currently being searched through, a counter (C) going through all the channels to activate clock gating for the channel that is being searched through and a the current position within a bitstream channel (DL), which is similar to the current position within a frame (L). The maximum allowed number of channels is defined by Amax and may be equal to 16 in one implementation. The method 1250 then proceeds to 1258.

The A, B and C variables are referenced from a value of 0 so setting the current number of bitstream frame channels to 8 means that A=7. This is done to save register space. To understand how these variables are used, assume that there are 3 maximum number of bitstream frame channels so Amax=2. The counters are then set to A=0, B=0, C=0 and DL=1. This means that there is currently assumed to be 1 bitstream frame channel (A=0), the current bitstream frame channel being searched for a synchronization pattern is the first bitstream frame channel (B=0), the counter looking through all channels starts in a first position (C=0) and the starting position in the transmitted data is 0 (DL=1).

The method 1250 works by systematically going through all possible structures of the bitstream frame format and trying to obtain synchronization in any of the allowed channels for each assumed frame format. The method 1250 will continuously increment the channel index counter C, which indicates which bitstream channel is currently being transmitted on the bus 64. When C is equal to the number of channels (A) defined for a frame format, it is reset and the general search method 1150 will capture a single bit, i.e. take out a single bit from the multiplexed signals on the bus 64 and assume this belongs to the frame channel containing the synchronization. At the same time, the current bit position (DL) within a channel will be advanced by one. If synchronization is not obtained in this channel, the current channel (B) that is searched for the synchronization pattern is incremented by one. If B is equal to A, the current number of channels, the search is complete for the current assumed number of channels for the current assumed frame format and A is incremented by one. If A is equal to Amax, the method 1250 has searched through all formats and all channels, otherwise C, DL, B and A will be incremented, in that particular order, to search through another channel for the synchronization pattern.

At 1258, the method 1250 synchronizes with the clock as described previously in order for the remaining actions of the method 1250 to start at a new clock cycle for the bus 64. The synchronization can either be done at the rising, falling or both clock edges as earlier described.

At 1260, the parameter re_sync is set to false (i.e. a logic value of 0). This signifies that the search by the main search method 1150 proceeds uninterrupted. When this parameter is set to true, the current search position L and the current frame length L_old are both reset to zero. This happens if no synchronization symbol has been found in the current bitstream channel that is being searched through. The method 1250 then proceeds to 1262.

At 1262, the method 1250 determines whether the parameter bitstream_mode is set to true (i.e. a logic value of 1). If this condition is true, then the method 1250 proceeds to 1266. If this condition is false, nothing happens and the method 1250 proceeds back to the bitstream entry point 1252. This is done so that all variables are in a well-defined state and this also lowers current consumption. It could be omitted in some embodiments. The check performed at 1262 may also be done earlier in the method 1250 in an alternative embodiment.

At 1266, the method 1250 determines whether the parameter sync_begin is set to true (i.e. 1). If this condition is true, then this means that the search for the synchronization pattern is starting at the very beginning under bitstream mode. The method 1250 proceeds to 1268 where the counters and parameters are reset to their initial values to assume that there is only one bitstream frame channel in which case the search for the synchronization pattern begins at the first bit in the first bitstream frame channel. If the condition at 1266 is false, then the search process for the synchronization pattern is not starting at the very beginning and the method 1250 proceeds to 1270.

At 1270, the method 1250 determines whether the current active bitstream channel (C) is not equal to the current assumed number of bitstream channels (A) that are being searched. If the condition is true, then the method 1250 proceeds to 1272 at which point the current active bitstream channel is increased by 1 (i.e. the next channel is active for searching purposes) and the method 1250 proceeds to 1252 at which point the search for the synchronization pattern is carried out by waiting until the current active bitstream channel is equal to the channel that is currently being investigated, namely channel B.

If the condition at 1270 is false, then this means that the currently active bitstream frame channel is the channel that is being searched through. In this case, the clock to the main search method 1150 will be enabled or a logic enable flag will bet set to enable the method 1150 to proceed. Accordingly, the method 1250 proceeds to 1274 at which point the active channel (C) is started over again at zero so that the method can determine the next time that the active channel is being searched. Simultaneously, the position within the frame channel that is being investigated is advanced by 1 (DL=DL+1). This is similar to the incrementing of the current position L in the main search method 1150. At 1274, the method 1250 then enables one bit of transmitted data to be checked by the main search method 1150. The method 1250 then proceeds to 1276.

At 1276, if the synchronization pattern has been found in the current active frame channel, then the method 1250 proceeds to 1278 at which point there is a possibility of being in synchronization. At 1278, the current position counter is then initialized to an initial position, e.g. 128, but it could also be some other value, e.g. 0. The comparison done at 1276 can be the same as was described for methods 900 and 950 in order to determine that the located sync portion is a valid sync portion. The parameter DL may be set to a large number at this point to allow the method 1250 to search for a longer time, if one sync symbol has been found. The method 1250 then proceeds to 1252 to read in the next bit from the multiplexed data stream. However, if the condition at 1276 is not true, then the method 1250 proceeds to the entry point 1302 to call a method that will loop through the remaining bitstream frame channels. This can be accomplished by another method such as method 1300 described with respect to FIG. 63.

Figure 63:
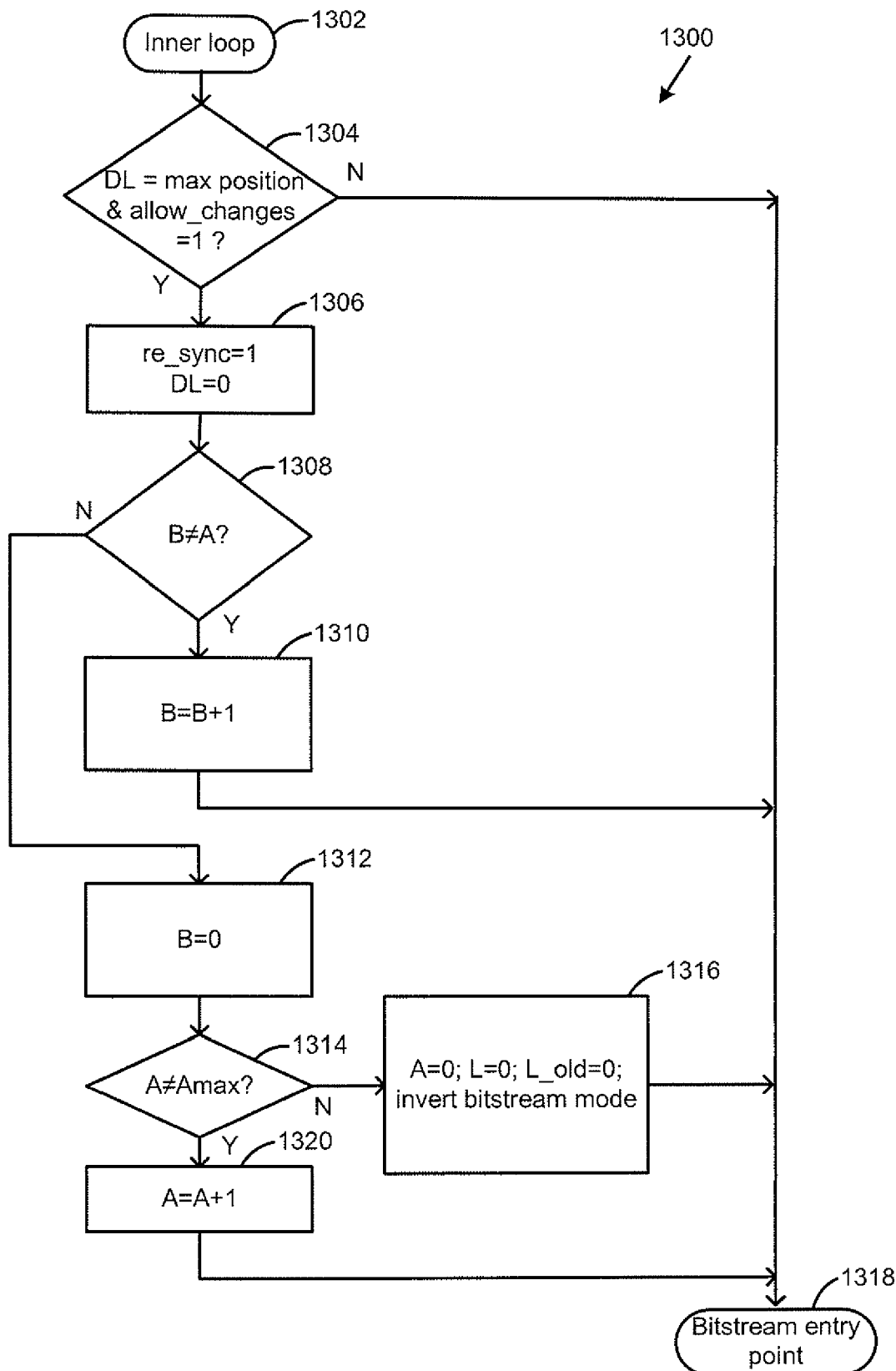
FIG. 63 is a diagram of an example embodiment of a bitstream update method that may be used with the bitstream mode synchronization method of FIG. 62.

Referring now to FIG. 63, shown therein is a diagram of an example embodiment of a bitstream update method 1300 that can be used with the bitstream mode synchronization method 1250.

At 1302, an instantiation of the method 1300 is initialized. Function calls to the method 1300 create an instantiation of the method 1300.

At 1304, the method 1300 determines whether the current bitstream starting position DL is at a maximum position (which is equivalent to being greater than a maximum frame length) and whether the allow_changes parameter is 1 (i.e. a logic true value). If this condition is true, this means that the searching method has to still achieve synchronization and the method 1300 moves to 1306. This means no synchronization was obtained in current frame channel. In some embodiments, the maximum position may be a value of 127. This is the last value to be reached if the initial value of DL was set at 128 and binary counting with wrap-around is used, but other maximum values could be used in other embodiments. If the condition at 1304 is false, this means that the method 1250 has not completed checking the current frame channel. In this case the method 1300 moves to 1318 and then back to the bitstream searching method 1250 to read in more bits from the current frame channel that is being investigated.

At 1306, the re_sync parameter is set to 1 (i.e. a logic true value) and the parameter DL is set to 0, but it could also be set to some other initial value. This means that the synchronization pattern was not found in the current bitstream frame channel and the next bitstream frame channel should be tried. By setting the parameter re_sync to 1, the parameters L and L_old will be reset in the main search method 1150, thereby starting a new search. The method 1300 then proceeds to 1308.

At 1308, the method 1300 determines whether the current frame channel (B) that is being investigated is not equal to the assumed number of frame channels (A). If this condition is true all channels within the currently assumed number of channels have not been investigated. The method 1300 then proceeds to 1310 where the current frame channel that is being investigated (B) is increased by one. The next frame channel will be searched for the synchronization pattern by calling the method 1250 at 1318. If the condition at 1308 is false, the method 1300 has been through all channel positions with the current assumed frame format. The parameter A indicates the current assumed number of frame channels. In this case, the number of assumed channels (A) will eventually be incremented by one. The method 1300 proceeds to 1312 where the current frame channel that is being investigated is re-initialized and set to 0. The first bitstream frame channel within the new assumed number of channels can then be searched. The method 1300 then proceeds to 1314.

At 1314, the method 1300 determines if the currently assumed number of bitstream frame channels (A) is not equal to the maximum allowed number of bitstream frame channels (Amax). If the condition is true, then the method 1300 proceeds to 1320 where the currently assumed number of bitstream frame channels is increased by one and the method 1300 then proceeds to search through the first frame channel with the newly assumed frame format and calls the method 1250 at 1318. If the condition at 1314 is false, this means that all of the positions in all allowed bitstream frame formats have been searched and the synchronization pattern has not been found. The method 1300 then proceeds to 1316 where the currently assumed number of bitstream frame channels is set to 0. The method 1300 then initializes the current position (L) within a frame and the frame length (L_old) and inverts the mode of operation (i.e. from bitstream mode to word mode). The method 1300 then proceeds to 1318 and then to 1252 of the search method 1250. In word mode, the method 1250 still runs, but with lower power consumption, since bitstream mode is false (see the decision at 1262). The bitstream method 1250 and the clock gated word mode method 1150 can be run (i.e. carried out or executed) in parallel.

Figure 64:
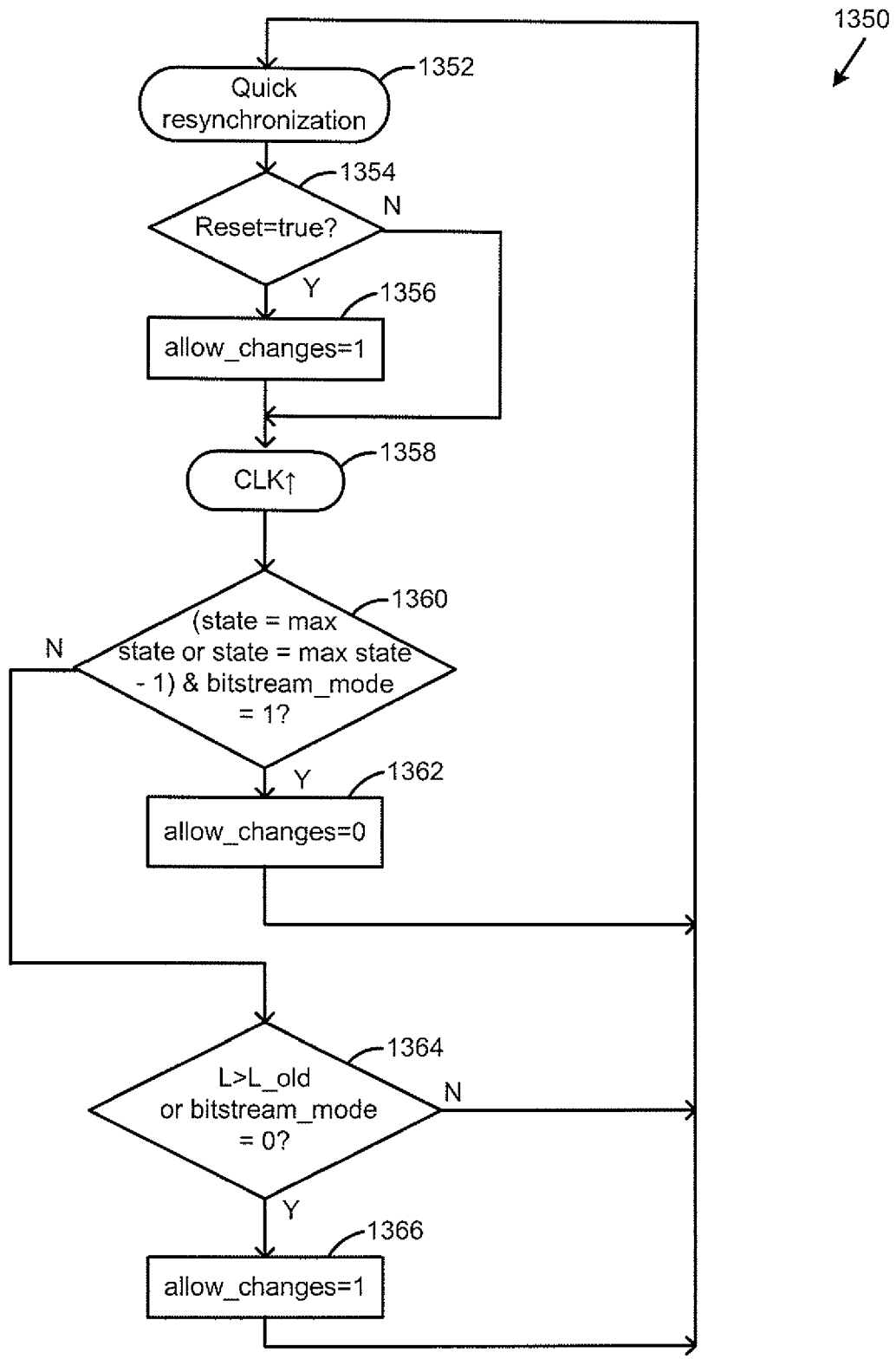
FIG. 64 is a diagram of an example embodiment of a quick resynchronization method.

Referring now to FIG. 64, shown therein is a diagram of an example embodiment of a quick resynchronization method 1350. The quick resynchronization method 1350 can be used when synchronization has already been achieved and a synchronization method is still being used in order to maintain synchronization. For example, the method 1350 can be run or executed in parallel with the methods 1150 and 1250.

At 1352, an instantiation of the method 1350 is initialized. Function calls to the method 1350 create an instantiation of the method 1350.

At 1354, the method 1350 determines whether the reset parameter has been set to true. If this condition is true, the method 1350 proceeds to 1356 at which point the parameter allow_changes is set to 1 (i.e. true). The method 1350 then proceeds to 1358. However, if the condition at 1354 is not true then the method 1350 proceeds to 1358.

At 1358, the method 1350 synchronizes with the clock as described previously in order for the remaining actions of the method 1350 to start at a new clock cycle for the bus 64.

At 1360, the method 1350 determines whether the value of the state counter is equal to the max state value or the max state value −1 (which can be set to 6 & 7 for example) and whether the search for the synchronization patterns is operating under bitstream mode. This compares the current state value against two different state values to allow for a single error in synchronization. If this is true, then the method 1350 proceeds to 1362 where the value of the parameter allow_changes is set to 0 (i.e. false) which means that synchronization has been achieved and the current state should be maintained even if some errors occur. This means that even if an error occurs in bitstream mode, the synchronization method will not immediately go out of lock. This condition is covered by the allow_changes parameter and act accordingly (in other words, the synchronization method is not allowed to immediately change back from assuming it is bitstream mode and back to assuming it is word mode based on a single error). The method 1350 then proceeds to 1352 to continue to monitor for any changes in the state value. However, if the condition at 1360 is false then the method 1350 proceeds to 1364.

At 1364, the method 1350 determines whether the search has exceeded the current frame length or whether the search for the synchronization patterns is operating under word mode. Therefore, the condition at 1364 can be used to find situations in which more than one error has occurred or the synchronization search method is operating under word mode. If the condition at 1364 is false, then the method 1350 proceeds to 1352. If the condition at 1364 is true, then the method 1350 proceeds to 1366 at which point the allow_changes parameter is set to 1 so the current value of B and A may be changed (after act 1304 of method 1300) if no synchronization symbol is found.

Figure 65:
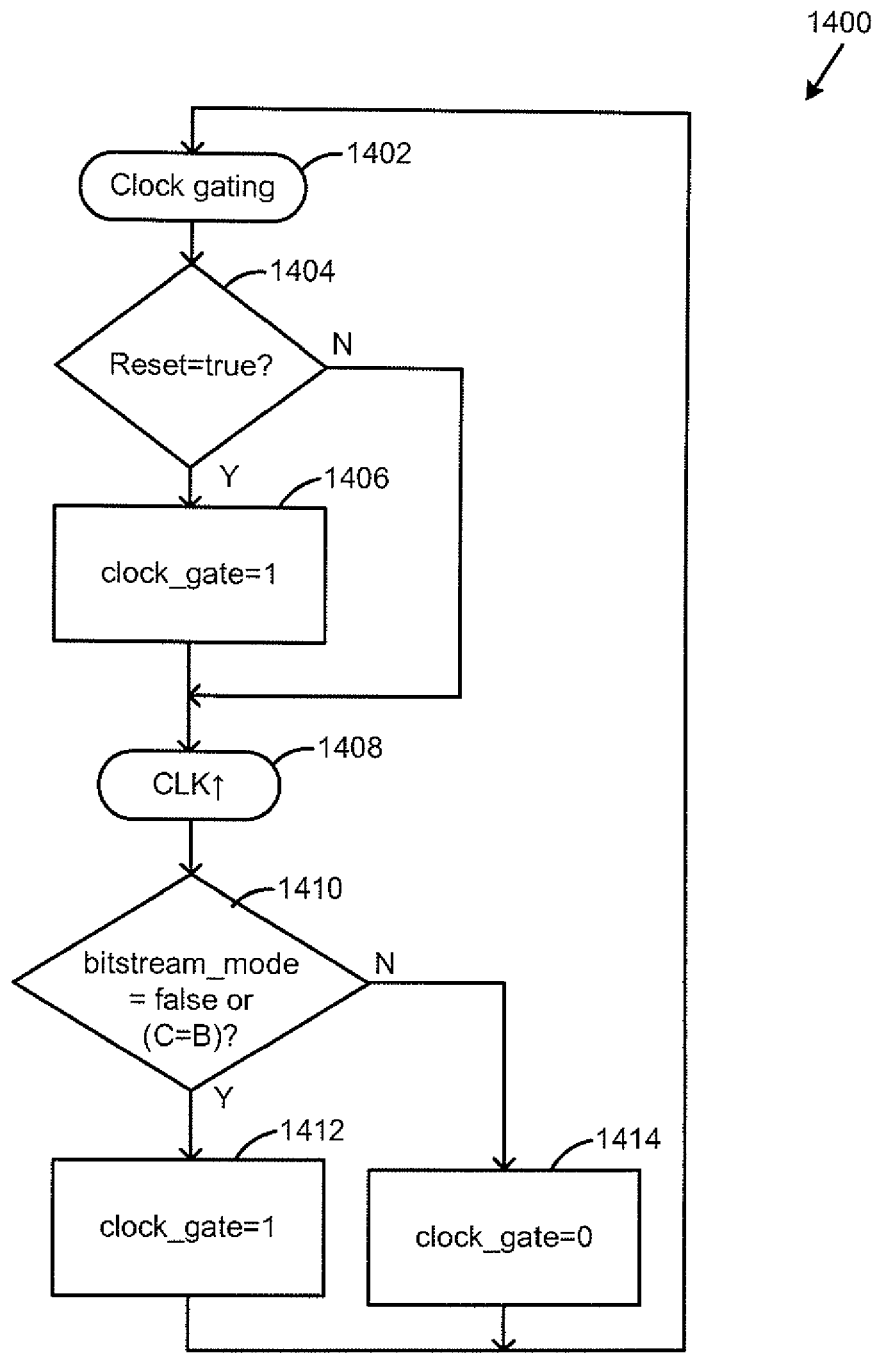
FIG. 65 is a diagram of an example embodiment of a clock gating method that can be used with the universal synchronization method of FIG. 60.

Referring now to FIG. 65, shown therein is a diagram of an example embodiment of a clock gating method 1400 that can be used in parallel with the methods 1150, 1250 and 1350 described herein. The clock gating or clock enable is used to control the main method 1150, so that it captures bus activity all the time in word mode and so that it only captures bus activity during the times when the current frame channel that is being monitored is active in bitstream mode, as explained previously.

At 1402, an instantiation of the method 1400 is initialized. Function calls to the method 1400 create an instantiation of the method 1400.

At 1404, the method 1400 determines whether the reset parameter has been set to true. The reset parameter is either set by a power-on reset signal or by an external event such as a controlled reset event initiated by a bus controller. If this condition is true, then the method 1400 proceeds to 1406 at which point the clock_gate parameter is set to 1 which means that the default condition is that the clock should be enabled in the search method that is using the method 1400. The method 1400 then proceeds to 1408. If the condition at 1404 is false, then the method 1400 proceeds directly to 1408.

At 1408, the method 1400 synchronizes with the clock as described previously in order for the remaining actions of the method 1400 to start at a new clock cycle for the bus 64.

At 1410, the method 1400 determines whether the current position within a multiplexed bitstream channel (C) is equal to the current channel that is being monitored or if the method is operating in word mode. In both cases, the clock should be enabled for the method 1150. If the condition at 1410 is false, the method 1400 proceeds to 1414 at which point the parameter clock_gate is set to 0, which means that the clock is disabled and the method 1150 is idle during the following clock period and ignores current data on the bus. At the completion of acts 1412 or 1414, the method 1400 proceeds back to 1402 to check if the mode of operation (i.e. bitstream mode or word mode) or the values of C and B have changed. This is done in every clock cycle since C and B can change value in every clock cycle.

Figures 66, 67:
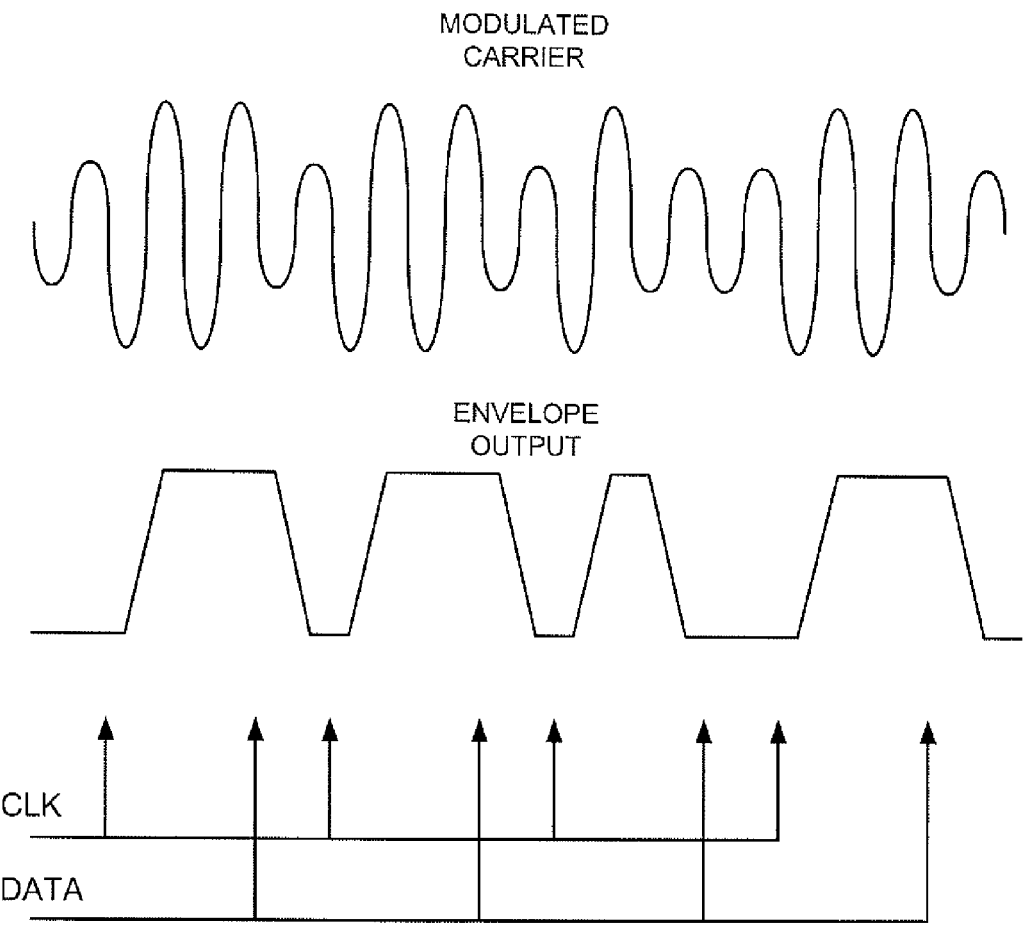
FIG. 66 shows an example of how the various embodiments of the unified bus communication protocol can be used in wireless communication.
FIG. 67 is a diagram of another example embodiment of the fields and bit allocations for a synchronization word.

It is also possible to use at least one embodiment of the unified bus communication protocol described herein over a wireless link. In this case, the wireless link or wireless interface can be considered to be the bus. It is especially suited for configurations where the delay is low (e.g. for high speed short distance links such as RF-ID like links or wireless docking stations) or where the communication speed is not too high and is limited by a longer propagation distance. For example, at least one embodiment of the unified bus communication protocol can be used in a low power magnetic link system, where a master device transmits a modulated carrier signal and utilizes the same time slot system as described for a single wire bus embodiment. The slave device will rectify the RF signal and use the envelope of this rectified signal as the "bus signal" in order to derive the clock and data signals, as shown in FIG. 66. In order for the slave device to communicate back to the master device, it may use a separate transmitter for long distance links, but for a simple magnetic link it may simply load the transmitted carrier signal. Similar to the single wire bus case, the loading of the transmitted carrier signal can be used as a mechanism for communicating back to the master device with the same advantages, namely the receiver can retrieve the clock and data directly from the transmitted carrier signal. Furthermore, the protocol and hardware are relatively simple to implement. The transmitting and loading of the carrier signal can be accomplished by the use of two small coils, e.g. implemented as a number of circular turns on a part of a PCB in the master device and the slave device. The spacing and number of turns of these PCB coils may be improved to utilize the inherent parasitic capacitance between the windings for tuning of these coils to a specific frequency of operation. In an alternative embodiment, two coupled transmission lines may be used for high frequency of operation and high speed data transfers. The transmitted carrier signal will typically have a frequency that is much higher than the bandwidth of the data, e.g. a 433 MHz, or 2.4 GHz carrier signal could be used as carrier and a frequency of 3.072 MHz or 19.20 MHz could be used as the transfer rate of high quality stereo audio. In some embodiments, a much higher carrier frequency, such as 24 or 60 GHz may be used, especially if broad band data such as high definition video, for example, may be transferred. These signals could be transmitted through closely coupled transmission lines. Furthermore, if the power requirements of the receiver is low, it is possible to power this device by the power from the transmitted carrier signal (that was sent from the master device) enabling similar functions as compared to an RF-ID device, but with the possibility of a higher bandwidth and more functionality. This enables the transfer of identity information or the transfer of larger amounts of information, e.g. files, audio, pictures or movies. In some embodiments, more than one data bit may be transferred after a given clock transition and before the next clock transition for enabling a higher bandwidth of the data. By encrypting the data, a secure handling of data can be obtained.

The next section of the description discusses other example embodiments of the unified bus communication protocol in which modifications have been made to achieve one or more benefits.

Referring now to FIG. 67, shown therein is a diagram of another example embodiment of the fields and bit allocations that can be used for a synchronization word otherwise known as an S word. For this S word, the IRQS bit (S15) is the first bit (or first time slot), the parity bit (S14) is now the $2^{nd}$ bit (or second time slot) and the ACK bit (S0) is now the last bit (or last time slot in which the S word is transmitted on the bus 64). The remainder of this S word format is similar to the one shown in FIG. 7 and will not be discussed.

In an example embodiment, the default value of the S word at power-up of the bus 64 can be "0010.1100.0111.1110"=0x2C7E. This is equivalent to starting the pseudo random sequence with a value of "1111".

It should be noted that with this different configuration for the S word, many of the example frame formats described herein will change such as those shown in FIGS. 40 to 44 due to the different ordering of bits in the S word of FIG. 67.

The purpose of the IRQS bit is to postpone a READ or WRITE or FUNCTION operation, if a slave device has an important status message to send. This status message can be sent by activating the IRQS bit. If no slave device has activated the IRQS bit (a logic level of '1' means activate in this example) or if the IRQS interrupt function is disabled by the S15 DELAY MASK, the READ or WRITE or FUNCTION operation will proceed. The interrupt is activated if the slave device has a status level equal to "10" or "11". To generate this interrupt, the slave device can copy the contents of the MSB of its status register onto the bus 64 during the timeslot in which the IRQS bit is being transmitted on the bus. As previously mentioned, Table 7 shows the frame action that occurs for various combinations of several command operations (i.e. PING, FUNCTION, READ and WRITE) and the values of the IRQS and S0 DELAY bits.

In at least one embodiment, the IRQS bit may also be used to enter into an ultra-low power mode since an interrupt can now occur at the beginning on an S word rather than at the end of the S word as was the case for the S word of FIG. 5. Accordingly, with the S word of FIG. 67, the devices attached to the bus 64 can be configured to enter a sleep mode right at the beginning of the S word, which occurs at the beginning of a frame. When the sleep mode is entered, the clock signal will be disabled and the value of the clock line will be at a static logic zero value or a static logic one value.

In at least one embodiment, the IRQS bit may also be used to wake up the bus 64 during a low power shutdown. In this case, the clock signal will be left in the high or low logic value state and any changes in the data line will resume the operation of the clock signal (i.e. the clock signal will no longer be held at a static value). The data line can be driven until the clock signal has changed state and has become active. In other embodiments, the slave device 54 may wake up the bus 64 by activating the clock line itself; in this case the master device 54 leaves the clock line in a weakly driven static state during a power down mode which can be done by driving the clock line using a bus holder.

The PAR bit is calculated as was described for the S word of FIG. 7 and will not be discussed here.

The acknowledgement bit ACK is calculated as was previously described, i.e. based on the bus traffic in the last frame. However, the difference now is that the ACK bit is transmitted on the bus 64 much later in time after the PAR bit. This is advantageous as it allows slower slave devices more time to calculate an ACK bit based on its parity calculation and comparison to the PAR bit. An example of this is shown in FIG. 68 which is another example timing diagram that shows data operations to the S word of FIG. 67 in word mode. The master device 52 writes the parity value in bit S14 and then the slave device 54 calculates the parity value and responds with an ACK or NACK 14 time slots later if it is equal or not equal, respectively, to the parity value calculated by the master device 52.

In an alternative embodiment, the fields of the X word can be modified such that addresses 12-14 of the ADDRESS field may be used to program several devices simultaneously using a SELECT GROUP ADDRESS function. All devices that are assigned to this group address can then be written to using a single WRITE operation which increases time efficiency and increases power efficiency for the bus 64. The group address may be disabled for a particular device by setting the value of the group address (GROUP) to 15, which is equivalent to broadcasting to all devices attached to the bus 64, which the devices support in this example embodiment. Similarly, the default GROUP address may be 15, which indicates that the device will not belong to a particular device subgroup at power-up.

In at least some embodiments, another modification that can be made to the ADDRESS field of the X word is that the address field is encoded in reverse order as compared to all other data on the bus 64. In this case, X7 is ADDRESS bit 0 and X0 is ADDRESS bit 7 (which is the reverse of the X word shown in FIG. 9*a*). This reverse ordering allows slave devices to have a longer internal access time if bit 7 is not used. In this case only the first 128 words can be programmed in an 8 bit address mode (16 bit data).

In a likewise fashion in these embodiments where reverse ordering is used for the ADDRESS bits in the X word, reverse ordering can also be used for the ADDRESS bits in the Y word in which the eight bit ADDRESS field in the Y word may be used together with the ADDRESS field of the X word to form a 16 bit address. For the reverse ordering, Y15 is bit 8 and Y8 is bit 15. This reverse ordering in the ADDRESS field allows slave devices to have a longer internal access time if address bit 15 is not used. In other words, when a value at an address is requested from a slave device, such as in a READ operation, the slave device will have more time to respond if the requested address is at an address value that can be represented by 15 bits instead of 16 bits since the device receives the LSB first due to the reverse ordering used for the ADDRESS fields in the X and Y words. The MSB is then assumed to be zero. In this case, the slave device will have 1 more clock cycle to respond. In this example, the register map is limited to 32 kbytes in 16 bit address mode (8 bit data).

Referring now to FIG. 69*a*, shown therein is another example of a definition of registers that can be used for a master device or a slave device for an example embodiment of the unified bus communication protocol. These registers are an alternative of the register layout shown in FIG. 16*a*. In this example embodiment, it can be seen that the $2^{nd}$ and $3^{rd}$ registers have been reversed. The advantage of this arrangement is that the sequence of programming for the registers is sequential both when using 16 bit data and 8 bit data, i.e. first register 2 is programmed, then register 3 is programmed, then register 4 is programmed and so on and so forth, instead of using a slightly disordered programming sequence, i.e. update register={3, 2, 4, 5, 6 etc}.

Another change is that a DIR field may be used instead of the IRQF MASK field of FIG. 16*a*. When the DIR field is zero, the port direction is input (i.e. data from the bus 64 will be transferred to the device). If the port from the device does not support input, no data will be taken from the bus 64 and the device will not enable output. When the DIR field is one, the port direction is output (i.e. data from the device will be transferred to the bus 64). If a port does not support output, no data will be written to the bus 64. If a bi-directional port is used, it is used as either an input or output, not both at the same time. The advantage of including this bit is that this enables support for bi-directional connections using a single port. In some embodiments, the DIR bit may be ignored by unidirectional ports.

In addition, in this example embodiment, reg. 0x05 is used for the SUBGROUP and REPEAT fields while reg. 0x06 is used for the SYNCHRONIZE AND CHANNEL LENGTH fields. Reg. 0x07 is now used for the FUTURE EXPANSION field and the SKIP field. Reg. 0x08 is now used for a FRAME STRUCTURE field (which is the same as the COMMAND SEPARATION field of FIGS. 29*a* and 29*b*). Finally, reg. 0x09 is used for the PCLKD field and the TDM bit column field. The fields having similar names as those in FIGS. 16*a*, 16*b*, 29*a* and 29*b* have the same function and will not be discussed further. The advantage of the inclusion of additional register bits in the example register definition of FIG. 69*a* is that the programming of the registers is simpler and more combinations of REPEAT and SUBGROUP are allowed.

In this example embodiment, the FUTURE EXPANSION field is reserved for future functions.

In this example embodiment, the SUBGROUP field is now encoded using linear encoding, which enables more combinations of grouping data channels together.

The TDM bit column field is used in bitstream mode to indicate in which column (0-15) TDM data starts to be transferred. The start of the TDM data is defined by the START field and is given in the vertical direction. The START field defines the number of rows to skip before starting data, given in number of four rows. The end of command word is still used as a reference, even in columns that do not contain a control word. It is also allowed to write to any position for columns that do not contain command words. For example, in column zero (the column containing the command words) it is not allowed to write other data in the positions that contain the command words S, X & Y in this example embodiment. The slave device 54 should automatically disable the output for these positions in order to avoid crashing the bus 64 due to a programming error.

In this example embodiment, since the FRAME STRUCTURE field is now included in an earlier register it is not included in the later registers shown in FIG. 29*a*; however, the rest of the register table shown in FIG. 29*a* can be used in this example embodiment.

Referring now to FIG. 69*b*, shown therein is a definition of how many channels can be transferred for each repetition of a port. By varying the SUBGROUP parameter, it is possible to merge the output from two or more ports and thereby lower the latency of data transmission between the ports. As an example, two ports could merge their output by transmitting one channel at a time (SUBGROUP=0). In this way the samples on the bus 64 can alternate between the two ports for every output sample.

Figure 69C:
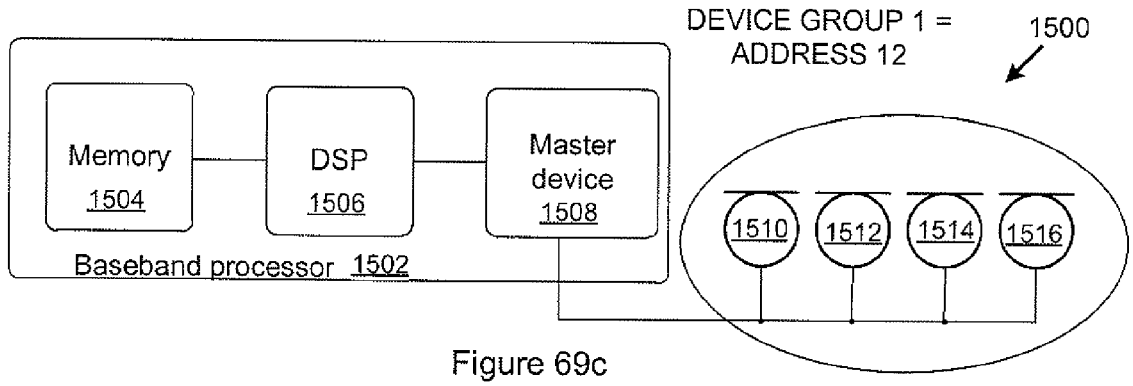
FIG. 69c is a diagram of an example embodiment of a system having devices assigned to one device group address.

Referring now to FIG. 69*c*, shown therein is a diagram of an example embodiment of a system 1500 having devices assigned to one device group address. The system 1500 comprises a baseband processor 1502 including memory 1504, a Digital Signal Processor (DSP) 1506 and a master device 1508. The system 1500 also comprises four microphones 1510-1516. In this example, the four microphones 1510-1516 are assigned to device group 1 which is assigned address 12.

Figure 69D:
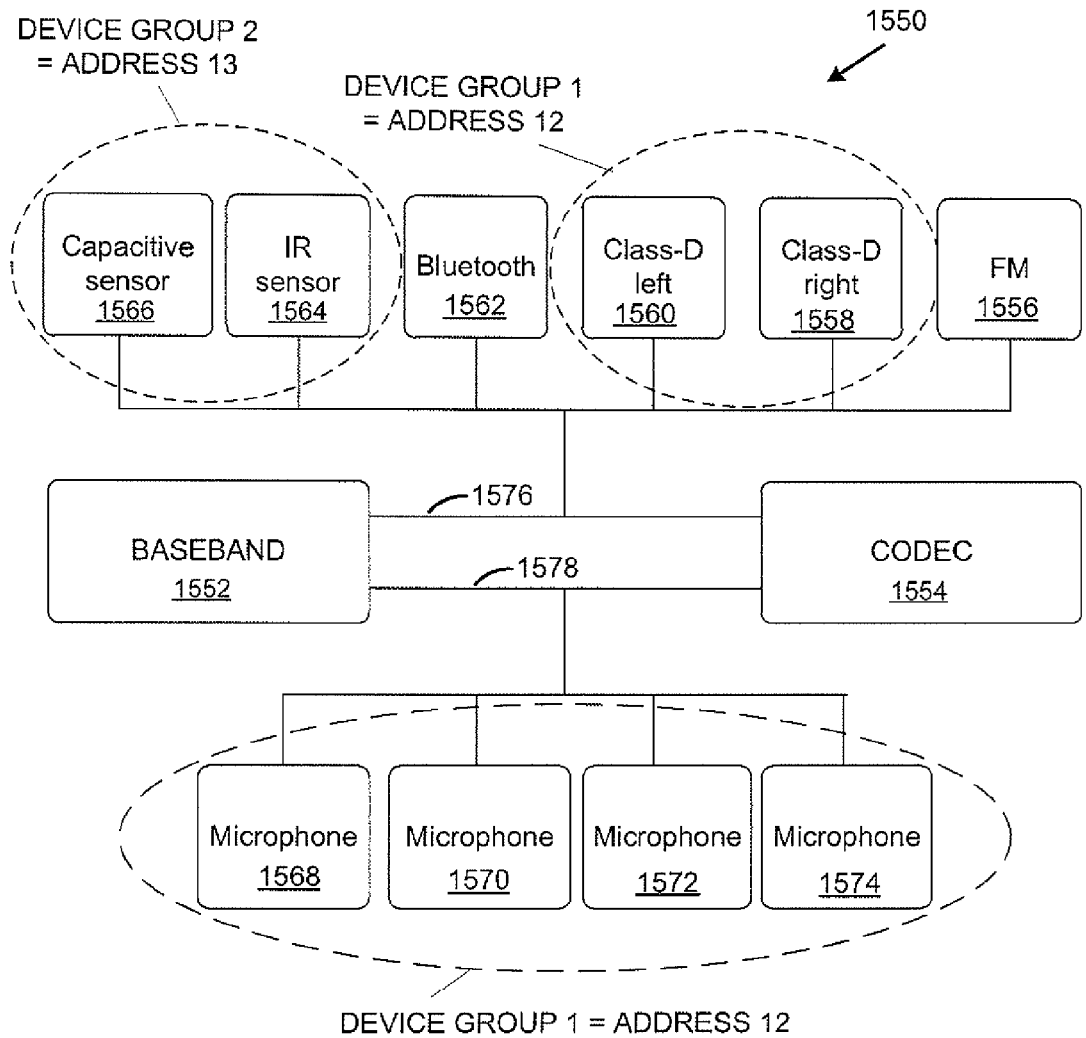
FIG. 69d is a diagram of an example embodiment of a system having devices assigned to three device group addresses.

Referring now to FIG. 69*d*, shown therein is a diagram of an example embodiment of a system 1550 having devices assigned to three device groups addresses. The system 1550 is an example embodiment of a mobile phone system that uses the unified bus communication protocol. The system 1550 can be a cellular phone or a smart phone, for example. The system 1550 comprises a baseband processor 1552, a CODEC 1554, an FM radio 1556, a right channel Class-D amplifier 1558, a left channel Class-D amplifier 1560, a Bluetooth module 1562, an IR sensor 1564, a capacitive sensor 1566, four microphones 1568 to 1574 and two buses 1576 and 1578. The bus 1576 is coupled to elements 1552 to 1566 and the bus 1578 is coupled to elements 1552, 1554 and 1568 to 1574. In this example, the buses 1576 and 1578 are implemented using a two-wire bus embodiment as described previously. Furthermore, in this example, the baseband processor 1552 acts as a master device and the other elements 1554 to 1574 act as slave devices. There can be applications in which more than one bus is used to make the system more energy efficient since when many devices are coupled to the same bus, there will be an increase in capacitive losses and less energy efficiency. In addition, the different buses can have different clock speeds with a lower clock speed being more energy efficient. Another aspect of the unified bus communication protocol is that it may be used on buses that connect low cost digital accessories to the system 1550. Furthermore, by connecting the devices to separate buses, the clock speed may no longer have to be determined based on the sum of all bandwidths used by all of the devices. This should also lower power consumption.

For the system 1550, there is device address group 1 for the four digital microphones 1568 to 1574 coupled to the bus 1578 and device address groups 1 and 2 for several of the devices coupled to the bus 1576. The device address groups 1 and 2 correspond to device addresses 12 and 13 respectively. The microphones 1568 to 1574, the right channel Class-D amplifier 1558 and the left channel Class-D amplifier 1560 are assigned to device address group 1. The capacitive sensor 1566 and the IR sensor 1564 are assigned to device group 2 for the second bus. As mentioned previously commands can be given in parallel to the devices in each device address group to program the devices in parallel which reduces the lines of code, decreases the execution time used for programming by roughly the same amount. This setup allows the master device 1552 to quickly setup a stereo playback situation, control multiple sensors or simultaneously control the gain of all microphones.

Referring now to FIG. 70, shown therein is another example list of functions and corresponding bit settings that may be set in the X word. The majority of these functions are similar to the functions shown in FIG. 11a although the order of some of these functions may have changed. The similar functions will not be discussed here but the new functions SELECT GROUP ADDRESS and INVERT ACTIVE BANK functions will be discussed.

The execution of the SELECT GROUP ADDRESS function (X3:X0=0011) may be used to assign an alternate address to any device. The least two bits in the data field (Y1:Y0) will select the actual address and can be from 12 to 15 (e.g. if Y1:Y0=10 then group address 14 is chosen). The maximum number of completely individual device address groups that can be set at the same time in this example embodiment is three {12, 13 & 14}; however, this can be changed in alternative embodiments. The default group address is 15.

The SELECT GROUP ADDRESS function can be used to quickly program several devices at the same time by first setting them to have the same group address and afterwards setting up port registers. These devices can still be addressed using their own original address as programmed during the REQUEST ID function. The broadcast command (i.e. device address 15) will also still work, even if a device has been assigned a different group address in this example embodiment. The SELECT GROUP ADDRESS function may be used to group together identical or similar devices which can receive the same commands at the same time. For example, when programming data channels, both the receiver and transmitter channels can be programmed to use the same time slots. By assigning an alternate DEVICE GROUP ADDRESS to the devices with these receiver and the transmitter channels, it is possible to program these devices at the same time. This is more efficient as it would allow multiple devices, such as multiple speakers or multiple microphones, for example, to be set up at the same time.

With the SELECT GROUP ADDRESS function, the individual DEVICE ADDRESS field of a device does not have to be changed but rather some of the devices addresses are allocated for multiple devices (i.e. one or more groups of devices). The gate count overhead to implement this is reduced since only two bits may be stored that gives the current GROUP address (11 will default to the broadcast address) and much of the existing logic can be reused.

In this example embodiment, the device addresses 12-15 are currently not monitored during a PING operation. However, the device address 15 has already been assigned to have a BROADCAST function since a command is sent to all devices when device address 15 is used. This leaves device address 12 to 14 to be used as device group addresses. A two-bit register may be used to indicate the device group address that has been to a particular device. It should be noted that a device group address does not have to be assigned to a particular device but will default to address 15.

An example of how to use the device group address now follows. A microphone and bitstream receiver can both be assigned to a first device group address. The devices assigned to the first device group address can then be programmed using the same commands. The microphone can then be enabled. The bitstream receiver can then be enabled. This results in a faster setup of these devices. In this example, the device programming can be done with approximately half the number of lines of code.

The execution of the INVERT ACTIVE BANK function (X3:X0=0100) may be used to change the active bank without using the CURRENT BANK bit. This can be useful in order to program a single device without having to program all devices attached to the bus 64 having the current configuration in the alternate bank. The LSB (Y0 bit) will determine the active bank, i.e. if Y0='0' then the active bank is determined by the CURRENT BANK bit issued during PING commands and if Y0='1' then the active bank is determined by the inverted value of the CURRENT BANK bit.

The various embodiments of the unified bus communication protocol described herein can also be used with a Universal Asynchronous Receiver/Transmitter (UART) controller. UART controllers are used in serial communication. For example, a first UART controller can transmit bytes of data one bit at a time in a sequential manner and a second UART controller can receive these bits and reassemble them into the original bytes of data. This serial communication can be synchronous or asynchronous.

A UART controller can be used for a variety of applications. For example, the UART controller can be utilized for classical serial interfaces, for a Bluetooth interface or a Bluetooth modem, for an FM receiver, for WiFi components (the utilized bandwidth may vary), for USB (variable bandwidth) communication, for touch pad sensors, for low data rate sensors, and for any component that has variable data input or output. A UART typically contains a FIFO structure in order to compensate for finite latencies in real time systems.

A typical UART controller has several input or output pins including a clock signal pin, a READ command pin, a WRITE command pin, a data (0-7) pin and an IRQ interrupt pin. In some instances, this can be reduced to four pins (CLOCK, TX DATA, RX DATA and IRQ) if the data are transmitted in serial format.

It is typically desired that the UART controller have low power consumption. However, in order to obtain low power consumption, many systems tie the clock signal to a static value such as a logic low value or a logic high value during an idle period. With no activity on the clock signal, power consumption can be very low. The actual power consumption is determined by the duty cycle when the clock signal is active. This is directly determined by the data bandwidth that is used.

As an example, the SLIMbus protocol involves running the clock signal continuously or restarting the clock with an unknown latency. This results in a continuous clock requirement and therefore high current consumption for a UART controller due to the requirement of not losing any data. Therefore, the SLIMbus protocol is not suited for low power consumption and UART use.

To achieve low power consumption, separate wires can be used for the UART controller. This means a terminal price count of two terminals can be achieved using at least one embodiment of the unified bus communication protocols described herein. However, the typical UART component has several more terminals (i.e. clk, data_in, data_out, IRQ, etc), so there is still some savings even when a dedicated bus is allocated to the UART controller.

Furthermore, to achieve low power consumption, in at least one embodiment of the unified bus communication protocol, the bus 64 will be set in a clock idle mode and it wake up when the buffer in the UART controller reaches a certain predetermined threshold. The threshold can typically be programmed to a specific value, which is between 0 and 100% of the buffer size. After this, a number of samples, e.g. 1-3, are transferred in every frame until the UART buffer is low or empty.

In some embodiments, the clock signal can be changed between two frequency values in order to support both isochronous data and sometimes UART data and in other embodiments the clock signal will be completely stopped until the UART FIFO has new data.

The UART controller can be used to transmit data only once in a while which may happen when the system is operating in an idle mode or a sleep mode. When data is transmitted infrequently, the clock frequency can be reduced which will decrease power consumption. Furthermore, when the clock frequency is reduced, the bandwidth is also reduced. However, when more data may have to be transmitted then the clock frequency can be increased and the system can be brought out of lower power mode.

This scheme may also be used with for automatic bandwidth control. In this case the transmitter is allowed to change the CURRENT BANK bit in every frame. When the CURRENT BANK bit is set to high, the master device 52 can use a higher clock frequency than when it is set to low and the change can happen simultaneously with the change of registers. This allows a UART controller to dynamically control the frequency of the bus 64 depending on the bandwidth that may be used. In bitstream mode, the clock frequency may be fixed.

There are various other methods that may be used to reduce power consumption. For example, the external physical layer is often the limiting factor. Accordingly, one effective method to reduce power consumption is to use multiple buses. In one embodiment, bitstream microphones may use a separate DATA line for a right and left microphone instead of multiplexing the data on a common DATA line. By doing this, the external power consumption can approximately be cut in half, since the clock line can now run at half the frequency and the capacitive losses are lower since each data line is only driven by a signal from a single microphone. In one embodiment, the change to this MONO mode can be determined by setting the Left/Right terminal to a third state, e.g. floating and utilizing the circuit of FIG. 11e to determine the connection. In this case the microphones can be connected as a MONO microphones (driving new data on both clock half periods) if the input terminal was floating. This configuration enables compatibility with all existing systems.

In some embodiments, the clock signal may be used to drive an internal multi-level delta sigma converter, such as a three-level converter and this multi-bit signal is then converted to two levels before transmitting the data on the bus either in STEREO or in MONO mode depending upon a selection. The selection between the STEREO and MONO interface mode may be determined by pin, register or clock frequency programming. The advantage of using a multi-bit converter may be a lower clock speed and lower power consumption, which can be in the order of a factor of two, when comparing a two-level converter to a three-level converter, which gives significant power reduction savings. A digital delta-sigma converter or special logic may be used to convert from multiple levels to a two-level bitstream output.

Another method to reduce power consumption, which can be used in at least one embodiment of the unified bus communication protocols described herein, is to allow systems that can go idle to go idle when nothing is happening in the system.

Another method to reduce power consumption, which can be used in at least one embodiment of the unified bus communication protocols described herein, is to lower the drive voltage which can give a large power consumption reduction. It may also be possible to use multiple signal voltages, e.g. {0, 0.6, 1.2, 1.8 V} in order to transfer two bits in every audio data slot.

Another method to reduce power consumption, which can be used in at least one embodiment of the unified bus communication protocols described herein, is to integrate the clock signal with data. This method may result in less flexible clocking, the potential use of special clock recovery circuits and possibly a constant drain of power for all devices attached to the bus. However, if the physical power consumption of the physical layer is dominant, a significant power reduction may result due to the inclusion of the clock signal with data, e.g. as can be done using a single wire and 8/10b or similar encoding of the clock and data. In this case, the power consumption may be reduced to about 0.5 transitions per bit, which is dictated by physical constraints. It is 0.625 transitions per bit for 8/10b encoding and random data. In some embodiments, only audio channels may be encoded using 8/10b encoding.

Another method that may be able to achieve low power consumption, which can be used in at least one embodiment of the unified bus communication protocols described herein, is to operate the system in two modes. In a first mode, all of the features of the system are available and in a second mode only a few of the features are available and it is no longer possible to program devices. The clock frequency does not necessarily have to be changed between these different modes. The second mode has a lower power consumption compared to the first mode.

As an example, currently some bandwidth is allocated to control and synchronization and this is allocated in any scenario. It costs power to clock out this information to the bus 64. However, lower power consumption may be obtained by setting the bus 64 in a specific mode, where this bandwidth is no longer used. However, this means that control is no longer possible and the slave devices and the master device may use sequences in order to regain control. It is possible to change from a scenario that includes control data to a scenario where there is no control data. The problem lies in assuring synchronization after control data has been removed and to assure a slave device or the master device can initiate a control sequence, if needed. If control is removed, devices could get out of sync. For example, if an error occurs due to a glitch on the clock line, these devices may not be able to get back in sync since the synchronization information has been removed. The simplest solution to this problem is to limit the number of devices on the bus 64 to two devices and let one device drive the bus 64 when the clock signal is high, and let the other device drive the bus 64 when the clock signal is low. This fully solves the problem of synchronization even in the event of errors on the bus 64.

Still continuing with the example of not sending control data, a transmitting slave device (e.g. a microphone) may wake up the master device 52 by sending out a certain sequence to the master device 52, that is predetermined as part of the unified communication protocol. This sequence is masked out from audio data by having the master device 52 filter this sequence out using a receive buffer, so the sequence is not heard if there are situations where audio data is converted into an audible audio signal. The master device 52 may have to force the slave device 54 back into control mode. This may be done with receiving devices, such as, but not limited to Class-D amplifiers for example, by submitting a specific control sequence and filtering this from the audio data at the receiver using a receiver buffer. However, it may be more difficult to force control back when it is a receiver that wishes to regain control. If it is the master device 52 that wishes to regain control, it may change the clock frequency to different value, but this will take some time. Accordingly, this approach may be slow and may use special hardware in the receiver.

Alternatively, in another embodiment, the physical layer may be modified to allow two devices to signal on the bus 64 at the same time and let the resulting bus conflict lead to a change in mode of operation to again start transmitting control data on the bus 64. This may be used with the bus system that has just been described here. For example, a logic zero value is signaled by no change on the bus 64 and a logic one value is signaled by a change of value on the bus 64. A receiver wanting attention can force changes on the bus 64 by transmitting at the same time as the transmitter and only transmit logic one values. This will result in every value that is transmitted being inverted from its previous value. This will not result in a bus conflict but the transmitter will see multiple transmit errors. The transmitter will then back off and stop transmitting after a limited and short number of errors. The master device 52 will be able to identify this condition by the lack of any signal transitions on the bus 64. All devices will then change operation back to the initial programming mode and the master device 52 will once again regain control of the bus 64.

In this example embodiment, if a slave device loses lock with the bus 64, it could begin to write in an empty or a full column or even all columns, if operating in bitstream mode. If the slave device begins to write in an empty column according to the frame format currently being used, the master device 52 will detect this activity since there is not supposed to be any activity in the empty column of the currently used frame format. If a slave device begins to write in an already utilized column according to the frame format currently being used, then errors will result for one or more slave devices since the read-back value will not correspond with the written value. This is basically telling the master device that this slave device is requesting a mode change by signaling all ones, thereby telling the master device that something is wrong with this slave device or that it requires attention. In this scenario, it is not allowed to signal a certain number of ones under normal conditions, e.g. transmitting more than 127 consecutive ones (thereby setting a limitation on the output from the sigma-delta converter), which would lead to a very small (e.g. <0.07 dB) reduction in dynamic range.

When systems have physical components that are physically spaced farther apart from one another, the bus diameter increases. An example of components that are spaced far apart is the use case of large screen TVs. For example, a 100" 16/9 HDTV has a side length of 87" (221 cm) and a height of 49" (125 cm). The large screen TVs can provide certain functionality such as beamforming of speaker output or beamforming for multiple microphone support. This results in a larger bus diameter due to the large physical distance between slave devices (i.e. speakers or microphones). While it is possible to solve the problem completely using analog signaling schemes, it may in some instances be beneficial to be able to transfer digital audio directly to the components that are spaced far apart.

In some conventional cases, the SLIMbus communication protocol may be used since it provides some advantages. For example, the SLIMbus protocol requires the data to settle within half a clock period. The second half of the clock period is not used and therefore it is possible to lower the frequency of the clock so that no overlap occurs between different devices. Therefore using a lower clock frequency allows a longer bus radius to be used.

Alternatively, the various embodiments of the unified bus communication protocol described thus far do not have half a clock period of silence between data. While this solution enables lower power consumption and higher bandwidth, it also means that data should be removed from the bus 64 within a certain time after a clock transition to support a high bandwidth and typically within approximately 5 ns. This limits the bus radius to approximately 30 cm (depending on design requirements) for a 20 MHz clock when using both clock edges to transfer data.

However, at least one embodiment of the unified bus communication protocol described herein can directly emulate the SLIMbus physical layer to allow for a long bus radius. For example, by using bitstream mode with an even number of columns and only utilizing every second column, it is possible to emulate the SLIMbus driving mode (D-Z-D-Z etc.). This has the advantage that longer lines can be driven without changing the physical layer of the bus components. However, the disadvantage is that the power consumption becomes comparable to that of the SLIMbus protocol. Furthermore, in order to drive very long bus lines, the clock speed is reduced to avoid transmission line effects and there may be a long time for the data to settle. The result is lower bandwidth due to both long wire length and less efficient signaling.

In some embodiments, the same physical layer may be implemented to support both SLIMbus and the described unified protocols using the same I/O cell.

With very short wires, there are no problems with transmission line effects. However, when connecting multiple devices to the same bus 64, it may be difficult to utilize matched transmission lines that might otherwise be used for point-to-point high speed connections.

A solution to these problems is made possible by using alternative topologies for the devices that are connected to the bus 64 such that not all of the devices are driven at the same time and/or not all of the devices are attached to the same bus. By connecting devices in a pipe or a ring topology/structure, all devices can be accessed even though individual links only have a single transmitter and receiver. The transmission speed can be much higher for links with a single transmitter and a single receiver since the distance between the individual devices may be much shorter. This structure effectively distributes the timing margins between a number of devices instead of adding up to a single large number.

Referring now to FIG. 71, shown therein is an example embodiment of a system 1600 that uses a ring or a pipe topology to couple devices to a bus and the system uses the unified bus communication protocol. The structure of the system 1600 is equivalent to adding a ring or a pipe to a multi-drop topology (the term multi-drop means that many devices are attached to a single wire). The system 1600 includes two different buses 1602 and 1604 that are used to connect all of the devices. The buses 1602 and 1604 are implemented using a two-wire embodiment in which one wire can be used to send a clock signal and another wire can be used to send data, control information and synchronization information. The advantage of using a two-wire bus is that the pin-count may be reduced and thereby the cost and space requirements may also be reduced.

The system 1600 includes a master device 1606 that is connected to slave devices 1608 to 1614 through the bus 1602. The slave device 1614 also acts as a hub device to connect the master device 1606 with the slave devices (speakers) 1616 to 1622. It should be noted that the topology of the speakers 1616 to 1622 is different from the topology of the slave devices 1608 to 1614. In particular, the speakers 1616 to 1622 each receive a clock line however the data lines are connected sequentially between each of the speakers 1616 to 1622. Accordingly, in operation, the master device 1606 controls the bus 1602 and transmits speaker data, for this particular example, through the slave hub device 1614. The speaker 1616 then receives data from the slave device 1614. The speaker 1618 then receives data from the speaker 1616. The speaker 1620 then receives data from the speaker 1618 and the speaker 1622 then receives data from the speaker 1620. Finally, the data from the speaker 1622 can be sent back to the slave hub device 1614. Accordingly, the structure connected to the bus 1604 is a ring structure (if the speaker 1622 is not connected to the slave hub device 1614, then the structure is a pipe). In some embodiments, the clock signal is first sent to the device receiving the data from the hub device and in other embodiments the clock signal may be first sent to the device sending data to the hub device. In either case, the physical distance in between the speakers 1616 to 1622 as well as the physical distance between the speaker 1616 and the hub device 1614 as well as the physical distance between the speaker 1622 and the slave hub device 1614 is chosen to be about the same so that data transmission can be synchronized between each of the devices 1614 to 1622. The data that can be sent between the speakers 1616 to 1622 as well as between the speakers 1616 to 1622 and the slave hub device 1614 can be impedance information that indicates the temperature of a given speaker or status information, either using a full return path in the case of a ring topology or using a partial return path in the case of a pipe structure. The data transmitted from a slave hub device to the slave devices attached to the pipe or ring is typically synchronization, status and programming information as well as data such as audio, for example. It should be noted that while FIG. 71 shows audio information going from the master device 1606 to the slave hub device 1614, the flow of information can also be in the reverse direction. In some embodiments, the slave hub device 1614 may be combined with a speaker or a microphone.

Figure 72:
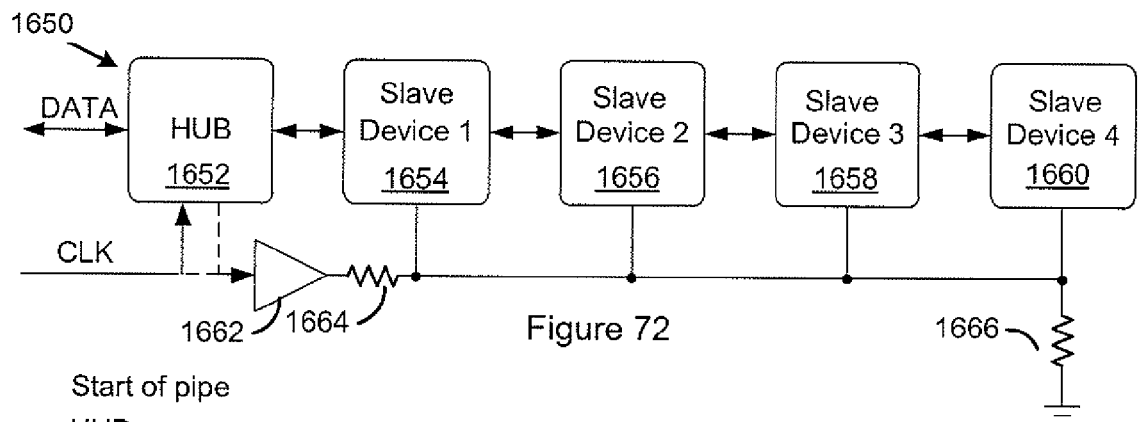

Referring now to FIG. 72, shown therein is an example embodiment of a system 1650 that uses a pipe topology to couple devices to a bus (not shown) and the system 1650 uses the unified bus communication protocol. The system 1650 comprises a slave hub device 1652, slave devices 1654 to 1660 along with an amplifier 1662 and resistors 1664 and 1666. The (digital input) amplifier is just an example of a receiver of audio data.

The advantage of the topology shown in FIG. 72 is that the hub device 1652 handles a single clock signal. Therefore, even if there are considerable delays in the system 1650 due to a large distance between the outermost components, these delays are distributed across all devices. Also, because the slave hub device 1652 or a master device (not shown) receives information timed according to the same clock signal that is used to transmit data, there should not be a difference between the transmitted and received clock signals.

Figure 73:
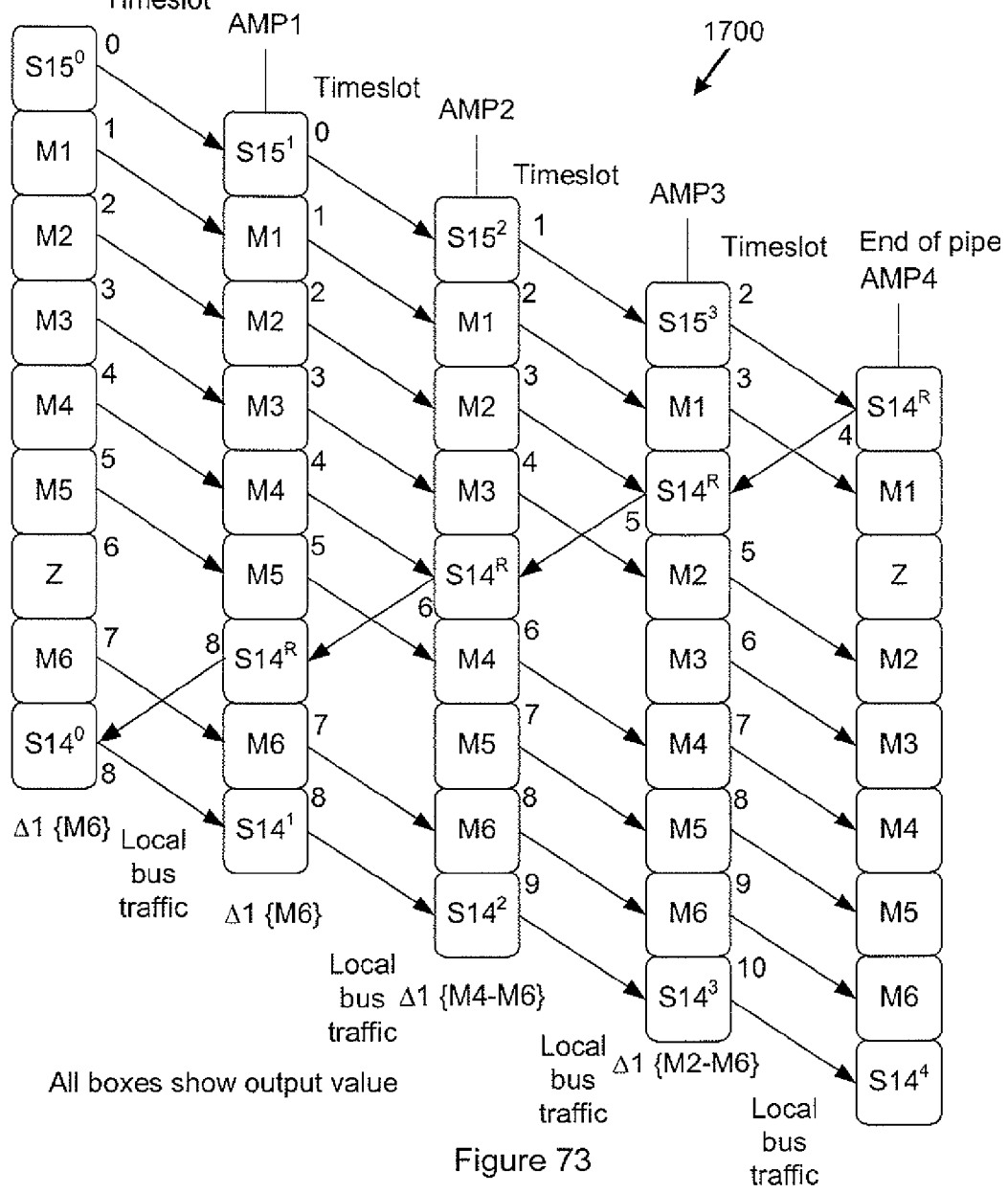

Referring now to FIG. 73, shown therein is an example embodiment of a system 1700 that uses pipe control to couple many devices AMP1, AMP2, AMP3 and AMP4 to a bus through a hub device (HUB) and the system 1700 uses the unified bus communication protocol. The timing is more challenging in this case as the data can be transferred in two different directions. The majority of the data is transmitted from left to right but there is some data, typically status or control data, which is transmitted from right to left.

It should also be noted that there may be delays between adjacent devices in order for data to be transmitted to all of the devices at the correct time. This can be done by delaying the bitstream data from the hub device a certain number of clock periods, which can be defined by a register setting. The delays enable data to proceed in both directions (from the hub device to the slave devices and from the slave devices to the hub device) at the correct time. In the pipe topology, typically status information, for example, may be transferred from the slave devices to the hub device. In the system 1700, the hub device (HUB) delays bitstream channel 6 by one sample, the first slave device (AMP1) delays bitstream channel 6 by one sample, the second slave device (AMP2) delays bitstream channels 4 to 6 by one sample and the third device (AMP2) delays bitstream channels 2 to 6 by one sample. The end point of the pipe does not delay any samples. In this example embodiment, the hub device can be a master device or a slave device.

Figure 74:
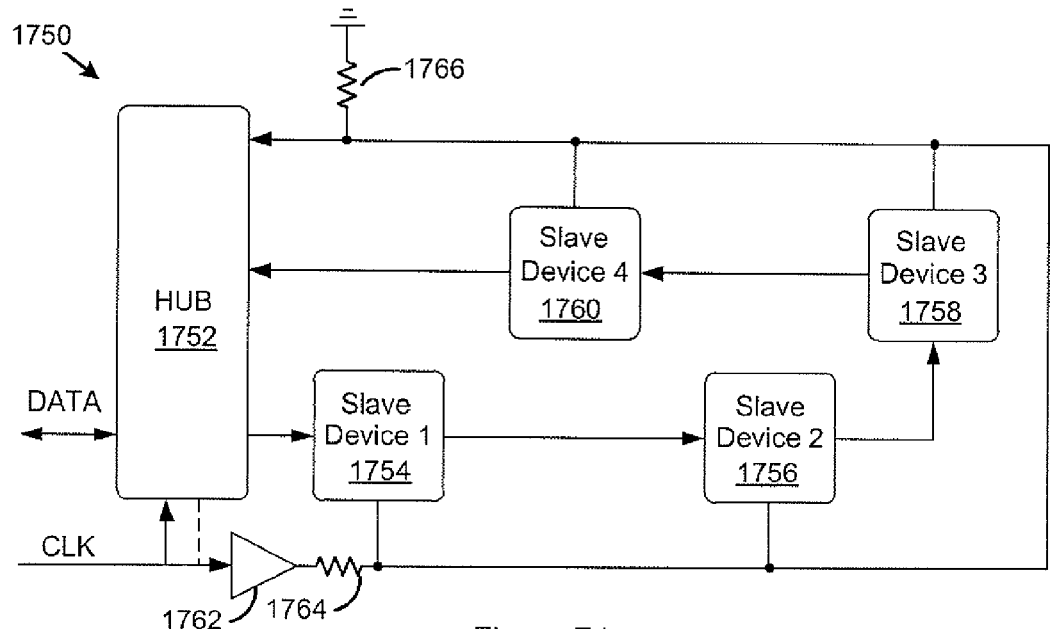

Referring now to FIG. 74, shown therein is an example embodiment of a system 1750 that uses a single dimension, staggered ring topology to couple devices to a bus (not shown) and the system 1750 uses the unified bus communication protocol. The system 1750 comprises a hub device 1752, slave devices 1754 to 1760, an amplifier 1762 and resistors 1764 and 1766. The resistors 1764 and 1766 are used as series and parallel terminations of the clock signal. The amplifier 1762 is an example of digital input audio receiver.

The advantage of system 1800 is that the transfer of large amounts of information in both directions (e.g. from the hub device to the slave devices or from the slave devices to the hub device) is simpler, but the hub device may have to compensate for the skew between the transmit and receive portions of the clock signal. This topology can be used on a large panel such as a sound bar since the ring topology is used in such a way as to obtain roughly an equal distance between adjacent slave devices (if this is not done then there can be problems because the signal is not fully settled). Alternatively, the system 1800 may utilize the clock signal at the slave device 14 to adjust for this clock skew.

In the example embodiment shown in FIG. 74, the physical devices are numbered in a different way to obtain roughly an equal physical distance between the slave devices. In this case, the slave device 1754 is physically adjacent to the slave device 1760 which is physically adjacent to the slave device 1756 which is physically adjacent to slave device 1758. However, the slave devices 1754 to 1760 are electrically connected to one another so that there is roughly an equal electrical distance between them as well as between the slave device 1754 and the hub device 1752 and between the slave device 1760 and the hub device 1752. The advantage of this physical placement of the devices is that the electrical distance between the devices is approximately the same thereby distributing the timing margins equally between these devices. The disadvantage is a more complicated wiring pattern. This physical placement of the devices may also be used with other bus communication protocols that utilize a ring topology.

Figure 75:
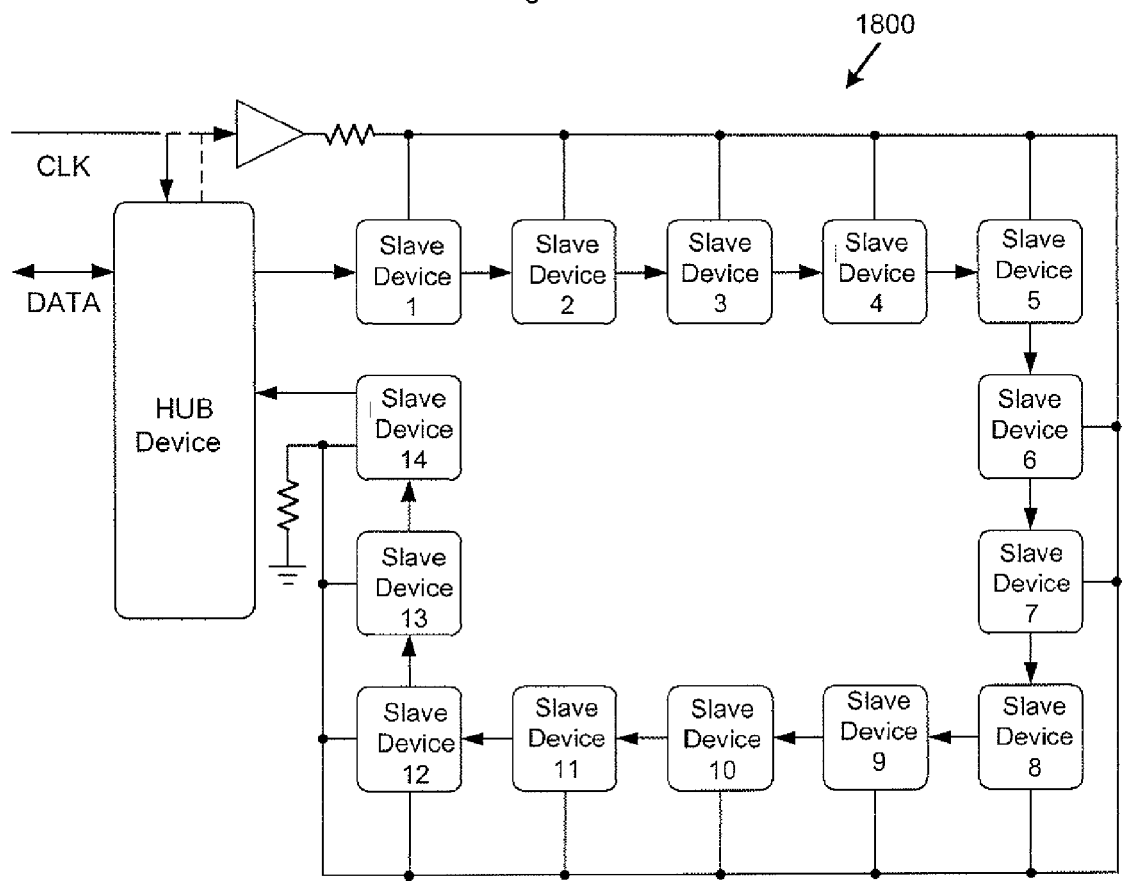

Referring now to FIG. 75, shown therein is an example embodiment of a system 1800 that uses a two-dimensional ring topology to couple devices to a bus (not shown) and the system 1800 uses the unified bus communication protocol. In this example embodiment, the hub device connects with a ring of slave devices and there is about 20 to 30 cm (other similar small distances can also be used) between each device. Since the data travels through each of the slave devices sequentially the data should settle within a short time. This topology allows one to support many large structures if the physical distance between the individual slave devices is much smaller than the overall physical distance and can still achieve very high speed even though the total overall physical distance covered by the devices may be quite large. The clock signal may either be supplied to the beginning or the end point of the ring structure while the end termination of the clock signal may happen at the opposite end of the ring structure.

In at least some embodiments that use the topology of FIG. 75, the clock and/or data lines may be implemented using matched transmission lines for obtaining the highest possible transmission speed. The disadvantage of this approach is carefully adjusted output impedances in the transmitters and input impedances in the receivers of these devices, for matching purposes, and a relatively large physical space on a PCB. Furthermore, unless the bandwidth usage is very high, this solution will result in excessive power consumption as compared to other methods of transmission. However, this solution does offer much greater bandwidth than techniques where transmission line effects are ignored.

Figure 76:
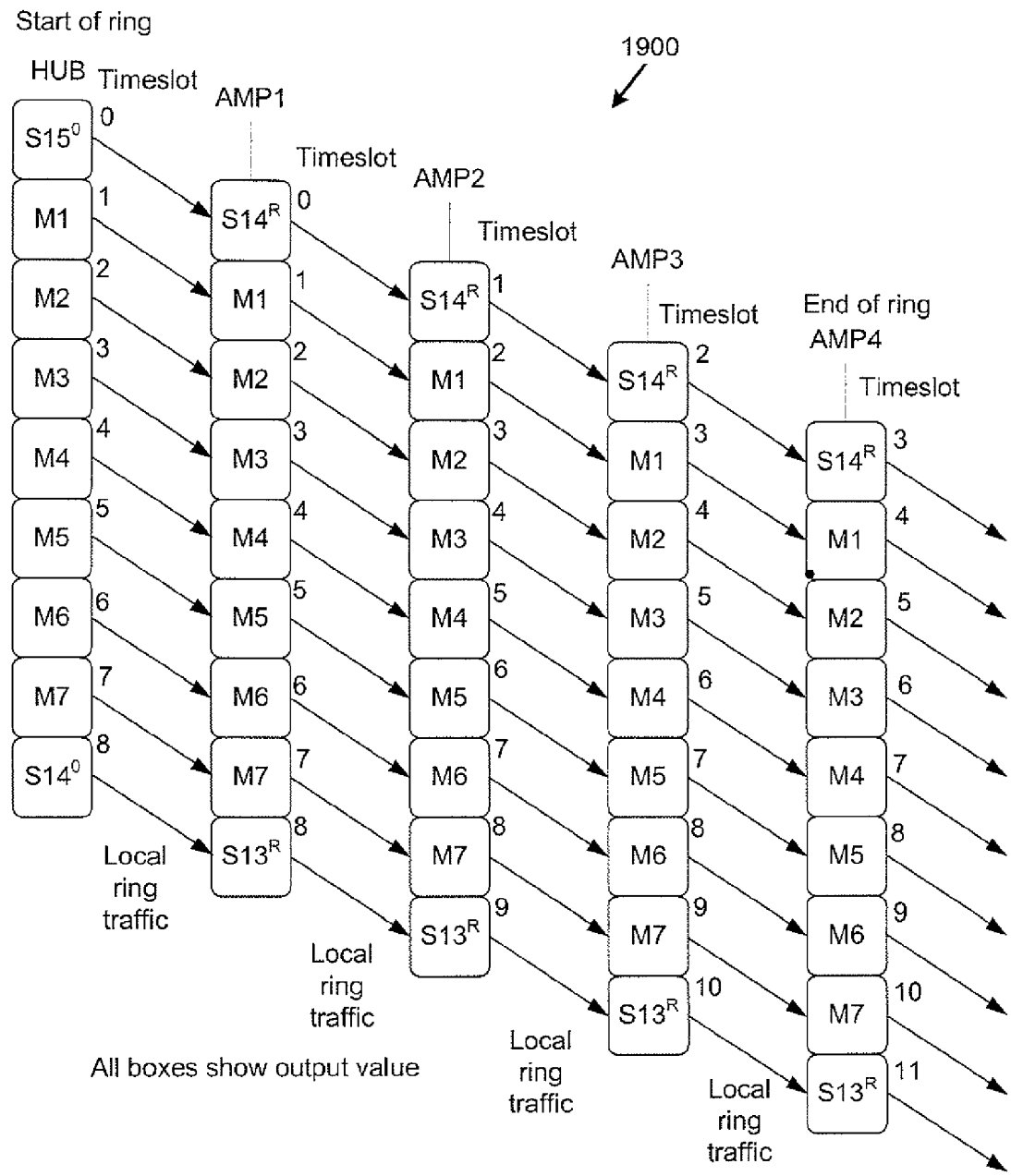

Referring now to FIG. 76, shown therein is another example embodiment of a system 1900 that uses pipe control to couple many devices to a bus and the system 1900 uses the unified bus communication protocol. Here the timing is simpler (compared to the structure of FIG. 73) since the data is just transferred from left to right. This topology has greater bandwidth than the pipe topology, but may use additional processing in the receiving section of the hub device or the master device, since there may be some clock skew between the transmitted and received clock signal. It is possible to program all slave devices in both the pipe ring structure and transfer data to all of the slave devices. Both structures may be used to make a beamforming speaker array. These structures may also be used to make a microphone array. In this case the end of the pipe instead of the start of the pipe can be connected the hub device for maximum bandwidth. This topology could also be used with other methods of signal transfer.

In the normal scenario, bus clock edges are used to define time when there is a transfer of information. However, it is possible to reduce the number of transitions of the clock signal; this may involve using an internal clock multiplier in the clock receiver or by combining the clock and data signals. In the theoretical case, external power consumption may be reduced by as much as a factor of three as compared to the case of a continuous clock signal that controls a data signal that on average changes 50% of the time during every clock edge. However, it may take longer for a device to enable the transmission of audio data on the bus since it will take a PLL some time to acquire lock after receiving an input clock signal and there may be some limitations when changing from one clock frequency to another because it will take the PLL some finite time to change from one lock condition to another. Furthermore, in order to allow any device to lock onto the bus 64, including devices that do not support overclocking, the master device 52 may send a signal in the last part of the data of a frame just before the clock edge or alternatively, at the very first part of the data after a clock edge since both clock edges can be utilized for this purpose. In this scenario, the master device 52 may control the entire time slot, by not allowing any other devices to utilize the other portions of this time slot. This timing allows the devices locked onto the bus 64 to read and respond to the S, X and Y information in the frame that was just transmitted. This scheme may be used to transfer data between a slave device and the master device 52, but not usually between two slave devices due to timing constraints in this overclocking mode. Both the master device 52 and the slave device 54 may use internal synchronous dividers to reduce jitter. The internal PLL in a slave device may be disabled when over-clocking is not used by resetting a bit in the register map. Furthermore, in the overclocking mode of operation, the total possible bandwidth is usually lower than without the use of overclocking since some space may have to be added between the overclocked data and the inherent jitter to avoid incorrect readings due to PLL jitter, to avoid bus collisions and to avoid increased power consumption.

Referring now to FIG. 77a, shown therein is a timing diagram for an example of when 2× overclocked data slots are used (i.e. there is an overclocking factor of 2). This in contrast to the timing shown in FIG. 4a which only sends half as much data. With the timing shown in FIG. 77a, when there is a clock transition, two bits of data are sent rather than just one. Accordingly, there is a power savings as not as many clock transitions are used to send the same amount of data as the scheme shown in FIG. 4a, for example. FIG. 77a, shows that data is sent on both a rising clock edge and a falling clock edge so there are four data sampling events for a single clock cycle.

FIG. 77a also shows how there may be jitter between the clock used by the master device 52 and the clock that is used by the slave device 54. This jitter is shown as shaded regions of the clock signal used by the slave device which translates into certain periods of time when valid data is not transmitted on the bus 64 as shown. This example shows only one data bit written from the master device 52 and in other cases the master device 52 may be able to write to other time slots as well. Due to the finite lock-in-range of the PLL, this scheme may typically be used in a much more narrow frequency range, than when this scheme is not utilized. In general, it is not possible to achieve lock without a clock signal, so this scheme uses a continuous clock signal.

Referring now to FIG. 77b, shown therein is a table showing an example embodiment of timing parameter values that may be used for devices that utilize overclocked data slots. Overclocking by a factor of 4× may be done using 4 data slots per half clock period (instead of 2), and overclocking by a factor of 6× may be done by transmitting 6 data bits for every half clock period. It should be noted (see * in FIG. 77b) that if it is only possible to have a time to disable output ($T_{DZ}$) that is greater than 5 ns and a time to enable output ($T_{ZD}$) that is less than 9 ns, then the output current should be less than 1 mA during the violation period. Any overlap of data will lead to increased power consumption which is not desirable. Also, the VCO range of the PLL may be higher by an integer factor if required by internal device timing events (see + in FIG. 77b).

The actual timing of some overclocking examples will now be discussed. For 2× overclocking using an 8.2 MHz clock, the setup time is given by equation 1.

$$T_{SETUP} = T_{CLKMIN}/2 - T_{ZD} - T_{CLKSKEW(WRITE)} - \qquad (1)$$
$$T_{CLKSKEW(READ)} - T_{PCB} = T_{SLJITTER} -$$
$$T_{MSJITTER} - T_{DLY}$$
$$= (70/2 - 16 - 2 - 2 - 2 - 4 - 1 - 4)\text{ns}$$
$$= 4 \text{ ns, margin 2 ns}$$

The hold time is given by equation 2.

$$T_{HOLD} = T_{ZD} - T_{CLKSKEW} + T_{PCB} - T_{SLJITTER} - \qquad (2)$$
$$T_{MSJITTER} + T_{DLY}$$
$$= (9 - 2 - 4 - 1 + 2)\text{ns}$$
$$= 4 \text{ ns, margin 3 ns}$$

The bus conflict time is given by equation 3.

$$T_{BUS\ CONFLICT} = T_{ZD} + T_{SLJITTER(MIN)} - T_{DZ(MAX)} - \qquad (3)$$
$$T_{SLJITTER(MAX)}$$
$$= (9 - 2 - 5 - 2)\text{ns}$$
$$= 0 \text{ ns, } (\geq 0)$$

For 4× overclocking using an 8.2 MHz clock, the setup time is given by equation 4.

$$T_{SETUP} = T_{CLKMIN}/4 - T_{ZD} - T_{CLKSKEW(WRITE)} - \qquad (4)$$
$$T_{CLKSKEW(READ)} - T_{PCB} - T_{SLJITTER} -$$
$$T_{MSJITTER} - T_{DLY}$$
$$= (140/4 - 16 - 2 - 2 - 2 - 4 - 1 - 4)\text{ns}$$
$$= 4 \text{ ns, margin 2 ns}$$

The hold time is given by equation 5.

$$T_{HOLD} = T_{ZD} - T_{CLKSKEW} + T_{PCB} - T_{SLJITTER} - \qquad (5)$$
$$T_{MSJITTER} + T_{DLY}$$
$$= (9 - 2 - 4 - 1 + 2)\text{ns}$$
$$= 4 \text{ ns, margin 3 ns}$$

For 6× overclocking using an 8.2 MHz clock, the setup time is given by equation 6.

$$T_{SETUP} = T_{CLKMIN}/6 - T_{ZD} - T_{CLKSKEW(WRITE)} - \qquad (6)$$
$$T_{CLKSKEW(READ)} - T_{PCB} - T_{SLJITTER} -$$
$$T_{MSJITTER} - T_{DLY}$$
$$= (204/6 - 16 - 2 - 2 - 2 - 4 - 1 - 4)\text{ns}$$
$$= 4 \text{ ns, margin 2 ns}$$

The hold time is given by equation 7.

$$T_{HOLD} = T_{ZD} - T_{CLKSKEW} + T_{PCB} - \qquad (7)$$
$$T_{SLJITTER} - T_{MSJITTER} + T_{DLY}$$
$$= (9 - 2 - 4 - 1 + 2)\text{ns}$$
$$= 4 \text{ ns, margin 3 ns}$$

As mentioned previously, if some of the devices that are attached to the bus 64 support overclocking and some of the devices that are attached to the bus 64 do not, then there is a risk of bus collision. Devices that do not support overclocking may occupy an entire data slot (one half of a bus clock period). If other devices already occupy part of this slot, a bus collision error will be reported by one or more devices. A device that does not support overclocking is able to get into lock with the bus 64 under many circumstances, since the master device 52 will be utilizing the first or last slot before a clock edge. Therefore, all READ operations from the master device 52 should be correct. This can be seen in FIG. 77c for an example of overclocking by a factor of two in which the master data slot is the last slot before a clock edge on the bus 64.

Referring now to FIG. 77d, shown therein is an example of register values that can be used to implement overclocking. Also shown is the estimated power saving that may be achieved with each overclocking rate.

Referring now to FIG. 78a, shown therein is a timing and voltage level scheme for sending out multiple bits of data at a time. In this example, there are four voltage levels that are used instead of two voltage levels. The four voltage levels can be used to send two data bits per time slot (i.e. data slot), which allows for higher bandwidth since more data is being sent out in a given time period. This multi-voltage level data scheme also allows for lower power consumption since a lower clock rate can be used to send the same amount of data. However, the multi-voltage level data scheme is more sensitive to ElectroMagnetic Interference (EMI) than a two voltage level data scheme.

For example, assuming there is a 1.8 Volt power supply, in the two voltage level data scheme, voltages of 0 V and 1.8 V can be used to transmit data, which means that there is a 0.9 V noise margin. With a four voltage level data scheme, voltages of 0 V, 0.6 V, 1.2V and 1.8V can be used for the different voltage levels, which means that there is a noise margin of 0.3 V. In the four voltage level case, 0 V can represent '00', 0.6 V can represent '01', 1.2 V can represent "10" and 1.8 V can represent '11'. It should be noted that when multilevel signaling is used, there is the minor limitation in that only a single device can determine more than one bit. Therefore, for any slots, where more than one device may want to write to (e.g. acknowledge or interrupt bits) this data slot would need to use two voltage level and not multilevel signaling.

Referring now to FIG. 78b, shown therein is a table of example encoding that can be used when a device sends out multiple packed bits in a data slot (i.e. multi-level signaling) using the overclocking mode. In this case, the receiving device will be configured to interpret the bits accordingly. This encoding will minimize the number of transitions on the bus 64 and thereby the power consumption. As an example (assuming six bits per data slot), if part of a binary word in the group has B17-B12="111001" then "100101" will be transmitted using the encoding scheme shown in FIG. 78b. As another example, if part of a binary stream is "101011" then "100001" will be transmitted using the encoding scheme shown in FIG. 78b. This scheme reduces the number of transitions and thereby reduces the power consumption as long as the encoded data (e.g. a bitstream from a microphone) conforms to the typical output from such a system (e.g. a delta-sigma converter operating in the normal range).

A system can be configured to have various combinations of the following modes of operation or changes in operation to achieve different levels of power consumption control.

The normal mode of operation may be set as the default operating mode. In this mode, the master device 52 may program a certain value so that the bus 64 is enabled and running. To achieve this, the master device 52 may program a value that is not equal to '00000' to the MCLKD field. The bus 64 is now enabled and running.

In at least one embodiment, the master device 52 may disable the bus 64 by programming a certain value, such as '00000', for example, to the MCLKD field. Conversely, the master device 52 may also wake up the bus 64 by programming a certain value, such as anything other than '00000', (when '00000' is used to disable the bus 64), for example, to the MCLKD field.

There may be changes made to the bus clock configuration in order to alter the power consumption. For example, in at least one embodiment, it is possible to switch the operating frequency of the bus 64 by changing the value stored in the master clock divide field MCLKD. In some instances the clock dividers for the individual device ports (see the PCLKD field) may also have to be changed simultaneously. Both operations should change the information in the inactive field BANK. When all devices have been set up, two PING operations with the same updated CURRENT BANK field may be used to change the operating mode.

There may be changes made to the bus mode configuration in order to alter the power consumption. For example, during the change of value for the BANK field, it may be possible to change the number of columns in a frame (see the FRAME STRUCTURE field). This allows for dynamic control of bandwidth. The COLUMN WIDTH field may then be changed in all devices attached to the bus 64 in the inactive BANK field. When this operation is complete, the CURRENT BANK field may be changed by submitting two PING frames (i.e. operations) with the new BANK number corresponding to the previous inactive BANK field.

Another mode of operation is the device BANDWIDTH CONTROL mode in which a device may request more bandwidth by activating the REQUEST BANK CHANGE field (during a PING operation). If the master device 52 has already set the ENABLE MODE CHANGES field to one, the BANK field will change during the next PING operation. In this embodiment, this will continue as long as the REQUEST BANK CHANGE field (during a PING operation) and the ENABLE MODE CHANGES field are both set to one. The master device 52 may allow for more bandwidth by configuring the second bank so that it allows more bandwidth than the original bank selection. In other embodiments, a device may request for less bandwidth in order to save power consumption.

Another mode of operation is the DEVICE ACTIVATED WAKE UP FROM BUS SLEEP mode in which any device can wake up the bus 64 by initiating an interrupt by changing the level of the DATA line after the master device 52 has turned off or disabled the clock to the bus 64. In this case, when the bus 64 is disabled, it may be kept in a tri-state mode but driven by a bus holder with a weak drive so that at least one of the slave devices can initiate the bus wake-up. When the slave device 54 initiates the device wakeup, the interrupt will be sent to the master device 52 which will then begin to activate the clock for the bus 64 again. In this case, the bus 64 acts as an input to the master device 52. In addition, in this case, all of the devices attached to the bus 64 will wake up unless they have been programmed to be in low power mode by other means. Since it is unknown, whether the clock of the master device 52 has been powered down or merely disabled, it may not be possible to achieve a low latency for this particular operation. In particular, if the master device 52 has been powered down, it may take several thousands of clock periods before the main oscillator of the master device 52 is running at normal level again, depending on the Q-factor of the crystal that is used in the oscillator.

Another mode of operation is the MASTER INITIATED DEVICE WAKE UP FROM SLEEP mode. For very low power consumption, most if not all of the devices may have their ports disabled and the bus 64 may be stopped. However, it is usually convenient to be able to selectively reduce the power consumption for a number of devices attached to the bus 64 to a bare minimum while still being able to communicate with the rest of the devices that are attached to the bus 64. To achieve this, SLEEP mode, which is initiated by the FUNCTION SET POWER ('0001' and '0010', partial shutdown), may be used to set a slave device in a special state where it will only monitor a frame once in a while and discard all of the other traffic on the bus 64 (see FIG. 79). The number of frames that will be ignored may be either 15 or 255 frames after which one frame will be monitored. These numbers has been chosen because it is easy to detect 16 or 256 clock cycles that have happened and because they are both divisible by 15. Thus, the waiting period may be any number of M=N*L frames, where N is a positive integer and L is selected based on the different number of synchronization codes that are used, where L is 15 in this example embodiment. In this technique, the pseudorandom counter inside the device that is sleeping will still match the next frame, even though a large number of frames have been skipped. For example, see FIG. 79 which shows a slave device that ignores 15*N frames in order to reduce power consumption while still staying in sync with the master device. Correctly implemented, this mode may result in an internal power consumption of less than 1 µA at a bus clock speed of 1 MHz, while the external power consumption (due to capacitive loading) may be an order of magnitude larger. To further lower the power consumption, the bus clock frequency may be set to be less than or equal to 100 kHz. In this mode of operation, the master device 52 may actively use the PING operation as a way to communicate back to the device that is sleeping. By writing to the DEVICE STATUS field (the default value may be zero), the master device 52 can set the most significant bit equal to a one (i.e. the high logic value). If the most significant bit is equal to one, the device should wake up again, while if it is zero, the device should maintain the lower power mode in this example embodiment. Since the device is asleep and only checking the data on the bus 64 every N*15 frames, then the master device 52 may have to send the device wake up command repeatedly for N*15 frames until the device actually wakes up.

Another mode of operation is the DEVICE INITIATED WAKEUP FROM SLEEP mode. This mode may be used for devices that require a low latency for data transfers after power down. An example of a typical scenario is a UART device that has been waiting for data and suddenly its internal buffer is quickly being filled up by data. Therefore, the UART device may have a lot of data to send but the master device 52 may have set the bus 64 to be inactive to reduce power consumption. Since crystal oscillators have a very long startup time approximately proportional to $Q/f_0$, where Q is the quality factor of the crystal and $f_0$ is the operating frequency (for example about 1 ms for a 10 MHz XTAL crystal and 1,000 ms for a 32.768 kHz crystal), it is may not always be possible to achieve low latency by utilizing a crystal oscillator. Therefore, a device that requires a low latency may instead use an internal relaxation (RC) oscillator with a low and known startup time (see FIG. 80b). The master device 52 may program the device for UART mode by setting the FUNCTION SET POWER. This allows a UART to dynamically control the bus 64 depending on the bandwidth that is used and to send data to the master device 52. The master device 52 may then take over when its crystal oscillator has stabilized. In alternative embodiments, an LC oscillator or a ring oscillator may be used instead of an RC oscillator. These different oscillators can restart in one or a few clock periods, which is advantageous, but they may result in more jitter than the clock signal of the master device 52.

In instances where the master device 52 wants to control the clock to avoid clock conflict before the UART device has taken over (e.g. there is no response from the UART device), the master device 52 can write different values to the DATA line one or more times with a certain delay without changing the clock line. This signals to the UART that the master device 52 wants to reactivate the clock signal again thereby avoiding a potential collision on the bus clock line.

It should be noted that although there are many options for reducing power consumption, a limiting factor may be the physical layer that is used in an implementation. Accordingly, all of the devices of a system may not be run on the same bus. Some devices may require much higher bandwidth than others, and power may be saved by running these devices on different busses. Furthermore, the system clock speed will increase with the number of devices that are attached to the bus 64, which increases capacitive losses and therefore further increases power consumption. In addition to this, it is possible to significantly minimize power losses by using a lower signaling voltage, e.g. 1.20 V instead of 1.80 V.

Referring now to FIG. 80a shown therein is an example of an alternative embodiment for various power consumption modes or power management modes that can be set for a port or a device using the unified bus communication protocol. The FUNCTION SET POWER can be used to set the operation mode of a port or of a device according to the at least one of the modes shown in FIG. 80a.

In this case, the power consumption scaling is set by a function and should not be considered to be exact but rather typical values. Therefore, the power levels indicated in FIG. 80a may vary for different slave devices. Modes that can change using the FUNCTION SET POWER may still have access to full control register map, but may likely affect the performance of analog circuits. A device may return from the shutdown modes 0000 to 0011 using special mechanisms, as described in the previous section on power management. In at least one embodiment, when a device is returned from the low power state, it may resume operation in the same mode as before the shutdown command was received.

In the shutdown power mode (0000), a slave device will be fully shutdown and activity on the bus 64 will no longer be monitored by the slave device. It is not possible for the master device 52 to wake up the slave device once put into the shutdown power mode. A wake up of the slave device may have to be done by the slave device itself or by using an extra terminal for a control signal that is used to wake up the fully shutdown slave device.

In the gated clock shutdown power modes (0001 and 0010), there is very low power consumption and clock gating of internal circuits is used for a slave device placed in either of these modes. Furthermore, all ports and all internal functions are powered down. The bus 64 is no longer monitored, but during every $M^{th}$ frame, the slave device will activate its logic and be awake for one frame (see FIG. 79 for an example). The slave device will still check if it is still in sync, check the X and Y words and respond accordingly. If the master device 52 wants to wake up the slave device in this mode, it may need to write to this slave device up to M times before the slave device receives the message and responds. If the slave device sees a synchronization error (e.g. due to a mode change while it was asleep), after a certain number of sync errors, such as two for example, it will try to get back in sync again, and will power its internal logic up in the process. After getting back in sync, the slave device will again deactivate its internal logic. It should be noted that for the value of M=16=15+1, a full cycle (i.e. 15 frames) of the pseudorandom sync counter is skipped, while for M=256=15*17+1, i.e. 17 cycles (i.e. 272 frames) of the pseudorandom sync counter are skipped and the next frame is monitored for this example embodiment.

Referring again to FIG. 80a, the power consumption mode '0011' may be used for the UART clock stop mode, where the UART can wake up the bus 64 itself after the clock has stopped. The power consumption mode '1000' may be used for a control-only application, where all internal circuits are shutdown, except the logic associated with the unified bus protocol. The power consumption modes '1001' to '1111' may be used for normal operating mode with various current scaling to the internal circuits thereby determining the actual performance of the device. Selecting between these modes will be a compromise between current consumption and slave device performance. The power consumption modes '0100' to '0111' are currently undefined and may be mapped to the first available lower power mode in a slave device.

Another way to enhance data communication using an embodiment of the unified bus communication protocol is to change how the clock signal is transmitted on the bus 64. For example, it is possible to use one or more timeslots that are normally used for data transmission in order to add redundancy to the data signal and thereby convey clock information that is multiplexed with data in the data signal. Therefore, the data itself is used to convey a clock edge. This allows for an increase in efficiency for data transfer as will now be described. This also results in less power consumption and the bandwidth utilized to convey the clock information can be reduced. This technique can be used if bitstream data is being transmitted or if word data is being transmitted over a single wire or using a single transmission channel. This technique also allows for each data channel to be controlled independently of one another as the technique to generate the clock signal does not combine data from different channels. This technique can also be used with multiple sources. This technique guarantees that there will be a clock transition every D bits. This technique also allows for synchronization to be maintained without using a second wire for separate clock and data lines.

Referring now to FIG. 81a, shown therein is an example embodiment of the unified data format in which a single wire is used to transfer clock and data. The clock is defined by the rising edges, while the data is defined by the falling edges. This has been described more in published U.S. patent application 2012/0144078, entitled "Single wire bus system". Each data bit is transmitted using three time slots: one time slot is used for sending a clock low signal, one time slot is used for sending a clock high signal and one time slot is used for the actual data. Accordingly, in this example the leading edge is used to convey clock information while the trailing edge is used to convey data information. In this case, the data bandwidth is ⅓ and the power consumption is related to 2 transitions per bit (one transition for low-high and one transition for high-low).

Referring now to FIG. 81b, shown therein is a second example of data transfer in which four data bits are transmitted using six data slots or time slots. Again, two time slots are utilized to convey the clock information (a first data slot signals a low clock signal and a second data slot signals a high clock signal). In this case, the data bandwidth is ⅔ and the power consumption is related to 0.875 transitions per bit. Thus, both the bandwidth available for data transfer is higher and the power consumption lower as compared to FIG. 81a, while the same low-to-high transition for synchronization is used.

Referring now to FIG. 81c, shown therein is an example of data transfer which uses bit inversion to transmit clock and data information more efficiently. In this case, one data bit out of a group of data bits is repeated once but transmitted the second time with an alternate polarity (i.e. it is bit inverted), thereby creating a clock transition for every group of data symbols. In other words, the first bit of a string of data is repeated a second time with opposite polarity, in order to convey an edge of a clock signal. In other words, one of the data bits is transmitted twice, once inverted and once normal (or vice-versa), to provide a clock transition for every group of data and providing devices with a transition to use in order to lock onto the bus. Accordingly, $D_0$ and $\overline{D_0}$ provide the clock pulse as well as transmit one bit of data (i.e. $D_0$). In an alternative embodiment, these two bits could be transmitted in opposite order. The data bit $D_0$ is transmitting information such as audio information, control information or other information. Therefore, the data bit $D_0$ can have any value regardless of the activity on the bus 64. Accordingly, in the six time slots there are now five bits of data that are transmitted.

In the example of FIG. 81c, the data bandwidth is ⅚ (five transmitted bits per six data slots) and the power consumption is related to 0.7 transitions per bit. In order to make this determination it is assumed that the data bits are not correlated. Therefore, going from $\overline{D_0} \rightarrow D1$, $D1 \rightarrow D2$, $D2 \rightarrow D3$, and $D4 \rightarrow D0$ there is a probability of ½ of a transition (if the next bit is the same value, there is no transition). The transition from D0 to $\overline{D_0}$ has a probability of 1 of a transition. Therefore, the total number of transitions is 5*0.5+1=3.5. There are a total of 5 bits that are transmitted. Therefore, the total power consumption per bit is 0.7 transitions per bit (i.e. 3.5/5). Accordingly, this new method of data bit inversion to convey clock and data information results in a greater bandwidth and lower power consumption as compared to the examples of FIGS. 81a and 81b. In addition, with this technique, it should be noted that all data slots can still be driven individually.

The schemes in FIGS. 81b and 81c are suited for bus systems that use high bandwidth and have low power consumption and also use a single wire or medium to transmit information. In other embodiments, the transmission medium could be optical or wireless. It should be noted that a PLL will typically be used in the receiver of a device in order to extract the clock information from the stream of data. Furthermore, a PLL that utilizes a single clock edge (e.g. low-to-high or high-to-low) transition, such as type III or type IV phase detectors, may utilize a small delay line together with an XOR gate in order to find the transition for every group of data. In this application, the delay could conveniently be approximately equal to one data slot and the direct and the delayed signal may be feed to an XOR gate and the output from the XOR gate may be provided to the phase detector.

In one aspect, at least one embodiment described herein provides a method of synchronizing a slave device to a master device that communicates using a unified bus communication protocol having first and second modes of operation. The method comprises assuming the first mode of operation for the unified bus communication protocol; searching for a synchronization pattern at one or more locations in transmitted data according to the first mode of operation; obtaining synchronization when the located synchronization pattern is verified according to at least one synchronization rule for the mode of operation; and if synchronization is not obtained assuming the first mode of operation, assuming the second mode of operation for the unified bus communication protocol and carrying out the searching and obtaining acts on the transmitted data according to the second mode of operation.

In at least one embodiment, the synchronization pattern comprises a constant sync portion and a dynamic sync portion and the searching act comprises searching for the constant sync portion.

In at least one embodiment, the constant sync portion is different for the first and second modes of operation.

In at least one embodiment, the dynamic sync portion is generated by a deterministic method such that the dynamic sync portions of two consecutive synchronization patterns are different.

In at least one embodiment, the deterministic method employs a Cyclic Redundancy Counter (CRC).

In at least one embodiment, the first mode of operation is word mode and the second mode of operation is bitstream mode or the first mode of operation is bitstream mode and the second mode of operation is word mode.

In at least one embodiment, when assuming word mode as the mode of operation, the searching act is performed on the transmitted data for various starting time slot positions up to and including a maximum frame length unless the synchronization pattern has been located earlier.

In at least one embodiment, when assuming bitstream mode as the mode of operation, the searching act is performed on the transmitted data for various starting time slot positions up to and including a maximum frame length and this is repeated for a maximum number of frame channels unless the synchronization pattern has been located earlier.

In at least one embodiment, once the synchronization pattern has been located, the searching and obtaining acts comprise searching for the next synchronization pattern in order to determine a frame length that is being used by the unified bus communication protocol.

In at least one embodiment, the at least one synchronization rule comprises performing the searching and obtaining acts several times to verify that the determined frame length is correct.

In at least one embodiment, the searching and obtaining acts comprise reading a current dynamic sync portion associated with a constant sync portion that is located, the at least one synchronization rule comprises calculating an expected dynamic sync portion based on the deterministic method and the current dynamic sync portion, locating a next constant sync portion and comparing a dynamic sync portion associated with the next constant sync portion with the expected dynamic sync portion to reduce the chance of false synchronization.

In at least one embodiment, the at least one synchronization rule comprises repeating the calculating, locating and comparing acts one or more times to further reduce the chance of false synchronization.

In at least one embodiment, the at least one synchronization rule comprises adding a random component in the locating and obtaining acts to improve the chances of synchronization under noisy conditions on bus traffic.

In at least one embodiment, the random component comprises reading the parity of the bus traffic for a certain period of time and using the parity information to aid in determining whether the currently located synchronization pattern is a true pattern or a false pattern.

In at least one embodiment, the random component is used when the synchronization pattern has been located under one or more errors.

In at least one embodiment, the first mode of operation is bitstream mode and clock gating is used to skip data from frame channels in which bits of the synchronization pattern are not assumed to exist.

In at least one embodiment, the method employs clock gating and a common search structure for searching for the synchronization pattern under both word mode and bitstream mode of operation.

In at least one embodiment, if the slave device falls out of synchronization, the slave device assumes a frame length and a frame format determined during previous a previous successful synchronization attempt and attempts to regain synchronization.

In at least one embodiment, if the dynamic sync portion associated with the next constant sync portion does not match the expected dynamic sync portion, the method further comprises continuing to search for a constant sync portion with a dynamic sync portion that matches the expected dynamic sync portion.

In at least one embodiment, a limit is placed on how many constant sync portions are searched for and located to locate the dynamic sync portion that matches the expected dynamic sync portion.

In at least one embodiment, if the limit is reached without finding the match, the method further comprises selecting any of the located constant sync portions as a valid sync portion.

In at least one embodiment, after synchronization has been achieved the method further comprises maintaining synchronization by examining positions in the transmitted data that are in the vicinity of a determined frame length's distance from a previous located synchronization pattern.

In at least one embodiment, the method further comprises maintaining a current located constant sync portion regardless of not finding a match between an expected dynamic sync portion and an actual dynamic sync portion until the searching exceeds a maximum frame length at which point the current located constant sync portion is discarded and an ensuing constant sync portion is used as the current located constant sync portion and the search for the match is continued.

In at least one embodiment, the method further comprises generating a table of the dynamic sync portions corresponding to all valid constant sync portions located within a maximum length of data, analyzing positions of the dynamic sync portions which match expected dynamic sync portions for a repetition in separation between consecutive positions to determine actual frame length, and using the actual frame length to obtain synchronization.

In another aspect, at least one embodiment described herein provides a method of synchronizing to a master device that communicates using a unified bus communication protocol having first and second modes of operation. The method comprises assuming the first and second modes of operation for the unified bus communication protocol; concurrently searching for a synchronization pattern at one or more locations in data transmitted according to the first and second modes of operation; obtaining synchronization when the located synchronization pattern is verified according to at least one synchronization rule for one of the first and second modes of operation; and if synchronization is not obtained, carrying out the searching and obtaining acts according to the first and second modes of operation on the transmitted data according to the unified bus communication protocol.

In at least one embodiment, the method may incorporate one or more of the features described above for the various method embodiments.

In yet another aspect, at least one embodiment described herein provides a method of synchronizing a slave device to a master device that communicates using a bitstream frame format. The method comprises searching for a synchronization pattern at one or more locations in transmitted data according to the bitstream frame format; obtaining synchronization when the located synchronization pattern is verified according to at least one synchronization rule for the mode of operation; and if synchronization is not obtained, repeatedly carrying out the searching and obtaining acts on newly transmitted data, wherein in the bitstream frame format, the synchronization pattern is multiplexed one bit at a time with other transmitted data.

In at least one embodiment, the method may incorporate one or more of the features described above for the various method embodiments.

In yet another aspect, at least one embodiment described herein provides a method of synchronizing a slave device to a master device that communicates using a word frame format. The method comprises searching for a synchronization pattern at one or more locations in transmitted data according to the word frame format; obtaining synchronization when the located synchronization pattern is verified according to at least one synchronization rule for the mode of operation; and if synchronization is not obtained, repeatedly carrying out the searching and obtaining acts on newly transmitted data, wherein in the word frame format, the synchronization pattern is transmitted in consecutive bits in every frame of data.

In at least one embodiment, the method may incorporate one or more of the features described above for the various method embodiments.

In yet another aspect, at least one embodiment described herein provides an electronic device that communicates according to a unified bus communication protocol having first and second modes of operation. The device comprises an interface for sending and receiving signals; and a mux and sync engine coupled to the interface, the mux and sync engine being configured to synchronize the electronic device with a second electronic device by assuming the first mode of operation for the unified bus communication protocol; searching for a synchronization pattern at one or more locations in transmitted data according to the first mode of operation; obtaining synchronization when the located synchronization pattern is verified according to at least one synchronization rule for the mode of operation; and if synchronization is not obtained assuming the first mode of operation, assuming the second mode of operation for the unified bus communication protocol and carrying out the searching and obtaining acts on the transmitted data according to the second mode of operation, wherein the electronic device is a slave device and the second electronic device is a master device.

In at least one embodiment, the device may incorporate one or more of the features described above for the various method embodiments.

In yet another aspect, at least one embodiment described herein provides an electronic device that communicates according to a unified bus communication protocol having first and second modes of operation. The device comprises an interface for sending and receiving signals; and a mux and sync engine coupled to the interface, the mux and sync engine being configured to synchronize the electronic device with a second electronic device by assuming the first and second modes of operation for the unified bus communication protocol; concurrently searching for a synchronization pattern at one or more locations in data transmitted according to the first and second modes of operation; obtaining synchronization when the located synchronization pattern is verified according to at least one synchronization rule for one of the first and second modes of operation; and if synchronization is not obtained, carrying out the searching and obtaining acts according to the first and second modes of operation on the transmitted data according to the unified bus communication protocol, wherein the electronic device is a slave device and the second electronic device is a master device.

In at least one embodiment, the device may incorporate one or more of the features described above for the various method embodiments.

In yet another aspect, at least one embodiment described herein provides an electronic device that communicates according to a bitstream frame format. The device comprises an interface for sending and receiving signals; and a mux and sync engine coupled to the interface, the mux and sync engine being configured to synchronize the electronic device with a second electronic device by searching for a synchronization pattern at one or more locations in transmitted data according to the bitstream frame format; obtaining synchronization when the located synchronization pattern is verified according to at least one synchronization rule for the mode of operation; and if synchronization is not obtained, repeatedly carrying out the searching and obtaining acts on newly transmitted data, wherein in the bitstream frame format, the synchronization pattern is multiplexed one bit at a time with other transmitted data, and wherein the electronic device is a slave device and the second electronic device is a master device.

In at least one embodiment, the device may incorporate one or more of the features described above for the various method embodiments.

In yet another aspect, at least one embodiment described herein provides an electronic device that communicates according to a word frame format. The device comprises an interface for sending and receiving signals; and a mux and sync engine coupled to the interface, the mux and sync engine being configured to synchronize the electronic device with a second electronic device by searching for a synchronization pattern at one or more locations in transmitted data according to the word frame format; obtaining synchronization when the located synchronization pattern is verified according to at least one synchronization rule for the mode of operation; and if synchronization is not obtained, repeatedly carrying out the searching and obtaining acts on newly transmitted data, wherein in the word frame format, the synchronization pattern is transmitted in consecutive bits in every frame of data, and wherein the electronic device is a slave device and the second electronic device is a master device.

In at least one embodiment, the device may incorporate one or more of the features described above for the various method embodiments.

In yet another aspect, at least one embodiment described herein provides a non-transitory computer readable medium comprising a plurality of instructions executable on a microprocessor of a slave device for adapting the microprocessor to implement a method of synchronizing the slave device to a master device that communicates using a unified bus communication protocol having first and second modes of operation, wherein the method comprises assuming the first mode of operation for the unified bus communication protocol; searching for a synchronization pattern at one or more locations in transmitted data according to the first mode of operation; obtaining synchronization when the located synchronization pattern is verified according to at least one synchronization rule for the mode of operation; and if synchronization is not obtained assuming the first mode of operation, assuming the second mode of operation for the unified bus communication protocol and carrying out the searching and obtaining acts on the transmitted data according to the second mode of operation.

In at least one embodiment, the non-transitory computer readable medium may incorporate one or more of the features described above for the various method embodiments.

In yet another aspect, at least one embodiment described herein provides a non-transitory computer readable medium comprising a plurality of instructions executable on a microprocessor of a slave device for adapting the microprocessor to implement a method of synchronizing the slave device to a master device that communicates using a unified bus communication protocol having first and second modes of operation, wherein the method comprises assuming the first and second modes of operation for the unified bus communication protocol; concurrently searching for a synchronization pattern at one or more locations in data transmitted according to the first and second modes of operation; obtaining synchronization when the located synchronization pattern is verified according to at least one synchronization rule for one of the first and second modes of operation; and if synchronization is not obtained, carrying out the searching and obtaining acts according to the first and second modes of operation on the transmitted data according to the unified bus communication protocol.

In at least one embodiment, the non-transitory computer readable medium may incorporate one or more of the features described above for the various method embodiments.

In yet another aspect, at least one embodiment described herein provides a non-transitory computer readable medium comprising a plurality of instructions executable on a microprocessor of a slave device for adapting the microprocessor to implement a method of synchronizing the slave device to a master device that communicates using a bitstream frame format, wherein the method comprises: searching for a synchronization pattern at one or more locations in transmitted data according to the bitstream frame format; obtaining synchronization when the located synchronization pattern is verified according to at least one synchronization rule for the mode of operation; and if synchronization is not obtained, repeatedly carrying out the searching and obtaining acts on newly transmitted data, wherein in the bitstream frame format, the synchronization pattern is multiplexed one bit at a time with other transmitted data.

In at least one embodiment, the non-transitory computer readable medium may incorporate one or more of the features described above for the various method embodiments.

In yet another aspect, at least one embodiment described herein provides a non-transitory computer readable medium comprising a plurality of instructions executable on a microprocessor of a slave device for adapting the microprocessor to implement a method of synchronizing the slave device to a master device that communicates using a word frame format, wherein the method comprises: searching for a synchronization pattern at one or more locations in transmitted data according to the word frame format; obtaining synchronization when the located synchronization pattern is verified according to at least one synchronization rule for the mode of operation; and if synchronization is not obtained, repeatedly carrying out the searching and obtaining acts on newly transmitted data, wherein in the word frame format, the synchronization pattern is transmitted in consecutive bits in every frame of data.

In at least one embodiment, the non-transitory computer readable medium may incorporate one or more of the features described above for the various method embodiments.

It should also be noted that at least some of the elements used to perform at least one of the methods of the unified bus communication protocol and the associated synchronization techniques described herein that are implemented via software may be written in a high-level procedural language such as object oriented programming. Accordingly, the program code may be written in C, C++ or any other suitable programming language and may comprise modules or classes, as is known to those skilled in object oriented programming. Alternatively, or in addition thereto, at least some of these elements implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the methods of the unified bus communication protocol described herein. The program code, when read by a processor, configures the processor to operate in a new, specific and predefined manner in order to perform at least one of the methods described herein for the unified bus communication protocol.

Furthermore, at least some of the methods described herein are capable of being distributed in a computer program product comprising a non-transitory computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

What is claimed is:

1. A method of synchronizing a slave device to a master device on a wired bus using a synchronization field, the method comprising:

receiving a bitstream of data on the wired bus, the bitstream comprising occurrences of the synchronization field, the synchronization field comprising a constant sync field and a dynamic sync field, the constant sync field having a constant sync value;

locating a first occurrence of the synchronization field in the received bitstream by searching for the constant sync value of the constant sync field;

reading a first value of the dynamic sync field of the located first occurrence of the synchronization field;

based on the first value computing an expected value of the dynamic sync field of a next occurrence of the synchronization field;

locating the next occurrence of the synchronization field by searching again for the constant sync value of the constant sync field in the bitstream;

reading a second value of the dynamic sync field of the located next occurrence of the synchronization field; and verifying that the second value is equal to the computed expected value, wherein the first value of the dynamic sync field comprises a pseudorandom value.

2. The method of claim 1, wherein the dynamic sync field is 4 bits in length.

3. The method of claim 1, wherein the constant sync value comprises the bit string "10110001".

4. The method of claim 2, wherein when the first value is represented in MSB (Most Significant Bit) first order as {S4, S3, S2, S1}, then the expected value of the dynamic sync field of the next occurrence of the synchronization field in MSB first order is {S3, S2, S1, (S4 XOR S3)}, where XOR is the "exclusive or" operation.

5. A method of enabling synchronization of slave devices to a master device on a wired bus using a synchronization field, the synchronization field comprising a constant sync field and a dynamic sync field, the constant sync field having a constant sync value, the method comprising:

transmitting, by the master device, in a first frame within a bitstream of data on the wired bus, a first instance of the synchronization field, the dynamic sync field of the first instance having a first dynamic sync value; and transmitting, by the master device, in a second frame within the bitstream, the second frame being successive to the first frame, a second instance of the synchronization field, the dynamic sync field of the second instance having a second dynamic sync value, wherein the second dynamic sync value can be determined from the first dynamic sync value;

wherein the first dynamic sync value comprises a pseudorandom value.

6. The method of claim 5, wherein the dynamic sync field is 4 bits in length.

7. The method of claim 5, wherein the constant sync value comprises the bit string "10110001".

8. The method of claim 6, wherein a first time the synchronization field is transmitted after reset the master device sets the dynamic sync field to a value of "1111".

9. The method of claim 6, wherein when the first dynamic sync value is represented in MSB (Most Significant Bit) first order as {S4, S3, S2, S1}, the second dynamic sync value in MSB first order is {S3, S2, S1, S4 XOR S3}, where XOR is the "exclusive or" operation.

10. An electronic device that synchronizes with another electronic device on a wired bus using a synchronization field, the electronic device comprising:
a memory storing executable instructions; and
a processor in communication with the memory configured to execute the instructions to cause the device to:
receive a bitstream of data on the wired bus, the bitstream comprising occurrences of the synchronization field, the synchronization field comprising a constant sync field and a dynamic sync field, the constant sync field having a constant sync value;
locate a first occurrence of the synchronization field in the received bitstream by searching for the constant sync value of the constant sync field;
read a first value of the dynamic sync field of the located first occurrence of the synchronization field;
based on the first value compute an expected value of the dynamic sync field of a next occurrence of the synchronization field;
locate the next occurrence of the synchronization field by searching again for the constant sync value of the constant sync field in the bitstream;
read a second value of the dynamic sync field of the located next occurrence of the synchronization field; and
verify that the second value is equal to the computed expected value,
wherein the first value of the dynamic sync field comprises a pseudorandom value.

11. The device of claim 10, wherein the dynamic sync field is 4 bits in length.

12. The device of claim 10, wherein the constant sync value comprises the bit string "10110001".

13. The device of claim 11, wherein when the first value is represented in MSB (Most Significant Bit) first order as {S4, S3, S2, S1}, then the expected value of the dynamic sync field of the next occurrence of the synchronization field in MSB first order is {S3, S2, S1, (S4 XOR S3)}, where XOR is the "exclusive or" operation.

14. An electronic device that synchronizes with another electronic device on a wired bus using a synchronization field, the synchronization field comprising a constant sync field and a dynamic sync field, the constant sync field having a constant sync value, the electronic device comprising:
a memory storing executable instructions; and
a processor in communication with the memory configured to execute the instructions to cause the device to:
transmit in a first frame within a bitstream of data on the wired bus a first instance of the synchronization field, the dynamic sync field of the first instance having a first dynamic sync value; and
transmit in a second frame within the bitstream, the second frame being successive to the first frame, a second instance of the synchronization field, the dynamic sync field of the second instance having a second dynamic sync value, wherein the second dynamic sync value can be determined from the first dynamic sync value;
wherein the first dynamic sync value comprises a pseudorandom value.

15. The device of claim 14, wherein the dynamic sync field is 4 bits in length.

16. The device of claim 14, wherein the constant sync value comprises the bit string "10110001".

17. The device of claim 15, wherein the processor is further configured to cause the device to set the dynamic sync field to "1111" a first time that the synchronization field is transmitted after reset.

18. The device of claim 15, wherein when the first dynamic sync value is represented in MSB (Most Significant Bit) first order as {S4, S3, S2, S1}, the second dynamic sync value in MSB first order is {S3, S2, 51, S4 XOR S3}, where XOR is the "exclusive or" operation.

19. A non-transitory computer readable medium comprising instructions executable on a processor of an electronic device that synchronizes to another electronic device on a wired bus using a synchronization field, the instructions causing the processor to execute a method comprising:
receiving a bitstream of data on the wired bus, the bitstream comprising occurrences of the synchronization field, the synchronization field comprising a constant sync field and a dynamic sync field, the constant sync field having a constant sync value;
locating a first occurrence of the synchronization field in the received bitstream by searching for the constant sync value of the constant sync field;
reading a first value of the dynamic sync field of the located first occurrence of the synchronization field;
based on the first value computing an expected value of the dynamic sync field of a next occurrence of the synchronization field;
locating the next occurrence of the synchronization field by searching again for the constant sync value of the constant sync field in the bitstream;
reading a second value of the dynamic sync field of the located next occurrence of the synchronization field; and
verifying that the second value is equal to the computed expected value,
wherein the first value of the dynamic sync field comprises a pseudorandom value.

20. A non-transitory computer readable medium comprising instructions executable on a processor of an electronic device that synchronizes with another electronic device on a wired bus using a synchronization field, the synchronization field comprising a constant sync field and a dynamic sync field, the constant sync field having a constant sync value, the instructions causing the processor to execute a method comprising:
transmitting in a first frame within a bitstream of data on the wired bus, a first instance of the synchronization field, the dynamic sync field of the first instance having a first dynamic sync value; and
transmitting in a second frame within the bitstream, the second frame being successive to the first frame, a second instance of the synchronization field, the dynamic sync field of the second instance having a second dynamic sync value, wherein the second dynamic sync value can be determined from the first dynamic sync value;

wherein the first dynamic sync value comprises a pseudorandom value.

* * * * *